US006912510B1

(12) United States Patent
Shepherd

(10) Patent No.: US 6,912,510 B1
(45) Date of Patent: *Jun. 28, 2005

(54) METHODS OF EXCHANGING AN OBLIGATION

(75) Inventor: Ian Kenneth Shepherd, Toorak (AU)

(73) Assignee: Alice Corporation PTY LTD, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,507

(22) Filed: May 9, 2000

Related U.S. Application Data

(63) Continuation of application No. 08/870,691, filed on Jun. 6, 1997, now Pat. No. 6,134,536, which is a continuation-in-part of application No. 08/070,136, filed on May 28, 1993, now Pat. No. 5,970,497, and a continuation-in-part of application No. PCT/AU95/00827, filed on Dec. 7, 1995.

(30) Foreign Application Priority Data

| May 29, 1992 | (AU) | ............................................. | PL2677 |
| Jun. 30, 1992 | (AU) | ............................................. | PL3216 |
| Jul. 12, 1994 | (AU) | ............................................. | PM9922 |
| Jul. 7, 1995 | (AU) | ............................................. | PN4060 |

(51) Int. Cl.[7] ............................................. G06F 17/60
(52) U.S. Cl. ..................................................... 705/37
(58) Field of Search ............................ 705/35, 36, 37, 705/38, 39, 10, 80

(56) References Cited

U.S. PATENT DOCUMENTS

| 3,573,747 A | 4/1971 | Adams et al. ............ 340/172.5 |
| 3,956,615 A | 5/1976 | Anderson et al. |
| 4,314,352 A | 2/1982 | Fought |
| 4,346,442 A | 8/1982 | Musmanno ................. 364/408 |
| 4,376,978 A | 3/1983 | Musmanno ................. 364/408 |

(Continued)

FOREIGN PATENT DOCUMENTS

| EP | 0276816 A2 * | 8/1988 | |
| EP | 0 407 026 A2 | 1/1991 | ........... G06F/15/24 |
| EP | 0 434 224 A2 | 6/1991 | ........... G06F/15/21 |
| EP | 0 448 800 A1 | 10/1991 | ........... G06F/15/21 |
| EP | 0 512 702 A2 | 11/1992 | ........... G06F/15/21 |

(Continued)

OTHER PUBLICATIONS

"Heavy Losses Have Been Chalked Up by City Punters Betting on the Financial Markets," *Evening Standard*, Oct. 22, 1987, p. 39.

(Continued)

*Primary Examiner*—Vincent Millin
*Assistant Examiner*—Sandra Snapp
(74) *Attorney, Agent, or Firm*—Sterne, Kessler, Goldstein & Fox PLLC

(57) ABSTRACT

A method of exchanging an obligation between parties where the exchange is administered by a supervisory institution that ensures real-time settling of obligations between parties by updating shadow records in real-time and instructing one or more exchange institutions to effect, from time to time, the exchange of obligations in accounts maintained external to the supervisory institution. Updates to the exchange institution accounts may reflect the net obligations of parties over a nominated period of time. The role of the supervisory institution is to ensure that obligations are only settled where parties have sufficient balance in their shadow records to complete the transaction. Obligations that can be exchanged include, but are not limited to: shares in financial or physical assets, participation rights in wagers, national or synthetic currencies, exchange settlement account deposits, taxation account deposits, and deposits of financial instruments or precious metals.

75 Claims, 117 Drawing Sheets

U.S. PATENT DOCUMENTS

| | | | |
|---|---|---|---|
| 4,484,304 A | | 11/1984 | Anderson et al. |
| 4,648,037 A | * | 3/1987 | Valentino ................... 705/36 |
| 4,674,044 A | | 6/1987 | Kalmus ..................... 364/408 |
| 4,694,397 A | | 9/1987 | Grant et al. |
| 4,722,055 A | | 1/1988 | Roberts .................... 364/408 |
| 4,739,478 A | | 4/1988 | Roberts et al. ............ 364/408 |
| 4,751,640 A | | 6/1988 | Lucas et al. ............... 364/408 |
| 4,766,539 A | | 8/1988 | Fox ........................... 364/401 |
| 4,774,663 A | * | 9/1988 | Musmanno et al. ......... 705/36 |
| 4,799,156 A | * | 1/1989 | Shavit et al. ................ 705/26 |
| 4,823,264 A | | 4/1989 | Deming .................... 364/408 |
| 4,831,526 A | | 5/1989 | Luchs et al. ............... 364/401 |
| 4,839,804 A | | 6/1989 | Roberts et al. ............ 364/408 |
| RE32,985 | * | 7/1989 | Nagata et al. ............... 705/41 |
| 4,891,503 A | | 1/1990 | Jewell |
| 4,903,201 A | | 2/1990 | Wagner ..................... 364/408 |
| 4,933,842 A | | 6/1990 | Durbin et al. ............. 364/408 |
| 4,953,085 A | | 8/1990 | Atkins ....................... 364/408 |
| 4,975,840 A | | 12/1990 | DeTore et al. ............ 364/401 |
| 4,980,826 A | | 12/1990 | Wagner ..................... 364/408 |
| 5,012,077 A | * | 4/1991 | Takano ...................... 235/380 |
| 5,025,138 A | * | 6/1991 | Cuervo ....................... 705/38 |
| 5,063,507 A | | 11/1991 | Lindsey et al. |
| 5,077,665 A | | 12/1991 | Silverman et al. ......... 364/408 |
| 5,093,787 A | | 3/1992 | Simmons |
| 5,101,353 A | | 3/1992 | Lupien et al. ............. 364/408 |
| 5,126,936 A | | 6/1992 | Champion et al. ......... 364/408 |
| 5,136,501 A | * | 8/1992 | Silverman et al. ........... 705/37 |
| 5,148,365 A | * | 9/1992 | Dembo ....................... 705/36 |
| 5,220,501 A | | 6/1993 | Lawlor et al. |
| 5,262,942 A | | 11/1993 | Earle |
| 5,265,007 A | | 11/1993 | Barnhard, Jr. et al. |
| 5,285,383 A | | 2/1994 | Lindsey et al. |
| 5,297,032 A | | 3/1994 | Trojan et al. |
| 5,361,199 A | | 11/1994 | Shoquist et al. |
| 5,453,601 A | | 9/1995 | Rosen |
| 5,455,407 A | | 10/1995 | Rosen |
| 5,898,154 A | | 4/1999 | Rosen |
| 5,970,479 A | * | 10/1999 | Shepherd ..................... 705/37 |
| 6,122,625 A | | 9/2000 | Rosen |
| 6,134,536 A | | 10/2000 | Shepherd ..................... 705/37 |
| 6,157,918 A | | 12/2000 | Shepherd ..................... 705/37 |

FOREIGN PATENT DOCUMENTS

| | | | | | |
|---|---|---|---|---|---|
| GB | | 1 489 573 | | 10/1977 | .......... G06F/15/20 |
| GB | | 2066540 A | * | 7/1981 | |
| GB | | 2 180 380 A | | 3/1987 | .......... G06F/15/21 |
| WO | | WO 90/11571 | | 10/1990 | .......... G06F/15/21 |
| WO | | WO 91/14231 | | 9/1991 | .......... G06F/15/21 |
| WO | | WO 93/15467 | | 8/1993 | .......... G06F/15/24 |
| WO | | WO 94/20912 | | 9/1994 | .......... G06F/15/30 |
| WO | | WO 94/28496 | | 12/1994 | .......... G06F/15/21 |
| WO | | WO 96/18160 | | 6/1996 | .......... G06F/17/60 |

OTHER PUBLICATIONS

"A Number of City Brokers and Dealers are Facing Financial Ruin as a Result of Losses They Have Incurred by Gambling on Future Movements in Stock Market Indices," *Evening Standard*, Oct. 30, 1987, p. 59.

"Christopher Hales, the Managing Director of City Index, the Organisation that Allows Punters to Bet on the FTSE Index, Has Not Yet Been Offered a Porsche . . . " *Evening Standard*, Nov. 2, 1987, p. 50.

"The Game of Professional Investment is Intolerably Boring and Over–Exacting to Anyone Who is Entirely Exempt from the Gambling Instinct, While He Who Has it Must Pay to this Propensity the Appropriate Toll," *Plannes Savings*, Dec. 1987, pp. 50–51.

"UK: Law Prohibiting Stock Market Betting Agencies from Suing Clients Overturned in Recent Legislation," *The Times*, Jul. 24, 1990.

"UK: Court Rules Gamblers Owing Money on Bets on Stock Market Have to Pay Up," *Mail on Sunday*, Jul. 29, 1990, p. 61.

"UK: Independent Law Report—Stock Market Movement Bet Claimed," *Independent* Aug. 3, 1990, p. 13.

"UK: City Index Successfully Sues Spencer Leslie for £35,000," *Euroweek* Aug. 3, 1990, p. 23.

"UK: Times Law Report—Differences Contract is Enforceable," *The Times*, Oct. 3, 1990.

"Testimony of Dr. Wendy L. Gramm, Chairman, Commodity Futures Trading Commision"–before the Committee on Agriculture, United States House Representatives, Jun. 14, 1989.

Churburk, David, "Discount Hunter: Using Personal Computers to Invest", Forbes, Jun. 26, 1989.

"The Federal Reserve Wire Transfer Network", Federal Reserve Bank of New York, Aug. 1989.

Winkler, Matthew, "Dean Witter Brokers Fume at Undercutting by Sears", The Wall Street Journal, Aug. 23, 1989.

"Societe Generale and General Electric Set Up Fimatex", Le Monde, Sep. 5, 1989.

"Austraclear Limited—Expert Paper Submitted to Study of International Clearing and Settlement", by US Office of Technology Assessment, Oct. 1989.

"Cedel—Expert Paper Submitted to Study of International Clearing and Settlement", by US Office of Technology Assessment, Oct. 1989.

Ruder, David S., "October Recollections: The Future of the US Securities Markets", United States Securities and Exchange Commission, Oct. 20, 1988.

"Study of International Clearing and Settlement"; Administered by Bankers Trust Company Under Contract to the Office of Technology Assessment, Congress of the United States, Oct. 1989, vol. 1, pp. 1–72.

"International Conference on Block Box Automated Trading Systems"—Transcript, Nov. 8, 1989, pp. 39–67 (covering papers by Wal Reisch, Executive Director, ICCH, and Bjorn Wissen, Chairman and CEO, Transvik).

"LIFFE Launches Automated Pit Trading", Financial Times, Nov. 30, 1989.

"Telerate and AT&T Agree to Global Transaction Services Company Purchase", Business Wire, Dec. 4, 1989.

"NASD's Portal System May Not Attract Major Players, Sources Say", Securities Week, Feb. 12, 1990.

"Corporate Treasury Management from Cognotec—Online and On Time", Accountancy, Apr. 4, 1990.

"Globex Likely to Emerge as Winner in Future Battle", Banking Technology, Apr. 12, 1990.

Layne, Richard, "Venture Links Investors, Brokers", American Banker, Jun. 26, 1990.

"Interbank FX Risk Attacked", Banking Technology, Jul. 12, 1990.

"Trading Around the Clock—Global Securities Markets and Information Technology: Background Paper"; Office of Technology Assessment, Congress of the United States, Jul. 1990, Appendix.

"Cognotec to Carry BankLink Data", Financial Technology Bulletin, Jul. 5, 1990.

"Global Trading Planned For Futures Exchanges", Financial Technology Bulletin, Jul. 5, 1990.

"Status Report and Request for Comment", US Working Committee, Group of Thirty Clearance & Settlement Project, Aug. 1990.

"Electronic Bulls and Bears—US Securities Markets and Information Technology"; Office of Technology Assessment, Congress of the United States, Sep. 1990, Chapter 1.

Schmerken, Ivy, "The Bulls and Bears Come out at Night: Electronic Trading", Wall Street & Technology, Sep. 1, 1990.

Gilardl, John, "CBOE to Offer Long–Term Equity Options Soon", Reuters News, Sep. 11, 1990.

"Wilco Developing Global Online Financial Clearance and Settlement System Based on the Stratus Platform 2000", Financial Technology Bulletin, Oct. 4, 1990.

"Report of the Committee on Interbank Netting Schemes of the Cantral Banks of the Group of Ten Countries", Bank for International Settlements, Nov. 1990.

Arend, Mark, "Bank Systems Set to Stage Glass–Steagall Coup. (Federal Reserve Board Permits J.P. Morgan Securities Inc To Trade Stocks, as 1933 Act Gradually Being Repealed to Allow Banks to Trade Securities)", Wall Street & Technology, Dec. 1, 1990.

"Waterhouse Securities Completes Rollout of InstantEx Order System", Securities Week, Jan. 28, 1991.

"Bank of Scotland Launches French–Style Terminal for Users of its HOBS Home and Office Banking System", Financial Technology Bulletin, Feb. 7, 1991.

Liffey, Kevin, "New Swiss Stock Option to be Traded Electronically", Reuters News, May 15, 1991.

Flannery, Mark J., "Comment on Payment System Risk", 1991, source unknown.

Clair, Robert T., "Daylight Overdrafts: Who Really Bears the Risk?", pp. 117–139, 1991, source unknown.

Milano, Gerard F., "Payment System Risk: A Private–Sector View", pp. 141–159, 1991, source unknown.

Redish, Angela, "The Government's Role in Payment Systems: Lessons from the Canadian Experience", pp. 161–179, 1991, source unknown.

"CBOT Looks at Electronic Trade in Hybrids and Swaps", Financial Times, Jun. 24, 1991.

"Thirteen GIRO Organizations Join to Develop Telegiro Pan–European Banking Network", Computing, Jul. 25,1991.

"RBA Launches Securities Settlement System", Banking Technology, Sep. 2, 1991.

Trivette, Don, "Managing Your Money Via Moderm: On–Line Services Help You Prosper. (Overview of Five Evaluations Of Financial Management Tools Offered By On–Line Services)" PC Magazine, Oct. 29, 1991.

"Barclays Offers Direct Forgeign Exchange Dealing Through New System", Financial Technology Bulletin, Dec. 5, 1991.

"Midland and Barclays Develop PC–Based Currency Trading System", Financial Times, Dec. 5, 1991.

"MECA & Fidelity Introduce FOX, Fidelity On–Line Xpress", Edge Work–Group Computing Report, Feb. 24, 1992.

"Lead Story #2: Fidelity Capital Offers Trade Execution to Buy Side", Investment Management Technology, Feb. 7, 1992.

"A War of Words: Deutsch Terminborse's Options Market Share Battle with UK''s LIFFE Depends on Automation", Banking technology, Mar. 12, 1992.

"EBS Group Creates Legal Joint Venture—Opens Door to New Member Banks", FX Week, Mar. 20, 1992.

"Bank of Scotland Launches PC–Based Version of its Home Office Banking Service", Financial Technology Bulletin, Apr. 2, 1992.

Shepherd, Ian, "Our Chance for Banking Bonanza", Article in The Australian, Jun. 9, 1992.

"Delivery Versus Payment in Securities Settlement Systems"—Report prepared by the Committee on Payment and Settlement Systems of the Central Banks of the Group of Ten Countries, Bank for International Settlements, Sep. 1992.

Raghavan, Anita, "Globeset Fund to be Unveiled that Lets Traders At Big Exchange Post Collateral Anytime of the Day", The Wall Street Journal, Nov. 23, 1992.

Quint, Michael, "A Fund–Shifting System That's Open All Night", The New York Times, Nov. 27,1992.

Borio, C.E.V., et al., "The Nature and Management of Payment System Risks: An International Perspective", Bank for International Settlements, pp. 1–83, Feb. 1993.

"Central Bank Payment and Settlement Services With Respect to Cross–Border and Multi–Currency Transactions"—Report Prepared by the Committee on Payment and Settlement Systems of the Central Banks of the Group of Ten Countries, Bank for International Settlements, Sep. 1993.

"Reforming the Wholesale Payments System", Financial Regulation Report, Oct. 26, 1992.

"Monnaie Sans Frontieres—Cross Border Payments Systems Improved", Banking Technology, Feb. 16, 1993.

"Swift Rival FNA Begins Network Tests", Banking Technology, Apr. 23, 1993.

"NY Clearing House: Goodby, Mr Chips", American Banker, Jun. 23, 1993.

"Foreign Exchange—City Networks Launches Confirmation Service", Financial Technology Bulletin, Jul. 20, 1993.

"Call for Cooperation—Joint Payment and Settlement Services From Central Banks", Banking Technology, Nov. 11, 1993.

"House–raising", Institutional Investor, Jul. 1, 1998.

"Four Hope to Start Commodity Exchange in Bermuda", The Wall Street Journal, Oct. 20, 1981.

"Electronic Exchange in Futures Open Oct. 25", The Wall Street Journal, Sep. 28, 1984.

Hubbard, Richard, "The Changing Face of Austraila's Payments' System", Australian Financial Review, Oct. 1, 1984.

"Full Automation Near in Securities Trading Firms Plan Links to Personal Computers", The Washington Post, Nov. 25, 1984.

"Consolidation of Retail Funds Networks Pushed; Card Organizations, Big ATM Systems Weigh Common Computer Operation", American Banker, Jan. 14, 1985.

"Chicago Board Options Exchange Launches Automatic Execution System", PR Newswire, Feb. 4, 1985.

Buck, Richard, "Banking on Cashlessness—Agreement Between Banks, Exchange Heralded as Sign of Changes to Come", The Seattle Times, Mar. 7, 1985.

"How 137 Banks Transfer Funds Using Electronic Clearing House", The Washington Post, Jun. 23, 1985.

Carroll, M., et al., "Bank of America Adds Brokerage to Home Banking", American Banker, Jun. 7, 1985.

Weiss, David M., "After the Trade is Made: Processing Securities Transactions"; New York Institute of Finance, 1986, Chapters 32–37.

Peake, Junius W., "Concept Document for 'Globex' An International Automated Foreign Exchange Trading System for Spot and Forward Trading"; The Peake/Ryerson Consulting Group Inc., Mar. 15, 1986.

"Eleven International Banks Intend to Set Up in London a Technology–Based Company, Under the Likely Name of FX Net, For Foreign Exchange Purposes", Financial Times, May 6, 1986.

"Update on International Links: NASD–London, AMEX–EOE, NYSE–Amsterdam", Securities Week, Oct. 6, 1986.

Mengle, David L., et al., "Intraday Credit: Risk, Value and Pricing", Economic Review, Jan./Feb. 1987.

"Financial Market Structure: A Longer View", Report by E. Gerald Corrigan, President, Federal Reserve Bank of New York, Jan. 1987.

"Stocks, Bonds, Options, Futures—Investments and Their Markets"; The Staff of the New York Institute of Finance, Ed. by Stuart R. Veale, Prentice–Hall, 1987.

Field, Anne R., "This Software Whiz Loves to Prove them Wrong", Business Week, Mar. 23, 1987.

Moore, Linda K.S., "Home Banking is Becoming A Hot Topic In United Kingdom", American Banker, May 28, 1987.

"Multilateral Netting Services Report", International Clearing Systems Inc, The Options Clearing Corporation, 1987.

"Upgraded ""Equalizer"" Software Gives Individuals and Edge on Wall Street", PR Newswire, Jul. 19, 1987.

Super, Pete, "Wave of Change Buoys ACH", Payment Systems Newletter, vol. 7, No. 16 Oct. 1987.

Field, Anne R. "Information Processing ADP Reprograms for the New Wall Street—It sees a gold mine in services for crash–conscious traders", Business Week, p. 70, vol. 3034, Jan. 18, 1988.

Stigum, Marcia, "After the Trade—Dealer and Clearing Bank Operations in Money Market and Government Securities"; Dow Jones–Irwin, Chapter 16, 1988.

"U.K. Stock Exchange to Have New Trading System", Reuters News, Jan. 18, 1988.

"A Perception of the Problems and Future Requirements for International Securities Settlement"—Speech by Philip Reichardt, Manager, SEAQ International, at the technology in the International Securities Markets Conference, London Mar. 24–25, 1988.

"Swiss Banks Set Up New Securities Clearing System", Reuters News, Apr. 8, 1988.

"Payment System Developments in Australia", Reserve Bank of Australia Bulletin, Jul. 1988.

"Citibank (USA) Helps Small Firms to Exchange Money", Financial Times, Sep. 6, 1988.

"SEC Approves ICC Cross–Margining Proposal", PR Newswire, Oct. 4, 1988.

Mitchell, Sue, "Swift to Match Deals", Australian Financial Review, Nov. 14, 1988.

"Lessons Learned from the Oct. 1987 Market Crisis", paper by Irving M Pollack and Anne Sullivan to the XII IOSCO Annual Conference Workshop 5, Nov. 16, 1988.

Madhaven, Ananth, et al., "Risky Business: The Clearence and Settlement of Financial Transactions", Dec. 8, 1988.

"Report on Netting Schemes", Group of Experts on Payment Systems of the Central Banks of the Group of Ten Countries, Bank for International Settlements, Feb. 1989.

"Natwest Launches Bankline, An Electronic Service for Small Buiness", The Independent, Feb. 9, 1989.

Rutz, Roger D., Clearance Payment and Settlement Systems in the Futures, Options and Stock Markets, Feb. 24, 1989.

"Clearance and Settlement Systems in the World's Securities Markets", Group of Thirty, Mar. 1989.

"An Overview of the Operations of the Options Clearing Corporation", Federal Reserve Bank of New York, Apr. 1989.

"Payment Systems in Eleven Developing Countries", Bank for International Settlements, May 1989, Chapter 11.

Earle, Dennis M., Impact of 24–hour Global Financial Markets on the World Banking System; Bankers Trust Company, New York Conference Presentation, Jun. 1989.

"Improving International Settlement", Report Of The Task Force Appointed By The FIBV, Federation Internationale Des Bourses De Valeurs Task Force Report, Jun. 1989.

"Members of Chips Agree to Share Payment Risks", American Banker, Mar. 19, 1990.

"Interbank FX Risks Attacked", Banking Technology, Jun. 12,1990.

"BankLink Offers FX Confirmations", Financial Technology Bulletin, Nov. 1, 1990.

"Bank Asset Freeze From War May Risk World Payment System", Dow Jones News Service, Jan. 15, 1991.

"Swift Expands Its Accord Deal Confirmation Service", Financial Technology Bulletin, Apr. 4, 1991.

"Currency Dealers Focus on Crisis Management", Reuters Newsletter, Jun. 9, 1991.

"Foreign Exchange Netting—Taking All the FX Risks", Banking Technology, Jun. 13, 1991.

"Swift Consortium Secretariat Confirms Launch of New Message Types on Electronic Data Interchange System", EDI Update International, Jul. 15, 1991.

"Casting a Net over the FX market (Global Netting Systems for Foreign Exchange)", Wall Street & Technology, Nov. 1, 1991.

"Regulators Apply Pressure for Fundamental Changes in Swift Data Exchange", Banking Technology, Nov. 14, 1991.

"Reports—Swift Update from Sibos", Financial Technology Insight Elsevier Advanced Technology Publications, Nov. 1, 1991.

"A French Coup for Swift—Banque De France Chooses Swift's Transaction System", Banking Technology, Feb. 13, 1992.

"Casting a Wider ECU Net—ECU Banking Association Plans International Interbank Payment System", Banking Technology, Feb. 13, 1992.

"Echo Members Meet, Decide to Sit on the fence; Funding Deadline Extended, US Banks Opt Out", FX Week Waters Information Services, Mar. 6, 1992.

"BIS Committee Produces "Discussion Paper" Slamming Multilateral Netting: Wither Echo?", FX Week Waters Information Services, May 8, 1992.

"Banks Join in Foreign Exchange Clearing Venture", The Independent—London, Jul. 1, 1992.

"BBA, FX Net, Echo Draft Responses to BIS' Farrant Report on Netting", FX Week Waters Information Services, Aug. 3, 1992.

"Chemical and Citibank Race to Market Rival Corporate Confirmations Systems", FX Week Waters Information Services, Aug. 24, 1992.

"UK: Current Law—City Index Ltd. v. Leslie; Gaming Contracts are Unenforceable Unlike Business Contracts," Chartered Surveyor Law Report, Oct. 18, 1990, p. 132.

"UK: Court of Appeal Rejects Market Gambler Case," *Financial Times*, The Financial Time Limited, Mar. 15, 1991, p. 7.

"UK: Personal Finance (Savings Snips)—City Saver—City Index Link," *Observer*, Mar. 7, 1993, p. 35.

"UK: Spread Your Bets for Dodgy Deregulation," *Evening Standard*, Apr. 7, 1995.

"UK: How to Make a Winning Spread Bet This Summer—The New Gambling—Cover Story," *The Times*, Apr. 8, 1995.

"UK: Family Finance—Do you Fancy a Financial Flutter?" *Sunday Telegraph*, The Sunday Telegraph Limited, London, Apr. 9, 1995, p. 9.

Nigel Cope, "UK: Where Bookie Meets Broker," *Management Today*, May 1995, p. 76.

Jonathan Davis, "UK: Your Money—Spread Betting—Risk and Reward in Selling the Ivory Coast Short," *Inependent*, May 27, 1995, p. 21.

"UK: Register—Meal Quaterly Summary—Jun. 1995—City Index Ltd.," *Register–Meal*, Jun. 14, 1995.

"UK: Scrum on Down for New Way of Betting," *Mail on Sunday*, Jun. 18, 1995.

Lucy Roberts, "UK: City Diary—City Index Weather Forecasts," *Independent*, Jun. 23, 1995, p. 26.

"UK: Christmas Day Snow Index Launched," *Evening Standard*, Dec. 8, 1995.

Joe Saumarez Smith, "Australia: City—Bookie's Move to Hit Betting Duty," *Sunday Telegraph*, The Sunday Telegraph Limited, London, Dec. 24, 1995, p. 2.

"UK: City Diary—Spreading the Word," *Daily Telegraph*, The Telegraph plc, London, Mar. 21, 1996, p. 21.

"UK: City Diary—Index Link a Fairly Safe Bet," *Daily Telegraph*, The Telegraph plc, London, Jul. 16, 1996, p. 25.

"UK: IG Index Comments on Rivals Merger Plans," *Evening Standard*, Jul. 17, 1996.

"UK: City Index—Partners," *Financial Times*, Financial Times Limited, Oct. 14, 1996, p. 14.

"UK: Reuters Launches Two UK Stock Indices," *Reuters Limited*, Nov. 8, 1996.

Paul Stokes, "UK: New Index Sparks a Worldwide Market for Scotland," *Scotsman*, Nov. 9, 1996, p. 21.

"UK: City Diary—Bookmarker Chief Appointed," *Daily Telegraph*, Telegraph Group Limited, London, Mar. 24 1997, p. 26.

"UK: Family Finance—Bond Pep From Age Concern—Savings Scene," *Sunday Telegraph*, Telegraph Group Limited, London, Sep. 14, 1997, p. 10.

Raymond Snoddy, "UK: Mirror to Launch Online Betting Service with PA—The Mirror Group—PA News," *The Times*, Times Newspaper Ltd, Sep. 19, 1997, p. 25.

"The DTB—West Germany's New Options and Futures Exchange. (2 of 2)," *Business Briefing* published in *Institutional Investor*, Aug. 31, 1989.

Richard Murphy, "Soffex Well–Established After First Six Months," *Business Briefing* published by *Reuters News Service*, Zurich, Nov. 16, 1988.

"A New Futures and Options Exchange to Come into Effect in 1990. (2 of 3)," *Business Briefing* published in *Euromoney Supplements*, Nov. 17, 1989.

"A New Futures and Options Exchange to Come into Effect in 1990. (3 of 3)," *Business Briefing* publishing in *Euromoney Supplements*, Nov. 17, 1989, p. 14.

"The Success of Soffex—The World's First Fully Automated Exchange," *Business Briefing*, Nov. 17, 1989.

Curtis M. Elliott and Emmett J. Vaughan: "Fundamentals of Risk and Insurance," John Wiley & Sons, Inc., 1972.

William A. Spurr and Charles P. Bonini: "Statistical Analysis for Business Decisions," Richard D. Irwin, Inc., 1974.

John W. Labuszewski and John E. Nyhoff: "Trading Options on Futures—Markets, Methods, Strategies and Tactics," John Wiley & Sons, Inc., 1988.

Edgar E. Peters: "Chaos and Order in the Capital Markets—A New View of Cycles, Prices, and Market Volatility," John Wiley & Sons, Inc., 1991.

David Mayers and Clifford Smith: "The Corporate Insurance Decision"—journal article reprinted in "The Revolution in Corporate Finance" edited by Joel M. Stern & Donald H. Chew, Jr., Blackwell Finance, 1992.

Charles Smithson and Clifford Smith: "Managing Financial Risk"—journal article reprinted in "The Revolution in Corporate Finance" edited by Joel M. Stern & Donald H. Chew, Jr., Blackwell Finance, 1992.

Donald R. Lessard: "Finance and Global Competition: Exploiting Financial Scope and Coping with Volatile Exchange Rates"—journal article reprinted in "The Revolution in Corporate Finance" edited by Joel M. Stern & Donald H. Chew, Jr., Blackwell Finance, 1992.

Alan C. Shapiro and Sheridan Titman: "An Integrated Approach to Corporate Risk Management"—journal article reprinted in "The Revolution in Corporate Finance" edited by Joel M. Stern & Donald H. Chew, Jr., Blackwell Finance, 1992.

"Dealing With Settlement Risk in a Brave New Financial World", American Banker, Sep. 25, 1987.

"OCC Plans to Enter Foreign Exchange", Chicago Sun–Times, Mar. 28, 1988.

"Reducing Risks in Financial Clearing and Settlement Systems", American Banker, Jun. 14, 1988.

"Central Banks Point to Payment Scheme Risks", Reuters News, Mar. 7, 1989.

"Currency Netting Seen Entering Major Growth Phase", Reuters News, Sep. 8, 1989.

* cited by examiner

FIG. 43A

| APPLICATION SPECIFICATION | |
|---|---|
| Part A | |

| | | |
|---|---|---|
| Application ID: | 100 | Applicable Product ID's |
| Application Promoter: | Demdata Inc | Preferred/preferential dealing? |
| Primary Application Use: | Defect liability management | Pre or Post Tax Matching? |
| Feasible Counterparty No's: | Single counterparty | Tax deduction/subsidy at source? |
| Public/private use?: | Public | Degree of Trading transparency: |
| Acceptable comms mediums: | Computer to computer | Secondary trading allowed? |
| Retail/Wholesale Use: | Wholesale | Derivative trading allowed? |
| Pricing and Matching Process: | Minimize consideration payment under an EV/CE regime | Deferred Order Submissions possible? |
| | | Partial Matches possible? |
| | | Settlement terms: |
| | |     - considerations |
| | |     - entitlements |
| Contract Revaluation Frequency: | Daily | Manual Approvals possible? |
| | | Ordering Party consideration credit? |
| Ordering Parties allowed negative contract payoffs? | No | Collateralisation Payments? |
| | |     - Counterparties |
| Application Access Limitations: | Nil |     - Ordering Parties |
| | | Bilateral Obligations Netting? |
| | | Bilateral Payments Netting? |
| | | Multilateral Obligations Netting? |
| | | Multilateral Payments Netting? |

| Netting Details (if applicable) | | Collateralisation Details (if applicable) | |
|---|---|---|---|
| Applicable Discount Rate: | Not Applicable | Trustee: | Not Applicable |
| Obligation Netting trigger: | Not Applicable | | |
| Min required settlements: | Not Applicable | | |

| Ordering Party Consideration-Credit Options | | |
|---|---|---|
| Counterparty provided? | --Participating Basis: | --Ord. Party-guarantor protected |
| | | --Unprotected |
| | --Non-Participating Basis: | --Ord. Party-guarantor protected |
| | | --Unprotected |
| Ordering Party Guarantor provided? | --Participating Basis: | |
| | --Non-Participating Basis: | |

FIG. 43B

| AS AT | 92.02.10.17.00.00.00 | |
|---|---|---|

| 1200-1250 | Application Access Limitations | |
|---|---|---|
| Unavailable | | |
| Pretax | Contract Ordering Parties: | |
| Not Applicable | | Nil |
| Nil | | |
| No | | |
| No | | |
| Yes | | |
| Yes | Contract Counterparties: | |
| | | Nil |
| Immediate | | |
| Immediate | | |
| No | | |
| No | | |
| | Counterparty Guarantors: | |
| No | | Nil |
| No | | |
| No | | |
| No | Others: | |
| No | | Nil |
| No | | |

| | Valuation Details | Consideration Credit Details |
|---|---|---|
| | Applicable Discount Rate:<br>10% p.a. | Ordering Party Guarantor:<br>Not Applicable |

|  | 1 | 2 | 3 | 4 | Key:<br>Counterparty: |
|---|---|---|---|---|---|
| -Participating | | | | | 1. Interest Rate(% p.a.) |
| -Non-Participating | | | | | 2. Participation rate(%) |
| | | | | | |
| -Participating | | | | | Order Party-quarantor |
| -Non-Participating | | | | | 1. Interest Rate(% p.a.) |
| | | | | | 2. Participation rate(%) |

FIG. 44A

| PRODUCT SPECIFICATION | |
|---|---|
| PRODUCT ID: | 1210 |

Product Summary

Application ID: 100                                         Product Sponsor:

Product Specification

| | |
|---|---|
| Market: | Factory Output Quality Indices |
| Sub-market: | 64-bit Microprocessor Fault Tolerance Index |
| Market type: | Spot |
| Establishment date/time: | 95.02.10.17.00.00.00 |
| Maturity date/time: | 95.02.10.17.00.00.00 |

Minimum Product Definition Value:     0.00                          Maximum Product Definition Value:

Product Details

| | | |
|---|---|---|
| Conditional Payoff Dimensions ID: | One | Actual/Perceived Market Identifier: |
| Market Phenomena Class Identifier: | Fault Tolerance Index | Specific Phenomenon: |
| Elemental/compound sub-market Identifier | -- | Sub-market Phenomenon Class Identifier: |
| Future Period Date/time Identifier: | At Contract Maturity date/time | Event Type Identifier: |
| Minimum Product Definition Value: | 0 | Maximum Product Definition Value: |
| Product Establishment Date/time: | 92.02.10.17.00.00.00 | Product Maturity Date/time: |
| Consideration denomination of Product: | Money | Currency type denomination of Product (if applic) |
| Entitlement denom. of Product: | Exclusive Production Warrants (XPW's) | |

Demdata Inc

Consideration denom.type:       Money

Entitlement denom. type : Exclusive Production Warrants(XPW's)

Currency type (if applic.) :        Com Bnk Dep.

National currency type (if applic.):     AUD

100         Product Step Value:        02

Actual                                      Elemental/compound
Dept of Defense Reject Summaries              Market Identifier:Single Market
--
Spot Value
100                                         Product Step Value:        02
95.02.10.17.00.00.00
   Com Bnk Dep.              National currency type denomination
                             of Product (if applic.)        AUD

FIG. 45A

| PRIMARY ORDER SPECIFICATION | | | | | AS AT: | |
|---|---|---|---|---|---|---|

| Ordering Party: | Denisons | | Application ID: | 100 |
|---|---|---|---|---|
| Own reference: | 5096263 | | | |

| Product: (ID: 1210 ) | | | Application Promoter | Demdata Inc |
|---|---|---|---|---|
| Market | Factory Output Quality Indices | | Product Sponsor | Demdata Inc |
| Sub-Market | 64B.M.F.T.Index | Market Type  Spot | Counterparty-guarantor | -- |
| Estab.date/time | 92.02.10.17.00.00.00 | | Regulator | Dept of Defense |
| Maturity date/time | 95.02.10.17.00.00.00 | | | |

| | | | | | "X"Value: | 5 | |
|---|---|---|---|---|---|---|---|
| X Range Value | 1 | 2 | 3 | 4 | 5 | 6 |
| Alpha (X) | 0 | 22 | 48 | 94 | 100 | |
| Alpha (X) | 0 | 21.040 | 21.040 | 161.900 | 161.900 | |

| G | 1 | 6 | | | |
|---|---|---|---|---|---|
| a | 2 | | 11 | | |
| m | 3 | | | 3 | |
| m | 4 | | | | 11 |
| a | 5 | | | | |

| ORDER SUPPORT DETAILS | | |
|---|---|---|
| Communications medium: | Computer-to-computer | |
| Consideration Credit sought? | No | |
| Desired Form of Consideration Credit(if appl.) | | Not Applicable |
| Counterparty Collateralisation payments required? | No | |
| Preparedness to make 'own' collateralisation payments(if applicable)? | | Not Applicable |
| Applicable Marginal Tax rate(if applicable)? | | |
|   -Consideration: | Not Applicable | |
|   -Entitlements: | Not Applicable | |
| Netting System Participation? | | |
|   -Bilateral Obligations netting?(if applic.) | No | |
|   -Bilateral Payments netting?(if applic.) | No | |
|   -Multilateral Obligations netting?(if applic.) | No | |
|   -Multilateral Payments netting?(if applic.) | No | |

FIG. 45B

| 93.07.01.14.25.30.00 |
|---|

|  | Consideration/<br>Entitlement<br>Denomination | Consideration | Entitlement |
|---|---|---|---|
| Consideration type | Money | Money | N.A. |
| Entitlement type | XPW's | N.A. | XPW's |
| Currency type(if applic.) | Com Bnk Dep | Com Bnk Dep | Com Bnk Dep |
| National Curr.type(if applic.) | AUD | AUD | AUD |
| Max.Consid.Amount | N.A. | 32,000 | As below |

Pricing and Matching Process
    Minimize consideration payment under an EV/CE regime SPECIAL
DEAL TYPE: Not Applicable

| Partial Matches desired?    No | Unacceptable Counterparties and Other Stakeholders |
|---|---|
| Manual Approval of Matches desired?    No | |
| Desired degree of trading transparency<br>    (if applicable)    Not Applicable<br>Applicable Consid./Entitlement Transfer Entity<br>Account details:    ABC Banking Corp<br>Operating A/c 1-1-502026-617634-1(and 2)<br>Desired date/time of Order Submission:    Immediate<br>Desired Order retention perid:    00.00.01.00.00.00<br>Desired Max.time for counterparty<br>manual order approval(if applic.):    Not Applicable | Not Applicable |
| Preferred/Preferential Dealing: | |
| Not Applicable | |

FIG. 46A

| ORDER SPECIFICATION PRICING | By : Demdata Inc |
|---|---|

| COUNTERPARTY PRICING SPECIFICATION | Application ID:<br>ProductID: |
|---|---|

| Defined<br>Circumstances ID | 14 | Commission<br>Rate: | 1.10% | Discount<br>Rate: |
|---|---|---|---|---|

| Feasible<br>Product<br>Definition<br>Values | Gross<br>Contingent<br>Entitlement<br>Amounts | Op/CP<br>C/Credit<br>Adjust | Net<br>Contingent<br>Entitlement<br>Amounts | Component<br>Product<br>Prices |
|---|---|---|---|---|
| 0-20 | 0.000 | 0.00 | 0.000 | 0.149588 |
| 22-48 | (21.040) | 0.00 | (21.040) | 0.666056 |
| 50 | (27.160) | 0.00 | (27.160) | 0.020458 |
| 52 | (33.290) | 0.00 | (33.290) | 0.020396 |
| 54 | (39.410) | 0.00 | (39.410) | 0.020328 |
| 56 | (45.540) | 0.00 | (45.540) | 0.020258 |
| 58 | (51.660) | 0.00 | (51.660) | 0.020180 |
| 60 | (57.790) | 0.00 | (57.790) | 0.008007 |
| 62 | (63.910) | 0.00 | (63.910) | 0.007927 |
| 64 | (70.030) | 0.00 | (70.030) | 0.007844 |
| 66 | (76.160) | 0.00 | (76.160) | 0.007758 |
| 68 | (82.280) | 0.00 | (82.280) | 0.007669 |
| 70 | (88.410) | 0.00 | (88.410) | 0.007578 |
| 72 | (94.530) | 0.00 | (94.530) | 0.007484 |
| 74 | (100.660) | 0.00 | (100.660) | 0.007387 |
| 76 | (106.780) | 0.00 | (106.780) | 0.007288 |
| 78 | (112.910) | 0.00 | (112.910) | 0.007187 |
| 80 | (119.030) | 0.00 | (119.030) | 0.007084 |
| 82 | (125.150) | 0.00 | (125.150) | 0.006979 |
| 84 | (131.280) | 0.00 | (131.280) | 0.006872 |
| 86 | (137.400) | 0.00 | (137.400) | 0.006763 |
| 88 | (143.530) | 0.00 | (143.530) | 0.006653 |
| 90 | (149.650) | 0.00 | (149.650) | 0.006542 |
| 92 | (155.780) | 0.00 | (155.780) | 0.006429 |
| 94-100 | (161.900) | 0.00 | (161.900) | 0.019515 |
|  |  |  |  | 1.06023 | x Applic. Entitle. Exchange Rates  (.................)   (.................)   (.................)
                                              C/E            Currency         Nat Curr.
= Base contract bid price(in Product Denom. terms)
Net Present Value (at........   9.90% p.a.   ...)
+ Flat Commission (..........   1.10%   ...)
= Contract Bid Price (in Product Denom. terms)
x Applic. Consid. Exchange Rates  (.................)   (.................)   (.................)
                                              C/E            Currency         Nat Curr.
= Contract Bid Price (in OP requested terms)(if applic.)
  Implied Base 'Margin' on Contract
+ Exchange Rate and Consideration Investment Margin
= Implied Contract Value (to CP)

FIG. 46B

| AS AT 93.07.01.14.26.40.00 | | | | |
|---|---|---|---|---|
| 100 1210 | Consideration Exchange Rates (if applic) :C/E .....-..... Currency.....-..... Nat.Curr.....-..... | | | |
| 9.90% p.a. | Entitlement Exchange Rates: (if applic) :C/E .....-..... Currency.....-..... Nat.Curr.....-..... | | | |

| Implied Contingent Entitlement Amounts | Assessed Probabilities of Occurence | Net Contingent Entitlement (Valuation) Amts. | Net Contingent Negative Entitlement (Valuation) Amounts | Maximum Absolute Negative Entitlement Amounts |
|---|---|---|---|---|
| 0.000 | 0.195375 | 0.000 | 0.000 | |
| (14.014) | 0.620536 | (13.056) | (13.056) | |
| (0.555) | 0.008358 | (0.227) | (0.227) | |
| (0.678) | 0.008295 | (0.276) | (0.276) | |
| (0.801) | 0.008228 | (0.324) | (0.324) | |
| (0.923) | 0.008158 | (0.372) | (0.372) | |
| (1.043) | 0.008084 | (0.418) | (0.418) | |
| (0.463) | 0.008007 | (0.463) | (0.463) | |
| (0.507) | 0.007927 | (0.507) | (0.507) | |
| (0.549) | 0.007844 | (0.549) | (0.549) | |
| (0.591) | 0.007758 | (0.591) | (0.591) | |
| (0.631) | 0.007669 | (0.631) | (0.631) | |
| (0.670) | 0.007578 | (0.670) | (0.670) | |
| (0.707) | 0.007484 | (0.707) | (0.707) | |
| (0.744) | 0.007387 | (0.744) | (0.744) | |
| (0.778) | 0.007288 | (0.778) | (0.778) | |
| (0.811) | 0.007187 | (0.811) | (0.811) | |
| (0.843) | 0.007084 | (0.843) | (0.843) | |
| (0.873) | 0.006979 | (0.873) | (0.873) | |
| (0.902) | 0.006872 | (0.902) | (0.902) | |
| (0.929) | 0.006763 | (0.929) | (0.929) | |
| (0.955) | 0.006653 | (0.955) | (0.955) | |
| (0.979) | 0.006542 | (0.979) | (0.979) | |
| (1.002) | 0.006429 | (1.002) | (1.002) | |
| (3.159) | 0.019515 | (3.159) | (3.159) | (161.900) |
| (34.110) | 1.0000 | (30.770) | (30.770) | (161.900) |

| 34.110 |
|---|
| 29.220 |
| 0.320 |
| 29.540 |

| 29.540 |
|---|

| 26.360 |
|---|

| 3.180 |
|---|
| ---- |
| 3.180 |

FIG. 47B

| | Consideration/<br>Entitlement<br>Denomination | Consideration | Entitlement |
|---|---|---|---|
| AS AT 93.07.01.16.00.00.00 Report for: Denisons | | | |

| | Consideration/<br>Entitlement<br>Denomination | Consideration | Entitlement |
|---|---|---|---|
| Cons./Entitlement type | Money/XPW's | Money | XPW's |
| Currency type(if appl) | Com Bnk dep. | Com Bnk dep. | N.A. |
| National Curr.type(if applic.) | AUD | AUD | N.A. |
| Amount | N.A. | 29.540 | As below |

| Pricing and Matching Process: | Minimize consideration payment under an EV/CE regime |
|---|---|

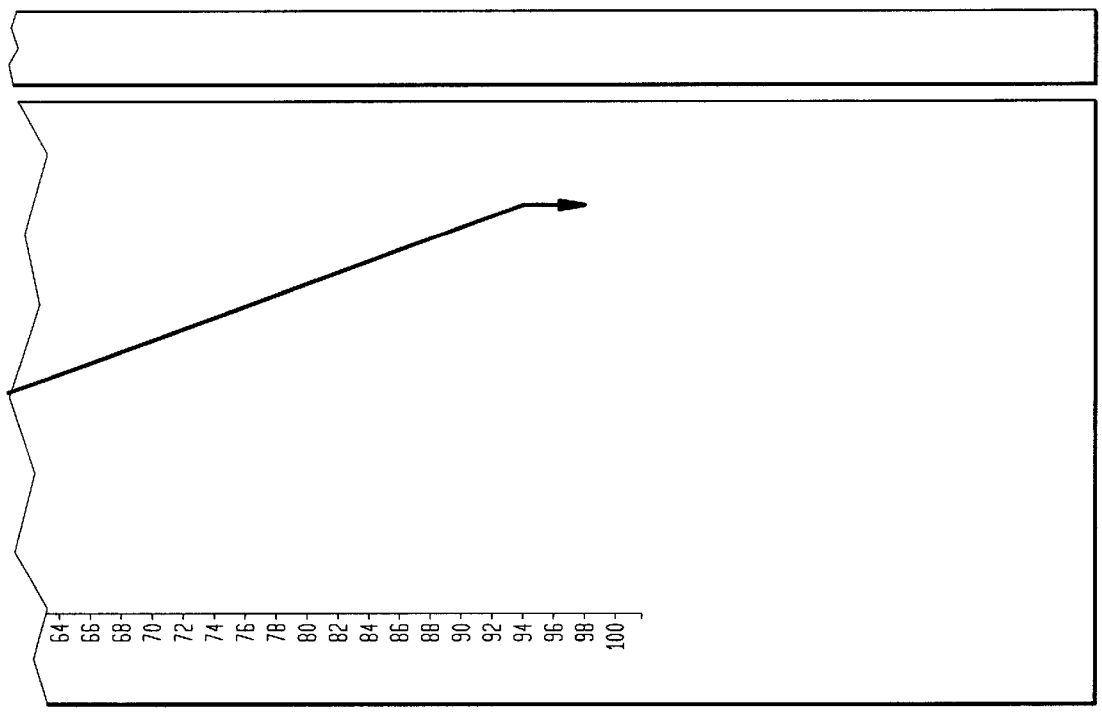

| | Consideration/ Entitlement Denomination | Consideration | Entitlement |
|---:|:---:|:---:|:---:|
| AS AT: 93.07.01.16.00.00.00 Report for: Demdata Inc | | | |
| Cons./Entitlement type | Money/XPW's | Money | XPW's |
| Currency type(if app) | Com Bnk dep. | Com Bnk dep. | N.A. |
| National Curr.type(if applic.) | AUD | AUD | N.A. |
| Amount | N.A. | 29.540 | As below |

Pricing and Matching Process: Minimize consideration payment under an EV/CE regime

FIG. 49A

| CONTRACT VALUATION | |
|---|---|
| CONTRACT SUMMARY (GRAPHICAL) | |

| Ordering Party: | Denisons | Application ID: | 100 |
|---|---|---|---|
| Counterparty: | Demdata Inc | O.P.Own reference: | 5096263 |

| Product: (ID: 1210 ) | | Application Promoter | Demdata Inc |
|---|---|---|---|
| Market | Factory Output Quality Indices | Product Sponsor | Demdata Inc |
| Sub-Market 64B.M.F.T.Index | Market Type Spot | Counterparty-guarantor | -- |
| Estab.date/time | 92.02.10.17.00.00.00 | Regulator | Dept of Defense |
| Maturity date/time | 95.02.10.17.00.00.00 | | |

| | | Valuations as at | 94.11.15.10.00.00 | |
|---|---|---|---|---|
| | | | F.P.V's | Contract |
| Order ID (if app.) | 85746235 | | | |
| Conf.date/time (if app.) | 93.07.01.14.38.50.00 | Expected Value | 58 | 42.160 |
| Contract/Product context: | 1 of 1 | Std. Deviation | 5 | 6.209 |

| Special Deal Type: | Not Applicable |
|---|---|

XPW's vs Feasible Product Values (F.P.V's)

| | Consideration/<br>Entitlement<br>Denomination | Consideration | Entitlement |
|---:|---|---|---|
| Cons./Entitlement type | Money/XPW's | Money | XPW's |
| Currency type(if app) | Com Bnk dep. | Com Bnk dep. | N.A. |
| National Curr.type(if applic.) | AUD | AUD | N.A. |
| Amount | N.A. | 29,540 | As below |

AS AT: 94.11.15.10.00.00.00    Report for:    Denisons

Pricing and Matching Process:   Minimize consideration payment
under an EV/CE regime

| | Consideration/ Entitlement Denomination | Consideration | Entitlement |
|---|---|---|---|
| Cons./Entitlement type | Money/XPW's | Money | XPW's |
| Currency type(if app) | Com Bnk dep. | Com Bnk dep. | N.A. |
| National Curr.type(if applic.) | AUD | AUD | N.A. |
| Amount | N.A. | 29,540 | As below |

Pricing and Matching Process: Minimize consideration payment under an EV/CE regime

FIG. 51A

APPLICATION SPECIFICATION

Part A

| Application ID: | 001 | Applicable Product ID's |
|---|---|---|
| Application Promoter: | Newcom Inc | Preferred/preferential dealing? |
| Primary Application Use: | Hardware capacity management | Pre or Post Tax Matching? |
| Feasible Counterparty No's: | Multiple counterparties | Tax deduction/subsidy at source? |
| Public/private use?: | Private | Degree of Trading transparency: |
| Acceptable comms mediums: | Computer to computer | Secondary trading allowed? |
| Retail/Wholesale Use: | Wholesale | Derivative trading allowed? |
| Pricing and Matching Process: | Minimize consideration payment under an EV/CE regime | Deferred Order Submissions possible? |
| | | Partial Matches possible? |
| | | Settlement terms: |
| | |     - considerations |
| | |     - entitlements |
| Contract Revaluation Frequency: | Daily | Manual Approvals possible? |
| | | Ordering Party consideration credit? |
| Ordering Parties allowed negative contract payoffs? | Yes | Collateralisation Payments? |
| | |     - Counterparties |
| Application Access Limitations: | Nil |     - Ordering Parties |
| | | Bilateral Obligations Netting? |
| | | Bilateral Payments Netting? |
| | | Multilateral Obligations Netting? |
| | | Multilateral Payments Netting? |

| Netting Details (if applicable) | | Collateralisation Details (if applicable) | |
|---|---|---|---|
| Applicable Discount Rate: | Not applicable | Trustee: | Not Applicable |
| Obligation Netting trigger: | Not applicable | | |
| Min required settlements: | Not applicable | | |

| Ordering Party Consideration-Credit Options | | |
|---|---|---|
| Counterparty provided? | --Participating Basis: | --Ord.Party-guarantor protected |
| | | --Unprotected |
| | --Non-Participating basis: | --Ord.Party-guarantor protected |
| | | --Unprotected |
| Ordering Party Guarantor provided? | --Participating basis: | |
| | --Non-Participating basis: | |

FIG. 51B

| AS AT | 93.11.01.17.00.00.00 | |
|---|---|---|

| 2001-2020 | Application Access Limitations | |
|---|---|---|
| Available | | |
| Not applicable | Contract Ordering Parties: | |
| Not applicable | | Nil |
| Nil | | |
| Yes | | |
| Yes | | |
| Yes | | |
| Yes | Contract Counterparties: | |
| | | Nil |
| Immediate | | |
| Immediate | | |
| No | | |
| No | | |
| | Counterparty Guarantors: | |
| No | | Nil |
| No | | |
| No | | |
| No | Others: | |
| No | | Nil |
| No | | |

| Valuation Details | Consideration Credit Details |
|---|---|
| Applicable Discount Rate:<br>6.50% | Ordering Party Guarantor:<br>Not Applicable |

|  | 1 | 2 | 3 | 4 |
|---|---|---|---|---|
| -Participating | | | | |
| -Non-Participating | | | | |
| | | | | |
| -Participating | | | | |
| -Non-Participating | | | | |

Key:
Counterparty:
1. Interest Rate (% p.a.)
2. Participation rate (%)

Order Party-quarantor
1. Interest Rate (% p.a.)
2. Participation rate (%)

FIG. 52A

| PRODUCT SPECIFICATION |
|---|

| PRODUCT ID: | 2001 |
|---|---|

| Product Summary | |
|---|---|
| Application ID: 001 | Product Sponsor: |

Product Specification

| | |
|---|---|
| Market: | Telecommunications Carrying Capacity |
| Sub-market: | Prime T.T.U.'s    (Transmission time units 1200-1800 hrs daily NY-Boston link) |
| Market type: | Spot |
| Establishment date/time: | 93.11.01.17.00.00.00 |
| Maturity date/time: | 96.11.01.17.00.00.00 |
| Minimum Product Definition Value:   -1.000 | Maximum Product Definition Value: |

Product Details

| | | | |
|---|---|---|---|
| Conditional Payoff Dimensions ID: | One | Actual/Perceived Market Identifier: | |
| Market Phenomena Class Identifier: | Primary | Specific Phenomenon: | |
| Elemental/compound sub-market Identifier | -- | Sub-market Phenomenon Class Identifier: | |
| Future Period Date/time Identifier: | At Contract Maturity date/time | Event Type Identifier: | |
| Minimum Product Definition Value: | -1.000 | Maximum Product Definition Value: | |
| Product Establishment Date/time: | 93.11.01.17.00.00.00 | Product Maturity Date/time: | |
| Consideration denomination of Product: | Ord Party T.T.U.'s | Currency type denomination of Product(if applic) | |
| Entitlement denom. of Product: | Counterparty T.T.U.'s (Transmission Time Units) | | |

Newcom Inc

Consideration denom.type: Ordering party T.T.U.'s

Entitlement denom.type   Counterparty T.T.U.'s

Currency type(if applic.): Not applicable

National currency type(if applic.): Not applicable 1.000      Product Step Value:                    0.05

Actual                                    Elemental/compound
(Log of) difference in the OP's                              Market Identifier:Single Market
utilization of the CP's network and the CP's utilization of the OP's network
              --
            Spot Value
    1.000                                          Product Step Value:        0.05
    96.11.01.17.00.00.00
                Not applicable       National currency type denomination
                                     of Product (if applic.)      Not applicable

FIG. 53A

| PRIMARY ORDER SPECIFICATION | | AS AT: |
|---|---|---|

| Ordering Party: | Basstel Co. | Application ID: | 001 |
|---|---|---|---|
| Own reference: | 06H582 | | |

| Product: (ID: 2001 ) | | | Application Promoter | Newcom Inc |
|---|---|---|---|---|
| Market | Telecommunications Carrying Capacity | | Product Sponsor | Newcom Inc |
| Sub-Market | Prime T.T.U.'s | Market Type   Spot | Counterparty-guarantor | -- |
| Estab.date/time | 93.11.01.17.00.00.00 | | Regulator | I.T.T. |
| Maturity date/time | 96.11.01.17.00.00.00 | | | |

| | | | | | "X"Value: | 4 |
|---|---|---|---|---|---|---|
| X Range Value | 1 | 2 | 3 | 4 | | |
| Alpha (X) | (1.00) | (0.35) | 0.20 | 1.00 | | |
| Beta  (X) | 386.340 | 386.340 | (498.43) | (498.43) | | |

| G | 1 | 11 |
|---|---|---|
| a | 2 | 8 |
| m | 3 | 11 |
| m | 4 | |
| a | 5 | |

| ORDER SUPPORT DETAILS | |
|---|---|
| Communications medium: | Computer-to-computer |
| Consideration Credit sought? | No |
| Desired Form of Consideration Credit(if appl.) | Not Applicable |
| Counterparty Collateralisation payments required? | No |
| Preparedness to make 'own' collateralisation payments(if applicable)? | Not Applicable |
| Applicable Marginal Tax rate(if applicable)? | |
|   -Consideration: | Not Applicable |
|   -Entitlements: | Not Applicable |
| Netting System Participation? | |
|   -Bilateral Obligations netting?(if applic.) | No |
|   -Bilateral Payments netting?(if applic.) | No |
|   -Multilateral Obligations netting?(if applic.) | No |
|   -Multilateral Payments netting?(if applic.) | No |

FIG. 53B 94.06.01.14.25.30.00

|  | Consideration/ Entitlement Denomination | Consideration | Entitlement |
|---|---|---|---|
| Consideration type | T.T.U.'s | T.T.U.'s | T.T.U.'s |
| Entitlement type | T.T.U.'s | T.T.U.'s | T.T.U.'s |
| Currency type(if applic.) | N.A. | N.A. | N.A. |
| National Curr.type(if applic.) | N.A. | N.A. | N.A. |
| Max.Consid.Amount | N.A. | 58.000 | As below |

Pricing and Matching Process:
   Minimize consideration payment under an EV/CE regime SPECIAL DEAL TYPE: Ordering party negative entitlement allowed.

| | |
|---|---|
| Partial Matches desired? No | Unacceptable Counterparties and Other Stakeholders |
| Manual Approval of Matches desired? No | |
| Desired degree of trading transparency (if applicable) Not Applicable | Not Applicable |
| Applicable Consid./Entitlement Transfer Entity | |
| Account details:   ABC Banking Corp | |
| Operating A/c 1-1-502026-345896-0 | |
| Desired date/time of Order Submission:   Immediate | |
| Desired Order retention period:   00.00.01.00.00.00 | |
| Desired Max.time for counterparty manual order approval(if applic.):   Not Applicable | |
| Preferred/Preferential Dealing: | |
| Nil | |

FIG. 54A

| ORDER SPECIFICATION PRICING | By: Tasnet |
|---|---|

| COUNTERPARTY PRICING SPECIFICATION | Application ID:<br>ProductID: |
|---|---|

| Defined Circumstances ID | 8 | Commission Rate: | 1.00% | Discount Rate: |
|---|---|---|---|---|

| Feasible Product Definition Values | Gross Contingent Entitlement Amounts | OP/CP C/Credit Adjust | Net Contingent Entitlement Amounts | Component Product Prices |
|---|---|---|---|---|
| (1.00)-(0.35) | (386.340) | 0.00 | (386.340) | 0.567639 |
| (0.30) | (305.910) | 0.00 | (305.910) | 0.022156 |
| (0.25) | (225.470) | 0.00 | (225.470) | 0.021499 |
| (0.20) | (145.040) | 0.00 | (145.040) | 0.019544 |
| (0.15) | (64.610) | 0.00 | (64.610) | 0.017349 |
| (0.10) | 15.830 | 0.00 | 15.830 | 0.017241 |
| (0.05) | 92.260 | 0.00 | 96.260 | 0.016989 |
| 0 | 176.700 | 0.00 | 176.700 | 0.016258 |
| 0.05 | 257.130 | 0.00 | 257.130 | 0.016001 |
| 0.10 | 337.560 | 0.00 | 337.560 | 0.015847 |
| 0.15 | 418.000 | 0.00 | 418.000 | 0.015654 |
| 0.20-1.00 | 498.430 | 0.00 | 498.430 | 0.290238 |
| | | | | 1.036416 | x Applic. Entitle. Exchange Rates ( ............... ) ( ............... ) ( ............... )
                                                C/E                                 Currency                            Net Curr.
= Base contract bid price(in Product Denom. terms)
Net Present Value (at ........ 9.90% p.a. ...)
+ Flat Commission ( .......... 1.00% ...)
= Contract Bid Price (in Product Denom. terms)
x Applic. Consid. Exchange Rates ( ....... C/E ......) ( ........ Currency ........ ) ( ....... Net Curr. ....... )
= Contract Bid Price (in OP requested terms) (if applic.)
  Implied Base 'Margin' on Contract
+ Exchange Rate and Consideration Investment Margin
= Implied Contract Value (to CP)

FIG. 54B

| AS AT:94.06.01.14.26.40.00 | | | | |
|---|---|---|---|---|
| 001 2001 | Consideration Exchange Rates: (if applic) :C/E ....-.... Currency....-.... Nat.Curr....-.... | | | |
| 9.90% p.a. | Entitlement Exchange Rates: (if applic) :C/E ....-.... Currency....-.... Nat.Curr....-.... | | | |
| Implied Contingent Entitlement Amounts | Assessed Probabilities of Occurence | Net Contingent Entitlement (Valuation) Amts. | Net Contingent Negative Entitlement (Valuation) Amounts | Maximum Absolute Negative Entitlement Amount |
| (219.302) | 0.544514 | (210.3675) | (210.3675) | |
| (6.777) | 0.016838 | (5.151) | (5.151) | |
| (4.847) | 0.016793 | (3.786) | (3.786) | |
| (2.8346) | 0.016718 | (2.425) | (2.425) | |
| (1.1209) | 0.016614 | (1.073) | (1.073) | |
| 0.2729 | 0.016481 | 0.261 | | |
| 1.6354 | 0.016320 | 1.571 | | |
| 2.8727 | 0.016132 | 2.851 | | |
| 4.1143 | 0.015918 | 4.093 | | |
| 5.3493 | 0.015678 | 5.292 | | |
| 6.5433 | 0.015414 | 6.443 | | |
| 144.6633 | 0.29257 | 145.825 | | (498.43) |
| (69.432) | 1.0000 | (56.463) | (222.8025) | (498.430) |

| 69.432 |
|---|
| 54.630 |
| 0.550 |
| 55.180 |
| 55.180 |

| 44.420 |
|---|

| 10.760 |
|---|
| ---- |
| 10.760 |

FIG. 55A

| ORDER SPECIFICATION PRICING | By : Aarcom | |
|---|---|---|
| COUNTERPARTY PRICING SPECIFICATION | | Application ID:<br>ProductID: |

| Defined<br>Circumstances ID | 9 | Commission<br>Rate: | 0.90% | Discount<br>Rate: | |

| Feasible<br>Product<br>Definition<br>Values | Gross<br>Contingent<br>Entitlement<br>Amounts | OP/CP<br>C/Credit<br>Adjust. | Net<br>Contingent<br>Entitlement<br>Amounts | Component<br>Product<br>Prices |
|---|---|---|---|---|
| (1.00)-(0.35) | (386.340) | 0.00 | (386.340) | 0.566603 |
| (0.30) | (305.910) | 0.00 | (305.910) | 0.018357 |
| (0.25) | (225.470) | 0.00 | (225.470) | 0.018492 |
| (0.20) | (145.040) | 0.00 | (145.040) | 0.018417 |
| (0.15) | (64.610) | 0.00 | (64.610) | 0.018313 |
| (0.10) | 15.830 | 0.00 | 15.830 | 0.016481 |
| (0.05) | 92.260 | 0.00 | 92.260 | 0.016320 |
| 0 | 176.700 | 0.00 | 176.700 | 0.016132 |
| 0.05 | 257.130 | 0.00 | 257.130 | 0.015918 |
| 0.10 | 337.560 | 0.00 | 337.560 | 0.015678 |
| 0.15 | 418.000 | 0.00 | 418.000 | 0.015414 |
| 0.20-1.00 | 498.430 | 0.00 | 498.430 | 0.292577 |
| | | | | 1.028702 | x Applic. Entitle Exchange Rates (................) (................) (................)
                                           C/E          Currency        Net Curr.
= Base contract bid price(in Product Denom. terms)
Net Present Value (at........ 8.50% p.a...)
+ Flat Commission (.......... 0.90% ...)
= Contract Bid Price (in Product Denom. terms)
x Applic. Consid. Exchange Rates (......C/E........) (................) (................)
                                                    Currency        Net Curr.
= Contract Bid Price (in OP requested terms)(if applic.)
  Implied Base 'Margin' on Contract
+ Exchange Rate and Consideration Investment Margin
= Implied Contract Value (to CP)

FIG. 55B

| AS AT:94.06.01.14.26.40.00 | | | | |
|---|---|---|---|---|
| 001 2001 | Consideration Exchange Rates (if applic) :C/E .....-..... Currency.....-..... Nat.Curr.....-..... | | | |
| 8.50% p.a. | Entitlement Exchange Rates: (if applic) :C/E .....-..... Currency.....-..... Nat.Curr.....-..... | | | |

| Implied Contingent Entitlement Amounts | Assessed Probabilities of Occurence | Net Contingent Entitlement (Valuation) Amts. | Net Contingent Negative Entitlement (Valuation) Amounts | Maximum Absolute Negative Entitlement Amount |
|---|---|---|---|---|
| (218.901) | 0.545015 | (210.561) | (210.561) | |
| (5.616) | 0.017545 | (5.3672) | (5.3672) | |
| (4.169) | 0.017020 | (3.83749) | (3.83749) | |
| (2.671) | 0.016978 | (2.4625) | (2.4625) | |
| (1.183) | 0.016875 | (1.0902) | (1.0902) | |
| 0.261 | 0.016754 | 0.265 | | |
| 1.571 | 0.016256 | 1.565 | | |
| 2.851 | 0.015689 | 2.772 | | |
| 4.093 | 0.015456 | 3.974 | | |
| 5.292 | 0.015625 | 5.274 | | |
| 6.443 | 0.015401 | 6.438 | | |
| 145.829 | 0.291395 | 145.240 | | (498.430) |
| (66.200) | 1.0000 | (57.790) | (223.318) | (498.430) |

| 66.200 | | |
|---|---|---|
| 54.900 | 45.960 | |
| 0.490 | | |
| 55.390 | | |
| 55.390 | | |

| 9.430 |
|---|
| ---- |
| 9.430 |

| AS AT | 94.06.01.16.00.00.00 | Report for: | Basstel Co. |

|  | Consideration/<br>Entitlement<br>Denomination | Consideration | Entitlement |
|---|---|---|---|
| Cons./Entitlement type | T.T.U.'s | T.T.U.'s | T.T.U.'s |
| Currency type(if app) | N.A. | N.A. | N.A. |
| National Curr.type(if applic.) | N.A. | N.A. | N.A. |
| Amount | N.A. | 55,180 | As below |

| Pricing and Matching Process: | Minimize consideration payment under an EV/CE regime |

| AS AT | 94.06.01.16.00.00.00 | Report for: | Tasnet |

|  | Consideration/ Entitlement Denomination | Consideration | Entitlement |
|---|---|---|---|
| Cons./Entitlement type | T.T.U.'s | T.T.U.'s | T.T.U.'s |
| Currency type(if appl) | N.A. | N.A. | N.A. |
| National Curr.type(if applic.) | N.A. | N.A. | N.A. |
| Amount | N.A. | 55,180 | As below |

Pricing and Matching Process: Minimize consideration payment under an EV/CE regime

| | Consideration/ Entitlement Denomination | Consideration | Entitlement |
|---|---|---|---|
| Cons./Entitlement type | T.T.U.'s | T.T.U.'s | T.T.U.'s |
| Currency type(if app) | N.A. | N.A. | N.A. |
| National Curr.type(if applic.) | N.A. | N.A. | N.A. |
| Amount | N.A. | 55,180 | As below |

| Pricing and Matching Process: | Minimize consideration payment under an EV/CE regime |
|---|---|

AS AT 94.11.22.10.00.00.00  Report for: Basstel Co

| | Consideration/<br>Entitlement<br>Denomination | Consideration | Entitlement |
|---|---|---|---|
| Cons./Entitlement type | T.T.U.'s | T.T.U.'s | T.T.U.'s |
| Currency type(if app) | N.A. | N.A. | N.A. |
| National Curr.type(if applic.) | N.A. | N.A. | N.A. |
| Amount | N.A. | 55,180 | As below |

AS AT 96.11.01.17.00.00.00   Report for:   Basstel Co

Pricing and Matching Process: Minimize consideration payment under an EV/CE regime

FIG. 60A

APPLICATION SPECIFICATION

Part A

| Application ID: | 001 | Applicable Product ID's: |
|---|---|---|
| Application Promoter: | B.L.C. Inc | Preferred/preferential dealing? |
| Primary Application Use: | Economic risk management | Pre or Post Tax Matching? |
| Feasible Counterparty Numbers: | Multiple counterparties | Tax deduction/subsidy at source? |
| Public/private use: | Public Use | Degree of Trading Transparency: |
| Acceptable comms mediums: | Computer-computer link | Secondary trading Allowed? |
| Retail/Wholesale Use: | Wholesale | Derivative trading Allowed? |
| Pricing & Matching Process: | Minimize pre-tax consideration payment under an EV/CE regime | Deferred Order Submissions possible? |
| | | Partial Matches possible? |
| | | Settlement terms: |
| | |     - Considerations |
| | |     - Entitlements: |
| Contract revaluation frequency: | Daily | Manual Approvals possible? |
| | | Ordering Party consideration credit available? |
| Ordering Parties allowed negative contract payoffs? | Yes | Collateralisation payments required? |
| | |     - Counterparties |
| Application Access limitations: | Nil |     - Ordering Parties |
| | | Bilateral Obligations Netting? |
| | | Bilateral Payments Netting? |
| | | Multilateral Obligations Netting? |
| | | Multilateral Payments Netting? |

| Netting Details (if applic.) | | Collateralisation Details (if applic.) |
|---|---|---|
| Applicable Discount rate: | 9.80% p.a. | Trustee: |
| Obligation netting trigger: | 100.000 | NOT APPLICABLE |
| Min required settlements: | 5.000 | |

| Ordering Party Consideration-Credit Options | | |
|---|---|---|
| Counterparty provided? | --Participating basis: | --Ord.Party-guarantor protected |
| | | --Unprotected |
| | --Non-participating basis: | --Ord.Party-guarantor protected |
| | | --Unprotected |
| Ordering Party Guarantor provided? | --Participating basis: | |
| | --Non-participating basis: | |

FIG. 60B

| AS AT | 91.06.03.17.00.00.00 |
|---|---|

| 10020-11400 | Application Access Limitations |
|---|---|
| Available | |
| Pre-Tax | Contract Ordering Parties |
| Not Applicable | NIL |
| NIL | |
| Yes | |
| Yes | |
| Yes | |
| Yes | Contract Counterparties |
| | NIL |
| Immediate | |
| Immediate | |
| No | |
| Yes | |
| | Counterparty Guarantors |
| Yes | NIL |
| Yes | |
| Yes | |
| Yes | Others: |
| No | NIL |
| No | |

| Valuation Details | Consideration Credit Details (if applicable) |
|---|---|
| Applicable discount rate: | Ordering Party Guarantor: |
| 9.80% | ADVENTCO Inc |

| | | 1 | 2 | 3 | 4 |
|---|---|---|---|---|---|
| -Participating | | 7 | 1 | 0.5 | 0.3 |
| -non-part. basis | | 7 | 1 | 0.5 | |
| | | 8 | 1 | | |
| -Participating | | 11 | | 0.5 | 0.3 |
| -non-part. basis | | 11 | | 0.5 | |
| | | 19 | | | |
| | | | | 16 | 1 |
| | | | | 20 | |

Key:
Counterparty:
1. Interest Rate(% p.a.)
2. Participation rate(%)

Ord. Party-Guarantor
3. Interest Rate(%p.a.)
4. Participation rate(%)

FIG. 61A

| PRODUCT SPECIFICATION | |
|---|---|
| PRODUCT ID: | 10061 |

| Product Summary | |
|---|---|
| Application ID: 001 | Product Sponsor: |

| Product Specification | |
|---|---|
| Market: | Stock Indices |
| Sub-market: | PTSE 75 |
| Market type: | Spot |
| Establishment date/time: | 91.06.03.17.00.00.00 |
| Maturity date/time: | 94.06.03.17.00.00.00 |
| Minimum Product Definition Value: 1600 | Maximum Product Definition Value: |

| Product Details | |
|---|---|
| Conditional Payoff Dimensions ID: One | Actual/Perceived Market Identifier: |
| Market Phenomena Class Identifier: Share Price Index | Specific Phenomenon: |
| Elemental/compound sub-market Identifier -- | Sub-market Phenomenon Class Identifier: |
| Future Period Date/time Identifier: At Contract Maturity date/time | Event Type Identifier: |
| Minimum Product Definition Value: 1600 | Maximum Product Definition Value: |
| Product Establishment Date/time: 91.06.03.17.00.00.00 | Product Maturity Date/time: |
| Cons./entitlement denomination of Product: Money | Currency type denomination of Product(if applic) |

FIG. 61B

| AS AT | 91.06.03.17.00.00.00 |

B.L.C. Inc

Consideration/entitlement denom.type:Money

Currency type(if applic.):            Com Bnk Dep.

National currency type(if applic.):   AUD

2200      Product Step Value:          0010

```
       Actual
       PTSE 75              Elemental/compound Market Identifier:Single Market
          --
       Spot Value
         2200                                      Product Step Value:0010
   94.06.03.17.00.00.00
                Com Bnk Dep.    National currency type denomination
                                of Product (if applic.)        AUD
```

FIG. 62A

| PRIMARY ORDER SPECIFICATION | | AS AT: |
|---|---|---|

| Ordering Party: | Abbots & Taylor | Application ID: | 001 |
|---|---|---|---|
| Own reference: | PQZ260 | | |

| Product: (ID: 10061 ) | Application Promoter | B.L.C. Inc |
|---|---|---|
| Market Stock Indices | Product Sponsor | B.L.C. Inc |
| Sub-Market PTSE 75  Market Type  Spot | Counterparty-guarantor | CNZ Banking Corporation |
| Estab.date/time  91.06.03.17.00.00.00 | Regulator | Pacific Central Bank |
| Maturity date/time  94.06.03.17.00.00.00 | | |

|  |  |  |  |  | "X"Value: | 4 |
|---|---|---|---|---|---|---|
| X Range Value | 1 | 2 | 3 | 4 | 5 | 6 |
| Alpha (X) | 1600 | 1930 | 1990 | 2200 | | |
| Beta  (X) | 187.200 | 187.200 | 37.440 | 37.440 | | |

| G | 1 | 11 |
|---|---|---|
| a | 2 | 8 |
| m | 3 | 11 |
| m | 4 | |
| a | 5 | |

| ORDER SUPPORT DETAILS | | |
|---|---|---|
| Communications medium: | Computer-to-computer | |
| Consideration Credit sought? | No | |
| Desired Form of Consideration Credit(if appl.) | | Not Applicable |
| Counterparty Collateralisation payments required? | Yes | |
| Preparedness to make 'own' collateralisation payments(if applicable)? | | Not Applicable |
| Applicable Marginal Tax rate(if applicable)? | | |
|   -Consideration: | Not Applicable | |
|   -Entitlements: | Not Applicable | |
| Netting System Participation? | | |
|   -Bilateral Obligations netting?(if applic.) | No | |
|   -Bilateral Payments netting?(if applic.) | No | |
|   -Multilateral Obligations netting?(if applic.) | No | |
|   -Multilateral Payments netting?(if applic.) | No | |

FIG. 62B 93.01.01.17.37.06.00

|  | Consideration/<br>Entitlement<br>Denomination | Consideration | Entitlement |
|---|---|---|---|
| Cons./Entitlement type | Money | Money | Money |
| Currency type(if applic.) | Com Bnk Dep | Com Bnk Dep | Com Bnk Dep |
| National Curr.type(if applic.) | AUD | AUD | AUD |
| Max.Consid.Amount | N.A. | 54,000 | As below |

Pricing and Matching Process:
  Minimize pre-tax consideration payment under an EV/CE regime SPECIAL DEAL TYPE: Collateralisation Payments

| | |
|---|---|
| Partial Matches desired?        Yes<br>Manual Approval of Matches desired?   No<br>Desired degree of trading<br>Transparency(if applicable)    Not Applicable<br>Applicable Consid./Entitlement Transfer Entity<br>Account details:   ABC Banking Corp<br>Operating A/c 1-1-502026-619930-0<br>Desired date/time of Order Submission:   Immediate<br>Desired Order retention period:    00.00.01.00.00.00<br>Desired Max.time for counterparty<br>manual order approval(if applic.):   Not Applicable<br>Preferred/Preferential Dealing:<br><br>NIL | Unacceptable Counterparties and Other Stakeholders<br><br>NIL |

FIG. 63A

| ORDER SPECIFICATION PRICING | | | By : Abrahamsons (Potential Counterparty No.1) |
|---|---|---|---|
| COUNTERPARTY PRICING SPECIFICATION | | | Application ID: ProductID: |
| Defined Circumstances ID 26 | Commission Rate 1.25% | | Discount Rate 10.00% p.a. |

| Feasible Product Definition Values | Gross Contingent Entitlement Amounts | Op/CP C/Credit Adjust. | Net Contingent Entitlement Amounts | Component Product Prices |
|---|---|---|---|---|
| < | 0.00 | 0.00 | 0.00 | |
| 1600 | (187.200) | 0.00 | (187.200) | 0.000220 |
| 1610 | (187.200) | 0.00 | (187.200) | 0.000227 |
| 1620 | (187.200) | 0.00 | (187.200) | 0.000237 |
| 1630 | (187.200) | 0.00 | (187.200) | 0.000249 |
| 1640 | (187.200) | 0.00 | (187.200) | 0.000266 |
| 1650 | (187.200) | 0.00 | (187.200) | 0.000287 |
| 1660 | (187.200) | 0.00 | (187.200) | 0.000314 |
| ⋮ | ⋮ | ⋮ | ⋮ | ⋮ |
| 2130 | (37.440) | 0.00 | (37.440) | 0.029642 |
| 2140 | (37.440) | 0.00 | (37.440) | 0.028625 |
| 2150 | (37.440) | 0.00 | (37.440) | 0.027469 |
| 2160 | (37.440) | 0.00 | (37.440) | 0.026193 |
| 2170 | (37.440) | 0.00 | (37.440) | 0.024819 |
| 2180 | (37.440) | 0.00 | (37.440) | 0.023369 |
| 2190 | (37.440) | 0.00 | (37.440) | 0.021865 |
| 2200 | (37.440) | 0.00 | (37.440) | 0.020330 |
| > | 0.000 | 0.000 | 0.000 | 0.146635 |
| | | | | 1.0402 | x Applic. Entitle. Exchange Rates  (................)   (................)   (................)
                                         C/E              Curr.            Nat Curr.
= Base contract bid price(in Product Denom. terms)
Net Present Value (at........   10.00% p.a.  ...)
+ Flat Commission (..........   1.25%    ...)
= Contract Bid Price (in Product Denom. terms)
x Applic. Consid. Exchange Rates  (................)   (................)   (................)
                                         C/E              Curr.            Nat Curr.
= Contract Bid Price (in OP requested terms)(if applic.)
  Implied Base 'Margin' on Contract
+ Exchange Rate and Consideration Investment Margin
= Implied Contract Value (to CP)

FIG. 63B

| | AS AT 93.01.01.17.38.02.00 | | | | |
|---|---|---|---|---|---|
| | 001<br>10061 | Consideration Exchange<br>Rates: (if applic) :C/E ....-.... Currency....-.... Nat.Curr....-.... | | | |
| | | Entitlement Exchange<br>Rates: (if applic) :C/E ....-.... Currency....-.... Nat.Curr....-.... | | | |
| Implied<br>Contingent<br>Entitlement<br>Amounts | Assessed<br>Probabilities<br>of<br>Occurence | Net<br>Contingent<br>Entitlement<br>(Valuation)Amts. | Net Contingent<br>Negative<br>Entitlement<br>(Valuation)Amounts | Maximum<br>Absolute<br>Negative<br>Entitlement Amount | |
| (0.041) | 0.000020 | (0.004) | (0.004) | (187.200) | |
| (0.042) | 0.000027 | (0.005) | (0.005) | | |
| (0.044) | 0.000037 | (0.007) | (0.007) | | |
| (0.047) | 0.000049 | (0.009) | (0.009) | | |
| (0.050) | 0.000066 | (0.012) | (0.012) | | |
| (0.054) | 0.000087 | (0.016) | (0.016) | | |
| (0.059) | 0.000114 | (0.021) | (0.021) | | |
| (1.110) | 0.029442 | (1.102) | (1.102) | | |
| (1.072) | 0.028425 | (1.064) | (1.064) | | |
| (1.028) | 0.027269 | (1.021) | (1.021) | | |
| (0.981) | 0.025993 | (0.973) | (0.973) | | |
| (0.929) | 0.024619 | (0.922) | (0.922) | | |
| (0.875) | 0.023169 | (0.867) | (0.867) | | |
| (0.819) | 0.021665 | (0.811) | (0.811) | | |
| (0.761) | 0.020130 | (0.754) | (0.754) | | |
| 0.000 | 0.158835 | 0.000 | 0.000 | | |
| (59.580) | 1.0000 | (55.000) | (55.000) | (187.200) | |

| 59.580 |
|---|
| 51.280 |
| 0.640 |
| 51.920 |
| 51.920 |

| 47.340 |
|---|

| 4.580 |
|---|
| ---- |
| 4.580 |

FIG. 64A

| ORDER SPECIFICATION PRICING | | | | By : Carpenters Inc (Potential Counterparty No.2) |
|---|---|---|---|---|
| COUNTERPARTY PRICING SPECIFICATION | | | | Application ID:<br>ProductID: |
| Defined Circumstances ID<br>17 | | Commission Rate<br>1.30% | | Discount Rate<br>9.8% p.a. |

| Feasible Product Definition Values | Gross Contingent Entitlement Amounts | Op/CP C/Credit Adjust. | Net Contingent Entitlement Amounts | Component Product Prices |
|---|---|---|---|---|
| < | 0.00 | 0.00 | 0.00 | |
| 1600 | (187.200) | 0.00 | (187.200) | 0.000220 |
| 1610 | (187.200) | 0.00 | (187.200) | 0.000226 |
| 1620 | (187.200) | 0.00 | (187.200) | 0.000237 |
| 1630 | (187.200) | 0.00 | (187.200) | 0.000249 |
| 1640 | (187.200) | 0.00 | (187.200) | 0.000265 |
| 1650 | (187.200) | 0.00 | (187.200) | 0.000287 |
| 1660 | (187.200) | 0.00 | (187.200) | 0.000314 |
| ... | ... | ... | ... | ... |
| 2130 | (37.440) | 0.00 | (37.440) | 0.029641 |
| 2140 | (37.440) | 0.00 | (37.440) | 0.028625 |
| 2150 | (37.440) | 0.00 | (37.440) | 0.027469 |
| 2160 | (37.440) | 0.00 | (37.440) | 0.026192 |
| 2170 | (37.440) | 0.00 | (37.440) | 0.024819 |
| 2180 | (37.440) | 0.00 | (37.440) | 0.023369 |
| 2190 | (37.440) | 0.00 | (37.440) | 0.021864 |
| 2200 | (37.440) | 0.00 | (37.440) | 0.020330 |
| > | 0.000 | 0.000 | 0.000 | 0.146635 |
| | | | | 1.0300 | x Applic. Entitle. Exchange Rates  (............)    (............)    (............)
                                               C/E                 Curr.            Nat Curr.
= Base contract bid price (in Product Denom. terms)
Net Present Value (at........  9.80% p.a.  ...)
+ Flat Commission (..........  1.30%  ...)
= Contract Bid Price (in Product Denom. terms)
x Applic. Consid. Exchange Rates  (............)    (............)    (............)
                                        C/E               Curr.           Nat Curr.
= Contract Bid Price (in OP requested terms) (if applic.)
   Implied Base 'Margin' on Contract
+ Exchange Rate and Consideration Investment Margin
= Implied Contract Value (to CP)

FIG. 64B

| AS AT 93.01.01.17.38.02.00 | | | | |
|---|---|---|---|---|

| 001 10061 | Consideration Exchange Rates: (if applic) :C/E ......-...... Currency......-...... Nat.Curr......-...... |
|---|---|
| | Entitlement Exchange Rates: (if applic) :C/E ......-...... Currency......-...... Nat.Curr......-...... |

| Implied Contingent Entitlement Amounts | Assessed Probabilities of Occurence | Net Contingent Entitlement (Valuation) Amts. | Net Contingent Negative Entitlement (Valuation) Amounts | Maximum Absolute Negative Entitlement Amount |
|---|---|---|---|---|
| (0.041) | 0.000020 | (0.004) | (0.004) | (187.200) |
| (0.042) | 0.000028 | (0.005) | (0.005) | |
| (0.044) | 0.000037 | (0.007) | (0.007) | |
| (0.047) | 0.000049 | (0.009) | (0.009) | |
| (0.050) | 0.000065 | (0.012) | (0.012) | |
| (0.054) | 0.000087 | (0.016) | (0.016) | |
| (0.059) | 0.000114 | (0.021) | (0.021) | |
| (1.110) | 0.029442 | (1.102) | (1.102) | |
| (1.072) | 0.028425 | (1.064) | (1.064) | |
| (1.028) | 0.027266 | (1.021) | (1.021) | |
| (0.981) | 0.025993 | (0.973) | (0.973) | |
| (0.929) | 0.024619 | (0.922) | (0.922) | |
| (0.875) | 0.023169 | (0.867) | (0.867) | |
| (0.819) | 0.021666 | (0.811) | (0.811) | |
| (0.761) | 0.020130 | (0.754) | (0.754) | |
| 0.000 | 0.158834 | 0.000 | 0.000 | |
| (60.840) | 1.0000 | (55.120) | (55.120) | (187.200) |

| (60.840) |
|---|
| 52.370 |
| 0.680 |
| 53.050 |
| 53.050 |

| 47.440 |
|---|

| 5.610 |
|---|
| ---- |
| 5.610 |

FIG. 65A

| CONTRACT SPECIFICATION LIMITS | | | | By: Abrahamsons |
|---|---|---|---|---|
| COUNTERPARTY CONSTRAINTS VERIFICATION | | | | |

| Details / Measure | Incremental Impact | Individual Contract Constraint Impact | | Single Product Portfolio Constraint Impact |
|---|---|---|---|---|
| | | Min/max required incremental impact of contract | Status Check | Allowable Incremental Imppact of contract |
| Absolute Loss | 187.200 | 500.000(max) | Y | NOT APPLICABLE |
| Expected Loss | 55.000 | 100.000(max) | Y | 600.000(max) |
| Exp.Incr.Value | 4.580 | 300.000(min) | Y | NOT APPLICABLE |

| Details / Measure | Incremental Impact | All Mat. Dates Total Product Portfolio Constraint Impact | |
|---|---|---|---|
| | | Allowable Incremental Impact of contract | Status Check |
| Absolute Loss | | NOT APPLICABLE | |
| Expected Loss | 55.000 | 210.000(max) | Y |
| Exp.Incr.Value | | NOT APPLICABLE | |

FIG. 65B

| AS AT | 93.01.01.17.38.02.00 |
|---|---|

| | "Equivalent" Maturity Date Total Product Portfolio Constraint Impact | | "Same Month" Mat. Date Total Product Portfolio Constraint Impact | |
|---|---|---|---|---|
| Status Check | Allowable Incremental Impact of Contract | Status Check | Allowable Incremental Impact of Contract | Status Check |
| | NOT APPLICABLE | | NOT APPLICABLE | |
| Y | 497.000(max) | Y | 1046.000(max) | Y |
| | NOT APPLICABLE | | NOT APPLICABLE | |

| | Current | Limit | Status Check |
|---|---|---|---|
| Contract expected loss as a proportion of the expected loss of all contracts/products | 6 % | 7 % | Y |
| Product expected loss as a proportion of the expected loss of all contracts/products | 62 % | 65 % | Y |

FIG. 66A

| CONTRACT SPECIFICATION LIMITS | | By: Carpenters Inc |
|---|---|---|

COUNTERPARTY CONSTRAINTS VERIFICATION

| Details / Measure | Incremental Impact | Individual Contract Constraint Impact | | Single Product Portfolio Constraint Impact |
|---|---|---|---|---|
| | | Min/max required incremental impact of contract | Status Check | Allowable Incremental Imppact of contract |
| Absolute Loss | 187.200 | 460.000 (max) | Y | NOT APPLICABLE |
| Expected Loss | 55.000 | 93.000 (max) | Y | 414.000 (max) |
| Exp.Incr.Value | 5.610 | 280.000 (min) | Y | NOT APPLICABLE |

| Details / Measure | Incremental Impact | All Mat. Dates Total Product Portfolio Constraint Impact | |
|---|---|---|---|
| | | Allowable Incremental Imppact of contract | Status Check |
| Absolute Loss | | NOT APPLICABLE | |
| Expected Loss | 55.120 | 661.000 (max) | Y |
| Exp.Incr.Value | | NOT APPLICABLE | |

FIG. 69A

| SECONDARY ORDER SPECIFICATION | | | | | AS AT: | |
|---|---|---|---|---|---|---|

| Acquiring Party: | Shearer & Associates |
|---|---|
| Own reference: | 61932076 |

| Application ID: | 001 |
|---|---|
| Order ID: | 9156515899 |
| Acq.P.Own reference: | 667-3 |

| Product: (ID: 10061 ) | |
|---|---|
| Market | Stock Indices |
| Sub-Market  PSTE 75 | Market Type   Spot |
| Estab.date/time | 91.06.03.17.00.00.00 |
| Maturity date/time | 94.06.03.17.00.00.00 |

| Application Promoter | B.L.C. Inc |
|---|---|
| Product Sponsor | B.L.C. Inc |
| Counterparty-guarantor | CNZ Banking Corporation |
| Regulator | Pacific Central Bank |

|  |  |  |  |  | "X"Value: | 4 |  |
|---|---|---|---|---|---|---|---|
| X Range Value | 1 | 2 | 3 | 4 | 5 | 6 |
| Alpha (X) | 1600 | 1930 | 1990 | 2200 |  |  |
| Alpha (X) | 187.200 | 187.200 | 37.440 | 37.440 |  |  |

| G | 1 | 11 |
|---|---|---|
| a | 2 | 8 |
| m | 3 | 11 |
| m | 4 |  |
| a | 5 |  |

| CONTRACT CONDITIONS | |
|---|---|
| Communications medium: | Computer-to-computer |
| Consideration Credit sought? | No |
| Desired Form of Consideration Credit(if appl.) | Not Applicable |
| Counterparty Collateralisation payments required? | Yes |
| Preparedness to make 'own' collateralisation payments(if applicable)? | Not Applicable |
| Applicable Marginal Tax rate(if applicable)? | |
|   -Consideration: | Not Applicable |
|   -Entitlements: | Not Applicable |
| Netting System Participation? | |
|   -Bilateral Obligations netting?(if applic.) | No |
|   -Bilateral Payments netting?(if applic.) | No |
|   -Multilateral Obligations netting?(if applic.) | No |
|   -Multilateral Payments netting?(if applic.) | No |

FIG. 69B

| 93.06.06.08.00.00.00 |
|---|

|  | Consideration/<br>Entitlement<br>Denomination | Consideration | Entitlement |
|---|---|---|---|
| Cons./Entitlement type | Money | Money | Money |
| Currency type(if applic.) | Com Bnk Dep | Com Bnk Dep | Com Bnk Dep |
| National Curr.type(if applic.) | AUD | AUD | AUD |
| Max.Consid.Amount | N.A. | 60,000 | As below |

Pricing and Matching Process:
  Minimize pre-tax consideration payment under an EV/CE regime SPECIAL           Collateralisation Payments
DEAL TYPE:

| | |
|---|---|
| Partial Matches desired?                          Yes<br>Manual Approval of Matches desired?          No<br>Desired degree of trading<br>Transparency(if applicable)     Not Applicable<br>Applicable Consid./Entitlement Transfer Entity<br>Account details:    ABC Banking Corp<br>Operating A/c 1-1-502026-846752-0 (and 1)<br>Desired date/time of Order Submission:    Immediate<br>Desired Order retention perid:     00.00.01.00.00.00<br>Desired Max.time for counterparty<br>manual order approval(if applic.):    Not Applicable<br>Preferred/Preferential Dealing:<br><br>                       NIL | Unacceptable Counterparties and<br>Other Stakeholders<br><br><br><br>NIL |

| | Consideration/ Entitlement Denomination | Consideration | Entitlement |
|---|---|---|---|
| Cons./Entitlement type | Money | Money | Money |
| Currency type(if app) | Com Bnk dep. | Com Bnk dep. | Com Bnk dep. |
| National Curr.type(if applic.) | AUD. | AUD. | AUD. |
| Amount | N.A. | 58,300 | As below |

AS AT 93.06.06.09.00.00.00  Report for:  Shearer & Associates

Pricing and Matching Process: Minimize pre-tax consideration payment under an EV/CE regime

| | Consideration/ Entitlement Denomination | Consideration | Entitlement |
|---|---|---|---|
| Cons./Entitlement type | Money | Money | Money |
| Currency type(if app) | Com Bnk dep. | Com Bnk dep. | Com Bnk dep. |
| National Curr.type(if applic.) | AUD. | AUD. | AUD. |
| Amount | N.A. | 58,300 | As below |

| AS AT   94.01.01.17.00.00.00 | Report for: | Shearer & Associates |

Pricing and Matching Process: Minimize pre-tax consideration payment under an EV/CE regime

FIG. 73

| | |
|---|---|
| APPLICATION SPECIFICATION | AS AT 91.06.03.17.00.00.00 |
| APPLICATION ID: | 001 |
| APPLICATION PROMOTER: | BLC INC |
| PRIMARY APPLICATION USE: | ECONOMIC RISK MANAGEMENT |
| FEASIBLE COUNTERPARTY NUMBERS: | MULTIPLE COUNTERPARTIES |
| PUBLIC/PRIVATE USE?: | PUBLIC USE |
| ACCEPTABLE COMMS MEDIUMS: | COMPUTER - COMPUTER LINK |
| RETAIL/WHOLESALE USE: | WHOLESALE USE |
| PRICING AND MATCHING PROCESS: | MINIMIZE PRE-TAX CONSIDERATION PAYMENT UNDER AN EV/CE REGIME |
| CONTRACT REVALUATION FREQUENCY: | DAILY |
| ORDERING PARTIES ALLOWED NEGATIVE CONTRACT PAYOFFS? | YES |
| APPLICATION ACCESS LIMITATIONS: | NONE |

FIG. 74

| | |
|---|---|
| PRODUCT SPECIFICATION | AS AT 91.06.03.17.00.00.00 |
| PRODUCT ID: | 10061 |
| PRODUCT SUMMARY: | |
| APPLICATION ID: | 001 |
| APPLICATION PROMOTER: | BLC INC |
| PRODUCT SPECIFICATIONS: | |
| MARKET: | STOCK INDICES |
| SUBMARKET: | PTSE 75 |
| MARKET TYPE: | SPOT |
| ESTABLISHMENT DATE/TIME: | 91.06.03.17.00.00.00 |
| MATURITY DATE/TIME: | 96.06.03.17.00.00.00 |
| CONSIDERATION/ENTITLEMENT DENOMINATION TYPE: | MONEY |
| CURRENCY TYPE(IF APPLICABLE): | COMMERCIAL BANK DEPOSIT |
| NATIONAL CURRENCY TYPE(IF APPLICABLE): | AUD |
| MINIMUM PRODUCT DEFINITION VALUE: | 1600 |
| MAXIMUM PRODUCT DEFINITION VALUE: | 2200 |
| PRODUCT STEP VALUE: | 10 |

FIG. 76A

```
ORDER SPECIFICATION PRICING                    AS AT 95.01.01.17.38.02.00

ORDER SPECIFICATION PRICING PARTY:  ABRAHAMSONS [Potential Counterparty No 1]

DEFINED CIRCUMSTANCES ID:  31      COMMISSION RATE: 1.25%
                                   DISCOUNT RATE: 10.00% pa
                                   COMPONENT PRODUCT PRICES: see Column 3 below
```

| Feasible Product Definition Values | Net Contingent Entitlement Amounts | Component Product Prices [ID 31] | Implied Contingent Entitlement Amounts |
|---|---|---|---|
| <    | 0.00  |          |       |
| 1600 | 83.83 | 0.000213 | 0.017 |
| 1610 | 83.83 | 0.000211 | 0.018 |
| 1620 | 83.83 | 0.000226 | 0.019 |
| 1630 | 83.83 | 0.000228 | 0.019 |
| 1640 | 83.83 | 0.000241 | 0.020 |
| 1650 | 83.83 | 0.000281 | 0.024 |
| 1660 | 83.83 | 0.000312 | 0.026 |
| .... | .... | .... | .... |
| .... | .... | .... | .... |
| 2130 | 83.83 | 0.028127 | 2.358 |
| 2140 | 83.83 | 0.028326 | 2.375 |
| 2150 | 83.83 | 0.027320 | 2.290 |
| 2160 | 83.83 | 0.026000 | 2.180 |
| 2170 | 83.83 | 0.024818 | 2.080 |
| 2180 | 83.83 | 0.023127 | 1.939 |
| 2190 | 83.83 | 0.021436 | 1.797 |
| 2200 | 83.83 | 0.020110 | 1.686 |
| >    | 0.000 | 0.146620 | 0.000 |
|      |       | 0.970600 | 69.07 |

```
Base Contract Bid Price(in Product Denomination terms):   (69.07)
Net Present Value (at 10.00% pa):                         (59.45)
+ Flat Commission (1.25%)                                   0.74
= Contract Bid Price (in Product Denomination Terms):     (58.71)
Implied Base Margin on Contract:
```

FIG. 76B

Application ID: 001
ProductID: 10061

| Assessed Probabilities of Occurence | Net Contingent Entitlement (Valuation)Amts. | Net Contingent Negative Entitlement (Valuation)Amounts | Maximum Absolute Negative Entitlement Amounts |
|---|---|---|---|
| 0.000020 | 0.002 | | |
| 0.000027 | 0.002 | | |
| 0.000037 | 0.003 | | |
| 0.000049 | 0.004 | | |
| 0.000066 | 0.006 | | |
| 0.000087 | 0.007 | | |
| 0.000114 | 0.010 | | |
| .... | .... | | |
| .... | .... | | |
| 0.029442 | 2.468 | | |
| 0.028425 | 2.383 | | |
| 0.027269 | 2.286 | | |
| 0.025993 | 2.179 | | |
| 0.024619 | 2.064 | | |
| 0.023169 | 1.942 | | |
| 0.021665 | 1.816 | | |
| 0.020130 | 1.687 | | |
| 0.158835 | 0.000 | | |
| 1.0000 | 70.51 | | |

```
ORDER SPECIFICATION PRICING                    AS AT 95.01.01.17.38.02.00

ORDER SPECIFICATION PRICING PARTY:   CARPENTERS [Potential Counterparty No 2]

DEFINED CIRCUMSTANCES ID:   19       COMMISSION RATE:  1.30%
                                     DISCOUNT RATE: 9.8% pa
                                     COMPONENT PRODUCT PRICES: see Column 3 below
```

| Feasible Product Definition Values | Net Contingent Entitlement Amounts | Component Product Prices [ID 19] | Implied Contingent Entitlement Amounts |
|---|---|---|---|
| < | 0.00 | | |
| 1600 | 83.83 | 0.000211 | 0.017 |
| 1610 | 83.83 | 0.000200 | 0.017 |
| 1620 | 83.83 | 0.000225 | 0.019 |
| 1630 | 83.83 | 0.000227 | 0.019 |
| 1640 | 83.83 | 0.000239 | 0.020 |
| 1650 | 83.83 | 0.000279 | 0.023 |
| 1660 | 83.83 | 0.000310 | 0.026 |
| .... | .... | .... | .... |
| .... | .... | .... | .... |
| 2130 | 83.83 | 0.028120 | 2.357 |
| 2140 | 83.83 | 0.028320 | 2.374 |
| 2150 | 83.83 | 0.027314 | 2.290 |
| 2160 | 83.83 | 0.025999 | 2.179 |
| 2170 | 83.83 | 0.024810 | 2.080 |
| 2180 | 83.83 | 0.023126 | 1.939 |
| 2190 | 83.83 | 0.021435 | 1.797 |
| 2200 | 83.83 | 0.020109 | 1.686 |
| > | 0.000 | 0.146620 | 0.000 |
| | | 0.969900 | 69.020 |

Base Contract Bid Price (in Product Denomination terms):   (69.02)
Net Present Value (at 9.80% pa):                           (59.41)
+ Flat Commission (1.30%)                                    0.77
= Contract Bid Price (in Product Denomination Terms):      (58.64)
Implied Base Margin on Contract:

FIG. 77B

Application ID: 001
ProductID: 10061

| Assessed Probabilities of Occurence | Net Contingent Entitlement (Valuation) Amts. | Net Contingent Negative Entitlement (Valuation) Amounts | Maximum Absolute Negative Entitlement Amounts |
|---|---|---|---|
| 0.000018 | 0.002 | | |
| 0.000027 | 0.002 | | |
| 0.000037 | 0.003 | | |
| 0.000049 | 0.004 | | |
| 0.000066 | 0.006 | | |
| 0.000087 | 0.007 | | |
| 0.000114 | 0.010 | | |
| .... | .... | | |
| .... | .... | | |
| 0.029442 | 2.468 | | |
| 0.028425 | 2.383 | | |
| 0.027269 | 2.286 | | |
| 0.025993 | 2.179 | | |
| 0.024619 | 2.064 | | |
| 0.023169 | 1.942 | | |
| 0.021665 | 1.816 | | |
| 0.020130 | 1.687 | | |
| 0.158837 | 0.000 | | |
| 1.0000 | 70.44 | | |

| | |
|---|---|
| APPLICATION SPECIFICATION | AS AT 91.06.03.17.00.00.00 |
| APPLICATION ID: | 201 |
| APPLICATION PROMOTER: | BLC INC |
| PRIMARY APPLICATION USE: | ECONOMIC RISK MANAGEMENT |
| FEASIBLE COUNTERPARTY NUMBERS: | MULTIPLE COUNTERPARTIES |
| PUBLIC/PRIVATE USE: | PUBLIC USE |
| ACCEPTABLE COMMS MEDIUMS: | COMPUTER - COMPUTER LINK |
| RETAIL/WHOLESALE USE: | WHOLESALE USE |
| PRICING AND MATCHING PROCESS: | MAXIMIZE PRE-TAX CONSIDERATION/ ENTITLEMENT EXCHANGE RATE |
| CONTRACT REVALUATION FREQUENCY: | DAILY |
| ORDERING PARTIES ALLOWED NEGATIVE CONTRACT PAYOFFS? | YES |
| APPLICATION ACCESS LIMITATIONS: | NONE |

FIG. 79

| | |
|---|---|
| PRODUCT SPECIFICATION | AS AT 91.06.03.17.00.00.00 |
| PRODUCT ID: | 11099 |
| PRODUCT SUMMARY: | |
| APPLICATION ID: | 201 |
| APPLICATION PROMOTER: | BLC INC |
| PRODUCT SPECIFICATIONS: | |
| MARKET: | IMMEDIATE EXCHANGE |
| SUB-MARKET: | NONE |
| MARKET TYPE: | SPOT |
| ESTABLISHMENT DATE/TIME: | 91.06.03.17.00.00.00 |
| MATURITY DATE/TIME: | As soon as possible after transaction initiation |
| CONSIDERATION/ENTITLEMENT DENOMINATION TYPE: | MONEY |
| CURRENCY TYPE (IF APPLICABLE): | COMMERCIAL BANK DEPOSIT |
| NATIONAL CURRENCY TYPE (IF APPLICABLE): | AUD and USD |
| MINIMUM PRODUCT DEFINITION VALUE: | Not Applicable |
| MAXIMUM PRODUCT DEFINITION VALUE: | Not Applicable |
| PRODUCT STEP VALUE: | Not Applicable |

FIG. 80

PRIMARY ORDER SPECIFICATION       AS AT 92.06.03.17.00.00.00

ORDERING PARTY:              ABBOTTS & TAYLOR
ORDERING PARTY REFERENCE:    PQZ 260

PRODUCT:
PRODUCT ID: 11099
MARKET: IMMEDIATE EXCHANGE           SUB-MARKET: NONE           MARKET TYPE: SPOT
ESTABLISHMENT DATE/TIME: 91.06.03.17.00.00.00                   MATURITY DATE/TIME: As soon as possible after transaction initiation ENTITLEMENT:
DENOMINATION TYPE:                              MONEY
CURRENCY TYPE (IF APPLICABLE):                  COMMERCIAL BANK DEPOSIT
NATIONAL CURRENCY TYPE (IF APPLICABLE):         USD
SPECIFIED ENTITLEMENT AMOUNT:                   70,000

CONSIDERATION:
DENOMINATION TYPE:                              MONEY
CURRENCY TYPE (IF APPLICABLE):                  COMMERCIAL BANK DEPOSIT
NATIONAL CURRENCY TYPE (IF APPLICABLE):         AUD
MAXIMUM CONSIDERATION AMOUNT:                   102,900

FIG. 81A

```
ORDER SPECIFICATION PRICING                          AS AT 92.06.03.17.38.02.00

ORDER SPECIFICATION PRICING PARTY:   ABRAHAMSONS [Potential Counterparty No 1]

DEFINED CIRCUMSTANCES ID:  54        COMMISSION RATE:  1.25%
                                     DISCOUNT RATE: Not Applicable
                                     ENTITLEMENT EXCHANGE RATE: 0.75
```

| Feasible Product Definition Values | Net Contingent Entitlement Amounts | Component Product Prices [ID 31] | Implied Contingent Entitlement Amounts |
|---|---|---|---|
| NA | (70.00) | 1.0000 | (70.00) |
| | | 1.0000 | (70.00) |

```
Base Contract Bid Price(in AUD @ 0.75 exch rate):    93.33
Net Present Value:                                   93.33
+ Flat Commission (1.25%)                             1.17
= Contract Bid Price (in Product Denomination Terms): 94.50
Implied Base Margin on Contract:
```

FIG. 81B

Application ID: 201
ProductID: 11099

| Assessed Probabilities of Occurence | Net Contingent Entitlement (Valuation) Amts. | Net Contingent Negative Entitlement (Valuation) Amounts | Maximum Absolute Negative Entitlement Amounts |
|---|---|---|---|
| 1.0000 | (70.00) | | |
| 1.0000 | (70.00) | | |
| | NA | | |
| | NA | | |

FIG. 82A

```
ORDER SPECIFICATION PRICING                    AS AT 92.06.03.17.38.02.00

ORDER SPECIFICATION PRICING PARTY:   CARPENTERS [Potential Counterparty No 2]

DEFINED CIRCUMSTANCES ID:  27      COMMISSION RATE:  1.30%
                                   DISCOUNT RATE: Not Applicable
                                   ENTITLEMENT EXCHANGE RATE: 0.70
```

| Feasible Product Definition Values | Net Contingent Entitlement Amounts | Component Product Prices [ID 19] | Implied Contingent Entitlement Amounts |
|---|---|---|---|
| NA | (70.00) | 1.0000 | (70.00) |
| | | 1.0000 | (70.00) |

```
Base Contract Bid Price(in AUD @ 0.70 each):           100.00
Net Present Value:                                     100.00
+ Flat Commission (1.30%)                                1.30
= Contract Bid Price (in Product Denomination Terms):  101.30
Implied Base Margin on Contract:
```

FIG. 82B

Application ID: 201
ProductID: 11099

| Assessed Probabilities of Occurence | Net Contingent Entitlement (Valuation)Amts. | Net Contingent Negative Entitlement (Valuation)Amounts | Maximum Absolute Negative Entitlement Amounts |
|---|---|---|---|
| 1.0000 | (70.00) | | |
| 1.0000 | (70.00) | | |
| | | NA | |
| | | NA | |

METHODS OF EXCHANGING AN OBLIGATION

This application is a continuation of U.S. application Ser. No. 08/870,691, filed Jun. 6, 1997, now U.S. Pat. No. 6,134,536, which is a continuation-in-part of U.S. application Ser. No. 08/070,136, filed May 28, 1993, now U.S. Pat. No. 5,970,479, and said U.S. application Ser. No. 08/870, 691 is also a continuation-in-part of PCT/AU95/00827, filed Dec. 7, 1995. Both U.S. application Ser. No. 08/070,136 and PCT/AU95/00827, which are commonly owned, are incorporated by reference in their entireties herein.

TECHNICAL FIELD

This invention relates to methods and apparatus, including electrical computers and data processing systems applied to financial matters and risk management. In particular, the invention is concerned with the management of risk relating to specified, yet unknown, future events.

BACKGROUND ART

Individuals and enterprises are continually exposed to risk because of future events beyond their control. The outcome of those events can either positively or negatively impact on their wellbeing.

Individuals and enterprises should generally prefer not to face exposure to the possibility of adverse consequences, regardless of their perception of the likelihood of such events occurring. It is in their interest to consider foregoing 'resources' they currently possess if doing so would reduce the possibility of being so greatly exposed to future outcomes.

Risk can take many forms in view of the large range and type of future events which might result in adverse consequences. Risk can be categorised, in one instance, as 'economic' in nature. Phenomena that constitute economic risk include: commodity prices, currency exchange rates, interest rates, property prices, share prices, inflation rates, company performance, and market event based indices.

Another characterisation of risk concerns 'technical' phenomena. This can include things like the breakdown of an electricity generation plant, aircraft engine failure, and the damage to, or failure of, orbiting telecommunications satellites. The outcomes for each of these phenomena will be adverse for the users and/or supplier.

Other forms of risk defy ready characterisation, such as weather-based (viz., rain damage or lightning strike), or other natural occurrences (viz., earthquakes or iceberg collision with sea-going vessels).

There are also less tangible risks associated with, for example, the emission of atmospheric pollutants or the disposal of intractable toxic wastes, in the sense that the future consequences are unknown, save that there is a notion, based on current information, that they could be adverse.

The capability to manage risk is more important today than it was in the past, and is likely to become ever-more important into the future, because there is an ever increasing exposure to a wider generic range of future phenomena beyond the control of individuals or enterprises. There is also a wider feasible range of possible future events, and greater uncertainty about the likelihood of occurrence, associated with any single future phenomenon viz., an increasing volatility.

It is also thought that individuals are now more risk-averse in recessionary times, when there are fewer available discretionary resources to trade-off to protect themselves from such adverse future events.

In the prior art, individuals and enterprises faced with 'technical' risk have hedged against future outcomes by mechanisms such as the adoption of quality assurance practices, warranties, increased research and development activity (and associated intellectual property rights such as patents, utility models and registered designs), the purchase of modernised plant and equipment, and improved inventory, occupational health and safety and employer/employee relations practices.

Consider a manufacturer of, say, integrated circuits (ICs), which has many clients wishing to purchase its ICs. The demand may result in a delay in delivery due to limited manufacturing capacity, thereby requiring advance production scheduling for orders already in-hand. Typically, the manufacturer will give a warranty to a purchaser as to measurable performance criteria for its ICs; if a batch does not perform to the specified criteria, the manufacturer is required by contract to replace that batch. That is, a purchaser may have no interest in obtaining monetary compensation for the poor quality ICs, as the purchaser needs the components for their own products. In that case, the 'consideration' the warranty makes is the priority scheduling of a substitute batch of that type of IC, possibly displacing other scheduled production runs, or deferring delivery to another purchaser.

Such contractual arrangements are piece-meal in nature, and can only be struck between the manufacturer and each individual purchaser. They also leave the manufacturer exposed to claims from other customers whose orders are delayed by the re-scheduling. The manufacturer has no convenient mechanism available to it to hedge against such claims, perhaps by way of reserving production rights with another manufacturer, in lieu of unavailability of their own manufacturing facility.

In the face of such 'economic' risk, it is known for individuals and enterprises to hedge against adverse outcomes by indirect means such as self-insurance, and directly by means such as futures contracts, forward contracts, and swaps.

There are disadvantages or limitations associated with such available economic risk management mechanisms. Particularly, they provide, at best, only indirect approaches to dealing with the risk management needs. The available mechanisms are relatively expensive, and provide limited phenomenon coverage, and therefore cannot meet the requirements of the party seeking to hedge against such wide-ranging future risk. The infrastructure and pay-out costs associated with switching between, say, a commodities market and a stock market are often prohibitive for entities small and large alike. As a consequence, entities find themselves saddled with obligations they have little control over and cannot escape.

In respect of the "less tangible" forms of risk, an example in the prior art of a form of management of that risk is that of 'pollution rights' sold by the U.S. Environmental Protection Agency (EPA) in March 1993 for the atmospheric emission of sulphur dioxide. This was done by an auction of "allowances" permitting the release into the atmosphere. By the year 1995, any company or organisation emitting sulphur dioxide in the U.S. without enough allowances to cover their total emissions will face prosecution. This means polluters must either buy further allowances, or else modify or replace their plant and equipment to reduce these emissions. The EPA will regulate the total number of allowances able to be obtained. The existing allowances have already become a valuable tradeable 'property' as between sulphur dioxide emitters, that is, even before the time when no further allowances will be able to be purchased.

Management techniques for the "less tangible" forms of risk are in their infancy. The existing forms indicate an emerging demand for systems and methods to enable effective management.

Specific examples in the prior art of patents relating to methods and apparatus which deal with various forms of risk management include British Patent No. 2 180 380, in the name of Merrill Lynch Pierce Fenner and Smith Incorporated, directed to an Automated Securities Trading Apparatus (corresponding to U.S. Pat. No. 4,674,004, and further related to U.S. Pat. Nos. 4,346,442 and 4,376,978). Other examples include U.S. Pat. No. 4,739,478 assigned to Lazard Freres and Co., directed to Methods and Apparatus for Restructuring Debt Obligations, U.S. Pat. No. 4,751,640 assigned to Citibank, N. A., directed to An Automated Investment System, and U.S. Pat. Nos. 4,752,877, 4,722,055, and 4,839,804 assigned to College Savings Bank directed to Methods and Apparatus for Funding Future Liability of Uncertain Cost.

The present invention comes about in view of the shortcomings of existing risk management mechanisms, and the perceived increasing importance of the management of risk relating to specified, yet unknown, future events.

In this sense, the invention is directed to something having economic value to individuals, enterprises and societies as a whole. Methods and apparatus that provide for the management of risk offer material advantages by, for example, minimising adverse future outcomes, providing both a form of compensation in the event of adverse future outcomes, and forms of risk management not otherwise supported or available in the prior art, and thus have value in the field of economic endeavour.

DISCLOSURE OF THE INVENTION

The invention encompasses methods and apparatus enabling the management of risk relating to specified, yet unknown, future events by enabling entities (parties) to reduce their exposure to specified risks by constructing compensatory claim contract orders on yet-to-be-identified counter-parties, being contingent on the occurrence of the specified future events. The entities submit such orders to a 'system' which seeks to price and match the most appropriate counter-party, whereupon matched contracts are appropriately processed through to their maturity.

Therefore, the invention enables parties to manage perceived risk in respect of known, yet non-predictable, possible future events. These future events may relate to measurable phenomena whose outcome is verifiable, and cannot be materially influenced by any other entity having a stake in that outcome.

The ability to price and match risk aversion contracts essentially comes about because of the nature of risk itself. Any number of people will each have differing views as to the likelihood of an outcome of some future event. This means that when each person is required to independently assess a range of outcomes for a specified future date, there almost always will be a variance in those assessments. Thus it is possible to match these expectations as between parties to form a contract. The potential counter-parties to an offered contract have the motivation of taking up an opportunity to exploit differing views of future outcomes to their advantage, either for some gain or, again, as a form of risk management.

It is important that the assessments as to future outcomes of events are made independently of any other party who could be a counter-party to a contract. The nature of the pricing and matching, therefore, is totally different to conventional negotiation or bidding as between parties.

The present invention enables entities to better manage risk, as they are able to think more explicity about possible future events beyond their control which they perceive will have adverse consequences for them. They will have the capacity to utilise existing resources to reduce exposure to a specific risk, and have access to a generally available mechanism by which they can explicity trade-off existing assets for increased certainty about the future. They are also free to decide upon the degree to which they should make such trade-offs, and to actually effect and subsequently manage such trade-offs in a simple and low cost manner.

Risk management contract formulation comprising the steps of order placement, pricing and matching. An ordering party initiates contract formulation by submitting an order that relates to a specified phenomenon that has a range of possible outcomes relative to a future date of maturity. The ordering party specifies elemental entitlements (pay-outs) due at maturity relative to the phenomenon's actual outcome, and a maximum consideration to be paid to a counterparty on matching of a contract. Independently, potential counterparties have submitted registering data based on their assessed probability of each possible outcome at maturity for the phenomenon in question. From this counterparty registering data, a data processing system then seeks to price each counterparty against the ordering party's specified entitlement. Broadly speaking, this involves multiplying each of the elemental ordering party entitlements with the corresponding counterparty probability and summing the results to derive counter considerations. The counter considerations must fall below the ordering party's maximum consideration for there to be the possibility of a match. Most usually a match will be made between the ordering party and the counterparty having the lowest counter consideration.

The ordering stakeholders and counter-party stakeholders can be considered to be contract buyers and contract sellers respectively. The entitlement for each outcome can be in the form of 'money' payoffs (both positive and negative) at maturity of a matched contract, or can be other types of compensation, possibly in the form of goods, services, promises, credits or warrants. The consideration, whether buyer specified or seller calculated, can again be in the nature of a premium or payments, or can relate to other 'non-money' forms of property or obligations, typically transferable when a contract is matched, although possibly deferable, until, and potentially beyond, the time of maturity.

In the period between the match of a contract and maturity the various buyers, sellers and other contract stakeholders can review any contract to which they are a party and seek to trade that contract to other parties by the pricing and matching procedure, or variations on the pricing and matching procedure. They would tend to do so if their view of the future outcome of the phenomenon, being the subject of the contract, had changed markedly, or as a means to minimise expected losses if some unforseen adverse trend in the present day outcome of the phenomenon has occurred. As well as trading existing contracts, further contracts can be offered to 'lay off' or avert risk. Stakeholder parties can build up a portfolio of matched contracts and offered contracts, which are continually traded to obtain the best possible position at any time, and that position can be continually reviewed with time.

It is further possible for offered contracts to be based on the difference between phenomena, and so manage perceived risk as between the phenomena. Elemental contract phenomena can therefore be developed to meet the most particular needs of buyers and sellers, thus creating great flexibility.

In most instances the date of maturity will be predetermined by a 'product sponsor' stakeholder, who otherwise cannot be a buyer or seller of contracts they sponsor. Even so, it is conceivable that the date of maturity can be tied to a specified time from the instant a contract is matched. This may be appropriate where the time of maturity is in the near future, in which case offered contracts could otherwise remain unmatched following initial offer even up until the time of maturity.

Other stakeholders have executive roles in administration, guaranteeing the performance of buyers and seller, regulation, supervision and so on. In this way the number and types of buyers and sellers that can be considered in pricing and matching offered contracts can be controlled.

The invention also encompasses apparatus and method dealing with the handling of contracts at maturity, and specifically the transfer of entitlement.

In another preferred form, the invention provides that the phenomenon for an offered contract is specified such that the elemental entitlements for the range of outcomes are the same for each outcome. In mathematical terms this corresponds to a shape in an x-y cartesian coordinate system where entitlement value (y) with respect to the outcome values (x) is a flat line. Put another way, the entitlement vs. outcome (y,x) shape has zero gradient ($\Delta y/\Delta x$). This type of entitlement/outcome shape can be thought of as a form of lending (if the entitlement is positive, or borrowing if the entitlement is negative), in that the ordering party wishes to make the consideration available for lending now, having the expectation of receiving a known (non-contingent) entitlement in the future. Contract pricing and matching with a counterparty can proceed as described above.

Embodiments of the invention significantly advance the state-of-the-art of formulating and trading risk management contracts. Essentially, this is achieved by a computing/telecommunications infrastructure that is capable of being accessed worldwide by any enterprise/individual having access to a computer and telephone network. Furthermore, a virtually infinite number and range of risk typescan be accommodated. One embodiment presents itself in a form that assists users in making consideration-entitlement (insurance-type) trade-off decisions and provides a blind yet transparent price-discovery and trading process. Through its capability to create special case lending/borrowing and exchange products, end users are also provided with a low-cost mechanism for pricing and acquiring these products without the involvement of traditional intermediaries.

BRIEF DESCRIPTION OF THE DRAWINGS

A number of embodiments of the invention will now be described with reference to the accompanying drawings, in which:

FIGS. 43A to 82B show tables and charts associated with Examples I, II, III, IV, and V.

DETAILED DESCRIPTION OF A BEST MODE FOR CARRYING OUT THE INVENTION

1. Introduction

The description firstly discusses the relation of the various users (stakeholders) of the 'system', followed by a consideration of a hardware data processing platform and peripheral input/output devices by which stakeholders interact with each other and the system.

This is followed by a discussion of the scope of the 'applications' that can be supported by the system in relation to the various stakeholders, and the interrelation of component parts thereof.

Details as to software methodologies for implementation of the applications supported by the system are also described, including a number of worked examples relating to the formulation and trading of risk management contracts.

In the course of the detailed description reference is made to a number of non-conventional expressions and terminologies. For convenience, an explanation of these is listed in the Glossary hereinbelow.

2. 'Systems' Configurations

Figure 1:
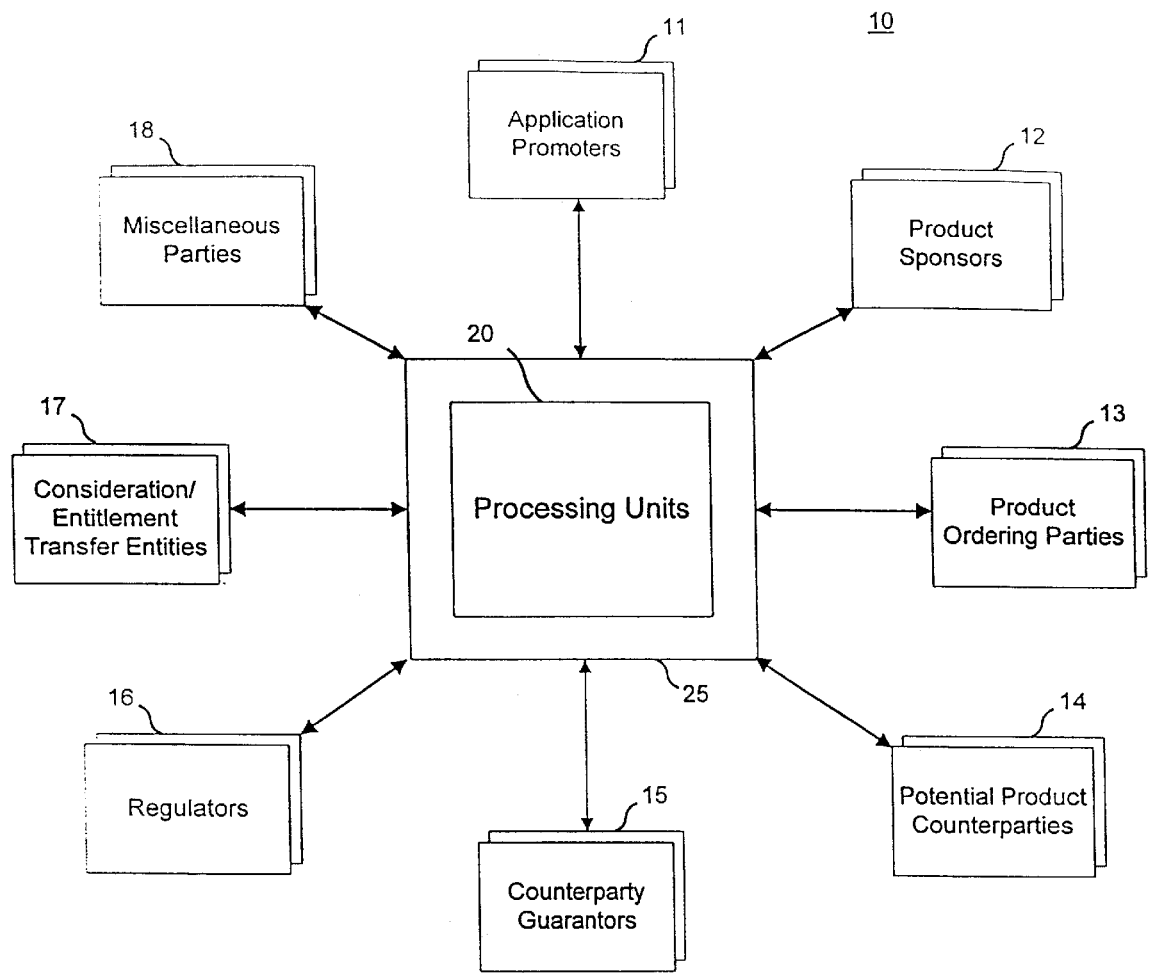
FIG. 1 shows a block diagram of a generic 'system' embodying the invention.

FIG. 1 shows a block diagram of a generic 'system' embodying the invention. The various stakeholders or parties to the system 10 each have access to a centralised processing unit 20. The processing units 20 can be constituted by one or more data processing apparatus, with each one thereof providing access for any one or more of the various stakeholders to applications software supported by the system 10, as all the processing units would be interconnected. Access to the one or more data processing apparatus is controlled by a generic form of communications co-ordination and security processing unit 25.

FIG. 1 also indicates that there are a number of types of stakeholder, and a number of individual stakeholders within each stakeholder type. The basic types of stakeholder are described as: applications promoters 11, product sponsors 12, product ordering parties (buyers) 13, potential product counter-parties (sellers) 14, counter-party guarantors 15, regulators 16, consideration/entitlement transfer ('accounting') entities 17, and miscellaneous parties 18. The detailed roles of each of these stakeholders will be subsequently described in greater detail at a later time. The number of types of stakeholder represented in FIG. 1 is typically the largest that will be supported by the system 10.

An embodiment of a computer system for the system 10 is shown in FIG. 2. The core of the system hardware is a collection of data processing units. In the embodiment described, the processing unit 20 comprises three interlinked data processors 93, 97, 104, such as the Sun 670 MP manufactured by Sun Microsystems, Inc. of the USA. Each processing unit 93, 97, 104 runs operational system software, such as Sun Microsystems OS 4.1.2, as well as applications software. The applications software is, in part, written around the flow diagrams subsequently described in FIGS. 8 to 16, and FIGS. 18 to 40, and accesses, or otherwise creates, the data files as summarized in the section headed PROCESS 2 VARIABLES AND DATA FILES hereinbelow. The processor configuration shown in FIG. 1 represents a large system designed to handle the transactions of thousands of stakeholders, the input and output data generated by those stakeholders, and risk management contact pricing, matching and subsequent processing functions.

Each processing unit 93,97,104 is operably connected with it one or more mass data storage units 95,100,110 to store all data received from stakeholders, and other data relating to all other software operations generating or retrieving stored information. Suitable mass storage units are, for example, such as those commercially available from Sun Microsystems.

A number of communications controllers 80,84,87, forming the communications coordination and security processing unit 25, are coupled with the processing unit 20. These controllers effect communications between the processing units 93,97,104 and the various external hardware devices used by the stakeholders to communicate data or instructions to or from the processing units. The communications controllers are such as the Encore ANNEX II, the IBM AS/400 server or the CISCO Systems AGS+.

A large range of communications hardware products are supported, and collectively are referred to as the stakeholder input/output devices 70. One amongst many of the communication devices 70 are personal computers 51 and associated printers 52, which have communications connection with the communications controller 80 by means of a modem 50. There can also be an external host device 53, such as a mini or mainframe computer, again linked with the communications controller 80 by means of a modem 54. In other forms, communications can be established simply by means of a tone dialing telephone 56, which provides for the input of instructions or data by use of the tone dialing facility itself. In the alternative, a voice connection via an operator 75 can be effected by a conventional telephone 58. Both these external devices are shown connected with the communications controller 84. A further possibility is to have data transfer by means of a facsimile machine 65, in this case shown linked to the communications controller 87.

In all cases, users of the input devices are likely to be required to make use of system access password generation and encryption devices such as the Racal RG 500 Watchword Generator 66,67,68,69, (for personal use) and the Racal RG 1000, which is incorporated in a mainframe computer 53. The corresponding decoding units for these devices are incorporated in the communications controllers 80,84,87.

The generic processing unit 20 also includes a large number of 'portable' information recordal devices, such as printers, disc drives, and the like, which allow various forms of information to be printed or otherwise written to storage media to be transferable. This is particularly appropriate where confirmatory documentation of matched risk contracts is required to be produced, either for safekeeping as a hard copy record, else to be forwarded to any one or more of the stakeholders that are a party to each individual matched contract.

Figure 2A:
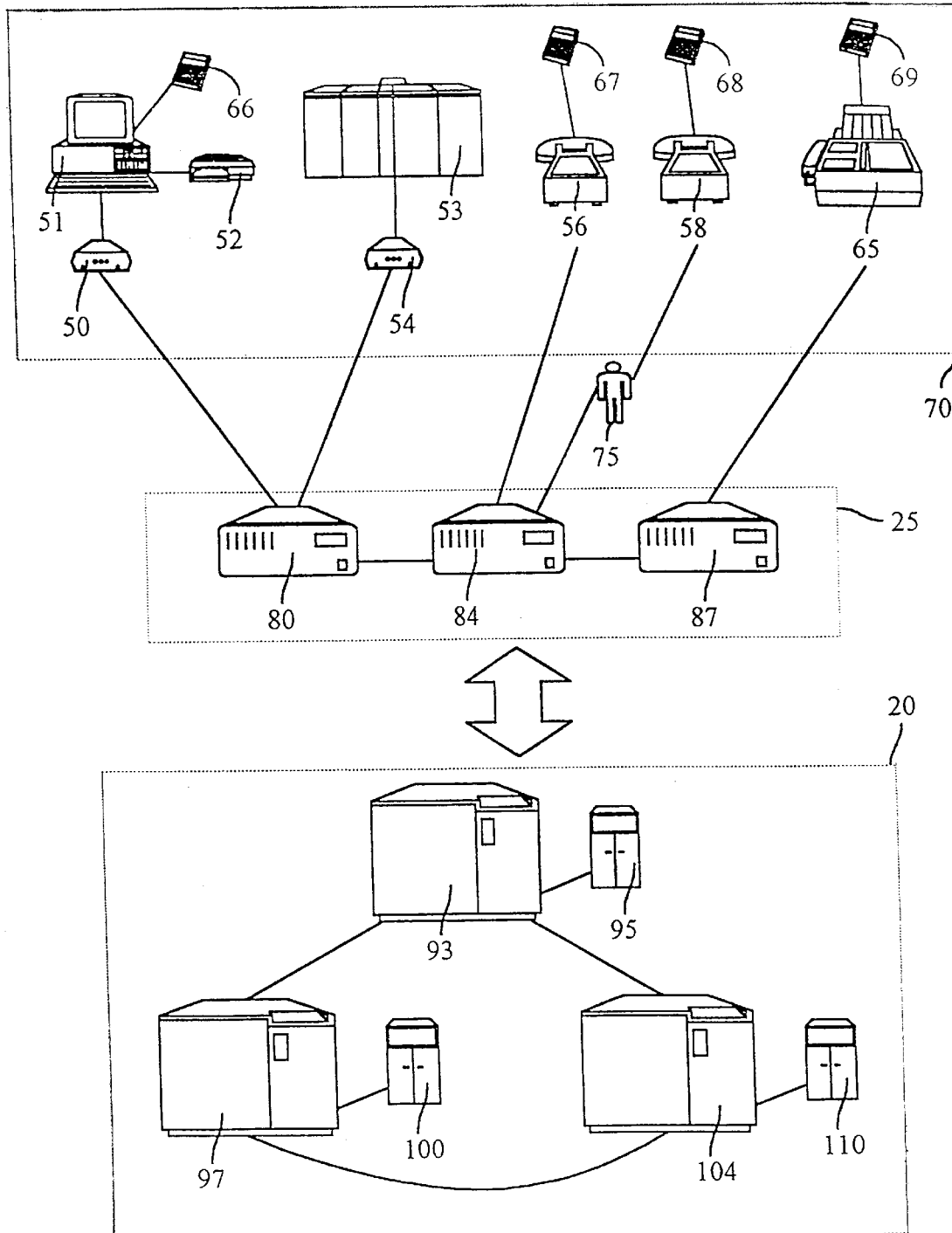
FIG. 2a shows a schematic block diagram of an indicative hardware platform supporting the system of FIG. 1.

The generic system 10 shown in FIG. 1 encompasses many varied configurations, relating not only to the number and types of stakeholders, but also the 'architectures' realisable by the system hardware and software in combination. In that sense the arrangement shown in FIG. 2a is to be considered only as broadly indicative of one type of hardware configuration that may be required to put the invention into effect.

Figure 2B:
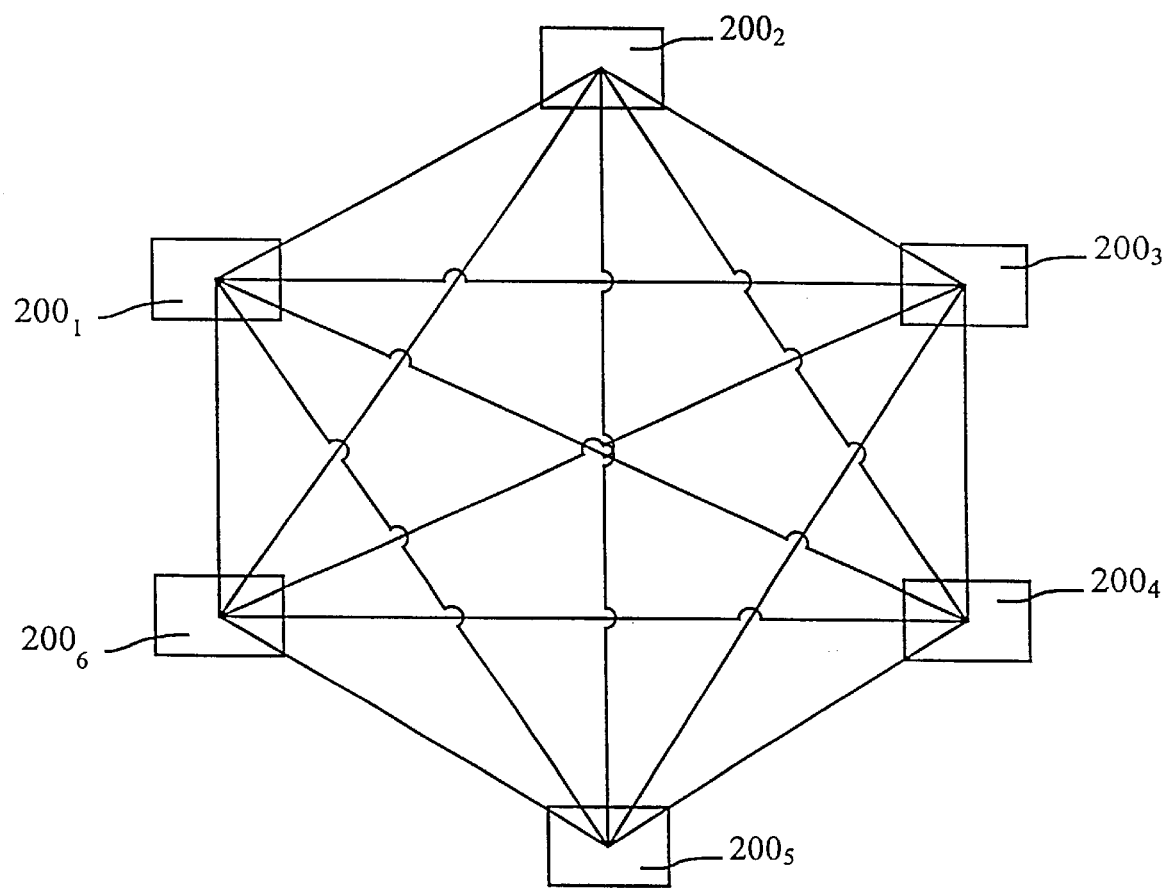
FIG. 2b is a schematic block diagram of an alternate hardware platform supporting the system of FIG. 1.

For example, FIG. 2b shows an alternative configuration that does not rely upon a centralised (hub) data processing unit, rather the necessary processing is performed locally at each stakeholder site 200$_n$ by means of distributed software.

Figure 3:
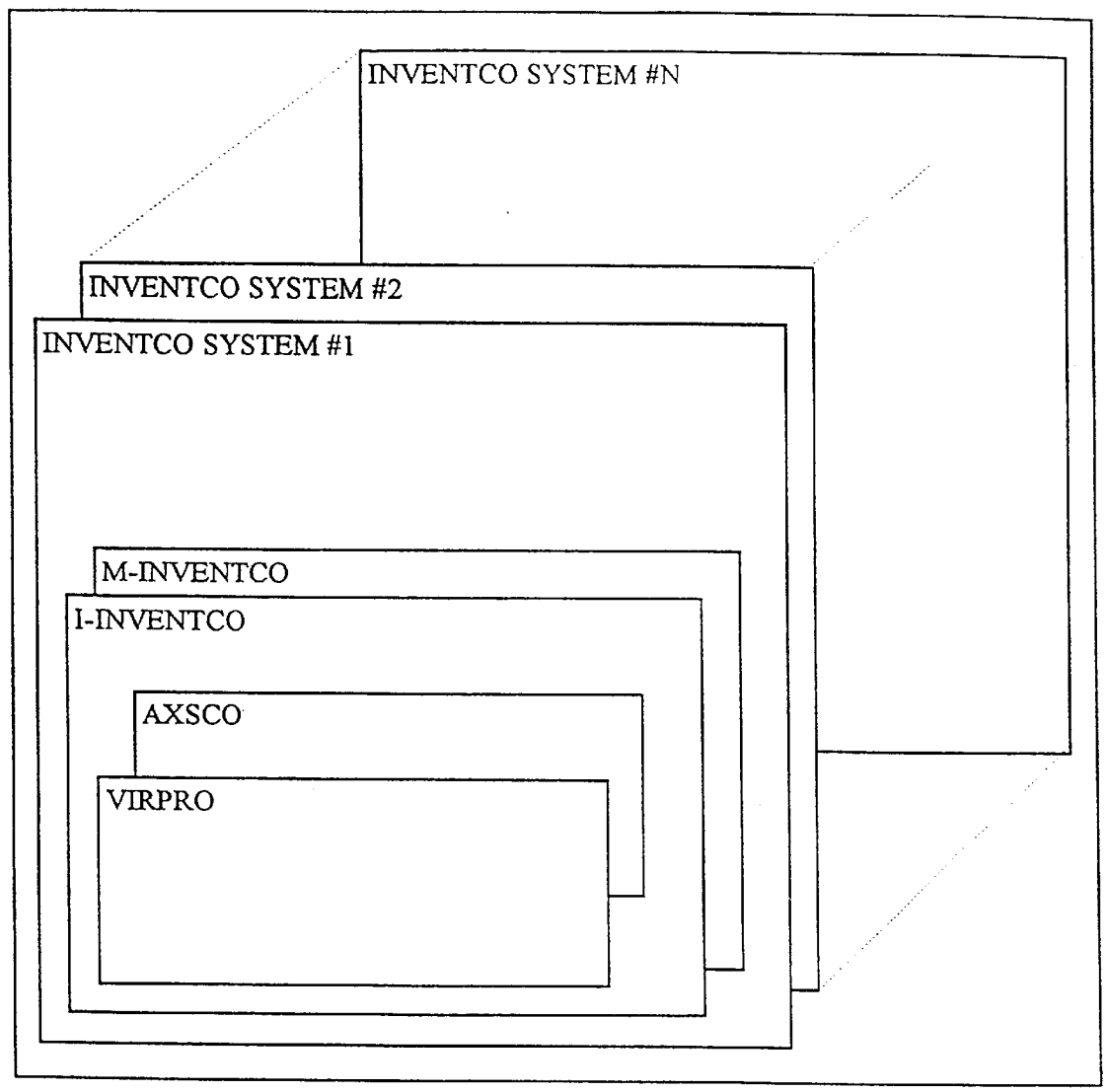
FIG. 3 shows a representation of INVENTCO and its main component parts.

The 'virtual' level of the system 10 is termed INVENTCO. INVENTCO is a collection of one or more potentially interrelated systems, as shown in FIG. 3. Each INVENTCO system (INVENTCO SYSTEM #1 . . . INVENTCO SYSTEM #N) enables the formulation and trading of a wide range of contractual obligations, including risk management contracts. The hardware configuration shown in FIG. 2, is to be understood both as a realisation for a single INVENTCO system, and equally can represent a number of INVENTCO SYSTEMS, where the processing unit 20 is common to all and supports a number of communications co-ordination and security units 25, others of which are not shown, together with associated external communications devices 70, also not shown.

While INVENTCO allows the formulation and trading of risk management contracts, it is also responsible for processing of such contracts through to, and including, their maturity, and in some respects, subsequent to maturity.

Where there are a number of INVENTCO systems, those systems may be inter-dependent or stand-alone in nature. If inter-dependent, INVENTCO (10) is responsible for transactions between those systems.

INVENTCO and all of its component parts can be legally or geographically domiciled in separate countries or states. The supra-national nature of INVENTCO enables the stakeholders to avail themselves of the risk management mechanisms independently of legal domicile or other such restrictions that are often a feature of some conventional risk management mechanisms, subject to meeting certain criteria regarding credit worthiness and such. Indeed, the legal domicile, location, ownership and participating stakeholders of INVENTCO, or any of the sub-systems, can be continually changing.

FIG. 3 further shows that each INVENTCO SYSTEM comprises an infrastructure component, termed I-INVENTCO, and a markets depository component M-INVENTCO. I-INVENTCO is concerned with coordination of communications and other security considerations, that part termed AXSCO, and also provides a network and general management system, termed VIRPRO. M-INVENTCO is a depository of authorised product-market (applications) software residing within INVENTCO under the authorisation of VIRPRO, and as distributed using I-INVENTCO.

One or more local or wide area telecommunication networks may link VIRPRO and M-INVENTCO to AXSCO, and thus to each other. In this way both VIRPRO and M-INVENTCO effectively reside around AXSCO.

AXSCO therefore comprises multiple, uniquely addressed communications controllers linked together in a number of possible ways. In one embodiment, AXSCO is represented by the communications co-ordination and security processing unit 25 shown in FIG. 2. The component hardware, such as the three controllers 80,84,87 shown in FIG. 2, typically are responsible for three types of operational applications. The first is in respect of time stamping data received from other parts of INVENTCO and data similarly transmitted to entities external of INVENTCO. The second is in respect of protecting the identity and/or location of entities within INVENTCO from one another, and from entities external to INVENTCO. The third is responsible for overall management of the routing of data received and to be transmitted within INVENTCO and to external entities thereto.

Figure 4:
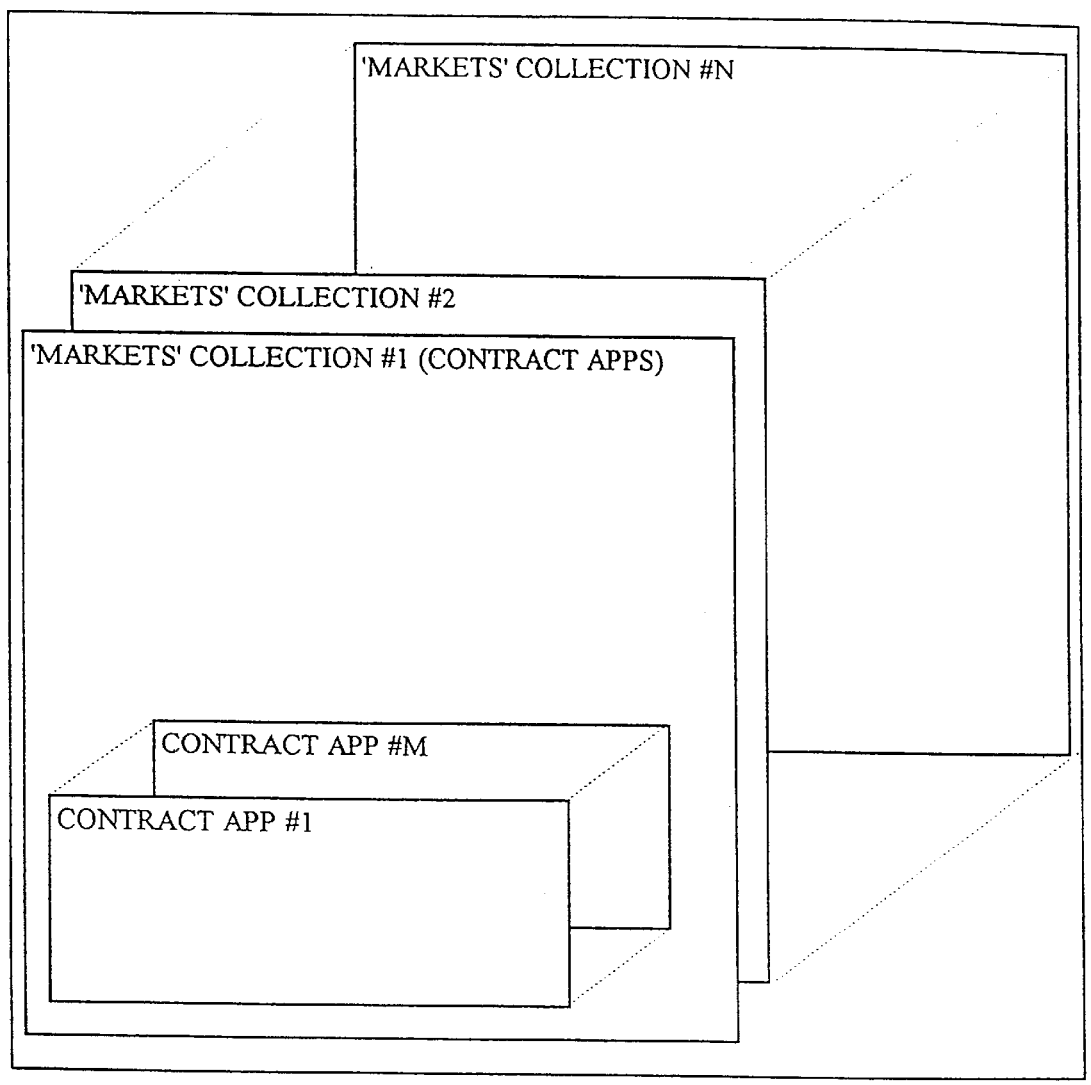
FIG. 4 shows a block diagram of a subset of the components of an INVENTCO system's markets-depository (M-INVENTCO)

Referring now to FIG. 4, within M-INVENTCO reside different collections of system sponsored phenomena or 'markets', one collection of which is termed CONTRACT APPS. Each CONTRACT APP within the CONTRACT APPS 'markets' collection is essentially related to a specific type of risk management phenomenon. The purpose of individual CONTRACT APPS is two-fold. First, to effect the trading/exchange/transfer of risk management contracts (and derivatives of these transactions) between participating product ordering parties and counter-parties on terms acceptable to the parties involved, as well as to others within INVENTCO registered as having a legitimate interest in the nature, size and composition of these trades/exchanges/transfers. And second, to appropriately manage all matched/confirmed contracts through to their time of maturity.

Individual CONTRACT APPS are responsible for performing the above-described tasks according to the specific rules they embody, defined by their applicable stakeholders.

The role played by the various stakeholders to CONTRACT APPS, remembering that in many cases it would not be necessary to have the involvement of all the possible types of stakeholder, briefly stated is as follows:

(a) An application promoter is an entity having overall responsibility for the functioning of a CONTRACT APP, having being granted that responsibility by VIRPRO.

(b) A product sponsor is an entity which promotes and administers the rules of trading, and subsequent management of defined "products" selected for inclusion in a CONTRACT APP by its application promoter.

(c) An ordering party (buyer) is an entity seeking to acquire a CONTRACT APP product from a potential counter-party (seller).

(d) A counter-party (seller) is an entity potentially prepared to satisfy the CONTRACT APP product needs of an ordering party (buyer).

(e) A guarantor is an entity guaranteeing a seller's ability to settle or meet obligations as a result of a CONTRACT APP effected match.

(f) Regulators are entities overseeing the on-going performance of all other stakeholders involved in a CONTRACT APP, and especially guarantors.

(g) Consideration/entitlement transfer ('accounting') entities are those parties with which all other CONTRACT APP stakeholders maintain 'accounts' to transfer required considerations/entitlements to or from each other.

(h) Other miscellaneous parties are those having some other defined stake in the functioning of a CONTRACT APP. In any implementation of the system, multiple numbers of each form of stakeholder are accommodated. A detailed consideration of the nature of CONTRACT APPS and the types of stakeholders to a CONTRACT APP is given in the section headed CONTRACT APPS hereinbelow.

Figure 5:
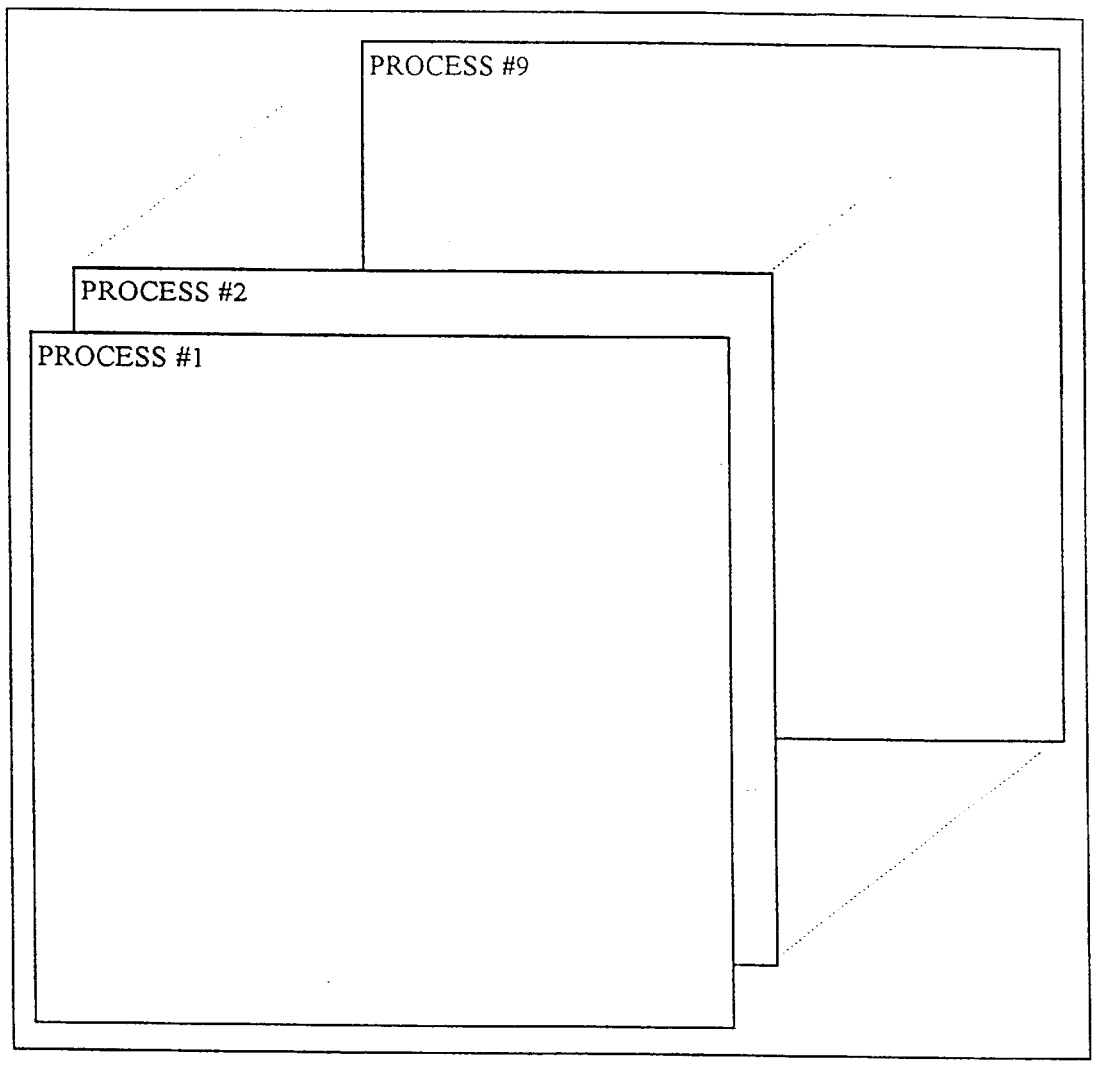
FIG. 5 shows a block diagram of the process components of a subset of one type of 'market' (termed CONTRACT APP) which can reside within M-INVENTCO.

As shown in FIG. 5, any one CONTRACT APP consists of a cluster of nine (and potentially more, or fewer) specific processes, these include:

(a) a process handling file administration and updating tasks supporting all other processes (termed Process 1);

(b) a process handling the receipt and processing of "primary" risk aversion contract transactions (termed Process 2);

(c) a process handling the receipt and processing of "secondary" risk aversion contract transactions (termed Process 3);

(d) a process handling the receipt and processing of "derivative-primary" risk aversion contract transactions (termed Process 4);

(e) a process handling the receipt and processing of "derivative-secondary" risk aversion contract transactions (termed Process 5);

(f) a process handling the "back office" management of all four types of risk aversion contract transactions, and transactions handled by Processes 7 to 9 (termed Process 6);

(g) a process handling non-CONTRACT APP-transaction related consideration, entitlement, and other "payment" obligation transfers between stakeholders (termed Process 7);

(h) a process handling CONTRACT APP (and authorised other INVENTCO) stakeholder access to specialist systems to assist the stakeholder concerned to decide how best to interface with a defined element of INVENTCO (termed Process 8); and (i) a process handling CONTRACT APP (and authorised other INVENTCO) stakeholder access to a range of INVENTCO-facilitated "value added services" (termed Process 9).

A detailed discussion of the nine CONTRACT APP processes is given in the section headed DESCRIPTION OF CONTRACT APP PROCESSES hereinbelow.

All these processes collectively access multiple data files and multiple records within these files. A description of the variables and data files used by Process 2, a key component process of a CONTRACT APP, is provided in the section headed PROCESS 2 VARIABLES AND DATA FILES hereinbelow.

The foregoing description identifies the essential inter-reaction between the hardware platform and the applications computer software run thereon.

A first example of the life-cycle of a risk management contract will now be described. A further detailed discussion of the nature of risk management contracts is given in the section headed RISK MANAGEMENT CONTRACTS hereinbelow.

3. Life Cycle of Risk Management Contract:

EXAMPLE I

The first example of a risk management contract describes a contract to manage risk associated with faults in microprocessors. In summary, the example shows how the system could enable one party, such as a supplier of military standard equipment seeking to avoid the adverse consequences of faulty microprocessors (specifically, 64-bit microprocessors) used in that equipment to make a contract with another party, such as a manufacturer of these microprocessors, who is seeking to exploit an opportunity based on their view of the future incidence of faults in the microprocessors they produce.

The specific offering is one which provides a contract ordering party with a specified contingent entitlement to "exclusive production warrants" (XPWs). That is, warrants providing the holder with priority access to a specified quantity of replacement and additional microprocessors sourced, immediately, from a defined, different, guaranteed high-quality, production line available to the supplier in consideration of payment of a money amount. The XPW entitlement is contingent on the value, at contract maturity date, of a percentage index of the proportion of 64-bit microprocessors shipped by the manufacturer, during a specified prior period, which are subsequently determined to be faulty to a defined degree. The defined degree, in this case, is the microprocessor being fault-free, as determined by successful completion of self-tests.

In this example, the relevant key stakeholders are: an application promoter (Demdata Inc); various product sponsors (the relevant one for the example being Demdata Inc itself); various primary product ordering parties (the relevant one for the example being Denisons); a single potential counterparty (Demdata Inc again); and an application regulator (the Department of Defence).

Figure 6:
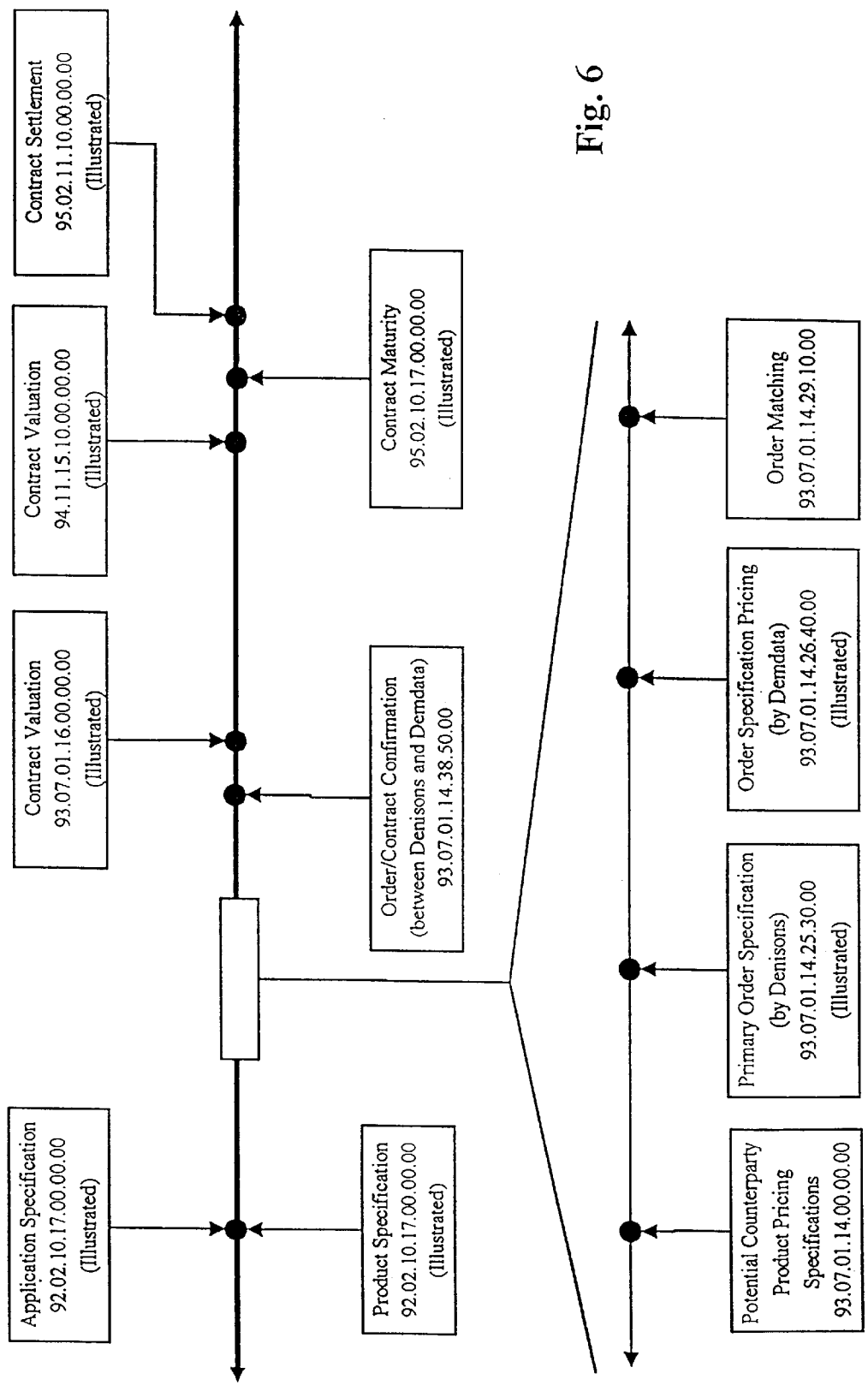
FIG. 6 shows a timeline applicable to Example I.

The timeline depicting the steps in the contract from the first step, Application Specification, to the final step, Contract Settlement, is shown in FIG. 6. FIGS. 43A–50B are eight detailed explanatory charts supporting FIG. 6. They should be read together with the following description.

Looking at the first step in the timeline (Application Specification) in conjunction with FIGS. 43A and 43B, it can be seen that Demdata Inc. established a Contract APP (Application ID100) on 92.02.10.17.00.00 (that is, in inverse order, 5 pm on Feb. 10, 1992) to deal with defect liability management. Application ID100 supports a range of products (Applicable Product ID's 1200–1250).

Looking at the second step in the timeline (Product Specification) in conjunction with FIGS. 44A and 44B, it can be seen that Demdata was also Product Sponsor of Product 1210 at the same time (92.02.10.17.00.00). This Product relates to the market termed: Factory Output Quality Indices, and to the sub-market termed 64-bit Microprocessor Fault Tolerance Index. The maturity date for Product 1210 is 95.02.10.17.00.00.00. The consideration for a specific contract involving Product 1210 is in the form of money (commercial bank deposits denominated in Australian dollars). The entitlement is in the form of Exclusive Product Warrants (XPWs); these entitle the contract ordering party to priority access over the forward production capacity of a defined, guaranteed-high-quality, 64-bit microprocessor production line. Product 1210 specifies a range of 0% to 100% in 2% increments in respect of the sub-market outcomes.

Looking at the third step in the timeline (Potential Counterparty Product Pricing Specifications), it can be found that Demdata is acting as the sole potential counterparty for forthcoming primary product orders dealing with Product 1210. At this point in the timeline (93.07.01.14.00.00.00), 17 months after the specification of Product 1210, Demdata has currently-specified parameters for pricing potentially forthcoming orders for the product.

Looking at the fourth step in the timeline (Primary Order Specification) in conjunction with FIGS. 45A and 45B, it can be seen that an Ordering party, Denisons, is seeking a contract (from the offering party, Demdata) in Product 1210 at that time (93.07.01.14.25.30.00). FIGS. 45A and 45B show the specific "pay-off" parameters that Denisons has defined for the contract it is seeking at this time, including a maximum acceptable contract consideration (premium) amount of 32,000 (denominated in commercial bank, Australian dollars).

Looking at the fifth step in the timeline (Order Specification Pricing) in conjunction with FIGS. 46A and 46B, it can be seen that Demdata (using the specified pricing parameters set at (93.07.01.14.00.00.00) prices the Denison order 93.07.01.15.26.40.00. Demdata's pricing parameters indicate that their appropriate Defined Circumstances ID for Denisons is 14. As is shown, this ID in turn implies a Commission Rate of 1.10%, a Discount Rate of 9.90%, a particular set of Component product prices and a particular set of Assessed Probabilities of Occurrence over the range of feasible product values (outcomes).

The Contract Bid Price is calculated automatically by the application software in the following manner: The ordering party-specified desired contingent entitlement amounts, i.e. the "registered data", (covering the feasible product definition value range) are multiplied by the potential counterparty-specified component product prices (which will rarely add to "1" because each counterparty is endeavouring to 'game' potential ordering parties in different ways) to yield the corresponding number of implied contingent entitlement amounts. When added together, these figures sum to (34.110), where the brackets signify a negative value. This figure represents an expected future counterparty-entitlement payout amount (as at the designated contract maturity date of 95.02.10.17.00.00). The present day value of this figure, calculated using the specified discount rate of 9.90% per annum, is 29,220. To this amount is added the potential counterparty's desired flat commission amount of 1.10%, yielding a contract Bid Price (in the consideration/ entitlement denomination of the product, commercial bank-denominated Australian dollars) of 29,540. No exchange rates are applicable in this case, because the ordering party, Denisons, is not seeking to deal in a consideration or entitlement denomination different to the denominations formally specified for the product. Demdata's parameters calculate that a consideration bid price of 29,540 will yield them a base margin on the contract of 3,180 (again denominated in commercial bank, Australian dollars).

This margin amount is calculated in the following manner: The ordering party-specified desired contingent entitlement amounts (covering the feasible product definition value range) are multiplied by the potential counterparty-specified assessed probabilities of occurrence to yield a corresponding number of net contingent entitlement valuation amounts. When added together, these sum to (30.770). This amount represents an expected future counterparty-entitlement loss-on the contract (as at the designated contract maturity date of 95.02.10.17.00.00). The present value of this amount, calculated using the specified discount rate of 9.90% per annum, is 26,360. Thus, (ignoring for this example the margin Demdata may gain from using, in some manner, the consideration amount of 29,540 through to the time the contract expires, and various transaction fees) the margin Demdata can expect from entering into this contract with Denisons is their calculated present-value indifference price of 29,540 less their calculated present-value expected loss on the contract of 26,360 (or 3,180).

The amounts in the last two rows of the table of FIGS. 46A and 46B are used for checking that this contract, if entered into by Demdata, will not result in them violating any self imposed portfolio valuation or composition limits. This notion is explained in detail in Example III.

Looking at the sixth step in the timeline (Order Matching), it can be found that Demdata's contract bid price of 29,540 is below Denison's specified maximum consideration price of 32,000, leading to a matching of the order at 93.07.01.14.29.10.00.

The seventh step in the timeline (Order/Contract Confirmation) can be seen to take place twelve minutes later at 93.07.01.14.38.50.00, after the system has determined that Denisons is able to (and then does) immediately pay the required consideration funds amount of 29,540 to Demdata.

Figure 47A:
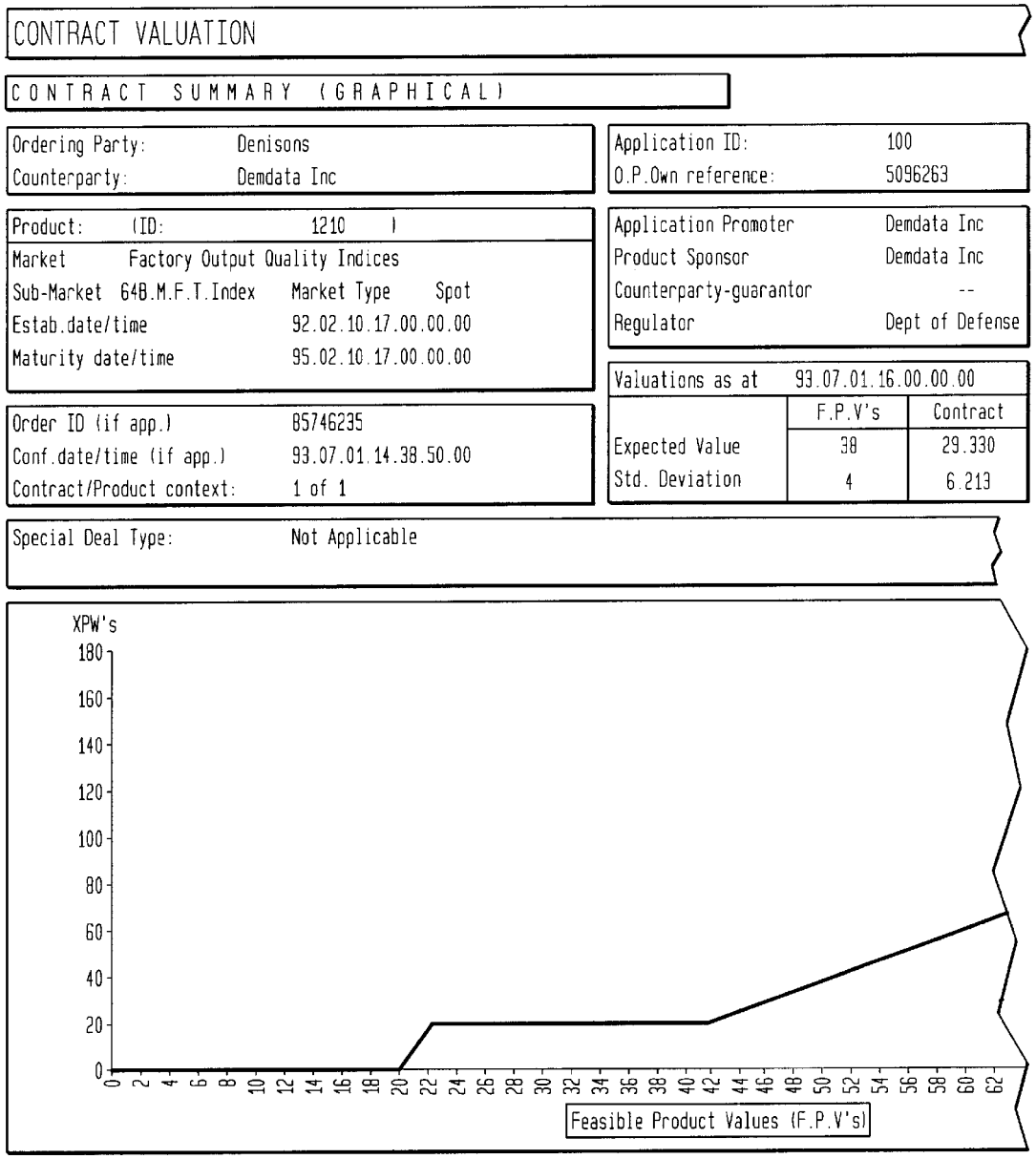

Looking at the eighth step in the timeline (Contract Valuation) in conjunction with FIGS. 47A and 47B, it can be seen that a contract valuation report for Denisons was published not much longer than one hour after confirmation of the contract, that is, at 93.07.01.16.00.00.00. As can be seen, the market estimate of the future product value of the 64BMFT Index at this moment is 38 (with a standard deviation of 4), which implies that this contract has an expected future value of 29,330 XPWs (with a standard deviation of 6,213).

Figure 48A:
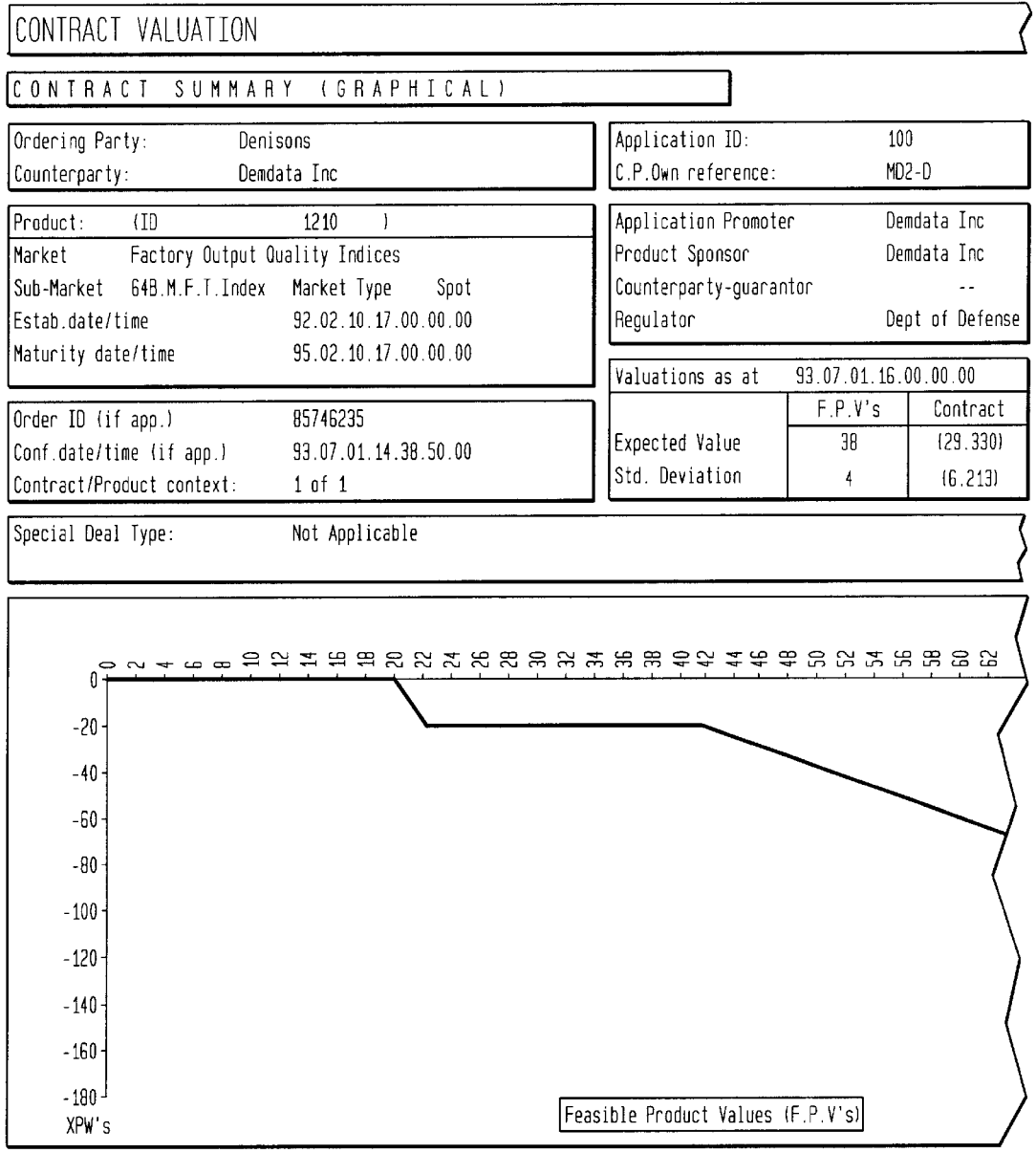
Figure 48B:
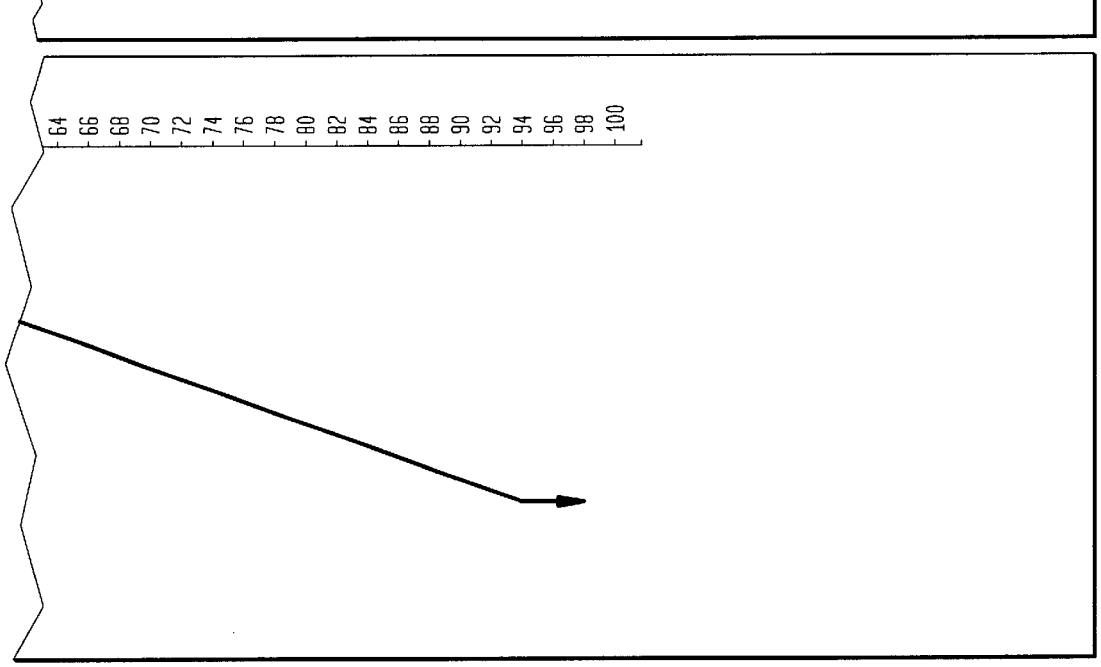

On FIGS. 48A and 48B it can be seen the equivalent report for Demdata Inc. of their expected future entitlement payout is identical to Denisons' expected future entitlement receipt (ignoring future fee payments which may be netted against these payments/receipts). The above-described market estimate of the future product value is determined by the system applying a defined composite of contract-counterparty assessed probabilities of occurrence figures drawn from the collection of all like contracts recently matched/confirmed by the system.

Figure 49B:
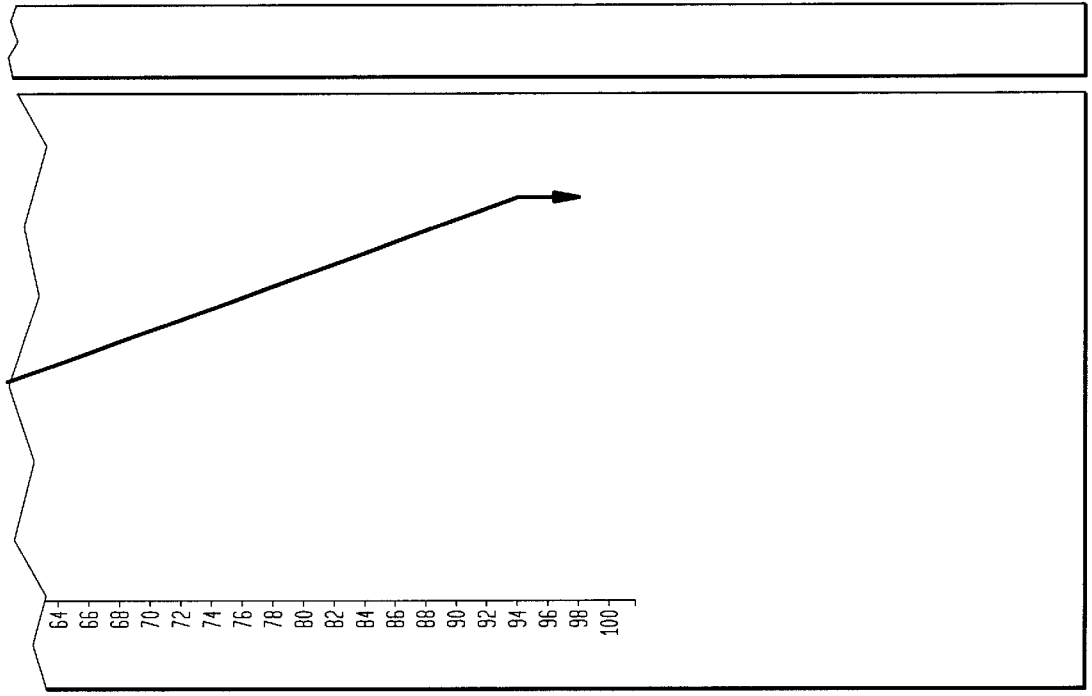
Figure 50A:
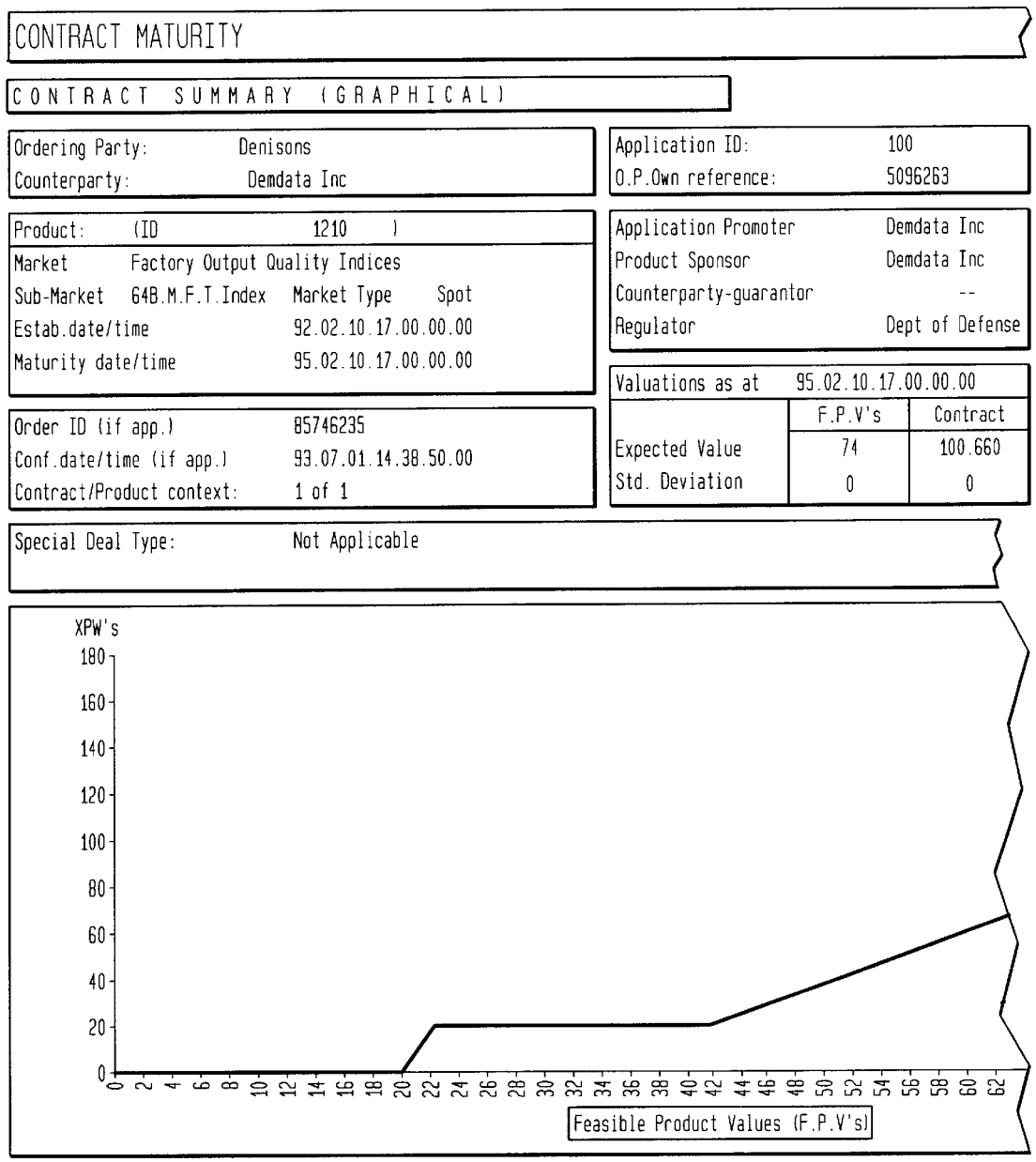
Figure 50B:
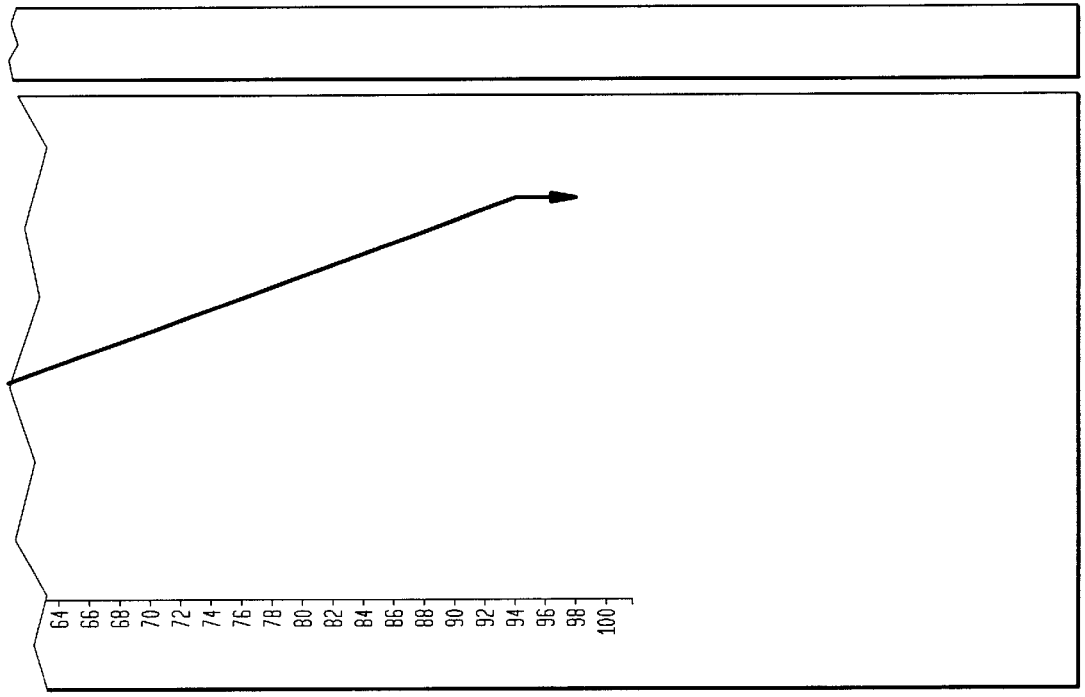

The ninth step in the timeline (Contract Valuation) refers to a contract valuation report published for Denisons sixteen months later, at 94.11.15.10.00.00.00 (see FIGS. 49A and 49B). As can be seen, the market estimate of the future product value of the 64 BMFT Index at this moment is 58 (with a standard deviation of 5), which implies that this contract now has an expected future value of 42,160 XPWs (with a standard deviation of 6,209). This is an increase in expected future value of 12,830 XPWs for Denisons since the former valuation date/time.

The tenth step in the timeline, Contract Maturity, refers to the actual determination of the product value at time of maturity, 95.02.10.17.00.00.00. As can be seen on FIGS. 50A and 50B, this product value of the 64 BMFT Index was specified by Demdata (as Product Sponsor) to be 74, implying a contract value of 100,660 XPWs to Denisons and a corresponding obligation on Demdata. The amount of 74 represents the percentage of 64-bit microprocessors shipped by Demdata, during a specified period some time before the designated contract maturity date, which are subsequently determined (possibly by the application regulator, The Department of Defence) to be faulty.

The eleventh step in the timeline involves the formal assignment of 100,660 XPWs by Demdata to Denisons (ignoring possible fee payments by one or both parties).

4. Life Cycle of Risk Management Contract:

EXAMPLE II

The second example describes a risk management contract associated with the utilisation of telecommunications carrying capacity. In summary, the example shows how the system could enable one party (a telecommunications carrier) seeking to avoid the adverse consequences of under and over-committing their call carrying capacity between specified points (say, between the two cities, New York and Boston) to make a contract with another party (say, another telecommunications carrier with call carrying capacity between the same two cities) similarly prepared to hedge against the consequences of this occurring.

The specific offering is one which provides a contract ordering party with a specified contingent entitlement to transmission time units between the hours 1200–1800 daily on the NY-Boston link within a defined future period (termed, Prime TTU's) upon assignment by the ordering party—to the counterparty—of a calculated consideration amount of Prime TTUs on the ordering party's own NY-Boston line within another defined future period (these defined TTUs may or may not be convertible to TTUs on other city links). The TTU entitlement is contingent on the value, at contract maturity date, of the log of the difference between the ordering party's utilisation of the counterparty's network and the counterparty's utilisation of the ordering party's network, during a specified prior period ending on the contract maturity date.

In this example, the relevant key stakeholders are: an application promoter (Newcom Inc); various product sponsors (the relevant one for the example being Newcom Inc itself); various primary product ordering parties (the relevant one for the example being Basstel Co.); two potential counterparties (Tasnet and Aarcom); and an application regulator (ITT).

Figure 7:
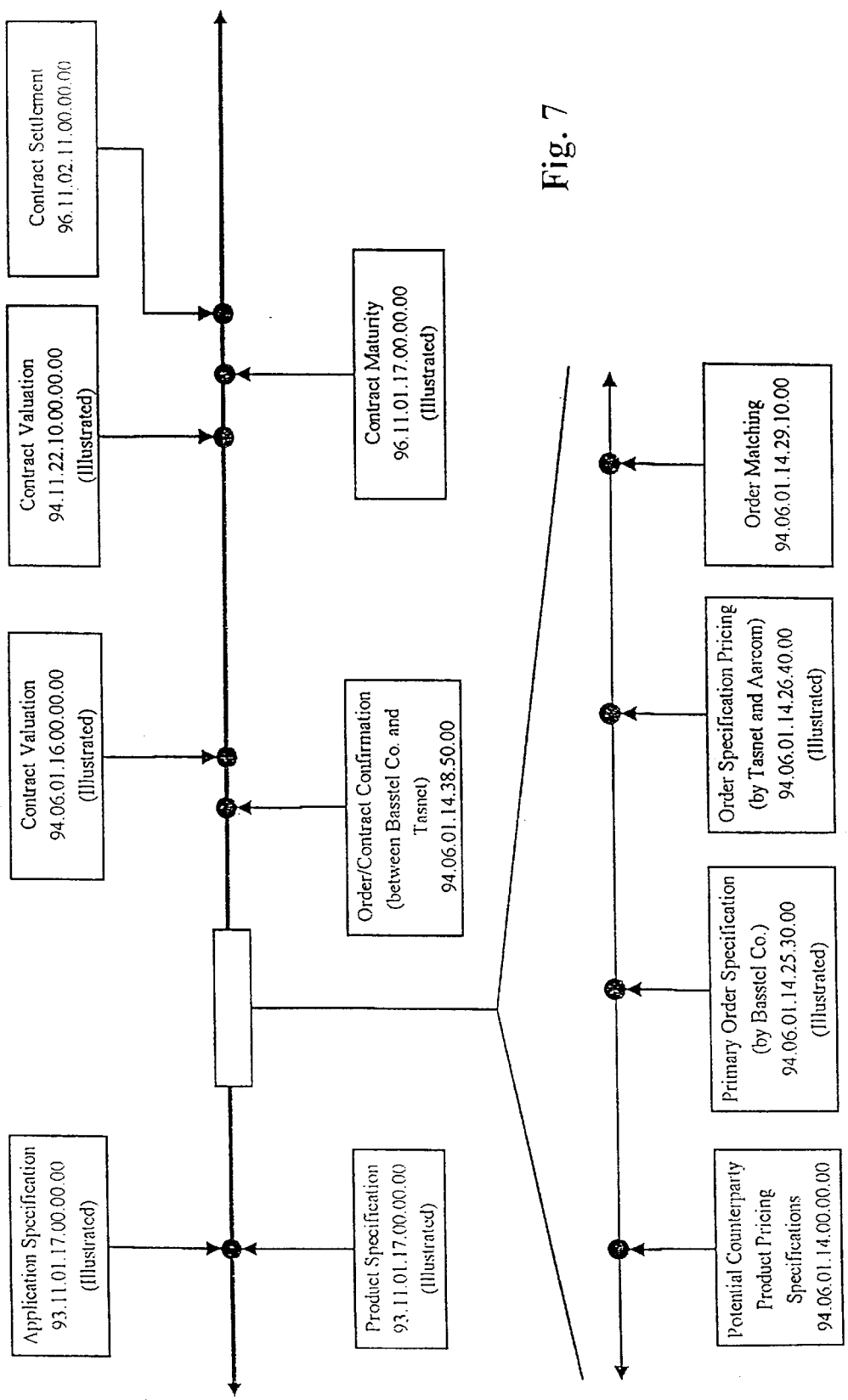
FIG. 7 shows a timeline applicable to Example II.

The timeline depicting the steps in the contract from the first step, Application Specification, to the final step, Contract Settlement, is shown in FIG. 7. FIGS. 51A–59B are nine detailed explanatory charts supporting FIG. 7. They should be read together with the following description.

Looking at the first step in the timeline (Application Specification) in conjunction with FIGS. 51A and 51B, it can be seen that Newcom Inc. established a Contract APP (Application ID 001) on 93.11.01.17.00.00 (that is, 5 pm on Nov. 1, 1993) to deal with hardware capacity management. Application ID 001 supports a range of products (Applicable Product ID's 2001–2020).

Looking at the second step in the timeline (Product Specification) in conjunction with FIGS. 52A and 52B, it can be seen that Newcom Inc. was also Product Sponsor of Product 2001 at the same time (93.11.01.17.00.00). This Product relates to the market termed Telecommunications Carrying Capacity and to the sub-market termed Prime TTUs. The maturity date for Product 2001 is 96.11.01.17.00.00.00. The consideration for a specific contract involving Product 2001 is in the form of "Ordering Party TTUs". The entitlement is in the form of "Counterparty TTUs"; these entitle the contract ordering party to "transmission time units between the hours 1200–1800 daily on the NY-Boston link (within a defined future period)". The feasible values of PRIME TTUs are normalized in the range of –1.0 to +1.0, respectively signifying the proportionate utilization of respective networks as between the parties to a contract.

Looking at the third step in the timeline (Potential Counterparty Product Pricing Specifications), one can find two other carriers, Tasnet and Aarcom, acting as potential counterparties for forthcoming primary product orders dealing with Product 2001. At this point in the timeline (94.06.01.14.00.00.00), 7 months after the specification of Product 2001, both Tasnet and Aarcom have currently-specified parameters for pricing potentially forthcoming orders for the product.

Looking at the fourth step in the timeline (Primary Order Specification) in conjunction with FIGS. 53A and 53B, it can be seen that an Ordering Party, Basstel Co., is seeking a contract, from an offering party, in Product 2001 at that time (94.06.01.14.25.30.00). FIGS. 53A and 53B show the specific parameters (entitlements) that Basstel Co. has defined for the contract it is seeking at this time, including a maximum acceptable contract consideration amount of 58,000 (denominated in its own TTUs).

Looking at the fifth step in the timeline (Order Specification Pricing) in conjunction with FIGS. 54A and 54B, it can be seen that Tasnet (using the specified pricing parameters set at 94.06.01.14.00.00.00) prices the Basstel Co. order at 94.06.01.14.26.40.00. Tasnet's pricing parameters indicate that their appropriate Defined Circumstances ID for Basstel Co. is 8. As is shown, this ID in turn implies a Commission Rate of 1.00%, a Discount Rate of 9.90% per annum, a particular set of Component product prices and a particular set of Assessed Probabilities of Occurrence. In a similar process to that described for Example 1, this results in a Contract Bid Price of 55,180 (denominated in Basstel Co. TTUs), which Tasnet's parameters calculate will yield them a base margin on the contract of 10,760 (again denominated in Basstel Co. TTUs).

Still looking at the fifth step in the timeline, in conjunction with FIGS. 55A and 55B, it can be seen that Aarcom (again using the specified pricing parameters set at 94.06.01.14.00.00.00) also prices the Basstel Co. order at 94.06.01.14.26.40.00. Aarcom's pricing parameters indicate that their appropriate Defined Circumstances ID for Basstel Co. is 9. As is shown, this ID in turn implies a Commission Rate of 0.90%, a Discount Rate of 8.50% per annum, a particular set of Component product prices and a particular set of Assessed Probabilities of Occurrence. This results in a Contract Bid Price of 55,390 (denominated in Basstel Co. TTUs), which Aarcom's parameters calculate will yield them a base margin on the contract of 9,430 (again denominated in Basstel Co. TTUs).

Looking at the sixth step in the timeline (Order Matching) it can be found that Tasnet's price bid of 55,180 is below Aarcom's bid of 55,390 and, in turn, that the 55,180 amount is below Basstel Co.'s specified maximum consideration price of 58,000. This leads to a formal matching of Basstel Co.'s order by Tasnet at 94.06.01.14.29.10.00.

The seventh step in the timeline (Order/Contract Confirmation) can be seen to take place nearly ten seconds later at 94.06.01.14.38.50.00, after the system has determined that Basstel Co. is able to (and then does) immediately assign the required consideration amount of 55,180 TTUs to Tasnet.

Figure 56A:
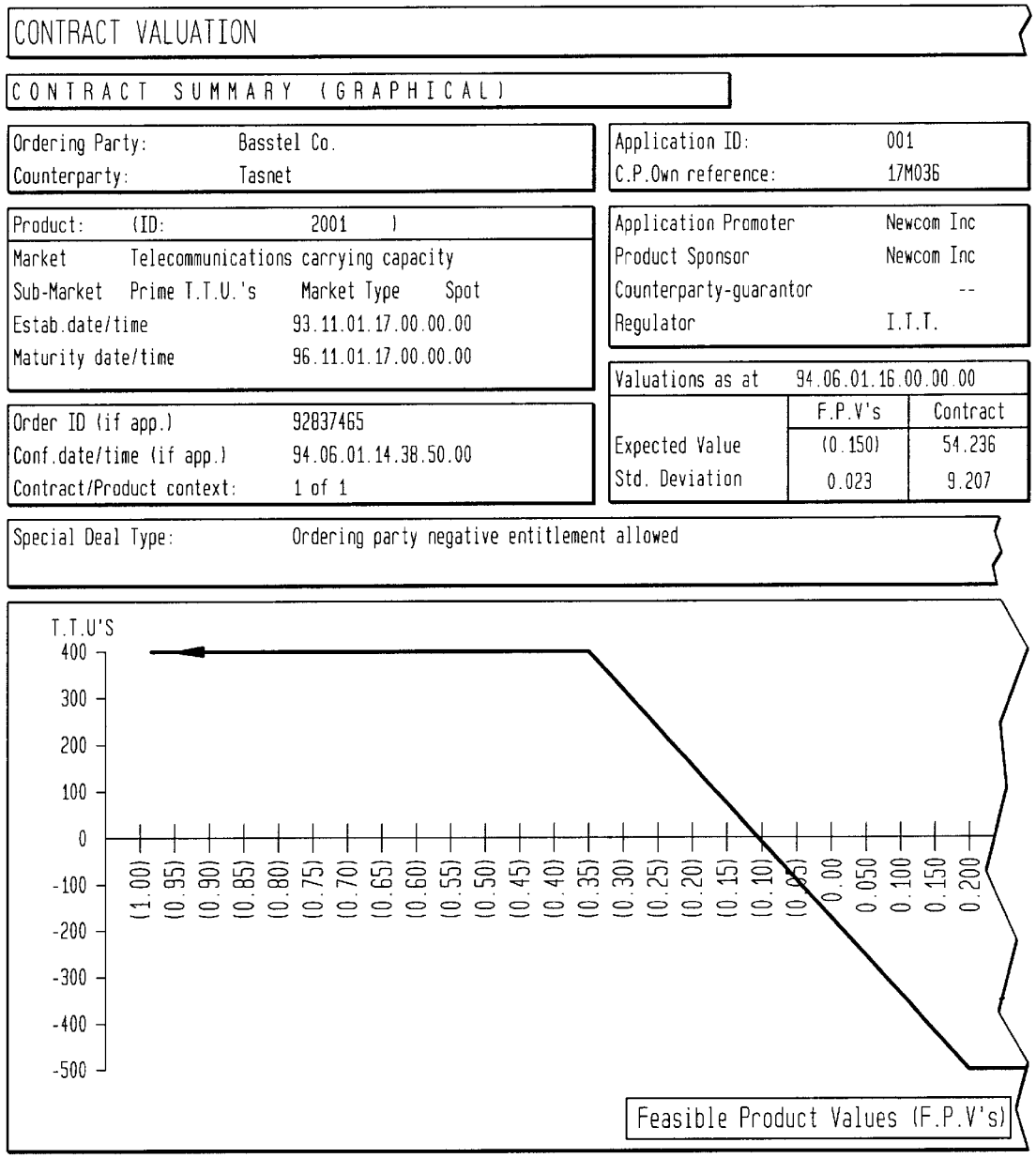
Figure 56B:
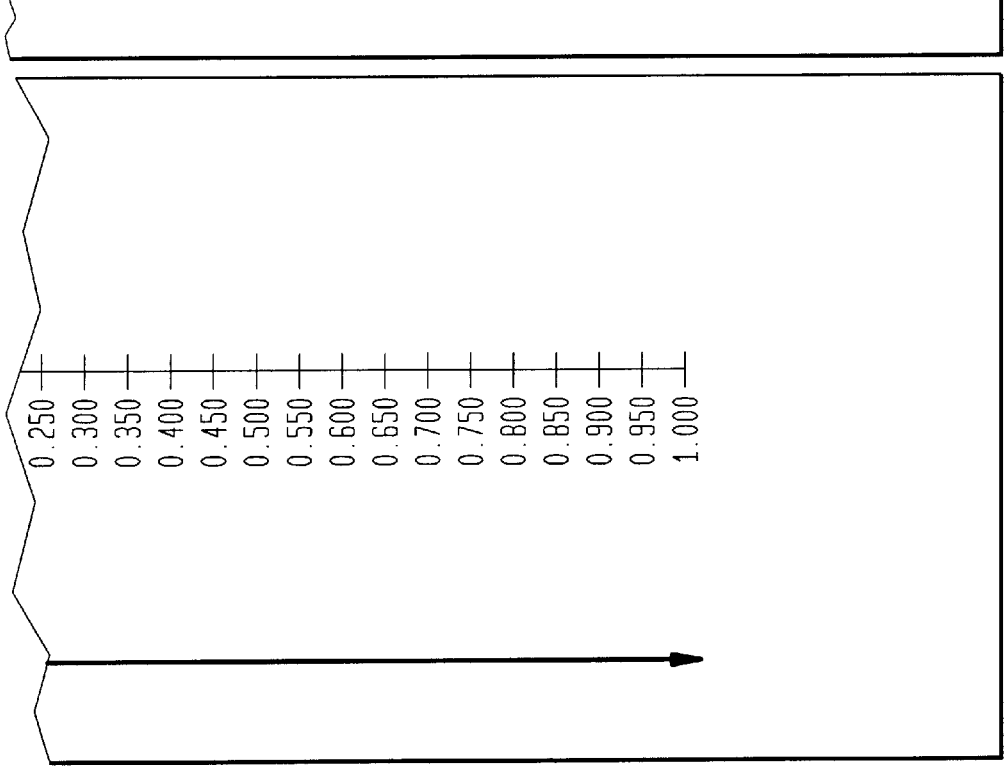
Figure 57A:
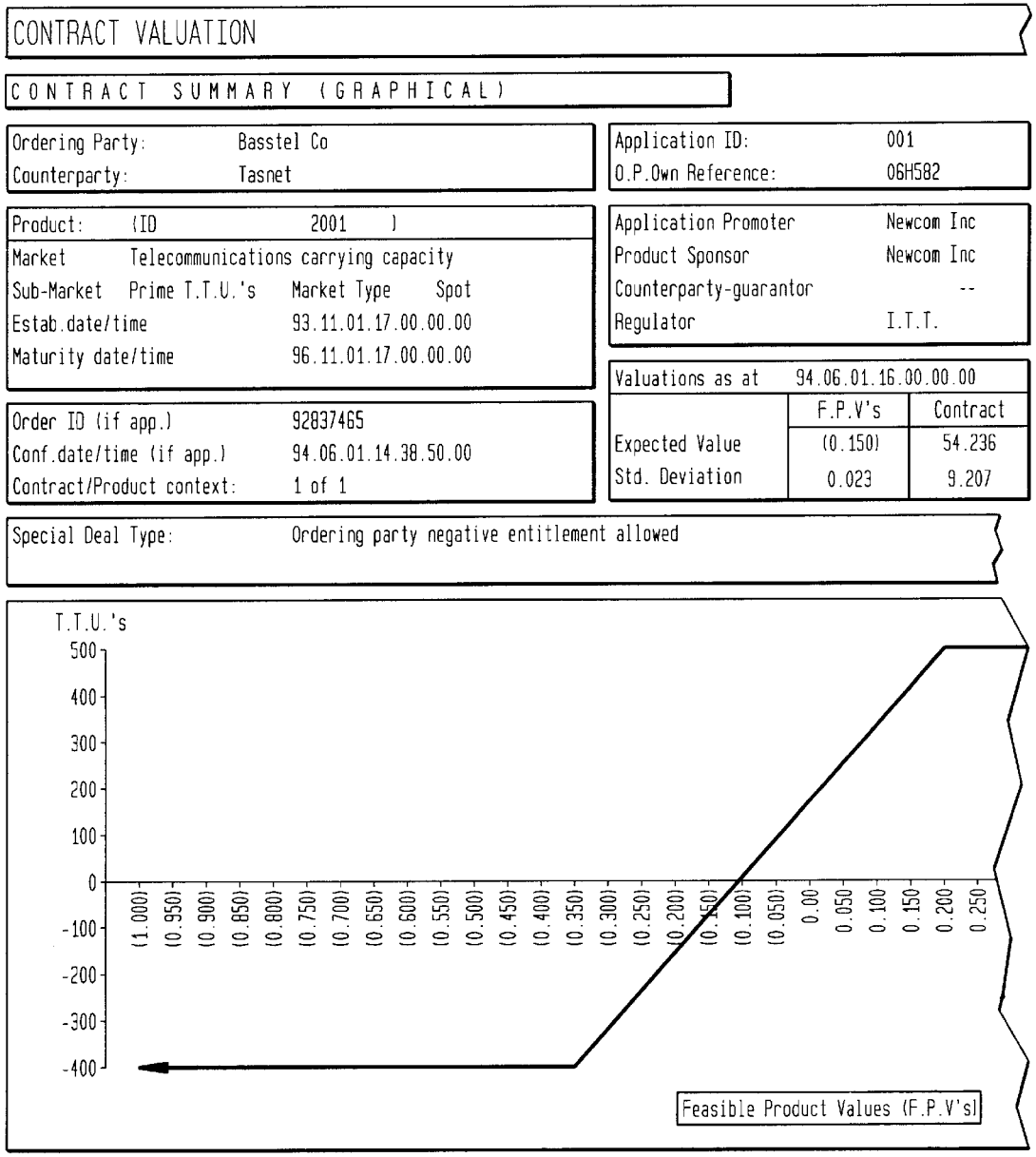
Figure 57B:
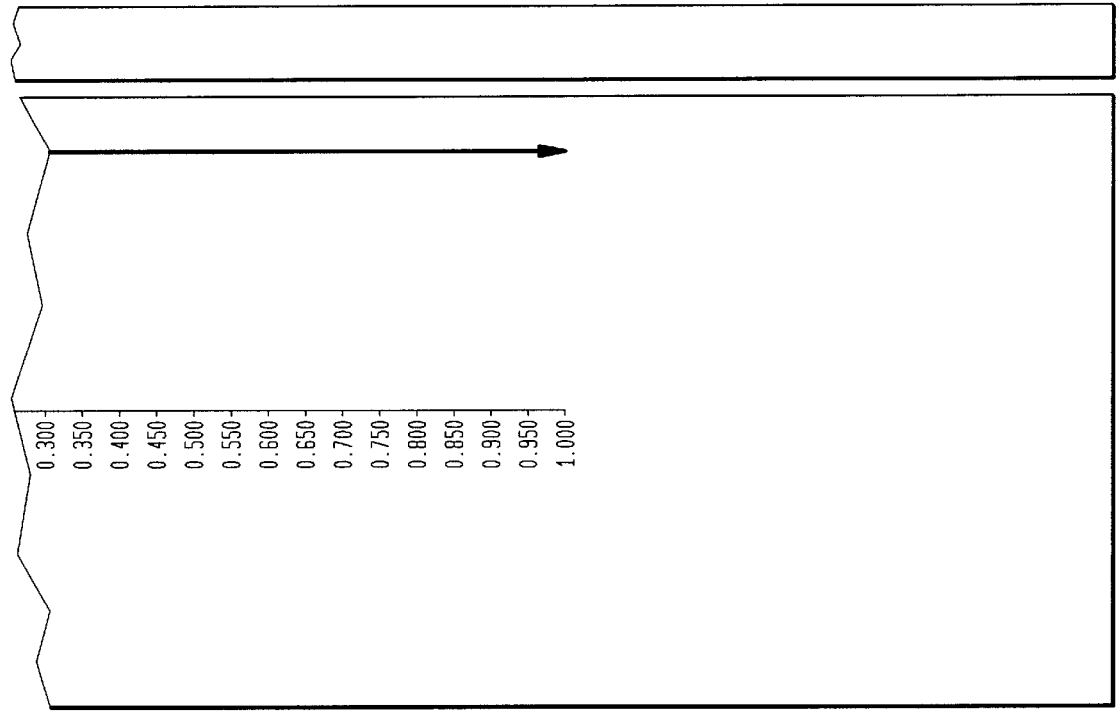

Looking at the eighth step in the timeline (Contract Valuation) in conjunction with FIGS. 56A and 56B, one can see a contract valuation report for Basstel Co. published about two hours after confirmation of the contract, that is, at 94.06.01.16.00.00.00. As can be seen, the market estimate of the future product value of the log of the difference between Basstel Co.'s utilization of Tasnet's network and Tasnet's utilization of Basstel Co.'s network (during a specified prior period ending on the contract maturity date) at this moment is (0.150) (with a standard deviation of 0.023), which implies that this contract has an expected future value of 54,236 Tasnet TTUs (with a standard deviation of 9,207). On FIGS. 57A and 57B one can see in the equivalent report for Tasnet that their required expected future entitlement payout is identical to Basstel Co.'s expected future entitlement receipt (ignoring future fee payments which may be netted against these payments/receipts).

Figure 58A:
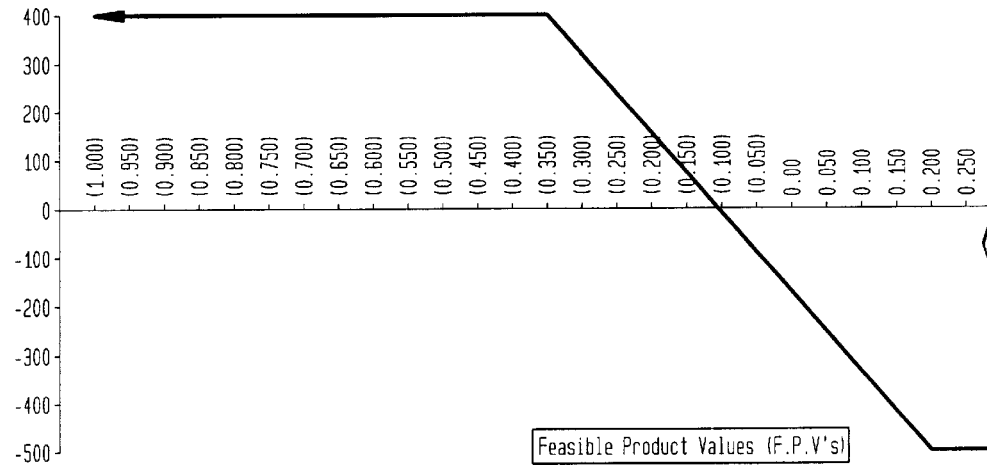
Figure 58B:
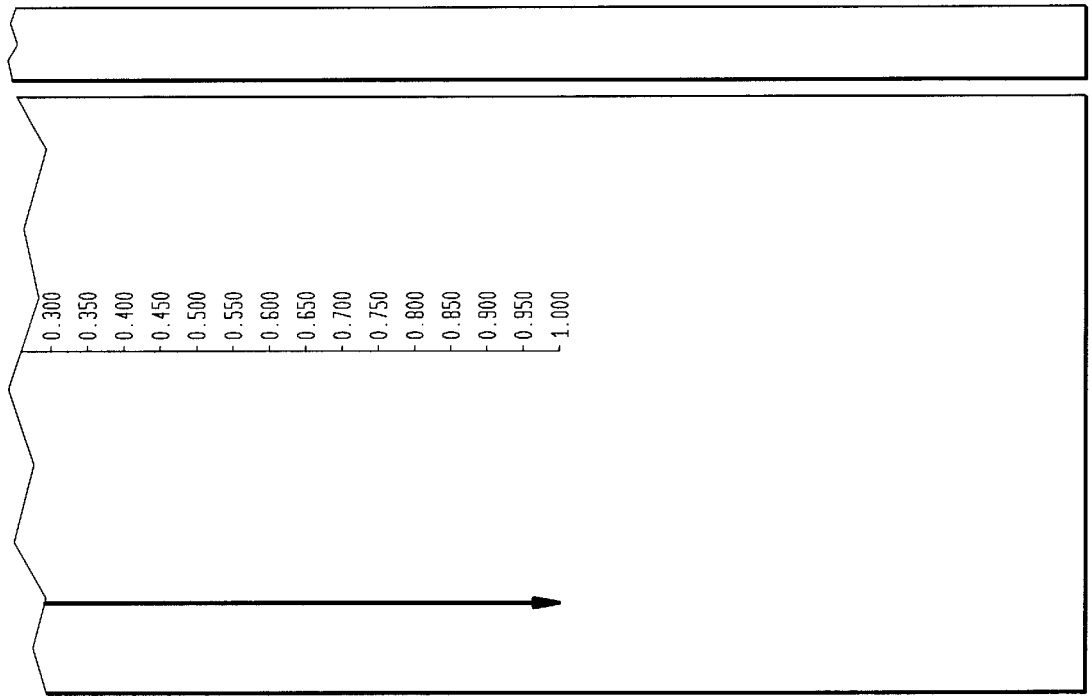
Figure 59A:
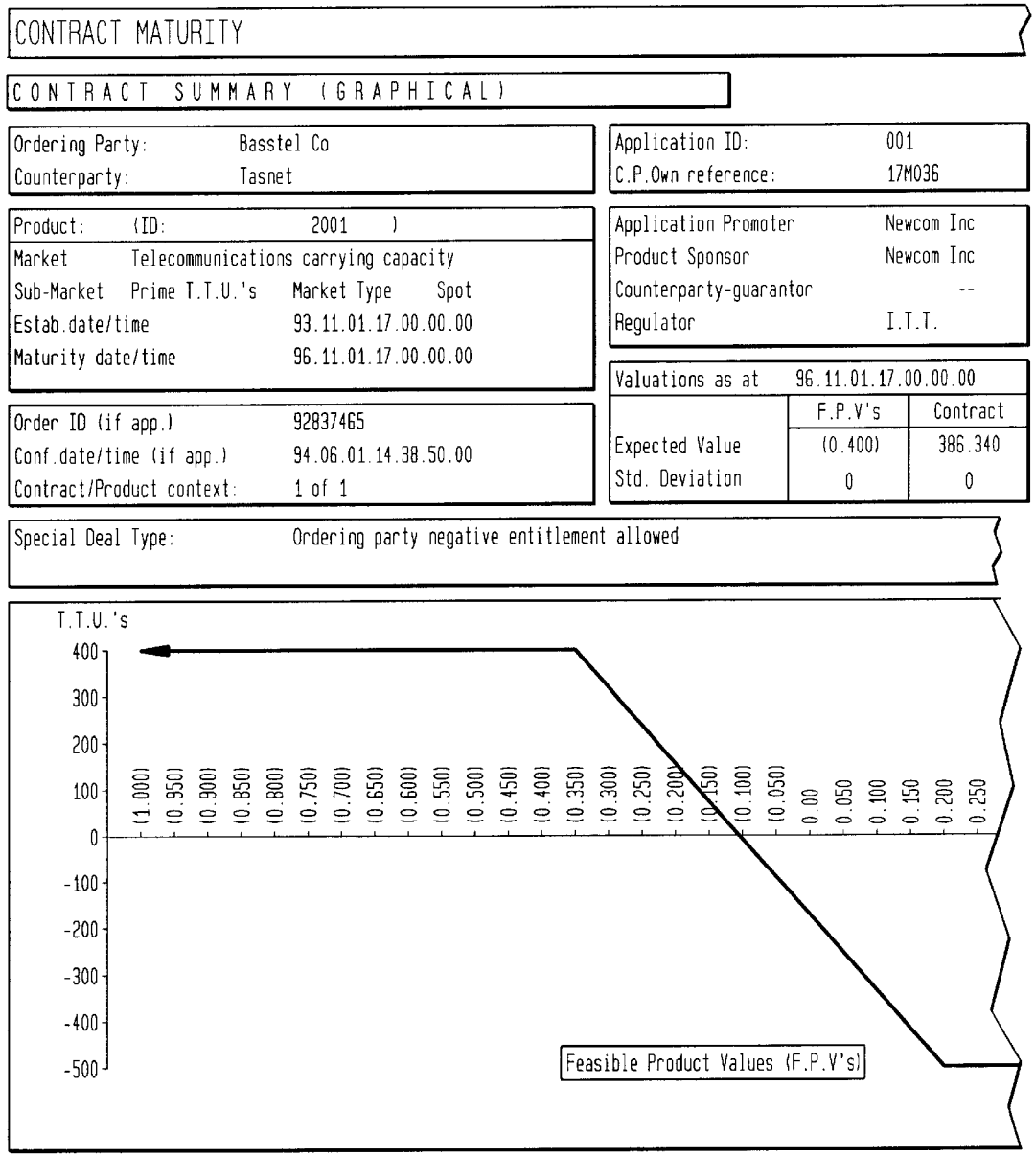
Figure 59B:
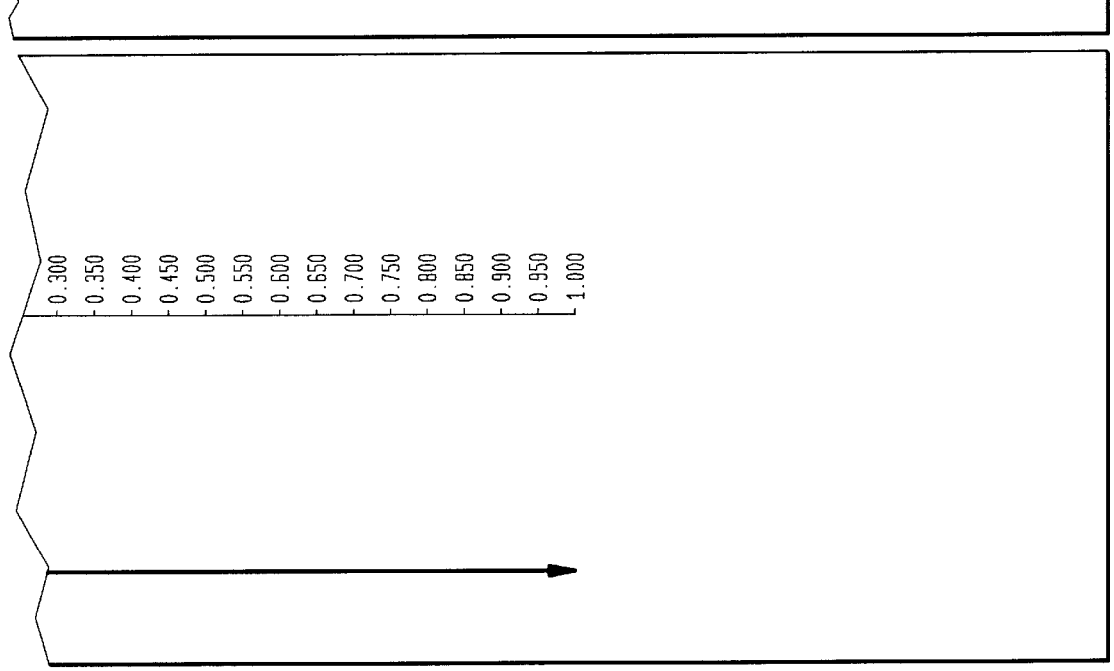

The ninth step in the timeline (Contract Valuation) refers to a contract valuation report published for Basstel Co. five months later, at 94.11.22.10.00.00.00 (see FIGS. 58A and 58B). As can be seen, the market estimate of the future product value of the log of the difference between Basstel Co.'s utilization of Tasnet's network and Tasnet's utilization of Basstel Co.'s network (during a specified prior period ending on the contract maturity date) at this moment is (0.400) (with a standard deviation of 0.010), which implies that this contract now has an expected future value of 350,181 Tasnet TTUs (with a standard deviation of 74,200). This is an increase in expected future value of 295,945 TTUs for Basstel Co. since the former valuation date/time.

The tenth step in the timeline (Contract Maturity) refers to the actual determination of the product value at time of maturity, 96.11.01.17.00.00.00. As can be seen on FIGS. 59A and 59B, this product value of TTU's was specified by Newcom Inc (as Product Sponsor) to be (0.400), unchanged from the prior valuation date/time, implying a contract value of 368,340 Tasnet TTUs to Basstel Co. and a corresponding obligation on Tasnet. The amount is higher than the prior valuation figure due to the actual determination figure being naturally without a standard deviation element.

The eleventh step in the timeline involves the formal assignment of the 368,340 TTUs by Tasnet to Basstel Co. (ignoring possible fee payments by one or both parties).

5. Primary Product Order Processing

Before describing the third, and most detailed, example, consideration will be given to the 'core' product (contact) ordering, pricing and matching processes. Note that expressions such as (PORD NEW) represent file names.

The flow charts in FIGS. 8 to 16 depict the processing flow of the matching system for primary product orders submitted by ordering party stakeholders to a CONTRACT APP, where this APP is based upon: an EV-CE counterparty pricing regime (assuming paid consideration amounts do not yield an income stream in their own right); a sequential order matching process; consideration/entitlement value dates which are immediately after a product sponsor-designated date/time; and matching rules which do three things: First, identify, for each ordering party's order, a counterparty offering the lowest price bid for an order, subject to this price being at or below the specified maximum price the ordering party has indicated it is prepared to pay. Second, accommodate portfolio expected loss constraints on an 'equivalent maturity date products', 'same-month maturity products', and 'all-products' basis. And third, apply the above-described matching rules on a pre-tax basis, with partial matching of product orders, and without conditional order matching rules.

Figure 8:
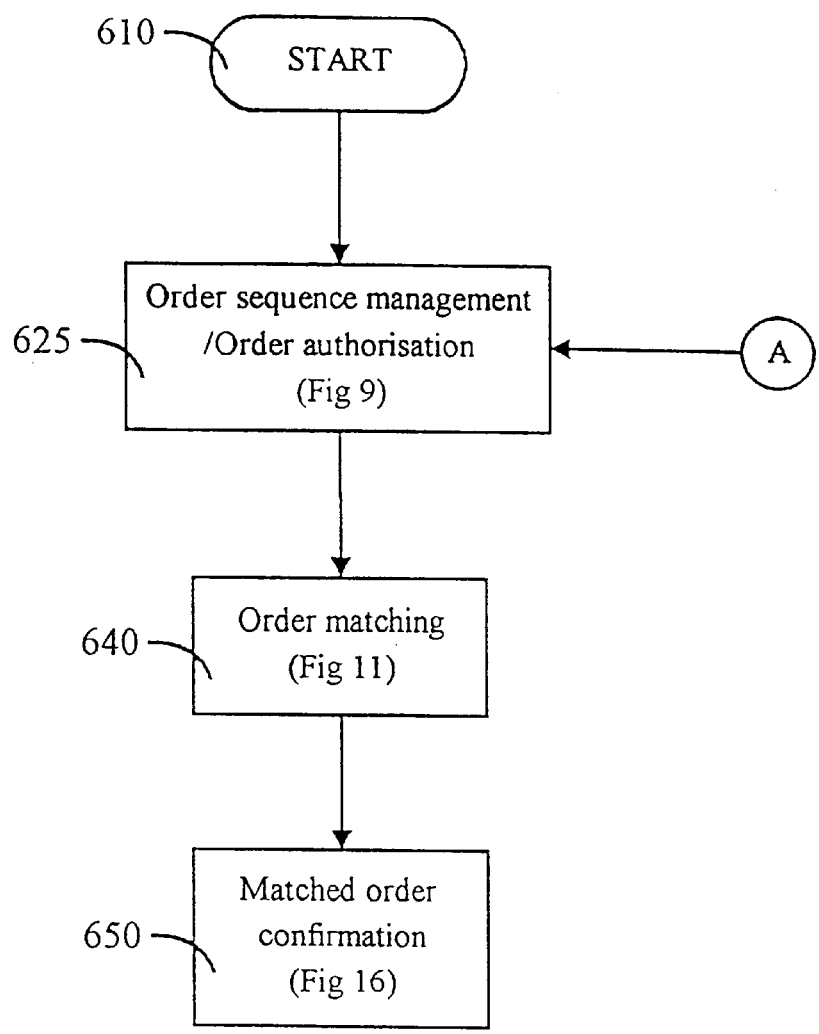
FIGS. 8 to 16 show flow diagrams of the contract pricing and matching methodology.
Figure 9:
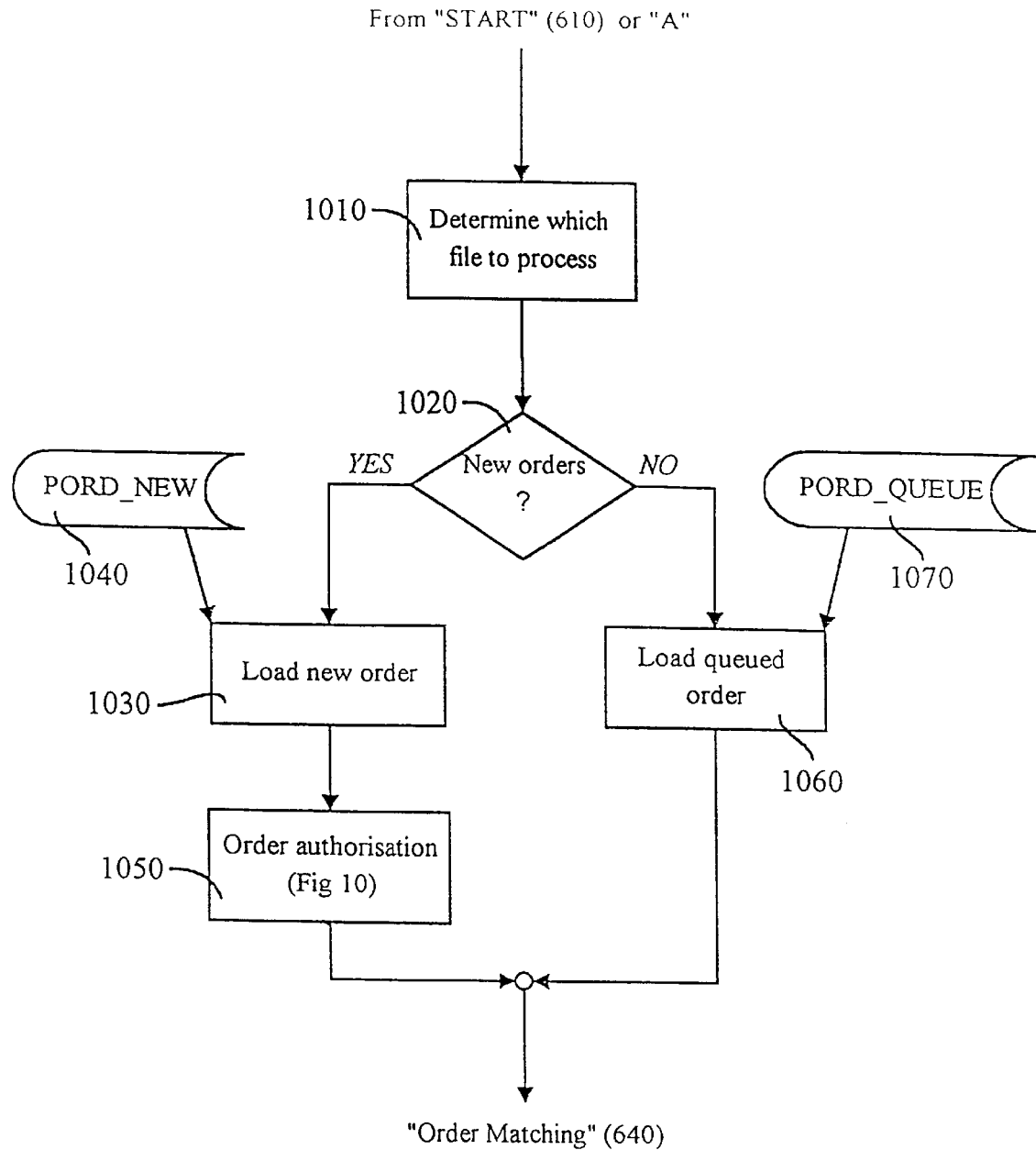

As shown in FIG. 8, starting at block 610, and proceeding to block 625, the system determines which set of orders to process, authorises these orders, matches them with counterparties where possible, and then confirms them. As shown in blocks 1010 to 1070 in FIG. 9, the system holds newly submitted orders (PORD NEW), and all previously submitted, but as yet unmatched, orders which are defined as queued orders (PORD QUEUE). Parameters and algorithms can be implemented to give the system the ability to determine whether new or queued orders are to be processed at any time. For example, a simplistic algorithm would be to alternate between PORD NEW and PORD QUEUE one order at a time. Another example would be to load queued orders only when there is a change in the counterparty parameters. Test 1020 checks the decision made in block 1010.

For new orders, the system moves to block 1030. Details of the next recorded new order are loaded from the PORD NEW master file (block 1040). The order data fields include: the ordering party identification (BID); the ordering party's own reference (BREF); the product identification (PID) specified by the ordering party; the entitlement "payoff" function type (PAYFUNC); the parameters for the entitlement "pay off" function (PAYPARAM); a "deal type" identifier (DTID); the anonymous and manual deal identifiers (OANON and OMANUAL); the order retention time limit (RET LIM); the maximum consideration the ordering party is prepared to pay (MAXCONSID); the number of the account from which the consideration is to be "paid" (ACC CONSID); and the number of the account to which any entitlement "pay off" amount is to be paid (ACC ENTITL). With this information set, the system's next step is to authorise the order. This occurs at block 1050.

Order Authorisation

Figure 10:
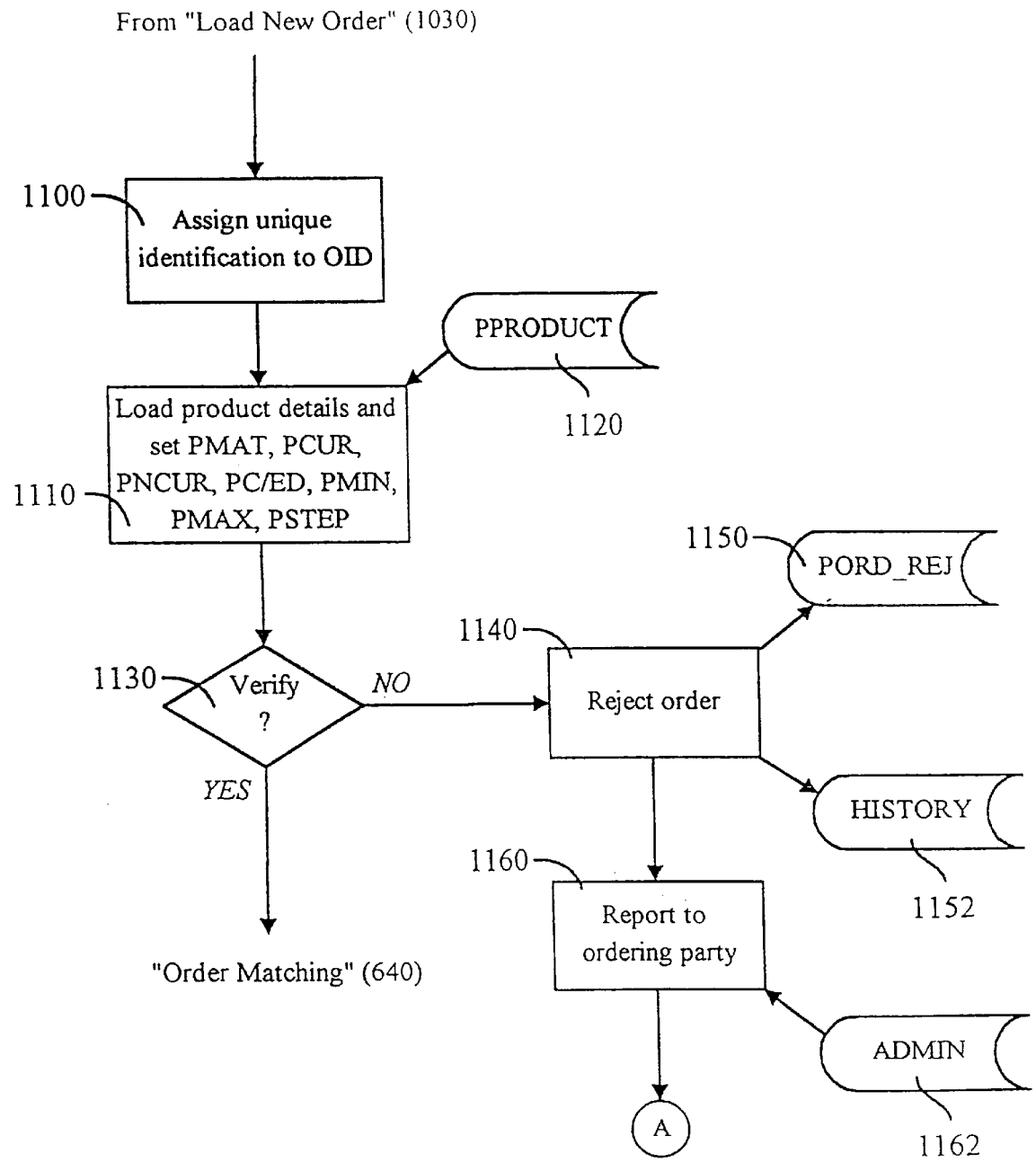
Figure 11:
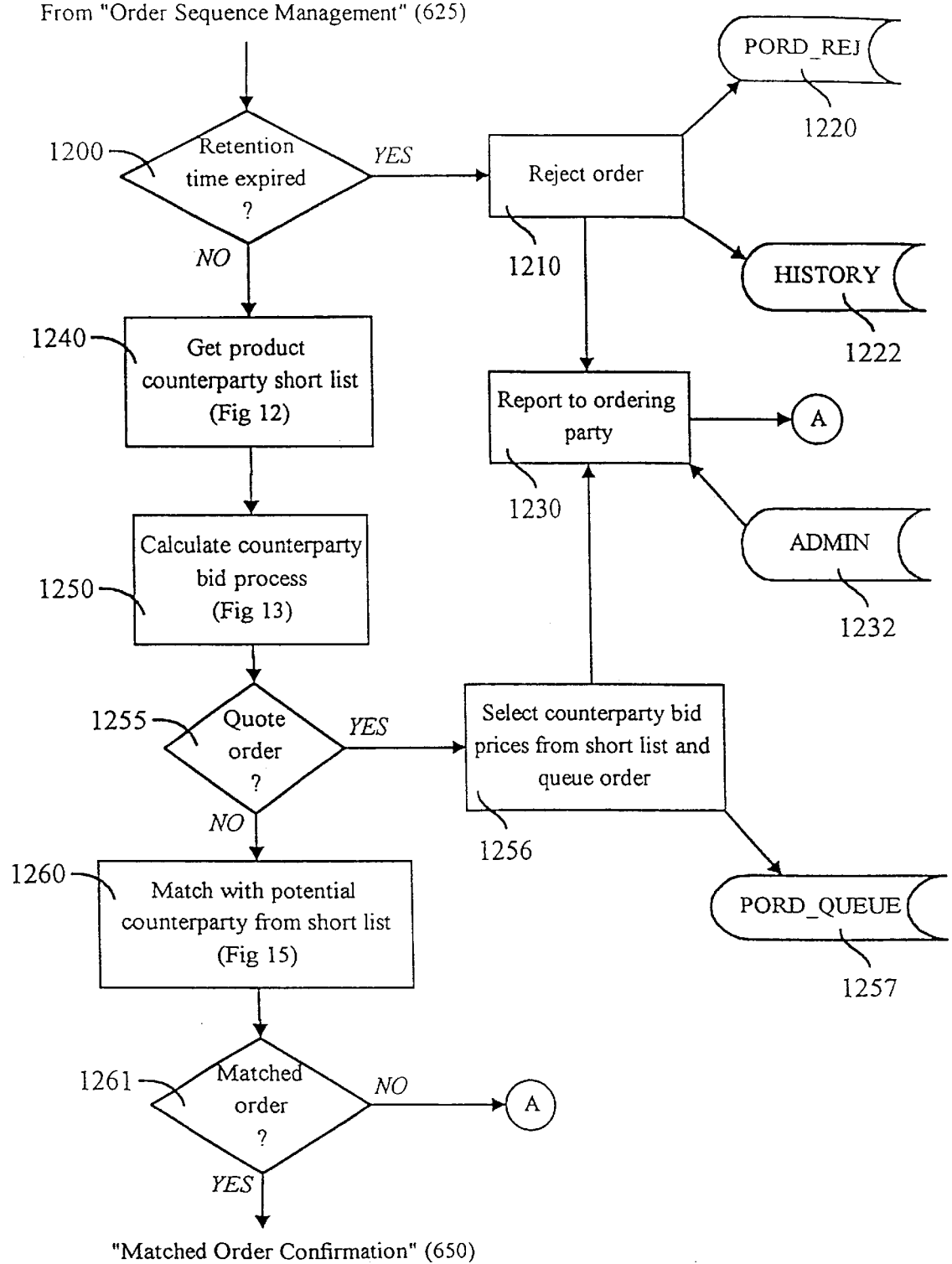

Blocks 1100 to 1162 in FIG. 10 provide an expansion of block 1050. Starting at block 1100 the order is assigned a unique identification, which is set in the order data field OID. Before verifying the order, additional information is required by the system. At block 1110, details of the product (order data field PID) are loaded from the master file PPRODUCT (block 1120). The information includes the product maturity date (PMAT); the product consideration/ entitlement denomination (PC/ED); the product currency denomination (PCUR) and national currency denomination (PNCUR); and the product limits and parameters (PMIN, PMAX, and PSTEP). The test 1130 checks that the order parameters are consistent with the master file parameters implied by the defined product identification (PID). Orders which fail this test are rejected at block 1140, with details of these orders being stored in the master file PORD REJ (block 1150). In turn, the ordering party is informed of this event (block 1160). Processing then returns to the start of the flow chart (block 1010), ready to load the next order. When an order is authorised, processing continues at block 640.

In the case of a queued order being loaded (block 1060), the order fields are set using the details stored in the queue file PORD QUEUE (block 1070). This data is a combination of new order data (as described in block 1030) and the data loaded/set when the order was originally verified (block 1110). Authorised order processing continues with the order matching process at block 640.

Order Matching

Blocks 1200 to 1616 in FIGS. 11 to 15 provide an explanation of block 640. Orders have retention time limits, stored in the order variable RET LIM. Test 1200 checks that the order retention time has not expired. If it has, the order is rejected at block 1210, with the order details copied to the rejected order file (PORD REJ). The ordering party is then informed of the rejection at block 1230, and processing returns to the main loop via connector "A". If the order is still valid, the order matching process proceeds. The aim now is to find a suitable counterparty (or counterparties) who "prices" the ordering party's "entitlement function" within the limits set by the ordering party. Starting at block 1240, the matching process described is one which seeks to identify, for each ordering party's order, a counterparty offering the lowest "price bid" for an order subject to this price being at or below the specified maximum "price" the ordering party has indicated it is prepared to pay.

Figure 12:
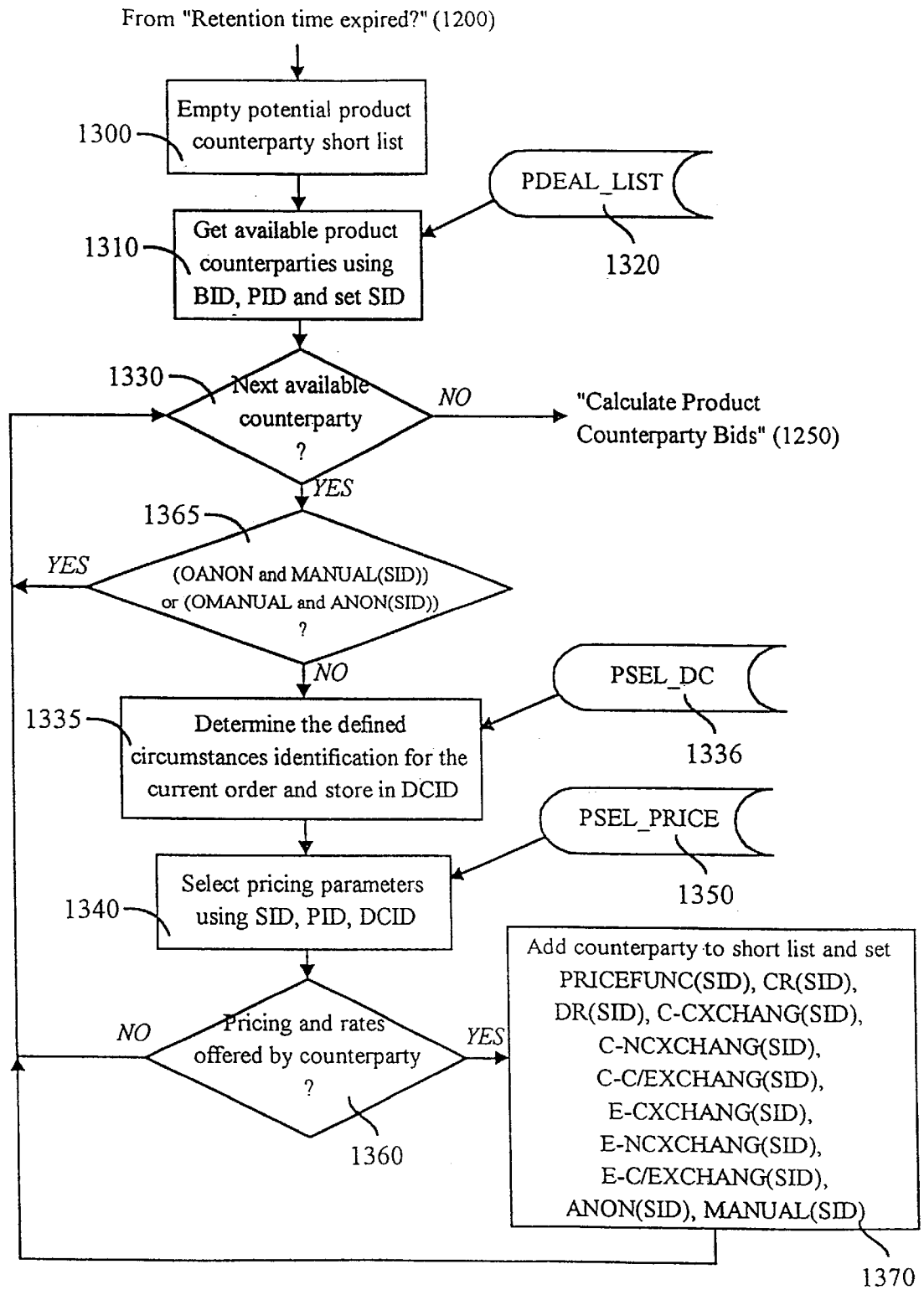

Blocks 1300 to 1370 in FIG. 12 provide an explanation of block 1240. The first step is to narrow down a group of counterparties prepared to at least deal with the ordering party. This is described as obtaining the available counterparty short list. First the counterparty short list is wiped (block 1300). Next, the order data fields BID (ordering part identification) and PID (product identification) are used to search the PDEAL LIST master file (block 1320) for all counterparties prepared to consider dealing with the ordering party in the specified product. Any stakeholders who have set a MANUAL or ANON flag are also loaded. For each counterparty selected, SID is set to the corresponding identification. Test 1330 commences a loop which allows every counterparty available to be dealt with in turn. For any currently selected counterparty (with identification set in SID), the data flow proceeds to test 1365. Where the order data field OANON has been set by the ordering party and some stakeholder requires manual confirmation (MANUAL (SID)), the current potential counterparty is not included in the short list. Likewise if the ordering party set OMANUAL and some other stakeholder required anonymity (ANON (SID)). In both cases, data flow returns to test 1330. Otherwise, flow continues at block 1335. At this point, the system determines the applicable "defined circumstances" for the order. It uses the order data fields currently loaded and parameters set in the PSEL DC masterfile (block 1336) to determine this. At block 1340, pricing parameters including consideration/entitlement exchange rates (if applicable), commission rates, and discount rates are selected from the PSEL PRICE master file (block 1350). Using the "defined circumstances" identification (set in DCID) all potential counterparties can have different sets of pricing parameters specified based on any of the order data fields of each order. Test 1360 checks that all the necessary parameters have been found. It is possible that the counterparty, though prepared to deal with the ordering party, does not have a complete set of pricing parameters for the current order specifications. Such a counterparty is not included in the counterparty short list, and processing returns to test 1330. At block 1370, the counterparty is added to the counterparty short list by including the pricing details in the variables: PRICEFUNC (SID), CR(SID), DR(SID), C-C/EDXCHANG(SID), C-CXCHANG(SID), C-NCXCHANG(SID), E-C/EDXCHANG(SID), E-CXCHANG(SID), E-NCXCHANG(SID), MANUAL(SID), and ANON(SID). Processing then returns to test 1330 where the next selected potential counterparty is dealt with. When all selected potential counterparties have been processed, program flow returns to block 1250. At this point a potential counterparty short list has been obtained.

Figure 13:
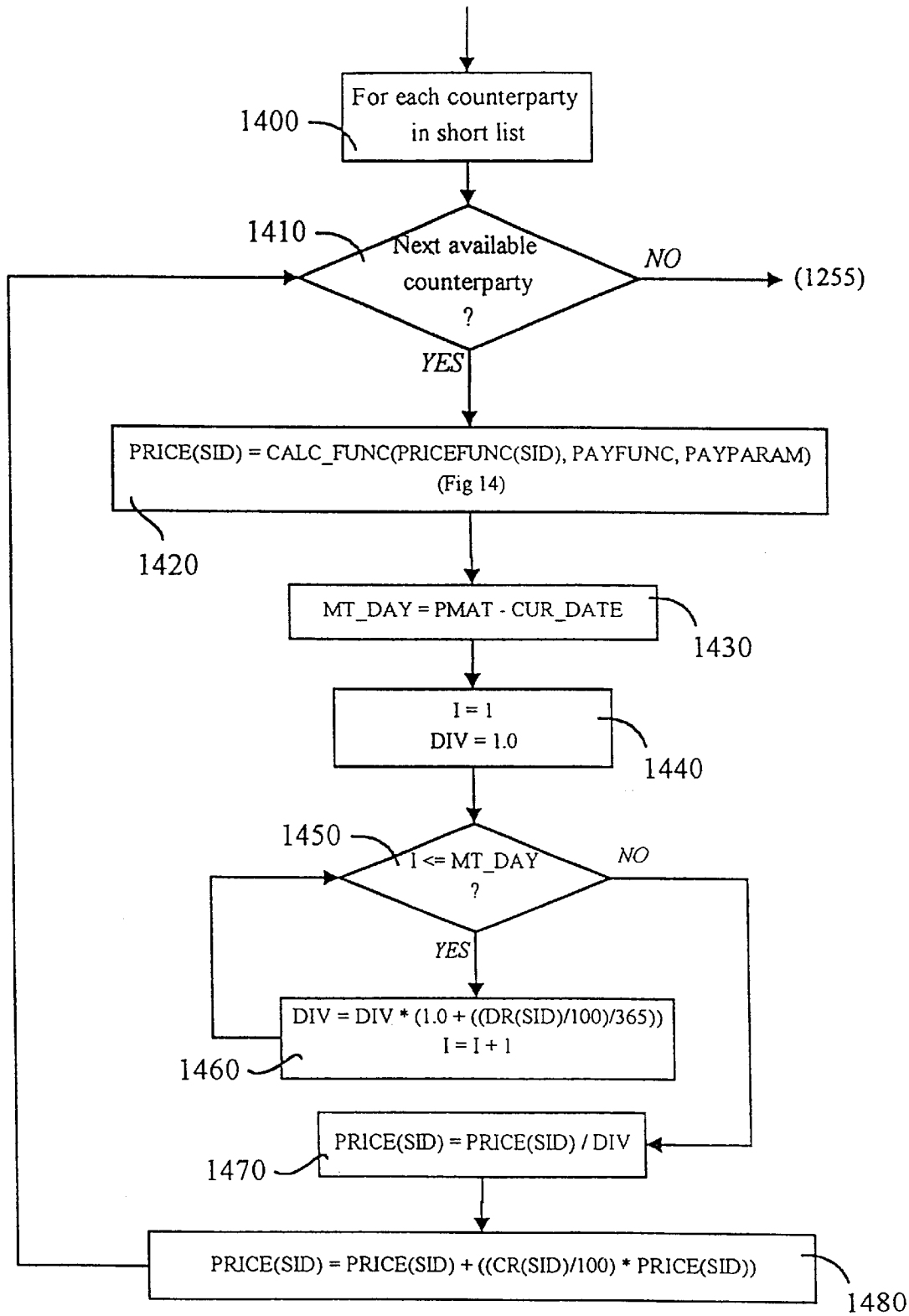
Figure 14:
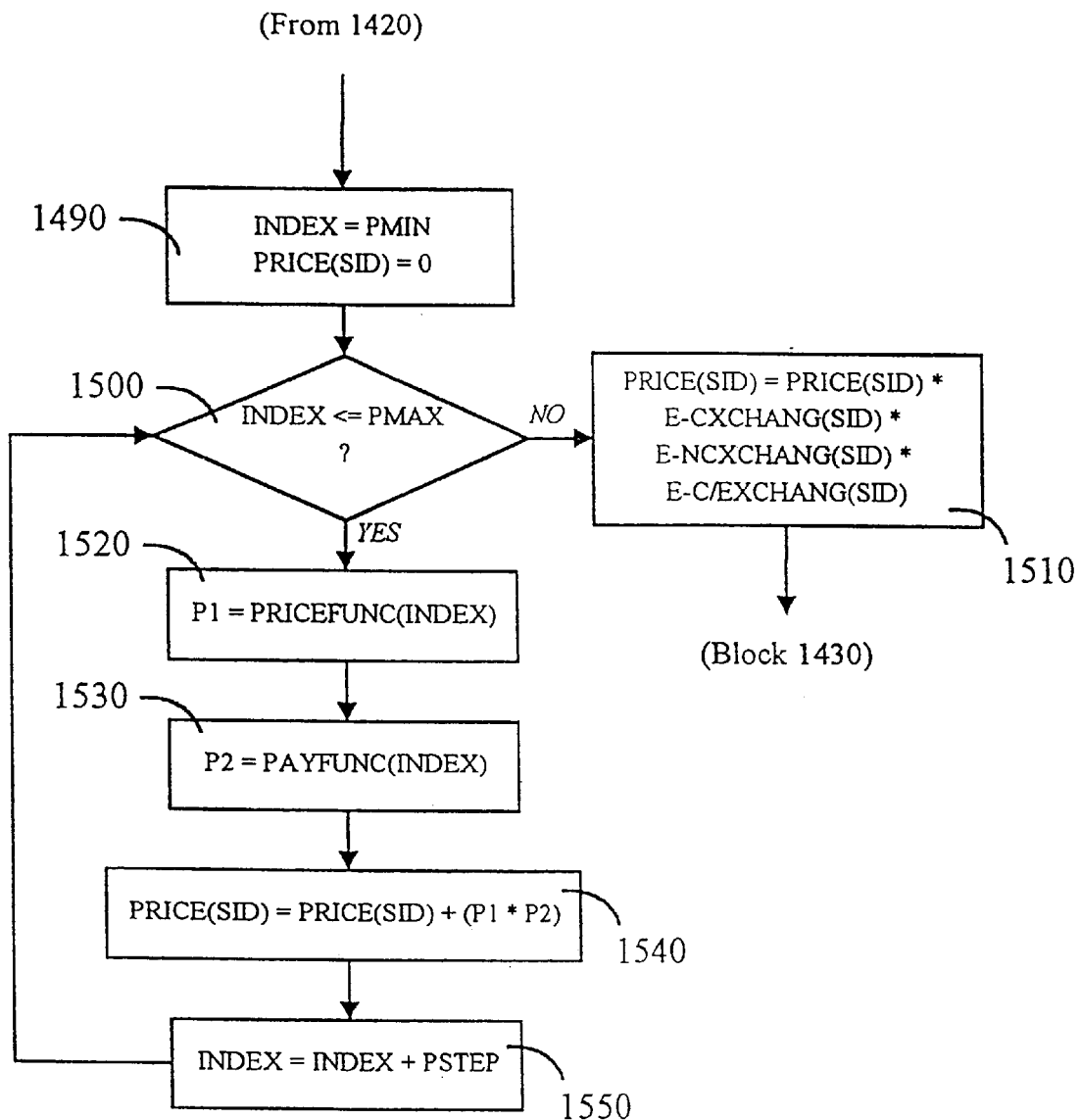
Figure 15:
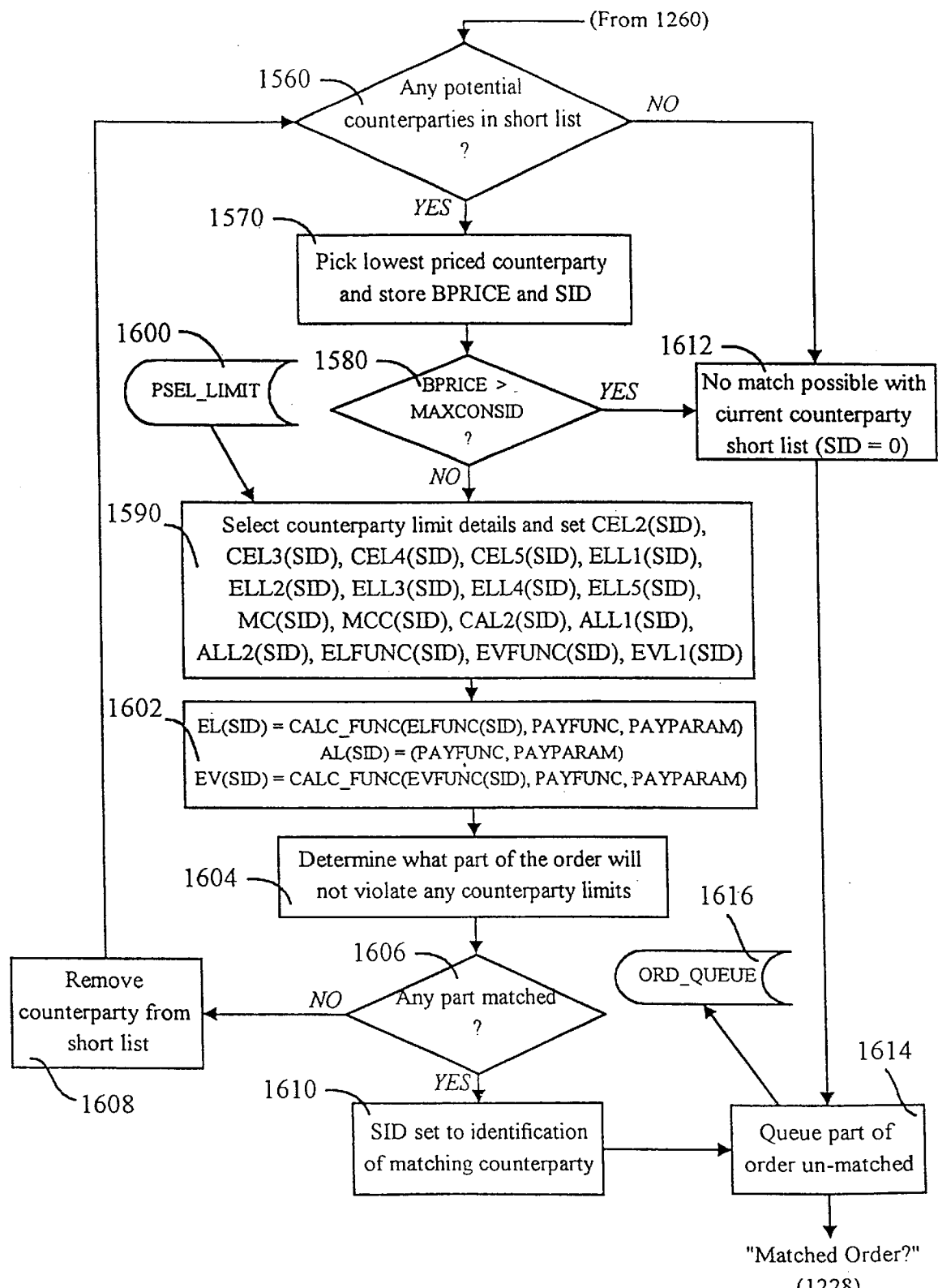

Blocks 1400 to 1550 in FIGS. 13 and 14 depict block 1250 in more detail, where every potential counterparty has its price offer calculated, based on their individual pricing parameters, for the currently loaded order. At block 1400 a loop commences allowing each potential counterparty in the potential counterparty shortlist to be dealt with in turn. SID is set to the identification of the counterparty currently selected. Test 1410 checks whether any counterparties are left for processing. At block 1420, the potential counterparty's price bid is calculated. Blocks 1490 to 1550 describe this calculation in more detail. At block 1490 the variable, INDEX, is assigned the starting value of the product value range (PMIN). Also, "price" is initialised to zero. Test 1500 commences a loop, where every index point in the product range is traversed. Block 1520 calculates the pricing value returned by the potential counterparty's pricing function, PRICEFUNC, as stored in (PRICEFUNC(SID)), at the current index point, and stores the value in P1. Block 1530 determines the pay-off amount required by the ordering party at the current index point and stores this value in P2. At block 1540, the total price at the current index point is calculated by multiplying P1 by P2. This value is added to the running total stored in PRICE(SID). At block 1550, the index counter (INDEX) is incremented by the product step size (PSTEP), and flow returns to the test 1500. When the end of the product range has been reached (PMAX), flow proceeds to block 1510, where the calculated price bid is modified by the following calculation:

$$PRICE(SID) = PRICE(SID)*E - C/EDXCHANG(SID)*E - CXCHANG(SID)*E - NCXCHANG(SID).$$

Returning to block 1430, the price bid stored in PRICE (SID) will be in the applicable product's consideration/ entitlement denomination, currency denomination, and national currency denomination. The following steps (block 1430–1470) determine and apply the applicable discount rate to the calculated price bid (currently in future value terms) to yield a price bid in present value terms. This is done as follows: At block 1430 the number of days to product maturity is determined. Block 1440 initialises the loop counter and discount rate divisor. For each day (or appropriate part thereof) between the current date/time and the product maturity date/time, the divisor is changed according to the formula (block 1460):

$$DIV=DIV*(1+((DR(SID)/100)/365))$$

At block 1470, the price bid is adjusted according to the formula:

$$PRICE(SID)=PRICE(SID)/DIV$$

Once the price bid in present value terms is known, the potential counterparty's defined commission is added to the price (block 1480). Given that CR(SID) is a percentage commission rate, the formula is:

$$PRICE(SID)=PRICE(SID)+((CR(SID)/100)*PRICE(SID))$$

When test 1410 confirms that every potential counterparty has been priced, program flow continues at 1255.

The test at 1255 checks whether the order was a "quote only" order. If so, flow continues at block 1256 where one or more of the counterparty bid prices are selected. At block 1230, the ordering party is informed of the pricing information gathered. If the order was not a quote order (that is, it was a real product order), an attempt is now made to identify a counterparty from the potential counterparty short list matching the requirements of the current order. This is done at block 1260. Blocks 1560 to 1616 in FIG. 15 describe this process in detail.

Starting at test 1560, a check is made to ensure the potential counterparty shortlist is not empty. If it is, no match is possible and flow continues at block 1612. At this point SID is assigned "0" to indicate that no counterparty was selected from the potential counterparty short list, before moving to block 1614 where the entire order (as no part was matched) is queued. When the list is not empty, program flow continues at block 1570, where the lowest priced counterparty is selected from the counterparty short list. This determination is done based upon each potential counterparty's bid price (PRICE(SID)), being converted to the consideration/entitlement type, currency, and national currency consideration "payment" denominations sought by the ordering party (that is, PRICE(SID)=PRICE(SID)*C–C/EDXCHANG(SID)*C–CXCHANG(SID)*C–NCXCHANG(SID)). The counterparty identification is stored in SID, and its price offer is stored in BPRICE. At block 1580, the following check is made:

$$BPRICE>MAXCONSID$$

If the selected price is greater than the ordering party's specified maximum consideration payment (MAXCONSID) limit, a match with the current potential counterparty is not deemed possible. This must also be true for any of the remaining counterparties in the counterparty short list. This part of the matching process returns without any potential counterparty in the short list having been selected for a match (block 1612). Otherwise, the current price is acceptable, and the process proceeds to attempt a match with the current selected counterparty.

The next step (block 1590), requires all the applicable contract, product, and portfolio absolute loss, expected loss, expected value limits, and maximum composition limits to be read from the PSEL LIMIT master file (block 1600) and stored in ALL1(SID), ALL2(SID), ELL1(SID), ELL2(SID), ELL3(SID), ELL4(SID), ELL5(SID), EVL1(SID), MC(SID) and MCC(SID). The current absolute and expected losses accumulated are also read and stored in CAL2(SID), CEL2(SID), CEL3(SID), CEL4(SID), and CEL5(SID). The ELFUNC(SID) and EVFUNC(SID) values are also set for use when calculating the expected loss and expected value for the current order. Block 1602 calculates the price of the order entitlement function using the counterparty product expected loss and expected value parameters ELFUNC(SID) and EVFUNC(SID). The order's expected loss is stored in EL(SID); the order's expected value is stored in EV(SID). The absolute loss function is also determined at block 1602 and it is stored in AL(SID). Proceeding to block 1604, the portion of the order which will not violate the counterparty limits is calculated. This check is made at test 1606. If no part of the order is matched, process flow continues at block 1608. The potential counterparty is removed from the counterparty shortlist.

Figure 16:
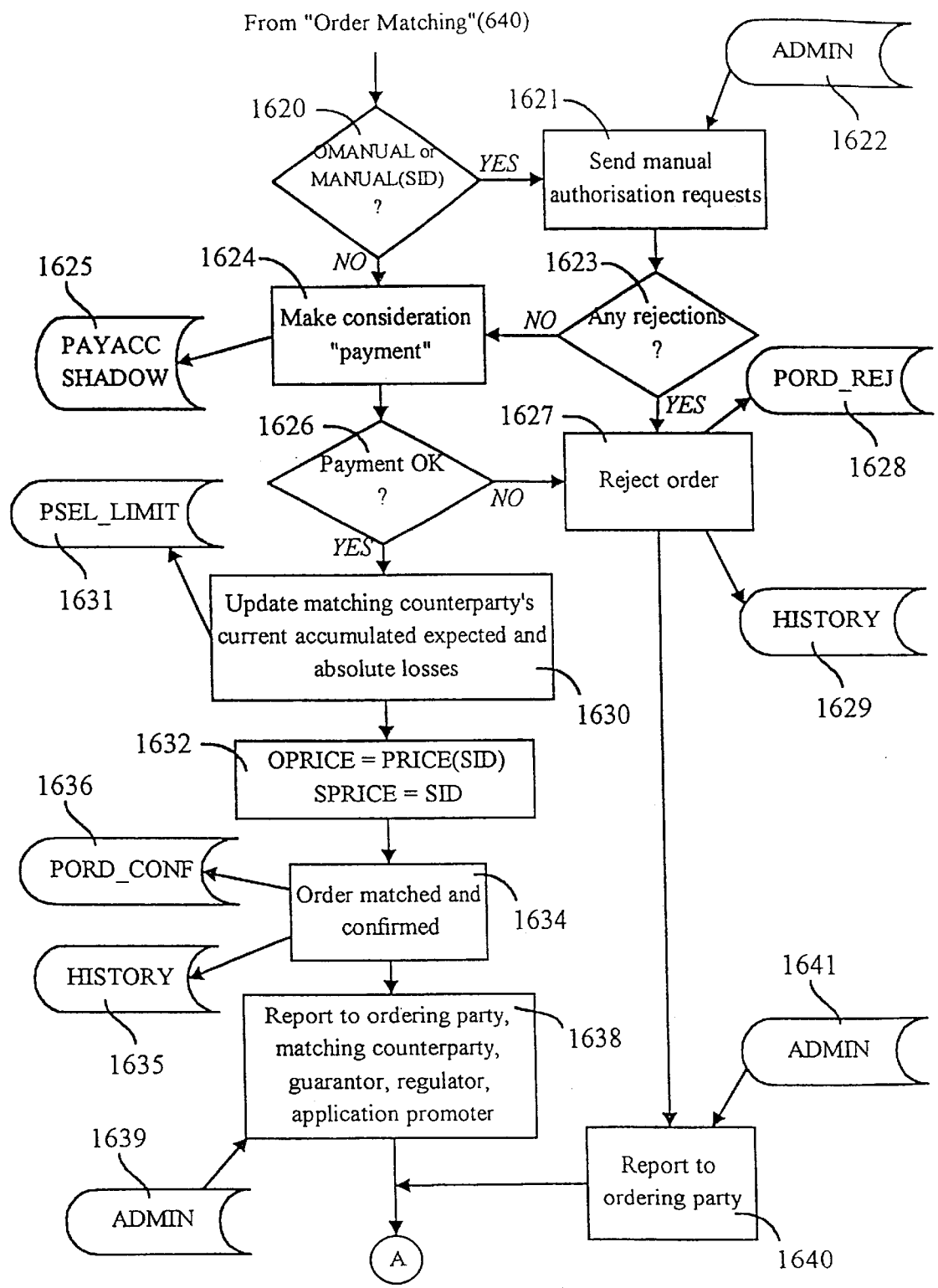

If some portion of the order is matched with the current counterparty, processing continues at block 1610. Here the SID is set to the identification of the matching counterparty. The unmatched portion (if any) is stored at block 1614 as a new order in the PORD QUEUE masterfile (block 1616). Flow then returns to test 1261 in FIG. 11. When a match occurs, program flow returns to block 650. The matched order must now be confirmed by carrying out a number of additional steps, as shown in FIG. 16, blocks 1620 to 1641. If no match occurred, processing of the current order steps, and program flow returns to the beginning via connector "A". The system is ready to load the next available order.

Matched Order Confirmation

For matched orders to become a contract, a number of additional actions are required. First, at test 1620, a check for manual authorisation is made. If required, program flow moves to block 1621 where authorisation requests are sent to the relevant stakeholders. Block 1623 then tests the replies for any rejections. If one or more rejections were received, program flow continues at block 1627 where the order is rejected. Otherwise, flow continues at 1624. Block 1624 effects the consideration payment by creating transactions in the payment shadow file (PAYACC SHADOW—block 1625). However, this may fail if the accounts specified do not exist or if at least the required consideration amount is shown not to be available. Test 1626 checks that "consideration payment" was effected successfully. If "consideration payment" fails, the matched order is rejected (block 1627), with details stored in the rejected order master file, PORD REJ (block 1628). The ordering party is then informed of this event at block 1640.

With successful payment, program flow proceeds to block 1630 where the counterparty's current accumulated absolute and expected loss figures are updated (masterfile PSEL LIMIT—block 1631). At block 1632, the order data field OPRICE is set to the price given by the counterparty PRICE(SID), and SPRICE set to the counterparty's identification, SID. At block 1634, the matched order is certified as confirmed, with full details recorded in the masterfile PORD CONF (block 1636). The next step, block 1638, reports details of the newly created contingent contract to all stakeholders concerned. Program flow then returns to the beginning, via connector "A". The system is now ready to start processing the next order submitted by a specified ordering party.

6. Life Cycle of Risk Management Contract:

EXAMPLE III

The third example of a risk management contract describes a contract to manage risk associated with potential future movements in the value of a specified index of share prices (termed the PTSE 75 index). In summary, the example shows how the system could enable one party (such as an institutional fund manager) seeking to avoid the adverse consequences of a significant decline in the future value of the PTSE 75 index (specifically a decline by June 1996, relative to the assumed current (June 1991) value of the index) to make a contract with another, as-yet-unknown, party, such as another fund manager seeking to avoid the adverse consequences of a significant corresponding increase in PTSE 75 index value.

The specific offering is one which provides a contract ordering party with a specified contingent entitlement to a compensatory Australian dollar future payout upon payment of a calculated up-front consideration money amount by the ordering party to the as-yet-unknown counterparty. The future money entitlement is contingent on the value, at contract maturity date, of the independently-determined value of the PTSE 75 index.

In this example, the relevant key stakeholders are: an application promoter (BLC Inc); various product sponsors (the relevant one for the example being BLC Inc itself); various product ordering parties (the relevant ones for the example being Abbotts & Taylor and Shearer & Associates); various potential counterparties (the relevant ones for the example being Abrahamsons and Carpenters Inc); a counterparty guarantor (CNZ Banking Corporation); and an application regulator (the Pacific Central Bank).

Figure 17:
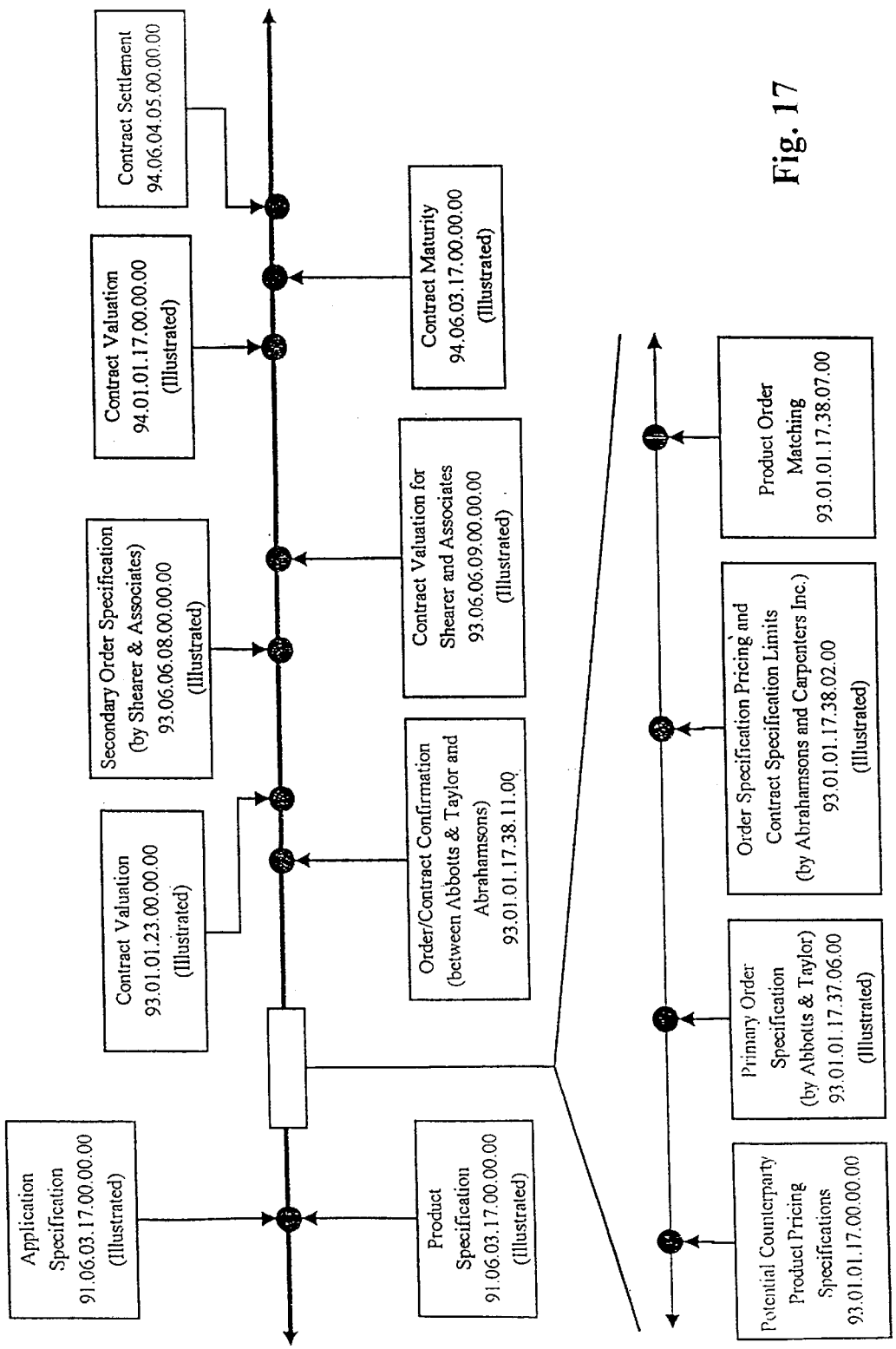
FIG. 17 shows a timeline applicable to Example III.

The timeline depicting the steps in the contract from the first step (Application Specification) to the final step (Contract Settlement) is shown in FIG. 17. FIGS. 60A to 72B are thirteen detailed explanatory charts supporting FIG. 17. They should be read together with the following description.

Looking at the first step in the timeline (Application Specification) in conjunction with FIGS. 60A and 60B, it can be seen that BLC Inc established a Contract APP (Application ID 001) on 91.06.03.17.00.00 (that is, 5 pm on Jun. 3, 1991) to deal with economic risk management. Application ID 001 supports a range of products (Applicable Product ID's 10020–11400).

Looking at the second step in the timeline (Product Specification) in conjunction with FIGS. 61A and 61B, it can be seen that BLC Inc was also Product Sponsor of Product 10061 at the same time (91.06.03.17.00.00). This Product relates to the Market termed Stock Indices and to the Sub-market termed PTSE 75. The maturity date for Product 10061 is 94.06.03.17.00.00.00. The consideration for a specific contract involving Product 10061 is in the form of money (commercial bank deposits denominated in Australian dollars). The entitlement is also in the form of commercial bank deposits denominated in Australian dollars, payable (if necessary) immediately after the Product's specified maturity date/time.

Looking at the third step in the timeline (Potential Counterparty Product Pricing Specifications), one can find two entities, Abrahamsons and Carpenters Inc, acting as potential counterparties for forthcoming primary product orders dealing with Product 10061. At this point in the timeline (95.01.01.17.00.00.00), 19 months after the specification of Product 10061, both Abrahamsons and Carpenters Inc have currently-specified parameters for pricing potentially forthcoming orders for the product.

Looking at the fourth step in the timeline (Primary Order Specification), in conjunction with FIGS. 62A and 62B, it can be seen that an Ordering Party, Abbotts & Taylor, is seeking a contract, from an offering party, in Product 10061 at that time (95.01.01.17.37.06.00). FIGS. 62A and 62B show the specific parameters (entitlement) that Abbotts & Taylor has defined for the contract it is seeking at this time, including a maximum acceptable contract consideration amount of 54,000 (denominated in commercial bank, Australian dollars).

In order to provide a more detailed explanation of the following fifth to seventh steps in the timeline, selected processing block numbers from FIGS. 8–16 will be referred to in brackets as follows: "[ ]".

Looking at the fifth step in the timeline (Order Specification Pricing) in conjunction with FIGS. 63A and 63B, it can be seen that Abrahamsons' specified pricing parameters, as set at 95.01.01.17.37.06.06 are used to price the Abbotts & Taylor order at 95.01.01.17.38.02.00. Abrahamsons' pricing parameters indicate that their appropriate Defined Circumstances ID for Abbotts & Taylor is 26 [1240]. As is shown, this ID in turn implies a Commission Rate of 1.25%, a Discount Rate of 10.00% per annum, a particular set of Component product prices and a particular set of Assessed Probabilities of Occurrence. In a similar process to that described for Example 1, this results in a Contract Bid Price of 51,920 (denominated in commercial bank, Australian dollars), which Abrahamsons' parameters calculate will yield them a base margin on the contract of 4,580 (again denominated in commercial bank, Australian dollars) [1250].

Still looking at the fifth step in the timeline, in conjunction with FIGS. 64A and 64B, it can be seen that Carpenters Inc specified pricing parameters, as set at 95.01.01.17.37.06.00, are also used to price the Abbotts & Taylor order at 95.01.01.17.38.02.00. Carpenters Inc's pricing parameters indicate that their appropriate Defined Circumstances ID for Abbotts & Taylor is 17 [1240]. As is shown, this ID in turn implies a Commission Rate of 1.30%, a Discount Rate of 9.80% per annum, a particular set of Component product prices and a particular set of Assessed Probabilities of Occurrence. This results in a Contract Bid Price of 53,050 (denominated in commercial bank, Australian dollars), which Carpenters Inc's parameters calculate will yield them a base margin on the contract of 5,610 (again denominated in commercial bank, Australian dollars) [1250].

Again, still looking at the fifth step in the timeline, in conjunction with FIGS. 65A and 65B, it can be seen that Abrahamsons' pricing-related parameters (also set at 95.01.01.17.37.06.00) for determining the acceptability of ordered-contracts on the basis of their absolute loss, expected loss, expected value, and maximum portfolio composition attributes are satisfied by Abbotts & Taylor's order [1604]. From Abrahamsons' perspective, this qualifies Abbotts & Taylor's order for inclusion in their product/contract portfolio, as long as Abrahamsons' consideration price bid turns out to be lower than Carpenters Inc's price bid, and, in turn, this bid is below the maximum consideration price that Abbotts & Taylor has specified, in its order specification (FIGS. 62A and 62B), it is prepared to pay.

Figure 66B:
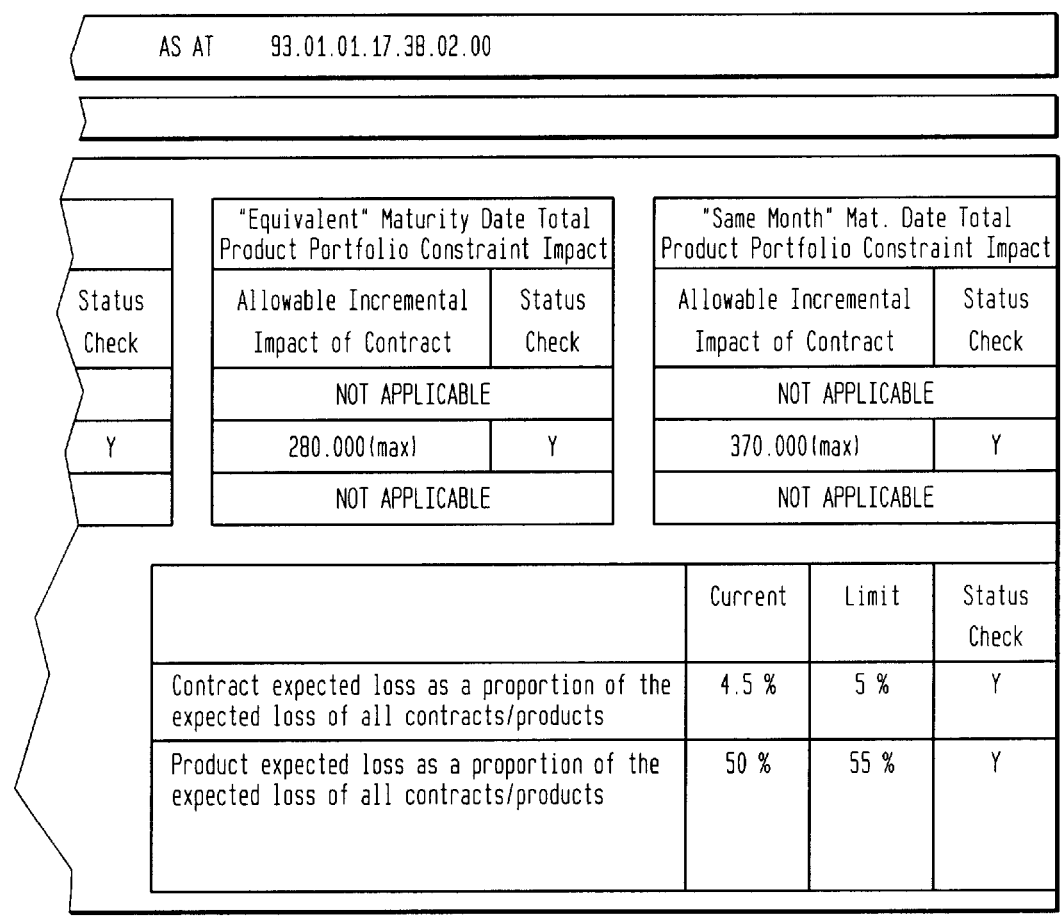

Finally, still looking at the fifth step in the timeline, but now in conjunction with FIGS. 66A and 66B, it can be seen that Carpenters Inc's pricing-related parameters (set at 95.01.01.17.37.06.00) for determining the acceptability of ordered-contract oil the basis of their absolute loss, expected loss, expected value, and maximum portfolio composition attributes are also satisfied by Abbotts & Taylor's order. Now, from Carpenters Inc's perspective, this qualifies Abbotts & Taylor's order for inclusion in their product/contract portfolio, in this case, as long as Carpenters Inc's consideration price bid turns out to be lower than Abrahamsons' price bid, and, in turn, this bid is below the maximum consideration price that Abbotts & Taylor has specified, in its order specification (FIGS. 62A and 62B), it is prepared to pay.

Looking at the sixth step in the timeline (Order Matching), it can be found that Abrahamsons' price bid of 51,920 is below Carpenters Inc's bid of 53,050 and, in turn, that the 51,920 amount is below Abbotts & Taylor's specified maximum consideration price of 54,000. This leads to a formal matching of Abbotts & Taylor's order by Abrahamsons' at 95.01.01.17.38.07.00 [1260].

The seventh step in the timeline (Order/Contract Confirmation) takes place five seconds later at 95.01.01.17.38.11.00, after the system has determined that Abbotts & Taylor is able to (and then does) immediately pay the required consideration funds amount of 51,920 to Abrahamsons [650].

Figure 67A:
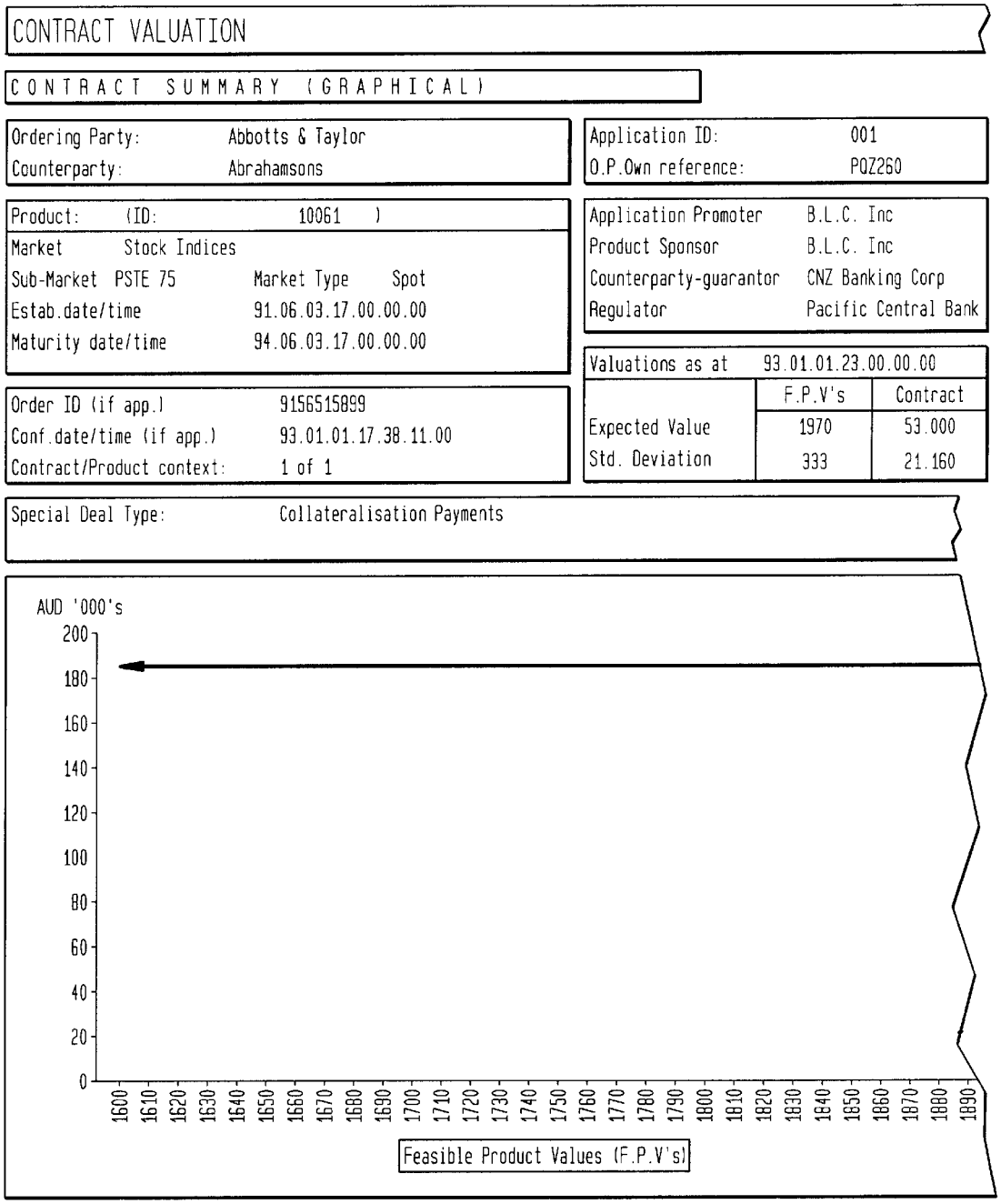
Figure 67B:
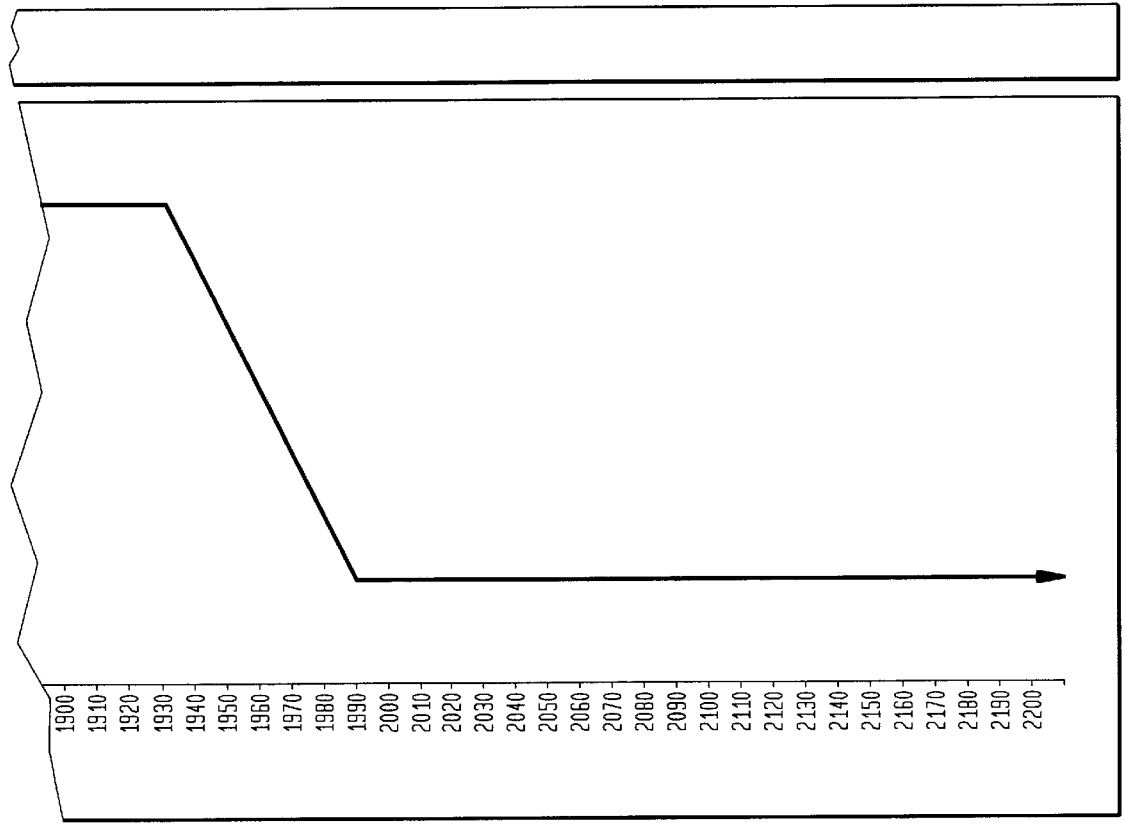
Figure 68A:
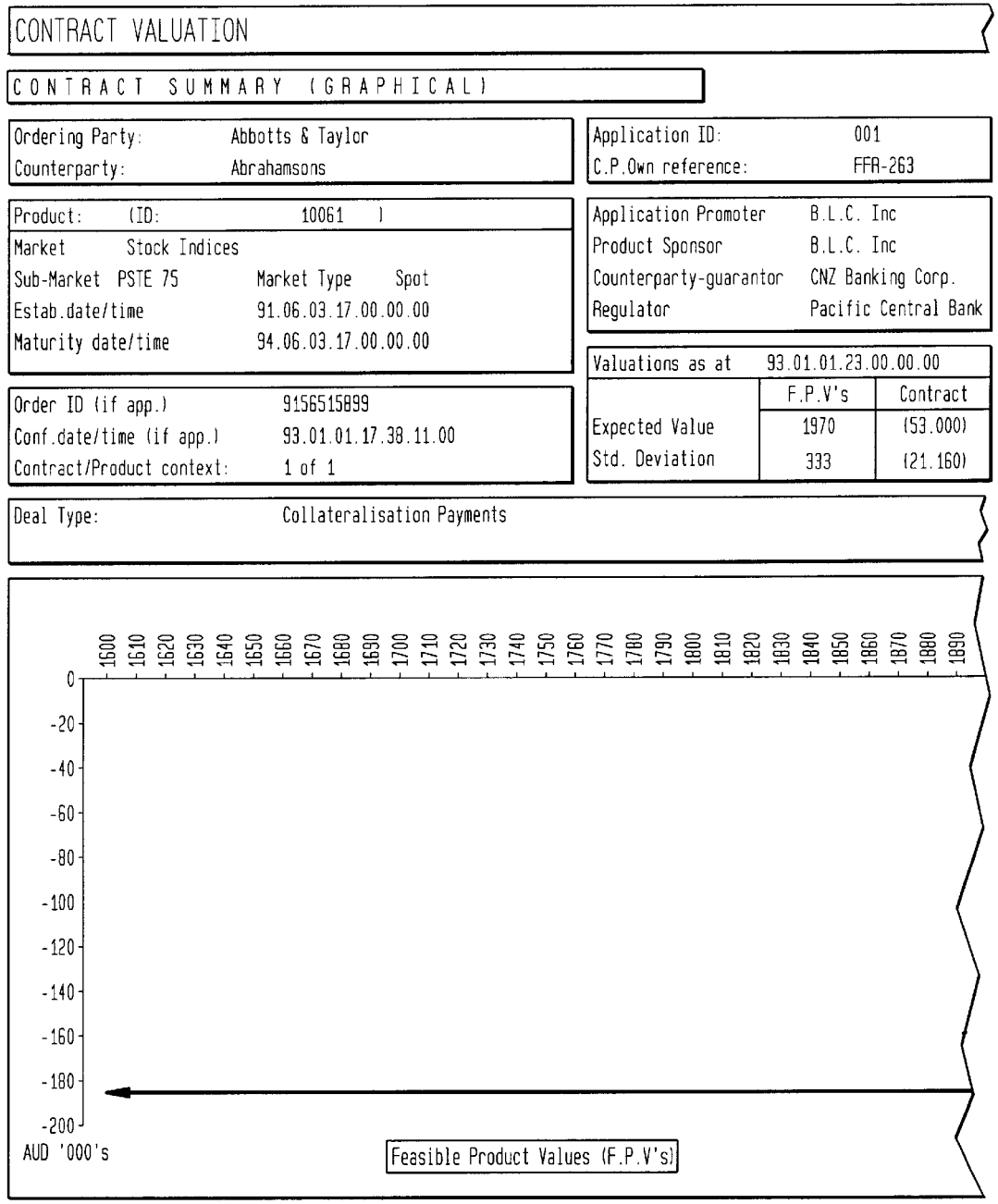
Figure 68B:
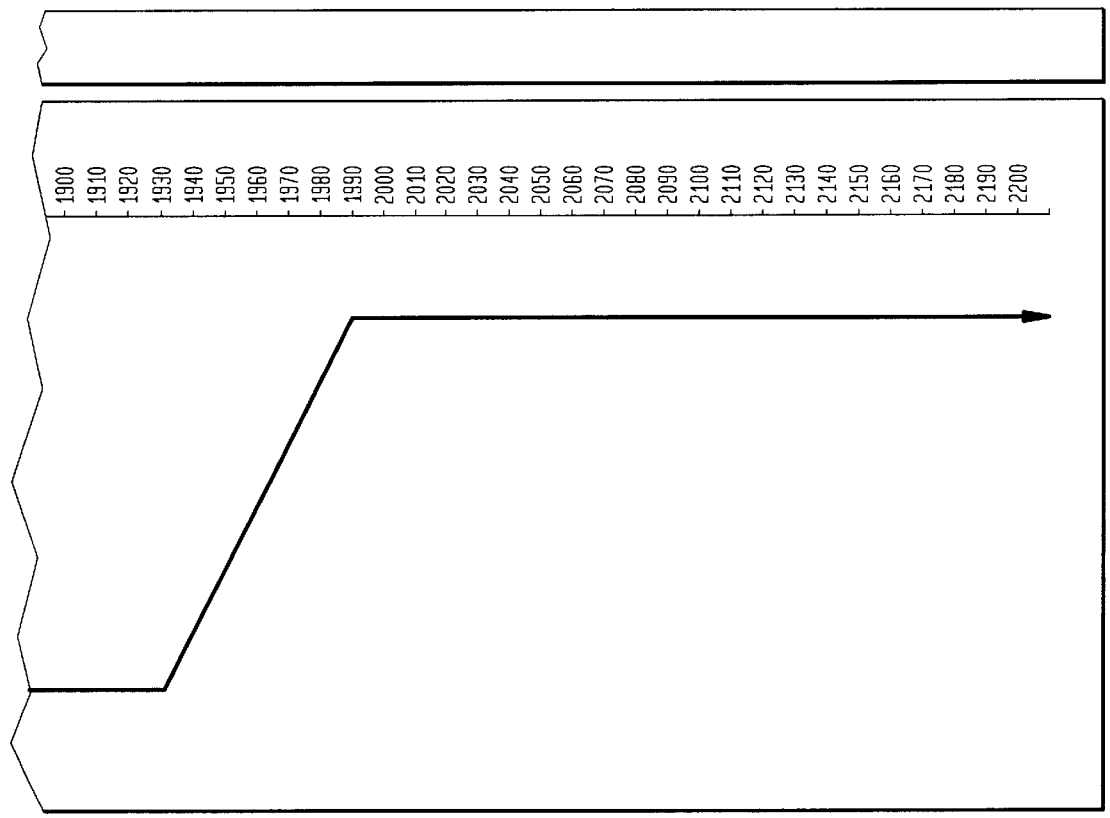
Figure 70A:
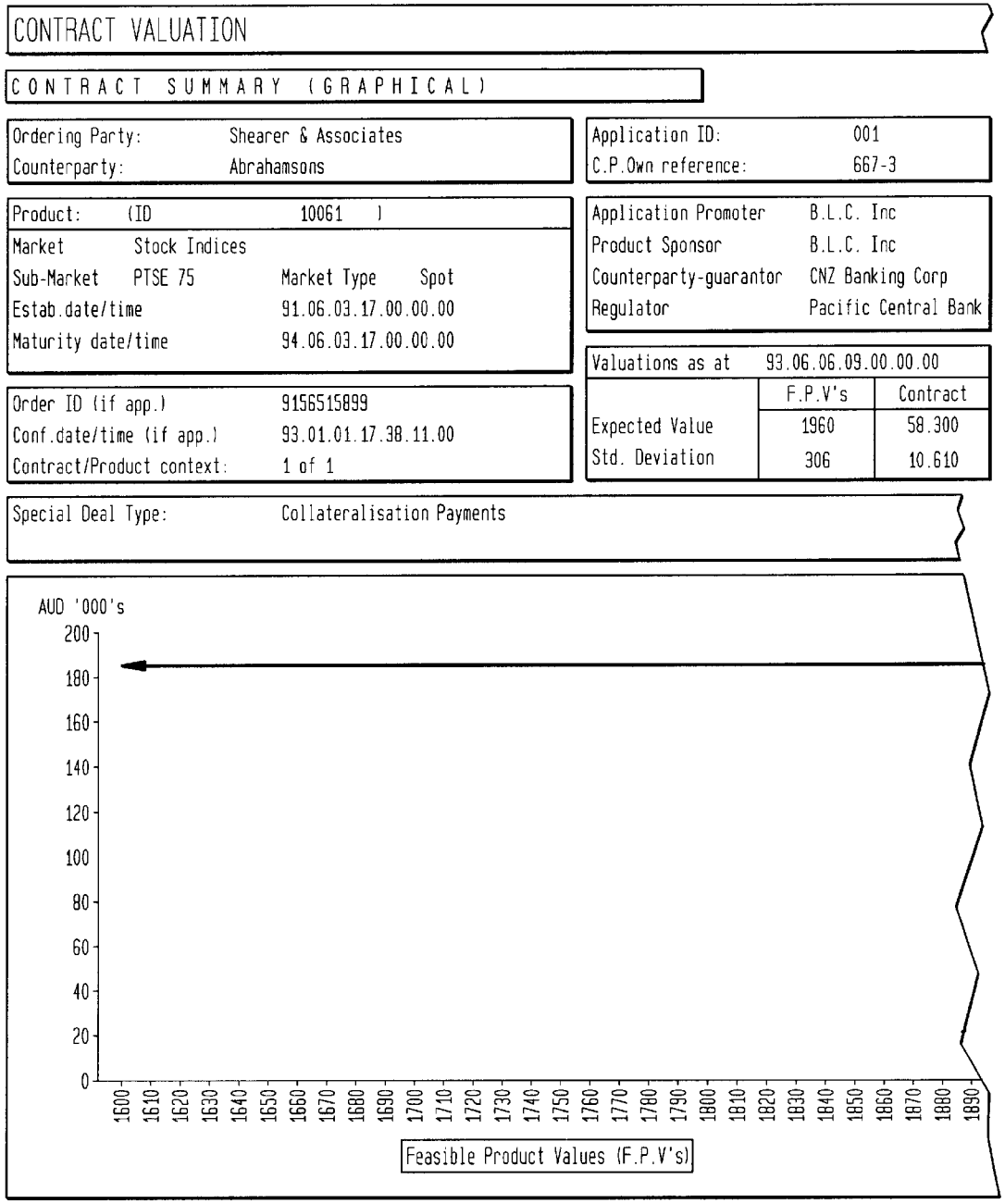
Figure 70B:
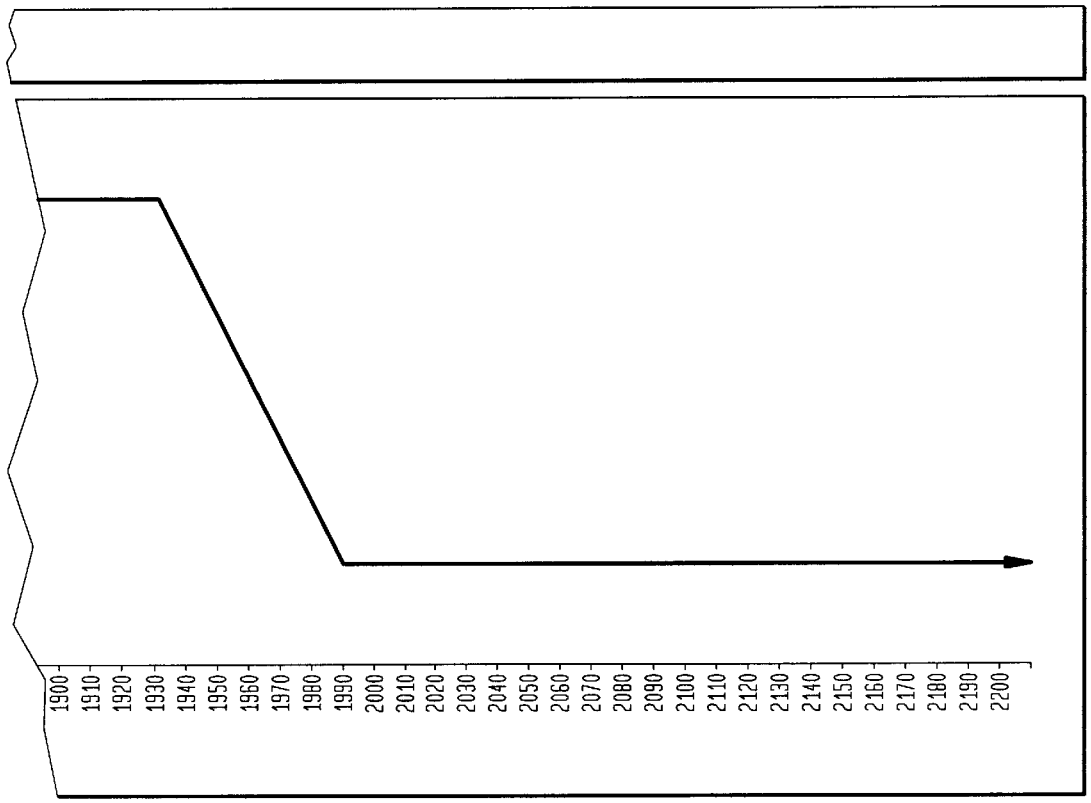

Looking at the eighth step in the timeline (Contract Valuation) in conjunction with FIGS. 67A and 67B, one can see a contract valuation report for Abbotts & Taylor published nearly six hours after confirmation of the contract, that is, at 95.01.01.23.00.00.00. As can be seen, the market estimate of the future product value of the PTSE 75 Index at this moment is 1970 (with a standard deviation of 333), which implies that this contract has an expected future value of 53,000 commercial bank-denominated Australian dollars (with a standard deviation of 21,160). On FIGS. 68A and 68B one can see in the equivalent report for Abrahamsons that their required expected future entitlement payout is identical to Abbotts & Taylor's expected future entitlement receipt (ignoring future fee payments which may be netted against these payments/receipts).

The ninth step in the timeline (Secondary Order Specification), detailed on FIGS. 69A and 69B, occurs nearly six months after the above-described contract valuation event; that is, at 95.06.06.08.00.00.00. At this time, Abbotts & Taylor is seeking to sell its position in the contract which was matched/confirmed at 95.01.01.17.38.11.00 (and at that time assigned the Order ID of 9156515800 by the system) at a price better than 57,000. Shearer & Associates is prepared to pay 60,000 (commercial bank deposit-denominated Australian dollars) for this position. In all other respects the contract's attributes remain unchanged. On FIGS. 70A and 70B, the tenth step in the timeline, a contract sale is seen to have occurred at a price of 58,300, just below the above-described 60,000 upper limit purchase-price amount specified by Shearer & Associates. This amount is the current best estimate of the contract's expected future value, with the standard deviation of this expected future value calculated by the system, utilizing other recent transaction data, as being 10,610. Shearer & Associates has now formally taken the place of Abbotts & Taylor as a stakeholder to the contract.

Figure 71A:
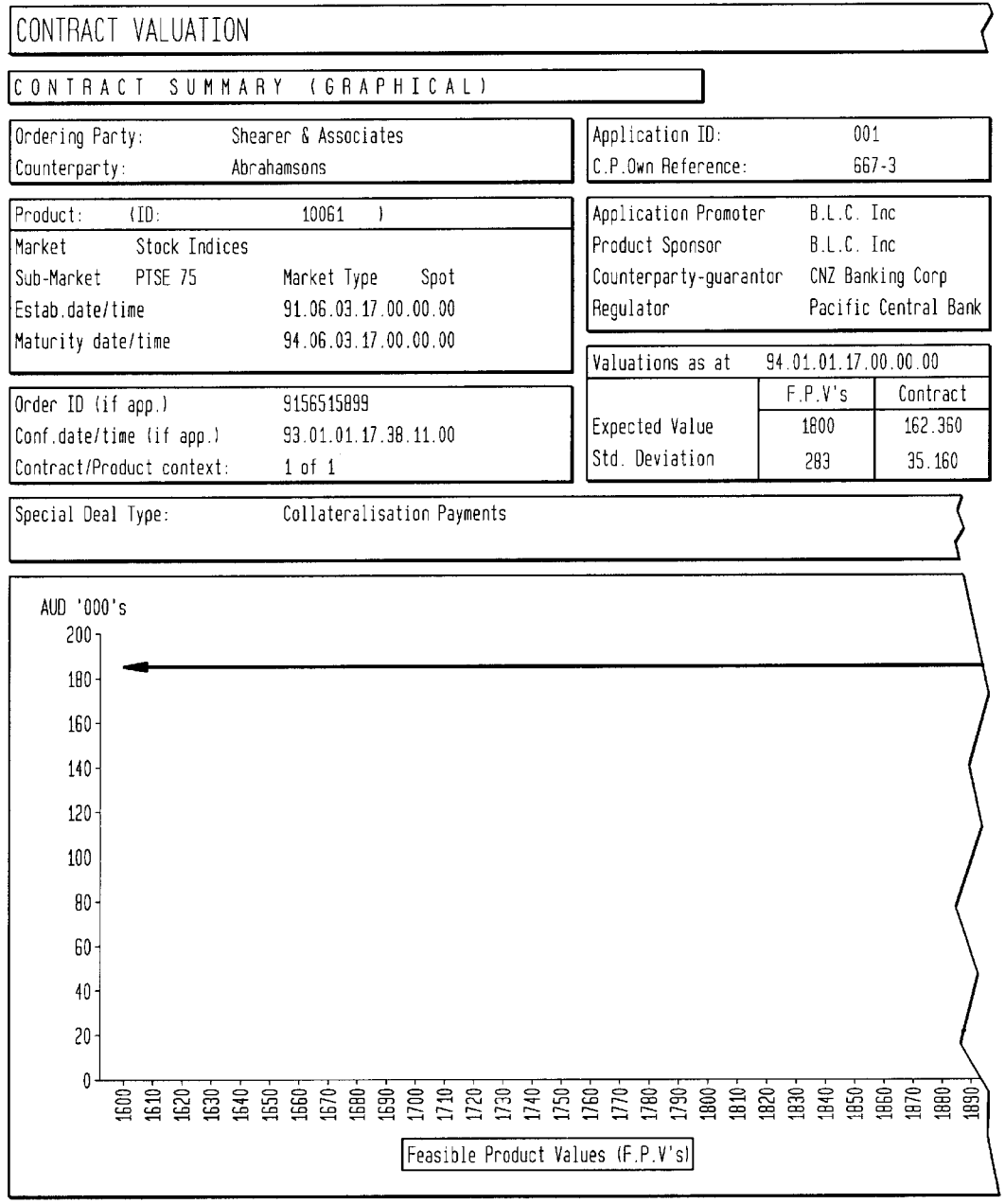
Figure 71B:
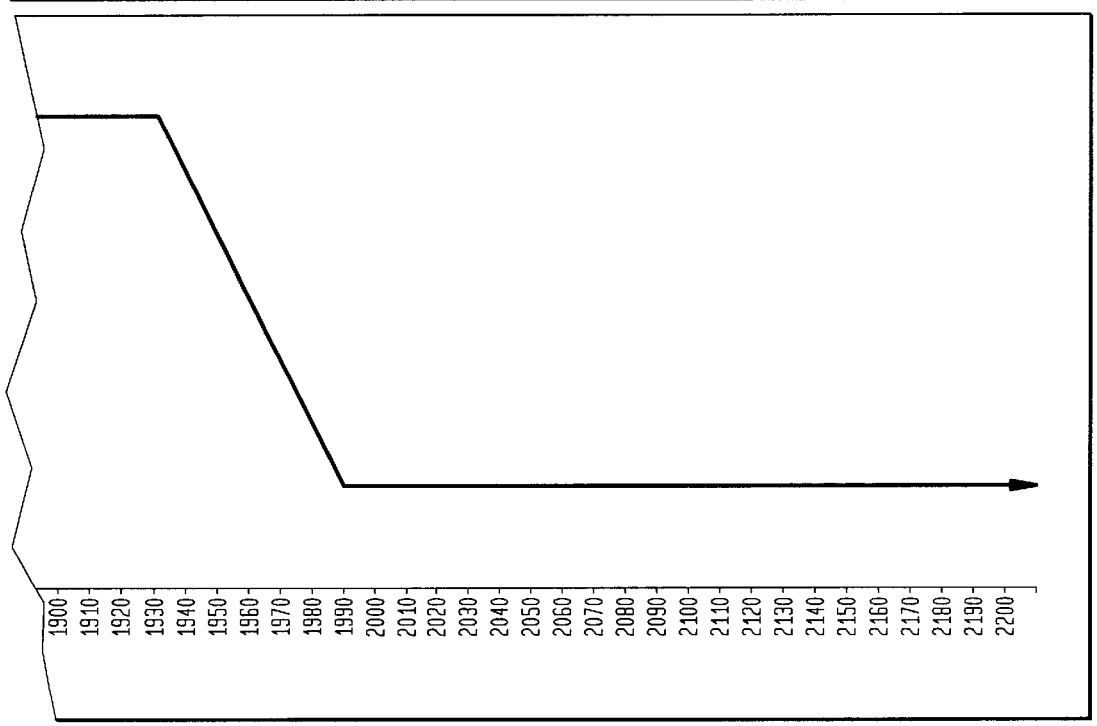
Figure 72A:
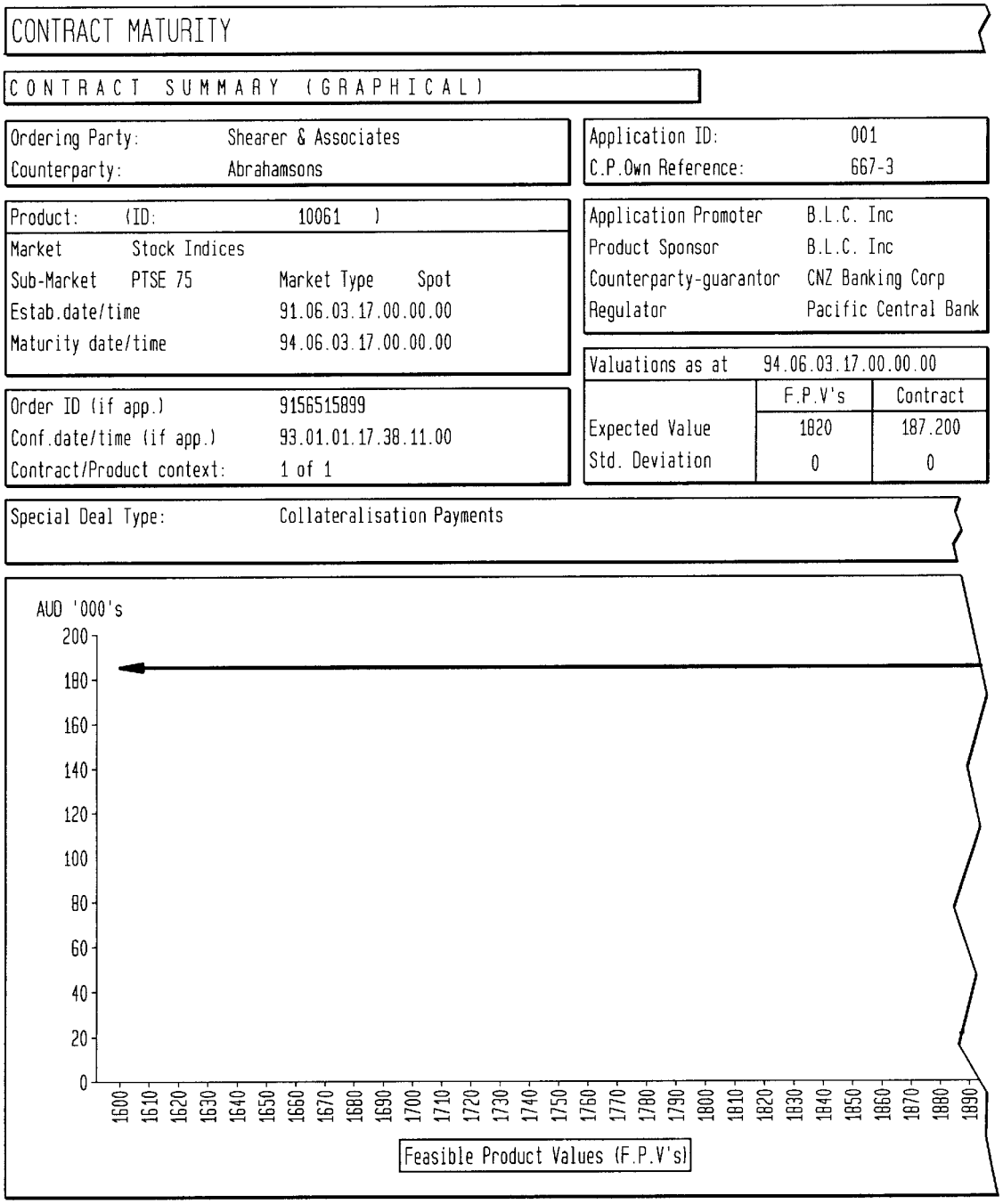
Figure 72B:
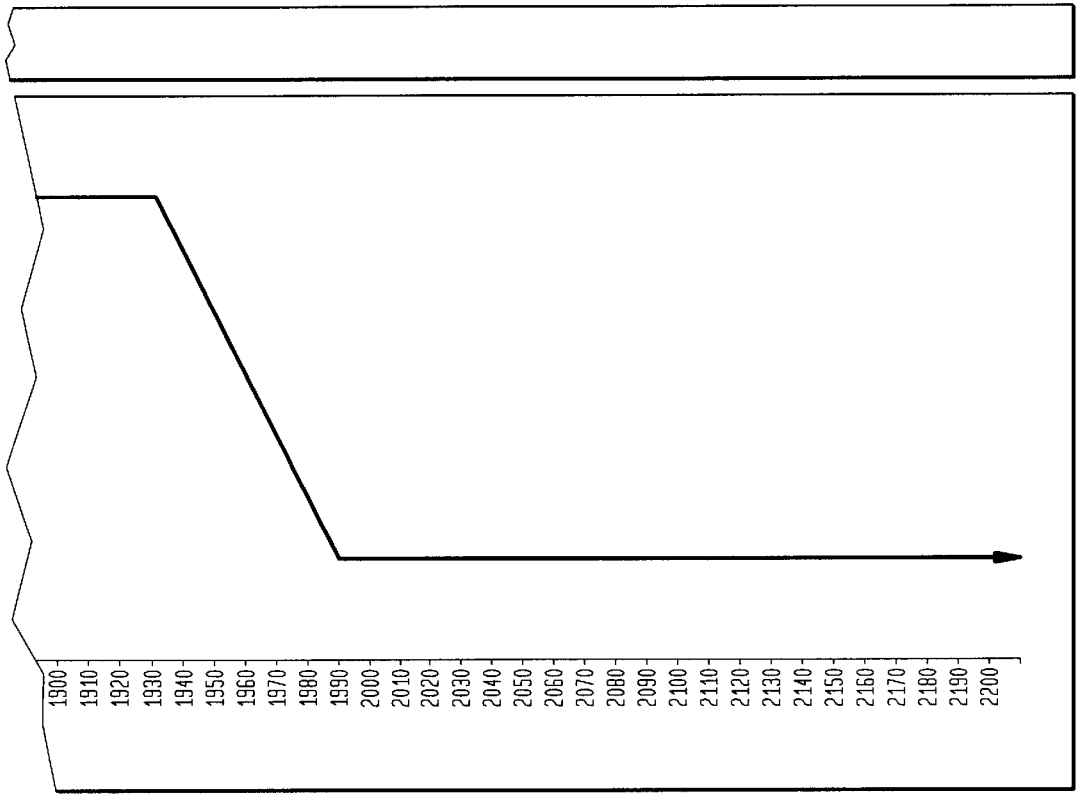

The eleventh step in the timeline (Contract Valuation) refers to a contract valuation report published for Shearer & Associates seven months later, at 96.01.01.17.00.00.00 (see FIGS. 71A and 71B). As can be seen, the market estimate of the future product value of the PTSE 75 Index at this moment is 1800 (with a standard deviation of 283), which implies that this contract now has an expected future value of 162,360 commercial bank deposit-denominated Australian dollars (with a standard deviation of 35,160). This is an increase in expected future value of 104,060 for Shearer & Associates since the former valuation date/time. The above described market estimate of the future product value is determined by the system applying a defined composite of contract-counterparty assessed probabilities of occurrence figures drawn from the collection of all like contracts recently matched/confirmed by the system.

The twelfth step in the timeline (Contract Maturity) refers to the actual determination of the product value at time of maturity, 96.06.03.17.00.00.00. As can be seen on FIGS. 72A and 72B, this product value of the PTSE Index was specified by BLC Inc (as Product Sponsor) to be 1820, implying a contract value of 187,200 (commercial bank deposit-denominated Australian dollars) to Shearer & Associates, and a corresponding obligation on Abrahamsons. The figure of 1820 represents the actual value of the PTSE share price index at 96.06.03.17.00.00.00 as obtained by BLC Inc from the independently verifiable information source, the identity of which they would have disclosed at the time they first announced their sponsorship of trading in the PTSE 75 share index product.

The thirteenth step in the timeline involves the formal payment of 187,200 (commercial bank deposit-denominated Australian dollars) by Abrahamsons to Shearer & Associates (ignoring possible fee payments by one or both parties).

Life Cycle of Economic Management Contract:

EXAMPLE IV

This further example of a risk management contract is an extension of Example III. More particularly, however, it is a special case of the general case of Example III, in that for a particular phenomenon the same entitlement is specified by the ordering party for each of the possible outcomes. This is a case where X=1, $\alpha(X)$ is not applicable, $\beta(X)$=the specified non-contingent entitlement (constant), and $\gamma(X)$=11, where "11" denotes a mathematical shape that is a straight-line with respect to the 'outcome' axis, drawn from a menu of such shapes. Put another way, the gradient of the graph of entitlement (y-axis) against outcome (x-axis) is zero.

The counterparty registering data remains the same as for Example III. It can be thought of as the scenario where the outcome is not of concern to the ordering party. When its future entitlement is positive, the contract, from the ordering party's view, is in the nature of a loan, in that the consideration is made available now for a future known entitlement. It is of course possible for the consideration and entitlement to be negative so that the nature of the contract from the ordering party's viewpoint is borrowing.

The example shows just this situation, in that one party (such as an institutional fund manager) seeks to avoid the adverse consequences of not having immediate possession of a defined resource (say, Australian dollars) by becoming a party to a contract with another, as-yet-unknown, party (such as another fund manager seeking to avoid the adverse consequences of being unable to adequately utilise the defined resource).

The specific contract offering is one which provides an ordering party with a specified non-contingent obligation (that is, a negative future entitlement) to make an Australian dollar future payout to the contract's counterparty upon that counterparty's payment of a calculated up-front consideration money amount to the ordering party.

Thus, for a given guaranteed entitlement payout amount by the ordering party to its counterparty on a contract's maturity date, the up-front consideration payment is essentially a function of two matters implicitly determined between the ordering party and the counterparty registering data:

1. The discount (interest) rate applicable to the contract (this will itself be credit risk-free Australian dollar instruments with the same maturity date, plus a margin reflecting the counterparty's assessment of the likelihood of default by the ordering party in making their required future entitlement payment in Australian dollars);
2. The counterparty's sought-after commission on the transaction.

Note that if, say, the contract entitlement is based in US dollars, the matter of the counterparty's defined forward Australian dollar/U.S. dollar exchange rate would also be relevant.

As noted, the relevant key stakeholders are the same as in Example III: an application promoter (BLC Inc); various product sponsors (the relevant one for the example being BLC Inc itself); various product ordering parties (the relevant ones for the example being Abbotts & Taylor and Shearer & Associates); various potential counterparties (the relevant ones for the example being Abrahamsons and Carpenters Inc); a counterparty guarantor (CNZ Banking Corporation); and an application regulator (the Pacific Central Bank).

Figure 41:
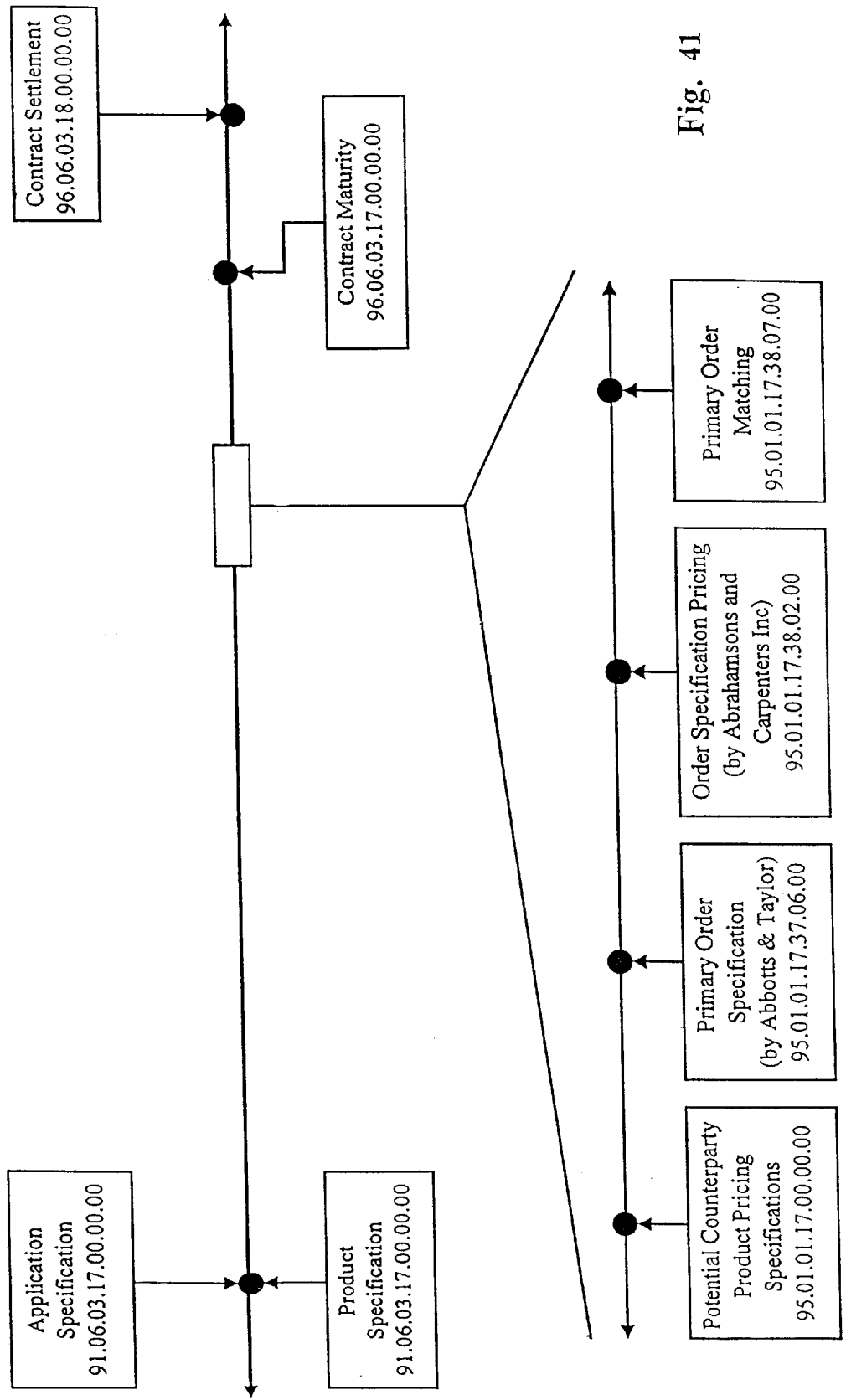
FIG. 41 shows a timeline for Example IV.

A timeline depicting the steps in the contract from the first step, Application Specification, to the final step, Contract Settlement, is shown in FIG. 41 and further supported by FIGS. 73–77B.

Looking at the first step in the timeline, Application Specification, in conjunction with FIG. 73, we see that BLC Inc established a Contract APP (Application ID 001) on 91.06.03.17.00.00 (that is, 5 PM on Jun. 3, 1991) to deal with economic risk management. The application involves a pricing and matching objective function of: "minimize pre-tax consideration payment under an expected value (EV)/certainty equivalent (CE) value". Note that a negative consideration payment is allowed.

Looking at the second step in the timeline, Product Specification, in conjunction with FIG. 74, we see that BLC Inc was also product sponsor of Product 10061 at the same time (91.06.03.17.00.00). This product relates again to the market of stock indices. The maturity date for Product 10061 is 96.06.03.17.00.00.00. The sub-market is the PTSE 75 stock index. The consideration for a specific contract involving Product 10061 is in the form of money (commercial bank deposits denominated in Australian dollars). The entitlement is also in the form of commercial bank deposits denominated in Australian dollars, payable immediately after the product's specified maturity date/time.

Looking at the third step in the timeline, Potential Counterparty Product Pricing Specifications, one can find two entities, Abrahamsons and Carpenters Inc, acting as potential counterparties for forthcoming primary product orders dealing with Product 10061. At this point in the timeline (95.01.01.17.00.00.00), 43 months after the specification of Product 10061, both Abrahamsons and Carpenters Inc have currently-specified parameters for pricing potentially forthcoming orders for the product.

Figure 75:
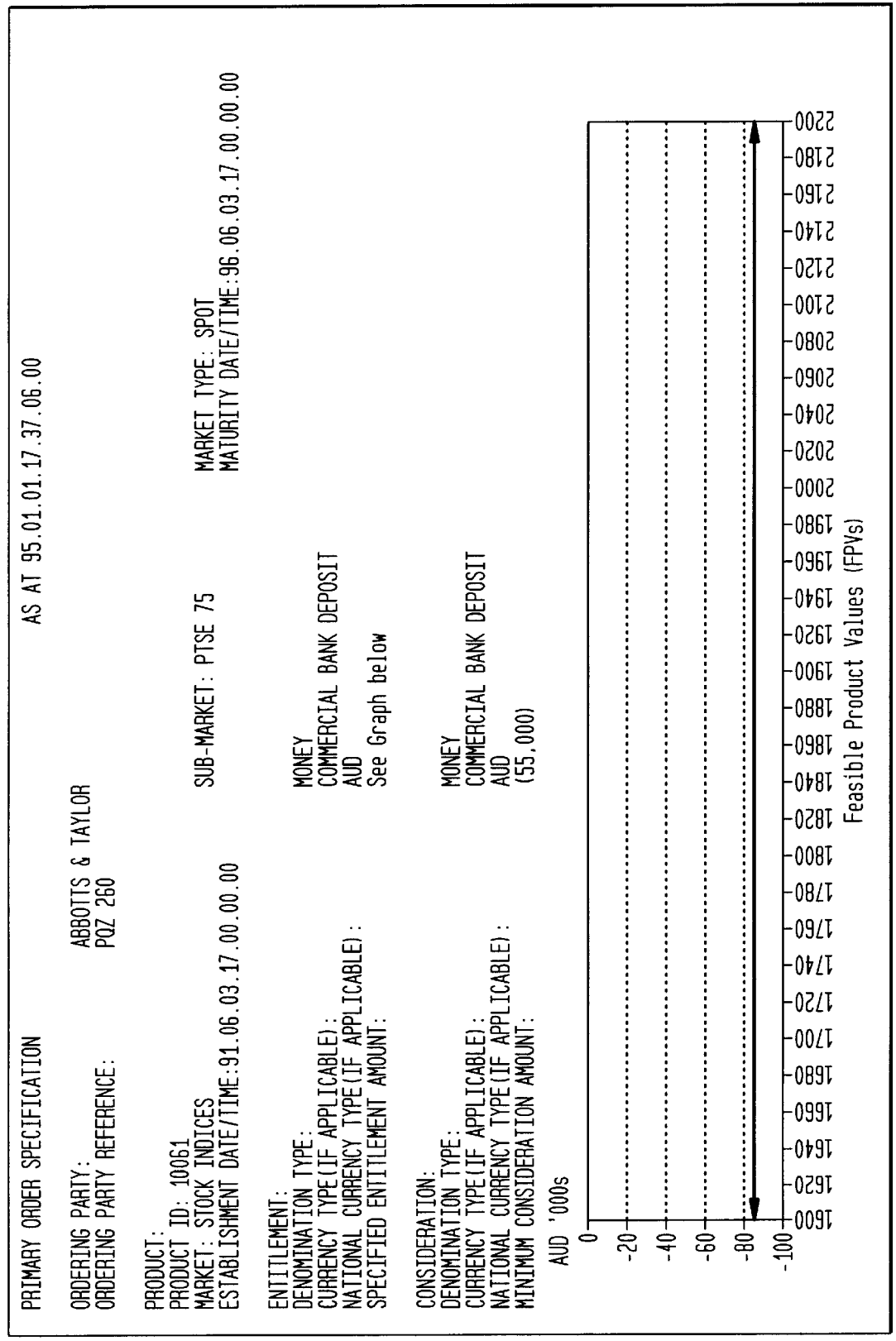

Looking at the fourth step in the timeline, Primary Order Specification, in conjunction with FIG. 75, it can be seen that Abbotts & Taylor is seeking a contract in Product 10061 at that time (95.01.01.17.37.06.00). FIG. 75 shows the specific parameters that Abbotts & Taylor has defined for the contract it is seeking at this time, namely $A 83,830 for any feasible product value including a minimum acceptable contract consideration amount of ($A 55,000). The parentheses indicate that the consideration is negative. The calculated counter consideration ($\geq$$A 55,000) will be paid by the counterparty to Abbotts & Taylor immediately after contract matching.

Looking at the fifth step in the timeline, Order Specification Pricing, in conjunction with FIGS. 76A and 76B, it can be seen that Abrahamsons (using the specified pricing parameters set at 95.01.01.17.37.06.00) prices the Abbotts & Taylor order at 95.01.01.17.38.02.00. Abrahamsons' pricing parameters, indicated by their defined circumstances ID of 31, require a commission rate of 1.25% and a discount rate of 10.00% pa. A particular set of component product prices together with a particular set of assessed probabilities of occurrence are specified. This results in a counter consideration of ($A 58,710), which Abrahamsons' parameters calculate will yield them a base margin on the contract of $A 1,980.

Still looking at the fifth step in the timeline, in conjunction with FIGS. 77A and 77B, it can be seen that Carpenters Inc (again using the specified pricing parameters set at 95.01.01.17.37.06.00) also prices the Abbotts & Taylor order at 95.01.01.17.38.02.00. Carpenters Inc's pricing parameters, indicated by their defined circumstances ID of 19, require a commission rate of 1.30% and a discount rate of 9.8% pa. A particular set of component product prices and a particular set of assessed probabilities of occurrence are specified. This results in a contract bid price of ($A 58,640), which Carpenters Inc's parameters calculate will yield them a base margin on the contract of $1,990.

Looking at the sixth step in the timeline, Primary Order Matching, it can be found that Abrahamsons' price bid of ($A 58,710) is above Carpenters Inc's bid of ($A 58,640) and above Abbotts & Taylor's specified minimum consideration price of ($A 55,000). This leads to a formal matching of Abbotts & Taylor's order by Abrahamsons at 95.01.01.17.38.07.00. Before the matching formally occurs, a check is made that absolute loss, expected loss, expected value and portfolio attribute limits are not violated.

The seventh step in the timeline, Contact Maturity, refers to the actual determination of the product value at time of maturity, 96.06.03.17.00.00.00.

The eighth step in the timeline involves the formal payment of $A 83,830 by Abbotts & Taylor to Abrahamsons.

The example just described can also be thought of as a case where the market is irrelevant, and therefore there is no minimum or maximum product definition value nor product step value. This equates to there being no future outcome, rather simply a known specified entitlement that is not dependent upon the outcome of any particular phenomenon. The mathematical representation of curves or lines no longer is relevant. The counterparty counter consideration thus becomes a function only of the discount rate, commission and (if applicable) entitlement exchange rate.

Life Cycle of Economic Management Contract:

EXAMPLE V

This embodiment relates to an economic management contract (based on a variation of Example IV) and describes the formulation of an immediate exchange contract involving an entitlement of a defined $US amount in return for a to-be-determined consideration denominated in commercial bank Australian dollars.

This example is a special case of the general case of Example II in that it is independent of the outcome of any particular phenomenon. It has only a single outcome for which a single entitlement is specified by the ordering party.

Unlike Example IV, however, this case also involves a unique notion of a contract maturity date/time. This is the notion of "as soon as possible after the date/time the transaction is originated by the ordering party", implying an immediate exchange. That is, the date of maturity is now.

In this example, the offering is one which provides a contract ordering party with a specified non-contingent entitlement to receive its desired $US currency amount ($US 70,000) as soon as possible after the ordering party specifies it is prepared to immediately pay not more than $A 102,900 (as a consideration) in exchange for this US currency.

In this example, the relevant key stakeholders are: an application promoter (BLC Inc); various product sponsors (the relevant one for the example being BLC Inc itself), various product ordering parties (the relevant ones for the example being Abbotts & Taylor), various potential counterparties (the relevant ones for the example being Abrahamsons and Carpenters Inc), a counterparty guarantor (CNZ Banking Corporation) and an application regulator (the Pacific Central Bank).

Figure 42:
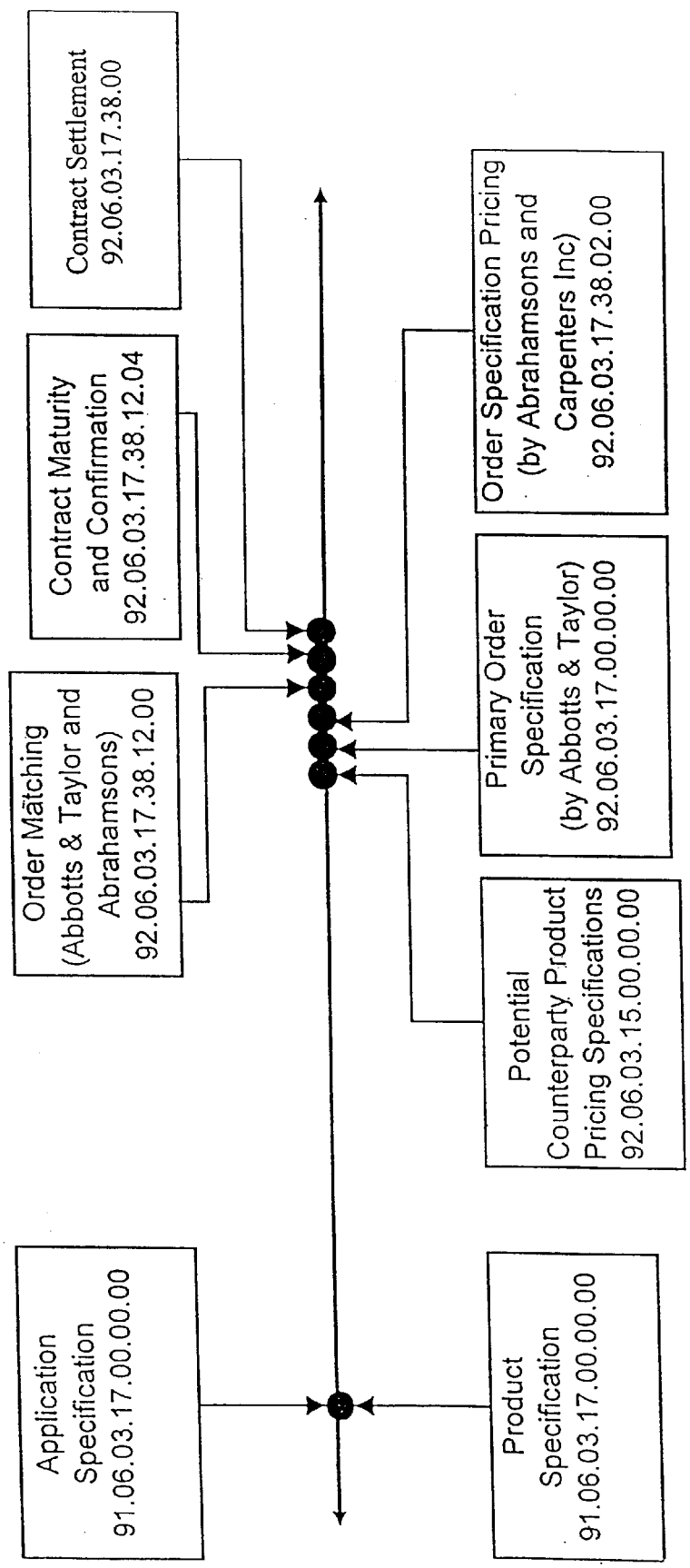
FIG. 42 shows a timeline for Example V.

The timeline depicting the steps in the contract from the first step, Application Specification, to the final step, Contract Settlement, is shown in FIG. 42, and are supported by FIGS. 78–82B.

Looking at the first step in the timeline, Application Specification, in conjunction with FIG. 78, we see that BLC Inc established a contract APP (Application ID 201) on 91.06.03.17.00.00 (that is, 5 pm on Jun. 3, 1991) to deal with economic risk management. The application involves a pricing and matching objective function of: "maximize pre-tax consideration/entitlement exchange rate". Application ID 201 supports a range of products.

Looking at the second step in the timeline, Product Specification, in conjunction with FIG. 79, we see that BLC Inc was also product sponsor of Product 11099 at the same time (91.06.03.17.00.00). This product relates to the market of immediate exchange. The maturity date for Product 11099 is "as soon as possible after transaction initiation". The consideration for a specific contract involving Product 11099 is commercial bank deposits denominated in Australian dollars. The entitlement is in the form of commercial bank deposits denominated in US dollars, payable immediately after the product's specified maturity date/time (that is, as soon as possible after transaction initiation).

Looking at the third step in the timeline, Potential Counterparty Product Pricing Specifications, two entities, Abrahamsons and Carpenters Inc, are potential counterparties for forthcoming primary product orders dealing with Product 11099. At this point in the timeline (92.06.03.15.00.00.00), 12 months after the specification of Product 11099, both Abrahamsons and Carpenters Inc have currently-specified parameters for pricing potentially forthcoming orders for the product.

Looking at the fourth step in the timeline, Primary Order Specification, in conjunction with FIG. 80, it can be seen that an ordering party, Abbotts & Taylor, is seeking a contract from an offering party in Product 11099 at that time (92.06.03.17.00.00.00). FIG. 80 shows the specific parameters that Abbotts & Taylor has defined for the contract it is seeking at this time, including a maximum exchange (consideration) amount of ($A 102,900) and a defined $US 70,000 entitlement.

Looking at the fifth step in the timeline, Order Specification Pricing, in conjunction with FIGS. 81A and 81B, it can be seen that the system determines that the counter consideration amount Abrahamsons judge to be ideal given their specified parameters is $A 94,500. This occurs at 92.06.03.17.38.02.00. Abrahamsons' pricing parameters specify an exchange rate of 0.75, a commission rate of 1.25% and a single assessed probability of occurrence of one (1) (discount rate and component product prices being irrelevant in this example). The counter consideration of $A 94,500 is lower than Abbotts & Taylor's specified maximum consideration amount of $A 102,900.

Still looking at the fifth step in the timeline, in conjunction with FIGS. 82A and 82B, the system determines that the counter consideration amount Carpenters Inc judge to be ideal given their specified parameters is $A 101,300. Carpenters Inc's pricing parameters imply an exchange rate of 0.70, a commission rate of 1.30% and a single assessed probability of occurrence of one (1) (discount rate and component product prices again being irrelevant).

Looking at the sixth step in the timeline, Order Matching, it can be found that the system assesses Abrahamsons' to be superior to that of Carpenter Inc and below Abbotts & Taylor's maximum consideration. This leads to a formal matching of Abbotts & Taylor's order by Abrahamsons' at 92.06.03.17.38.12.00. Matching coincides in time with maturity, and very shortly thereafter there is the transfer of $A 94,500 from Abrahamsons to Abbotts & Taylor and a corresponding transfer of $US 70,000 from Abrahamsons to Abbotts & Taylor. This then represent finalisation of the transaction, including all the transfers involved at the date/time of maturity of other contract types.

A further embodiment, relevant to each of the embodiments of Examples III to V above, involves the order pricing procedure as before, followed by a step of obligating the ordering party with the would-be matched counterparty for a period of time before the match is formally made. As before, the consideration can be payable immediately upon match or deferred for a time (even up until maturity), and the date of maturity can be at a future time from matching (or even immediately upon match). The period of obligation can be specified by the promoter stakeholder, and thus be known to the ordering party and the registering counterparties. The period of obligation thus enables parties to contract to future contingent contracts (in the case of Examples I and IV) or future exchange (in the case of Example V).

7. Description of Consideration/Entitlement Payment Process

The purpose of the CONTRACT APP consideration/entitlement (and related transactions) payment/receipt process is to effect debits and credits to INVENTCO stakeholder accounts, typically at maturity of a contract, with participating consideration/entitlement transfer (or exchange) entities, reflecting payment/receipt entitlements and obligations originated within INVENTCO. The process effects these payments/receipts in a two-stage process. First, by debiting/crediting, on a real-time basis, the relevant shadow records (in the data file PAYACC SHADOW) of the applicable stakeholder accounts with a participating consideration/entitlement transfer entity (C/E entity), external to INVENTCO, with which they maintain an account. And second, by periodically effecting, via existing and potential payment mechanisms, corresponding payment instructions to the payment entities concerned. Details of the above-described mechanism are as follows.

All INVENTCO stakeholders maintain (a minimum of) two special-purpose (net-credit balance only) accounts with (at least) one selected, VIRPRO authorised, C/E transfer entity. The purpose of special-purpose accounts is to ensure that only INVENTCO-initiated debits and credits are capable of being effected to the accounts. Thus, at any time the balance of each PAYACC SHADOW file account record should be equivalent to the true, but usually unknown, time-of-day balance of the actual account maintained by the C/E transfer entity.

The purpose of two accounts is to enable only credits to be effected through one account and only debits through another account. And the purpose of "net-credit balance only" accounts is to ensure that accumulated debits to the debits-only account never exceed the account opening balance plus accumulated credits to the credits-only account.

C/E transfer entities will typically be (but do not need to be) institutions of any/all of six types: public/private record-registries of various types; credit card companies (typically for retail transactions only); commercial banks; central banks; taxation authorities; and non-bank clearing houses and depositories.

The resources transferred by these entities may be of any type. However, most typically, they will be deposits appropriate for the entity concerned: With respect to public/private record-registries—entitlement deposits (including shares in financial or physical assets, participation rights in wagers, and so on). With respect to credit/debit card companies—normal card company deposits (denominated in national currencies or synthetic currencies (for example, SDRs)). With respect to commercial banks—normal bank deposits (denominated in national currencies or synthetic currencies (for example, SDRs)). With respect to central banks—exchange settlement account (or equivalent) deposits. With respect to taxation authorities—taxation account deposits. And with respect to non-bank clearing houses and depositories—deposits of financial instruments, precious metals and the like. CONTRACT APP potential counterparties will also effectively be C/E transfer entities, as will ordering party guarantors (external to INVENTCO) where they offer credit to product ordering parties. Also, some accounts will be trust accounts maintained on behalf of potential counterparties (and some product ordering parties) involved in applications requiring the periodic payment of collateral to independent third parties to serve as an additional security device.

Immediately after the completion of its daily—or more frequent—transaction processing, and their associated settlement functions, each C/E transfer entity electronically notifies the applicable CONTRACT APP of the "opening balances" of all the debit and credit INVENTCO accounts it maintains (At this stage, the debit account balance should be zero and the credit account balance should be greater than or equal to zero). Where an INVENTCO stakeholder has an overdraft or line-of-credit with its C/E transfer entity, the credit value of this will be reflected in the non-zero balance of its credit account at this time.

Upon receipt of the above-described notifications, the applicable CONTRACT APP updates/confirms its stakeholder shadow balances. Thus, at this point-in-time, all credit and debit shadow account balances should be equivalent to their actual debit and credit account balances.

Progressively throughout the day (where "day" here is likely to be different for each C/E transfer entity due to a combination of differences in the time-zone locations of payment entities in relation to the applicable CONTRACT APP, and the likely different account processing cycles of these entities), INVENTCO-stakeholder—authorised debits and credits to INVENTCO stakeholder shadow accounts are effected on a real-time basis—debits to debit accounts and credits to credit accounts. At all times, the CONTRACT APP ensures that the cumulative debit balance of each stakeholder's debits account does not exceed the "opening balance" plus the cumulative credit balance of the stakeholder's credit account. Thus, at any time, for every INVENTCO stakeholder, the combination of each stakeholder's debit account and credit account will represent the "true", net, time-of-day value of the stakeholder's two actual special-purpose accounts maintained external to INVENTCO.

Debits and credits to INVENTCO stakeholder accounts are effected according to strict rules and conditions, being different for credits and debits. Credits can be made to any INVENTCO stakeholder's credit account with its nominated C/E transfer entity by any other INVENTCO stakeholder for any reason. Naturally, as INVENTCO stakeholders will not know the account details of other stakeholders, such credits will be effected either automatically, according to information and rules known by the applicable CONTRACT APP, or semi-automatically by way of an INVENTCO stakeholder requesting from VIRPRO, as they need to do so, a credit-account number of the stakeholder to which they wish to transfer assets. This account number may only be valid for a nominated period and would not typically be the specified stakeholder's actual account number with its nominated consideration/entitlement transfer entity—it would only be a reference to an INVENTCO file containing this number.

On the other hand, debits can only be made to an INVENTCO stakeholder's debit account with its nominated C/E transfer entity by the stakeholder itself, and by other stakeholders explicitly granted this right by each stakeholder, subject to these other stakeholders exercising this right according to the rules and conditions specified for them.

Where an INVENTCO stakeholder seeks to initiate/authorise debits to its nominated account(s) on its own, this can only be done through the stakeholder satisfactorily completing the identification and security procedures set down by their C/E consideration/entitlement transfer entity (and reflected in VIRPRO-specified INVENTCO communication procedures). The type of procedure set down by all participating C/E transfer entities involves (at least) the following: First, the consideration/entitlement transfer entity supplying VIRPRO with a confidential file of account Pin numbers corresponding to each of its INVENTCO stakeholder debit accounts, and a similarly confidential "black box" which, by initiating any of a number of possible proprietary password request-response processes involving any one of its customers possessing the appropriate device (s), confirms that remote messages received from that customer, and processed by the "black box", are authentic. Second, the consideration/entitlement transfer entity supplying their INVENTCO customers with a programmable smart card (or equivalent device) enabling each customer, remotely—via telephone or direct computer line, to unambiguously confirm their identity with their INVENTCO-maintained account, thereby having the capability to authorise debits to their account within predefined parameters concerning factors such as maximum transaction amounts, possible transaction types, account usage patterns and so on. Third, INVENTCO providing the mechanisms for direct, confidential, stakeholder communications with their C/E transfer entity shadow debit accounts, and the formal updating of these accounts, through non real-time processes, utilizing the unique time-stamped reference numbers created as/when stakeholders authorise access to their account records.

Where an INVENTCO stakeholder has authorised other INVENTCO stakeholders to initiate debits to (any of) its nominated account(s) according to a standing authority of some type, this can only be done through the authorised stakeholder itself satisfactorily completing the identification and security procedures set down by the authorisation-granting stakeholder's nominated C/E transfer entity (and reflected in VIRPRO-specified INVENTCO communication procedures). Once again, the type of procedure, set down by all participating C/E transfer entities in this respect, involves (at least) the following: First, the C/E transfer entity supplying VIRPRO with a confidential file of account Pin numbers corresponding to each of its INVENTCO stakeholder debit accounts and each other INVENTCO stakeholder which has been authorised to effect debits (within defined parameters) to these accounts. Second, the C/E transfer entity supplying VIRPRO with a similarly confidential black box which, by initiating any of a number of possible proprietary password request-response processes involving an entity nominated by any of its customers possessing the appropriate device(s), confirms that remote messages received from that authorised entity, and processed by the black box, are authentic. Third, the C/E transfer entity supplying their INVENTCO customers with a collection of programmable smart cards (or equivalent devices), for distribution to these authorised entities, enabling each authorised entity, remotely—via telephone or direct computer line—to unambiguously confirm their identity with the customer's PAYACC SHADOW account, thereby having the capability to authorise debits to this account (again, within predefined parameters concerning factors such as maximum transaction amounts, possible transaction types, account usage patterns and so on). And four, INVENTCO providing the mechanisms for direct, confidential, authorised stakeholder communications with a stakeholder's C/E transfer entity shadow debit account(s).

At the end of each C/E transfer entity's specified day (or part of a day), the applicable CONTRACT APP transfers (at least) two things to the entity: First, if required, a series of figures representing the exchange settlement (or equivalent) accounting entries it has or will communicate to the C/E transfer entity's appropriate clearing authority (for each of the applicable consideration/entitlement denomination, currency and national currency types of the payments/receipts involved) where these figures represent the balancing net debit or credit figure corresponding to the aggregation of all of the entity's INVENTCO customer transactions in the prior day. And second, a detailed file of all customer transactions effected during the day (corresponding, if required, to the above-described net figures). Upon their receipt of these transactions and summary figures, the C/E transfer entity then debits/credits each transaction to the appropriate actual customer accounts, enabling new "closing" account balances to be calculated (these "closing" balances should be exactly the same as the end-of-day balances commumicated by the applicable CONTRACT APPS with it's file of customer transactions). In turn, these "closing balances" become the C/E transfer entity's account "opening balances" for the next day. The CONTRACT APPS notification process then repeats itself.

Where applicable, at days-end for the "clearing house" of clusters of like C/E transfer entities (for example, a national central bank), CONTRACT APP transfers netted exchange settlement accounting entries to the clearing houses concerned. These entries serve to "balance the individual customer account entries transferred to each associated C/E transfer entity individually.

8. INDUSTRIAL APPLICABILITY

The invention has industrial application in the use of electrical computing devices and data communications. The apparatus and methods described allow the management of risk in an automated manner by means of programming of the computing devices. The types of events associated with the risk management apparatus and methodologies includes physical and technical phenomena, and therefore have value in the field of economic endeavour.

Glossary of Key Terms
  Alpha (X)
    The Ordering party-specified event value corresponding to the Xth future product event value contract entitlement payoff (payout) inflection point.
  Application Promoter
    An entity authorised by VIRPRO that specifies and administers defined rules and regulations underlying a defined CONTRACT APP—including the specific products offered for trading; categories of, and conditions of involvement, of stakeholders; nature of involvement and dispute resolution procedures of stakeholders.
  Automatic/Manual Deal and No Deal Flags
    Indicators notified by each stakeholder to CONTRACT APP specifying the manner in which that stakeholder wishes to deal with each other stakeholder.
  AXSCO
    A communications co-ordination and security system, linked to all stakeholders and component applications.
  Base Pricing Probabilities
    The prices set by sellers for unit entitlement payoffs of a contract at each of its possible future index values denominated in the contract's formally specified consideration/entitlement, currency and national currency.
  Beta (X)
    The Ordering party-specified desired entitlement payoff (payout) amount in the desired currency denomination of contract entitlement payout (payoff) and national currency denomination of contract entitlement payout (payoff) corresponding to the Xth event value inflection point.
  Bilateral Obligations Netting Indicator
    An indicator that individual 'rolling' net present values of future payment/receipt commitments to/from all pairs of participating stakeholders are to be netted.
  Bilateral Payments Netting Indicator
    An indicator that individual end-of-day gross payments/receipts to/from all pairs of participating INVENTCO stakeholders are to be netted.
  Commission Rate
    The minimum required percentage profit margin required by a Potential Counterparty above the "breakeven" bid price for an Ordering party purchase order.
  Consideration/Entitlement Transfer Entity
    An entity acceptable to VIRPRO and the Application Promoter, satisfying defined minimum standards of financial strength, credit standing and integrity, able to maintain Consideration/entitlement accounts on behalf of stakeholders and effect transfers of those assets as directed.
  CONTRACT APP Stakeholder Types
    Expected stakeholder types are Application Promoter, Product Sponsor, Product Ordering party, Counterparty, Counterparty-Guarantor, Regulator, Consideration/entitlement Transfer Entities and Miscellaneous other parties.
  Contract and Product "Absolute Loss" Limit
    A value limit specified by a potential counterparty of the maximum absolute loss it is prepared to sustain on a contract/product irrespective of the assessment of the likelihood of any particular level of possible loss being incurred.
  Contract and Product "Expected Loss" Limit
    A value limit specified by a potential counterparty of the maximum expected loss it is prepared to sustain on a contract/product based on the counterparty's assessment of the likelihood of all levels of possible loss being incurred.

Contract Authorisation

A process of verifying that an Ordering Party product purchase order contains data appropriate to the product being sought and that the Ordering Party is accurately identified and credential led.

Contract Collateralisation Indicator

A descriptor set by the Application Promoter specifying whether and on what basis, counterparties may be required to periodically transfer assets/monies (collateral) to an independent trust fund to ensure they will be able to meet their potential entitlement payoff obligations on the maturity date of a contract.

Contract Confirmation

The process of securing the positive agreement of all affected stakeholders to a purchase order, including acknowledgement by the relevant Consideration/entitlement transfer entity of the Ordering party's ability to pay the required product consideration and fees, either automatically or through manual approvals.

Contract Matching

See Ordering party/Potential counterparty matching process.

Contractual Obligation
  a. A binding commitment one entity (or group of entities) has to provide products or services or information to another entity (or group of entities) in exchange for an agreed quantity of other products, services or information.
  b. A binding commitment all entities have to the network and general management system entity VIRPRO and thus to each other, to accept constraints on their activities imposed by other authorised entities on terms specified and agreed to by them as a condition of their participation in one or more of the component systems.

Contract Portfolio Netting

A term used to describe the process of "setting-off" or "netting", the future payment entitlement obligations between Ordering parties and Counterparties, either bi-laterally or multi-laterally.

Currency and National Currency Exchange Rates

The rates used to convert contract consideration/entitlement currency and national currency requirements into the product's consideration/entitlement currency and national currency denomination.

Deal Flag

An indicator or "flag" notified to CONTRACT APP signifying that the stakeholder is satisfied to deal unreservedly with the stakeholder against whom the flag has been set.

Defined Circumstances

The possible combinations of the categories of product-order information provided by Ordering parties.

Defined Probability Distributions

A set of pricing probability parameters specified by an Ordering party and including at least, a probability distribution type identifier, the expected value of the distribution, the standard deviation of the distribution and a probability distribution adjustment value or function.

Desired Currency Denomination of Contract Entitlement

A term indicating the currency in which an Ordering party wishes to receive potential entitlement payments from the sought contract.

Desired Currency Denomination of Consideration Payment

A term indicating the currency in which an Ordering party wishes to pay the required consideration for the contract sought.

Desired National Currency Denomination of Contract Entitlement

A term indicating the National currency in which an Ordering party wishes to receive potential entitlement payments from the sought contract.

Desired National Currency Denomination of Consideration Payment

A term indicating the National currency in which the Ordering party wishes to pay the required consideration for the contract being sought.

Discount Rate

The rate used to determine the present value of a potential counterparty's expected future entitlements.

Entitlement

The payout expected by the offering party at maturity as specified for each outcome in the range of outcomes. The payout can be both positive and negative in value over the range of outcomes, and can be in the form of money or other non-money types of goods, services, promises, credits or warrants.

EV-CE Pricing

A price discovery mechanism for primary contracts meaning "expected value certainty equivalent pricing" being the calculated expected present value or future value of the contract.

Expected Value

A function in EV-CE pricing which means the sum of the products of all possible contract entitlement payoff/payout amounts and the Ordering party's/Counterparty's assessment of the probability of occurrence of the future events which would contractually give rise to these entitlement payoff amounts.

Expected Value Limits on a Counterparty's Aggregate Product Portfolio

Optional value limits specified by a Potential counterparty at any one time, where time can be specified in terms including "equivalent maturity date"; "same-month maturity date" and "all possible maturity dates" including product expected loss limits and maximum (and possibly minimum) proportion of the expected total loss of the aggregate of the Counterparty's product portfolio that can be accounted for by the expected loss on the individual contract/product.

Gamma(X)

The Ordering party-specified desired shape of the function between each of the coordinates Alpha(1), Beta(1) and Alpha(2), Beta(2) and so on; such that Gamma can represent all possible mathematically definable shapes.

I-INVENTCO

The infrastructure component of INVENTCO.

INVENTCO

A collection of one or more (potentially interrelated) systems, where each system is the combination of a telecommunications, computing and other forms of infrastructure, and a variety of markets and support services distributed by this infrastructure.

M-INVENTCO

A depository of VIRPRO authorised "markets" application software.

Manual Deal Flag

An indicator or "flag" notified to CONTRACT APP by a stakeholder signifying that the stakeholder wishes to manually approve a transaction involving the other stakeholder against whom the flag has been set.

Multilateral Payments Netting Indicator

An indicator that individual end-of-day gross payments/receipts to/from all participating stakeholders from/to a specified third party trustee/clearing entity are to be netted.

Multilateral Obligations Netting Indicator

An indicator that individual 'rolling' net present values of future payment/receipt commitments to/from all participating stakeholders from/to a third party trustee/clearing entity are to be netted.

Negative Contract Payoffs

A type of contract in which the contract Ordering party may have a contingent payoff to the contract's Potential counterparty (i.e. the reverse of a normal contract).

No Deal Flag

An indicator or "flag" notified to a CONTRACT APP by a stakeholder signifying that the stakeholder does not wish to deal in any way with the other stakeholder against whom the flag has been set.

Ordering Party Contingent Claims Function

Specifications of a product payoff or a mathematical function to calculate an Ordering party's product payoff requirement.

Portfolio Product "Expected Loss" Limit

A value limit, specified by a potential Counterparty, of the maximum expected loss the potential Counterparty is prepared to sustain on its product portfolio based on the Counterparty's assessment of the likelihood of all levels of possible loss being incurred.

Product Ordering Party

An entity acceptable to VIRPRO and the Application Promoter, interested in and able to acquire a CONTRACT APP product.

Product Establishment Date/Time

The date/time an Application Promoter first offers a defined product for trading.

Product Future Event Value "Density" Indicator

An indicator specifying the number of intermediate points between the minimum and maximum future event product definition values specified for the product by the Application Promoter/Product Sponsor.

Product Event Value "Width" Indicator

An indicator specifying the range (minimum–maximum) of future event values accommodated by the product as set by the Application Promoter/Product Sponsor.

Product Future Event Value

A term used to indicate the actual value of a defined product at its date/time of maturity.

Product Maturity Date/Time

The date-time at which the Application Promoter is required to make a determination of the actual event value to enable entitlement and related payoffs on successful contracts.

Product Price Quote Requests

A type of product purchase order for which the matching process is terminated and the result communicated to the Ordering party, when a desired price bid or range of price bids has been obtained.

Product Purchase Orders

Specific product purchase orders for which the Ordering party is seeking a potential Counterparty match, which may be of three types: automatic orders; manual orders and "hide" orders.

Product Purchase Order Withdrawals

Ordering party-initiated requests to withdraw from processing pre-submitted but as yet unconfirmed product purchase orders.

Product Potential Counterparty

An entity acceptable to VIRPRO and the Application Promoter, exceeding a defined minimum standard of financial strength, credit standing and integrity, offering defined CONTRACT APP products to product Ordering parties.

Product Sponsor

An entity acceptable to VIRPRO and the Application Promoter, having responsibility for detailed definition of product parameters including the continual determination of product values over time.

Regulator

An entity acceptable to VIRPRO having local, state, national or international jurisdiction over one or more CONTRACT APPS.

Set of Pricing Probabilities

The range of probabilities a potential Counterparty applies to a class of Ordering party order, specified by the value of "defined circumstances" and applying to every feasible future product event defined for that product by an Application Promoter.

Stakeholder

An entity that is a registered participant in one or more of INVENTCO's component parts.

Value Dates

The respective dates/times at which matched contract consideration and entitlements are agreed to be made by the relevant Ordering party/Counterparty to a contract.

VIRPRO

The network and general management system component of INVENTCO.

"X"

A term indicating the number of contract payoff (payout) inflection points the Ordering party is seeking within the allowable range of future product event values (including the value range extremity points).

CONTRACT APPS

Overview

CONTRACT APPS is a term used to refer to certain types of units of applications software which can, but do not need to, reside within an INVENTCO system's (M-INVENTCO) depository of "markets" software. The purpose of individual CONTRACT APPS is two-fold: First, to effect the trading/exchange/transfer of risk aversion transactions (and derivatives of these transactions) between participating ordering parties and counterparties on terms acceptable to the parties involved as well as to others within INVENTCO registered as having a legitimate interest in the nature, size and composition of these trades/exchanges/transfers. And second, to appropriately manage all matched/confirmed contracts through to their time of maturity, including their ultimate settlement.

Individual CONTRACT APPS perform theses tasks according to the specific rules they embody, defined by their own stakeholders. CONTRACT APPS effectively reside upon AXSCO and within M-INVENTCO.

Stakeholder Types

CONTRACT APPS accommodate eight (and potentially fewer) generic types of their "own" stakeholders (as distinct from other INVENTCO stakeholders) termed: application promoter, product sponsors, product ordering parties, potential product counterparties, counterparty-guarantors, regulators, consideration/entitlement transfer entities, and other miscellaneous parties.

Some details of these stakeholders are as as follows: an application promoter is an entity having overall responsibility for the functioning of a CONTRACT APP (that responsibility having been granted by VIRPRO); a product sponsor is an entity which promotes and administers the rules of trading, and subsequent management, of defined contingent claims contracting product(s) selected for inclusion in a CONTRACT APP by its application promoter; a product ordering party is an entity seeking to acquire a CONTRACT APP product from a potential product counterparty (where a product ordering party can also be a product counterparty); a potential product counterparty is an entity potentially prepared to satisfy the CONTRACT APP product needs of a product ordering party (where a potential product counterparty can also be a product ordering party); a counterparty-guarantor is an entity guaranteeing a product counterparty's ability to settle any/all of its potential entitlement transfer obligations to a product ordering party to which it has become a counterparty as a result of a CONTRACT APP effected "match"; regulators are entities overseeing the on-going performance of all other stakeholders involved in a CONTRACT APP, especially counterparty-guarantors; consideration/entitlement transfer entities are entities with which all other CONTRACT APP stakeholders maintain "accounts" to transfer required considerations/entitlements to/from all each other; and miscellaneous parties are all other entities having a defined stake in the functioning of a CONTRACT APP.

Miscellaneous parties include: independent entities contracted by application promoters or product sponsors to formally determine the "value" of products on their date-of-maturity; multilateral obligations and payment netting trustee/clearing entity organisations; independent (non-regulator) taxation and other governmental authorities; electronic "gateway" providers (external to INVENTCO); and host system organizations (in the case of CONTRACT APPS within INVENTCO systems linked to a common host system). CONTRACT APPS accommodate any number of their own stakeholders of each of the above-defined generic types.

Product Types

CONTRACT APPS can support risk aversion contract "product types" with any combination of values of multiple attributes, including: the fundamental nature/purpose of the product; the establishment/maturity date/time of the product; the consideration/entitlement denomination type, currency (if applicable), and national currency (if applicable) consideration/entitlement identifiers associated with the product; the "width" and "density" identifiers of possible future event values of the product; and miscellaneous other product descriptors.

The "fundamental nature/purpose of the product" attribute may incorporate identifiers including: a conditional entitlement-payoff dimensioins identifier; a market identifier; a sub-market identifier; and a market-type identifier. The "conditional entitlement-payoff dimensions identifier" specifies the number of dimensions to an ordering party's sought-after conditional entitlement-payoffs. The market identifier specifies whether the product relates to an "actual" or "perceived" phenomenon (or phenomena), the number of such phenomena (if applicable), and the applicable phenomenon category (for example, industrial, scientific, financial market hedging, and so on). The sub-market identifier provides a more specific description of the product concerned. The market-type identifier specifies the applicable future period date/time (where this can be anything—for example, "at a defined contract maturity date/time", "at a specified time on or before contract maturity date/time", and so on), and type-of-future event involved (where, again, this can be anything—for example, as an indicator of some relative value of a phenomenon (spot value, average value and so on), or as an indicator of the "rate-of-change" of some value of a phenomenon.

The "establishment and maturity date/time of the product" attribute specifies, respectively, the date/time an application promoter first offered a product for trading, and the date/time at which the defined product matures (that is, the date/time at which the product sponsor is required to make a determination of the actual event value at that date/time so enabling contract entitlement transfers to be effected).

The "consideration/entitlement denomination type, currency (if applicable), and national currency (if applicable) consideration/entitlement identifiers associated with the product" attribute specify: the type of consideration/entitlement involved (where this can include rights and entitlements, physical assets, and "money" of all possible types); in the case of a "money" consideration/entitlement type, the currency of the consideration/entitlement (where such currency types can include: public/private record-depository deposits, commercial credit card company deposits, commercial bank deposits, central bank deposits, taxation authority deposits, and deposits in non-bank clearing houses and depositories, and the like); and, again, in the case of a "money" consideration/entitlement type, the national currency of the consideration/entitlement identifier (where such national currency types can be in any national currency, or form of synthetic currency).

The "width and density identifiers of possible future event values of the product" attribute specifies, respectively: the minimum and maximum values of the allowable range of future event values accommodated by a product; and the number of intermediate points between the defined minimum and maximum future event values accommodated by the product.

The "miscellaneous other product descriptors" attribute specifies such things as: the degree of stakeholder access granted the product by the application promoter in question; the forms of trading-services granted the product by the application promoter in question (where this product attribute specifies the accessibility of the product to a range of feasible "stakeholder services" with respect to such things as contract portfolio netting, contract collateralisation, consideration credit provision, ordering party ability to specify negative contract entitlements, and availability of secondary/derivative market product trading); and the degrees of trading, clearing and settlement "transparency" granted the product by the application promoter in question.

Transaction Types

A range of primary, secondary, derivative-primary, and derivative-secondary risk aversion contract transactions are accommodated by CONTRACT APPS.

The range of "primary" (and derivative-primary (options, for example)) risk aversion Contract transaction-types (handled principally by Processes 2 and 4) include: ordering party product orders (and option orders) for which the ordering party is seeking a counterparty "match", ordering-part), price quote (and options price quote) requests; and ordering-party withdrawals of existing product orders (and withdrawal of options on product orders). Ordering party product orders consist of: automatic orders and manual orders. Automatic orders consist of: normal automatic orders (being orders the ordering party is prepared to have matched automatically, subject only to the constraints defined in the ordering party's order, in addition to whatever "match" constraints other CONTRACT APP stakeholders have prespecified); and anonymous-automatic orders (being orders the ordering party is prepared to have matched automatically, subject to the constraints defined in the ordering party's order, in addition to whatever "match" constraints other CONTRACT APP stakeholders have prespecified, provided that no CONTRACT APP stakeholder has sought to manually authorise the transaction and, through so doing, being able to potentially identify the ordering party). Manual orders consist of normal-manual orders (being orders the ordering party wishes to manually authorise before they are finalised—that is, after a counter-party "match" has been effected but before the contract has been "confirmed"—subject only to the constraints defined in the ordering party's order, in addition to whatever "match" constraints other CONTRACT APP stakeholders have respecified); and anonymous-manual orders (being orders the ordering party wishes to manually authorise before they are finalised—that is, after a counterparty "match" has been effected but before the contract has been "confirmed" subject to the constraints defined in the ordering party's order, in addition to whatever "match" constraints other CONTRACT APP stakeholders have respecified, provided that no CONTRACT APP stakeholder has also sought to manually authorise the transaction and, through so doing, potentially identify the ordering party).

The range of 'secondary' (and derivative-secondary (options, for example) risk aversion contract transaction-types (handled principally by Processes 3 and 5) include: acquiring party product orders (and option orders) for which the acquiring party is seeking to "acquire" the position of a specified "risk counterparty" stakeholder in an existing contract; acquiring-party product price indications (and option price indications); and acquiring-party withdrawals of existing product orders (and option withdrawals).

Acquiring party product orders for which the acquiring party is seeking to "acquire" the position of a specified "risk counterparty" stakeholder in an existing contract, consist of automatic orders and manual orders.

Automatic orders consist of: normal-automatic orders (being orders the acquiring party is prepared to have matched automatically, subject only to the constraints defined in the acquiring party's order, in addition to whatever "match" constraints other CONTRACT APP stakeholders have prespecified); and anonymous-automatic orders (being orders the acquiring party is prepared to have matched automatically, subject to the constraints defined in the acquiring party's order, in addition to whatever "match" constraints other CONTRACT APP stakeholders have prespecified, provided that no CONTRACT APP stakeholder has sought to manually authorise the transaction and, through so doing, being able to potentially identify the acquiring party).

Manual orders consist of normal-manual orders (being orders the acquiring party wishes to manually authorise before they are finalised—that is, after a "match" has been effected but before the contract "sale" is "confirmed"—subject only to the constraints defined in the acquiring party's order, in addition to whatever "match" constraints other CONTRACT APP stakeholders have prespecified); and anonymous-manual orders (being orders the acquiring party wishes to manually authorise before they are finalised—that is, after a "match" has been effected but before the contract "sale" is "confirmed"—subject to the constraints defined in the acquiring party's order, in addition to whatever "match" constraints other CONTRACT APP stakeholders have prespecified, provided that no CONTRACT APP stakeholder has also sought to manually authorise the transaction and, through so doing, potentially identify the acquiring party).

Primary Product Pricing Process Types

CONTRACT APPS enable potential counterparties to automatically establish "bids" on any defined (primary and derivative-primary) product order according to either an "expected value/utility-certainty equivalent" (EV/U-CE) pricing regime, or any other mathematically-definable pricing regime.

In the case of an "expected value-certainty equivalent" (EV-CE) pricing regime, each potential counterparty specifies, amongst other things: an indicator of certain defined attributes of an as-yet-unknown product order; a base commission rate; a base discount rate; (if applicable) a set of base consideration/entitlement denomination, currency, and national currency exchange rates; base unit product prices; and desired adjustments to the preceding base-bid-price determinants dependent on any specific order (submitted by a specified ordering party).

The above-described indicator of certain defined attributes of an as-yet-unknown product order (termed, defined circumstances) may reflect any combination of the multiple characteristics of an order (irrespective of the ordering party concerned), including: the multiple attributes of the contingent claims function sought; the ordering party's interest or otherwise in being granted credit by a counterparty; the ordering party's interest or otherwise in participating in the possible netting and collateralisation features of the APP; and the maximum (and possibly minimum) consideration amount the ordering party is prepared to pay for their defined product. The above-described base commission rate specifies the minimum required percentage profit margin required by the counterparty above their breakeven consideration bid price for a product order.

The above-described base discount rate determines the present value of the counterparty's expected future entitlement associated with a contract (net of the ordering party's consideration, and making allowance for the future income stream this consideration is expected to generate). The above-described set of base consideration/entitlement denomination, currency and national currency exchange rates are used, where applicable, to convert an ordering party's contract requirements into the base consideration/entitlement denomination, currency and national currency of the product so enabling the contract matching process to make like comparisons of counterparty bids for product orders.

The above-described base unit product prices are prices set by potential counterparties for unit entitlement-payoffs of a contract at each of its possible future values, denominated in the contract's formally specified consideration/entitlement type and, if applicable, currency type and national currency type (where these unit prices can be specified as directly input figures for every feasible future product event (the sum of which may or may not add to 1), or as parameters of defined mathematical functions). The above-described desired adjustments to the preceding base-bid-price determinants dependent on the specific ordering party submitting a specific order can include: a commission rate adjustment; a discount rate adjustment; a consideration/denomination exchange rate adjustment; a currency exchange rate adjustment; and a national currency exchange rate adjustment.

In the case of an "expected utility-certainty equivalent" (EU-CE) pricing regime, each potential counterparty specifies all of the above-described parameters applicable to a EV-CE pricing regime as well as "utility bench-mark" figures for all possible consideration and entitlement "payment amounts" which could, conceivably, be associated with a product/contract.

Primary Product Matching Process Types

CONTRACT APPS may similarly accommodate any of a number of possible (primary and derivative-primary) order matching processes where these processes can be of multiple types, including sequential processes and simultaneous processes.

Sequential order matching processes can be characterised according to the "sequence determining" and "matching" rules they embody, where "sequence" rules may be of various types: "last-in-first-out (LIFO)", "first-in-first-out" (FIFO)", priced priority, and so on; and matching rules may also be of various type—for example, a specific matching process could seek, for each product ordering party, a counterparty (or counterparties) offering a product price at or below the maximum price the ordering party is prepared to pay (where the determined contract price could be either the lowest price offered by a potential counterparty, the mid-point between the an ordering party's specified "maximum consideration amount" and the lowest price offered by a potential counterparty, and so on); or seek for each potential product counterparty an ordering party prepared to pay the maximum price above a price at which the counterparty is prepared to deal (here, the determined contract price could be either: the ordering party's "maximum consideration amount" price, the mid point between the minimum price the counterparty is prepared to receive and the ordering party's "maximum consideration amount" price, and so on).

Simultaneous order matching processes are those seeking some type of optimum solution according to pre-defined objectives. For example: "maximise the number of ordering party-counterparty matches"; "maximize the aggregate consideration and/or entitlement value of ordering party-counterparty matches"; or "minimize the value of a function specifying the sum of the differences (possibly weighted according to their perceived importance) between the actual and desired values of match attributes of ordering parties and counterparties".

Both of the above-described sequential and simultaneous matching processes can also accommodate conditional contract matching rules; and pre and post tax price optimisation mechanisms.

Application Types

CONTRACT APPS may be: "in-house" APPS or "public" APPS; "single potential counterparty" APPS or "multiple potential counterparty" APPS; APPS with differing degrees and forms of "regulator" oversight of other application stakeholders; and APPS with differing degrees and forms of "counterparty-guarantor" oversight of product potential counterparties.

CONTRACT APPS support consideration "payment" value dates being "immediate" (meaning exactly the time at which a contract match is confirmed); or deferred until a defined time in the future, measured in terms of seconds, minutes, hours, or days. Similarly, CONTRACT APPS support entitlement "payment" value dates being "immediate" (meaning exactly the time at which the applicable application promoter formally notifies other CONTRACT APP stakeholders of the "result" of a maturing contract); or deferred until a defined time after the "result" of a maturing contract is known.

CONTRACT APPS allow contracts to be modified and liquidated after their creation. Contracts can be modified through: direct negotiation by the relevant "risk counterparties" to a particular contract; or the purchase/sale of "derivative" secondary risk aversion contract transactions (See Process 5 description below). Contracts can be similarly liquidated after their creation through sale of the contract (within or outside INVENTCO); and through direct negotiation between the initial ordering party and counter-parties to the contract. They can also be effectively liquidated through the ordering party/counterparty acquiring a mirror image of the contract to which they are a party (within or outside of INVENTCO).

Post Order Process Types

CONTRACT APPS undertake various generic types of "post-order-process" management functions for all the above-described generic types of "transactions", including: a function which maintains a formal record of contractual commitments entered into by all CONTRACT APP stakeholders with one another, and with VIRPRO-authorised entities external to either the applicable CONTRACT APP or INVENTCO overall; a function which effects the independent valuation of consideration and entitlement obligations between CONTRACT APP stakeholders, and between CONTRACT APP stakeholders and VIRPRO-authorised entities external to each applicable CONTRACT APP; a function which determines and effects "collateralisation" consideration/entitlement transfers between CONTRACT APP stakeholders, and between CONTRACT APP stakeholders and VIRPRO-authorised entities external to each applicable CONTRACT APP, based on above-described valuations of consideration and entitlement obligations associated with CONTRACT APP transactions; a function which determines and effects, as required, the bi-lateral netting of accumulated "consideration/entitlement" obligations "between CONTRACT APP stakeholders, and between CONTRACT APP stakeholders and VIRPRO-authorised entities external to each applicable CONTRACT APP; a function which determines and effects, as required, the multilateral netting of accumulated "consideration/entitlement" obligations" between CONTRACT APP stakeholders, and between CONTRACT APP stakeholders and VIRPRO-authorised entities external to each applicable CONTRACT APP (involving a nominated third-party "clearing house" entity); a function which manages the processing, accounting, reporting, and entitlement "payment" tasks associated with maturing contracts; a function which determines system usage and access fees payable to/from all CONTRACT APP (and other INVENTCO) stakeholders, and to/from VIRPRO-authorised entities external to INVENTCO; a function which determines and effects, as required, "bi-laterally netted" consideration/entitlement transfers from/to CONTRACT APP stakeholders themselves, and from/to CONTRACT APP stakeholders and VIRPRO-authorised entities external to each applicable CONTRACT APP; a function which determines and effects, as required, "multi-laterally netted" consideration/entitlement transfers from/to CONTRACT APP stakeholders themselves, and from/to CONTRACT APP stakeholders and VIRPRO-authorised entities external to each applicable CONTRACT APP (involving a nominated third-party "clearing house" entity); and a function which compiles and distributes CONTRACT APP (and other INVENTCO) stakeholder customised information.

Supplementary Process Types

CONTRACT APPS undertake various other types of support processes, including: enabling stakeholders to transfer consideration, entitlement and other "payment" obligations to and from one another, independently of transfers initiated by CONTRACT APP transactions (See Process 7 description below); providing CONTRACT APP (and other INVENTCO) stakeholders with shared access to specialist systems to assist them to decide how best to interface with the multiple aspects of INVENTCO (See Process 8 description below); and providing CONTRACT APP (and other INVENTCO) stakeholders with access to a range of INVENTCO-facilitated "value added services" (See Process 9 description below).

Order Matching Constraint Types

For their operation, CONTRACT APPS require all stakeholders to a specific APP to specify, amongst other things, which other stakeholders they do and do not want to have interactions with, and the conditions under which they wish to manually authorise some aspect of a transaction involving any other CONTRACT APP stakeholder over which they have control authority of some form.

In specifying which other stakeholders they do and do not want to have interactions with, CONTRACT APP stakeholders have various options. Application promoters can specify acceptable product sponsors, products, ordering parties and potential counterparties within their application—individually and by type. Similarly, product sponsors can specify acceptable application promoters, products, ordering parties, potential counterparties and counterparty-guarantors within their application—individually and by type.

Product counterparties and ordering parties (collectively) can specify: ordering parties/potential counterparties they do and do not want to deal with—individually and by type; the extent of their preparedness to be involved in contract netting and collateralisation arrangements provided for by their application promoter; application promoters, product sponsors, products, and consideration/entitlement transfer entities they do and do not want to deal with—individually and by type; ordering parties/potential counterparties they prefer to deal with, and those with which they wish to deal exclusively; the degree of trading transparency they require; and their wish or otherwise to manually authorise order matches before they are confirmed.

Potential counterparties can specify which ordering parties, or classes of ordering parties, they are prepared to offer credit to (and under what terms), and ones they are prepared to allow "ordering party-guarantors" to offer credit to and under what terms. Similarly, product ordering parties (uniquely) can specify: counterparty-guarantors with which they do and do not want to deal (individually and by type); counterparties with which they wish to deal exclusively or preferentially to obtain a particular form of counterparty-credit; and potential "ordering party-guarantors" (external to INVENTCO) with which they do and do not want to deal.

Counterparty-guarantors can specify which potential counterparties have their authority to operate and which application promoters, product sponsors and ordering parties they are prepared, indirectly, to have relationships with. Similarly, regulators can specify which counterparty-guarantors, potential counterparties, ordering parties, application promoters, product sponsors and products have their authority to operate. Finally, consideration/entitlement transfer entities can monitor and maintain up-to-date rules with respect to ordering parties, counterparties, application promoters, product sponsors, counterparty-guarantors, and regulators they are and are not prepared to deal with—individually and by type.

Ordering Party Requirements

For their operation, CONTRACT APPS require primary product ordering party stakeholders to a CONTRACT APP, in registering an order for a product of their choice, to specify: the above-described "product type" and "other stakeholder involvement" information; multiple attributes of the specific order they are seeking; their interest or otherwise in being granted credit by potential counterparties for their contract consideration amount, or in availing themselves of the possible netting and collateralisation features of the APP concerned; the maximum (and possibly minimum) consideration "price" they are prepared to pay for their defined product; and various other dimensions of their needs, where these include: the name/title by which they wish to be identified by other APP stakeholders; the time at which they wish their order to be submitted; the period of time after an order has been submitted that they wish the order to be retained before it is automatically withdrawn; whether or not they are prepared to accept partial matches of their order; the degree of market transparency they wish to be exposed to; whether or not they wish to have the option of trading a matched contract on an authorised INVENTCO secondary market (See Process 5 description below); whether or not they wish to manually consider/authorise potential counterparty quotes on an order; in the case where potential counterparty quotes are required to be manually considered/authorised, the maximum time after potential counterparty quote details are provided to the ordering party that the ordering party wishes to consider the quote(s); and the consideration/entitlement transfer entity accounts from which/to which they wish to have relevant "payments" made/received.

The above-mentioned multiple attributes of a specific primary order an ordering party is seeking include: their wish or otherwise to directly input the entitlement "coordinates" of their desired contingent claim order; their wish or otherwise to mathematically specify an entitlement function reflecting their desired product order, where such functions can be single or multidimensional (indicating a contingent contract entitlement conditional on two or more phenomena); the "consideration/entitlement unit", "currency" (if applicable), and "national currency" (if applicable) in which they wish to "pay"/"receive" their contract consideration/entitlement. Where an ordering party wishes to mathematically specify their desired primary product order as a single-dimensional entitlement function: the input term "X" can indicate the number of contract entitlement "inflection points" the ordering party is seeking within the allowable range of future product event values (including the value range extremity points); the input term "Alpha (X)" can indicate the ordering party-specified event value corresponding to the Xth future product event value contract entitlement inflection point; the input term "Beta (X)" can indicate the ordering party-specified desired entitlement amount (in the desired "consideration/entitlement form", "currency" and "national currency" entitlement denomination) corresponding to the Xth event value inflection point; and the input term "Gamma (X-1)" can indicate the ordering party-specified desired shape of the function between each of the co-ordinates: [Alpha (1), Beta (1)] and [Alpha (2), Beta (2)], [Alpha (2), Beta (2)] and [Alpha (3), Beta (3)], and so on (as applicable), where Gamma can represent all possible, mathematically definable, shapes.

Potential Counterparty Requirements

For their operation, CONTRACT APPS also require primary product "potential counterparty" stakeholders to a CONTRACT APP to define various parameters on the basis of which they can automatically price orders, including parameters with which they wish to establish a "consideration bid" on a defined product order; possible individual contract and product constraints they require to be satisfied if they were to become a counterparty to a defined product ordering party order; and possible expected-value product-portfolio constraints they require to be satisfied if they were to become a counterparty to a defined product ordering party order.

In defining parameters with which they wish to establish a "consideration bid" on a defined product order under a "EV-CE" pricing regime (described above), each potential counterparty is required to specify, amongst other things: an indicator of the appropriate "defined circumstances" of all possible product orders; a base "commission rate"; a base "discount rate"; (if applicable), a set of base "consideration/ entitlement denomination", "currency" and "national currency" exchange rates; base "unit product prices"; and desired adjustments to the base commission rate, discount rate, exchange rates, and unit product prices on specific product orders according to the determined-value of the "defined circumstances" indicator (based on a specific product order).

Possible individual contract and product constraints the potential counterparty requires to be satisfied if they were to become a counterparty to a defined product ordering party order, include: an absolute loss limit constraint (this constraint being specified as a single-figure constraint and/or as a function constraint); an expected loss limit constraint (this constraint defining the maximum "expected" aggregate loss the potential counterparty is prepared to incur on a contract/ product, taking into account their assessment of the likelihood of all feasible future product values occurring); and a constraint on the maximum proportion of the expected total loss of the aggregate of the potential counterparty's contracts/products that can be accounted for by the expected loss of the defined individual contract/product. Similarly, possible expected-value product-portfolio constraints the potential counterparty requires to be satisfied if they were to become a counterparty to a defined product ordering party order include the maximum (and possibly minimum) proportion of the expected total loss of the aggregate of the potential counterparty's product portfolio that can be accounted for by the expected loss of an individual contract/ product.

Communications

CONTRACT APP stakeholders communicate with their applicable APP via AXSCO. Individual "stakeholder-to/ from-AXSCO" communications can be by way of any/all of the following: voice communications with an AXSCO-linked "live operator" or "recorded messaging" system; touch-telephone communication with AXSCO directly; or computer-to-computer link with AXSCO (via a dedicated or dial-up communications line). With all three forms of communication, CONTRACT APP stakeholders may be required to utilize specified computer hardware and/or software mechanisms in their communications with AXSCO (including "payments" authorisation "black box" devices referred to below).

Component Processes

In their manifestation as telecommunications/computer software residing on telecommunications/computer hardware, individual CONTRACT APPS consist of a cluster of processes, utilizing a number of data files, residing on one or more processing units. A cluster of nine (and potentially more or fewer) specific processes and their related data files reside within a CONTRACT APP: a process handling file administration and updating tasks supporting all other processes (termed Process 1); a process handling the receipt and processing of "primary" risk management contract transactions (termed Process 2); a process handling the receipt and processing of "secondary" risk management contract transactions (termed Process 3); a process handling the receipt and processing of "derivative-primary" risk management contract transactions (termed Process 4); a process handling the receipt and processing of "derivative-secondary" risk management contract transactions (termed Process 5); a process handling the "back office" management of all four types of risk management contract transactions (termed Process 6); a process handling non-transaction related consideration, entitlement, and other "payment" obligation transfers between stakeholders (termed Process 7); a process handling CONTRACT APP (and other INVENTCO) stakeholder access to specialist systems to assist these stakeholders decide how best to interface with the multiple aspects of INVENTCO (termed Process 8); and a process handling CONTRACT APP (and other INVENTCO) stakeholder access to a range of INVENTCO-facilitated "value added services" (termed Process 9). These processes may function concurrently.

Description of CONTRACT APP Processes

Process 1

Figure 18:
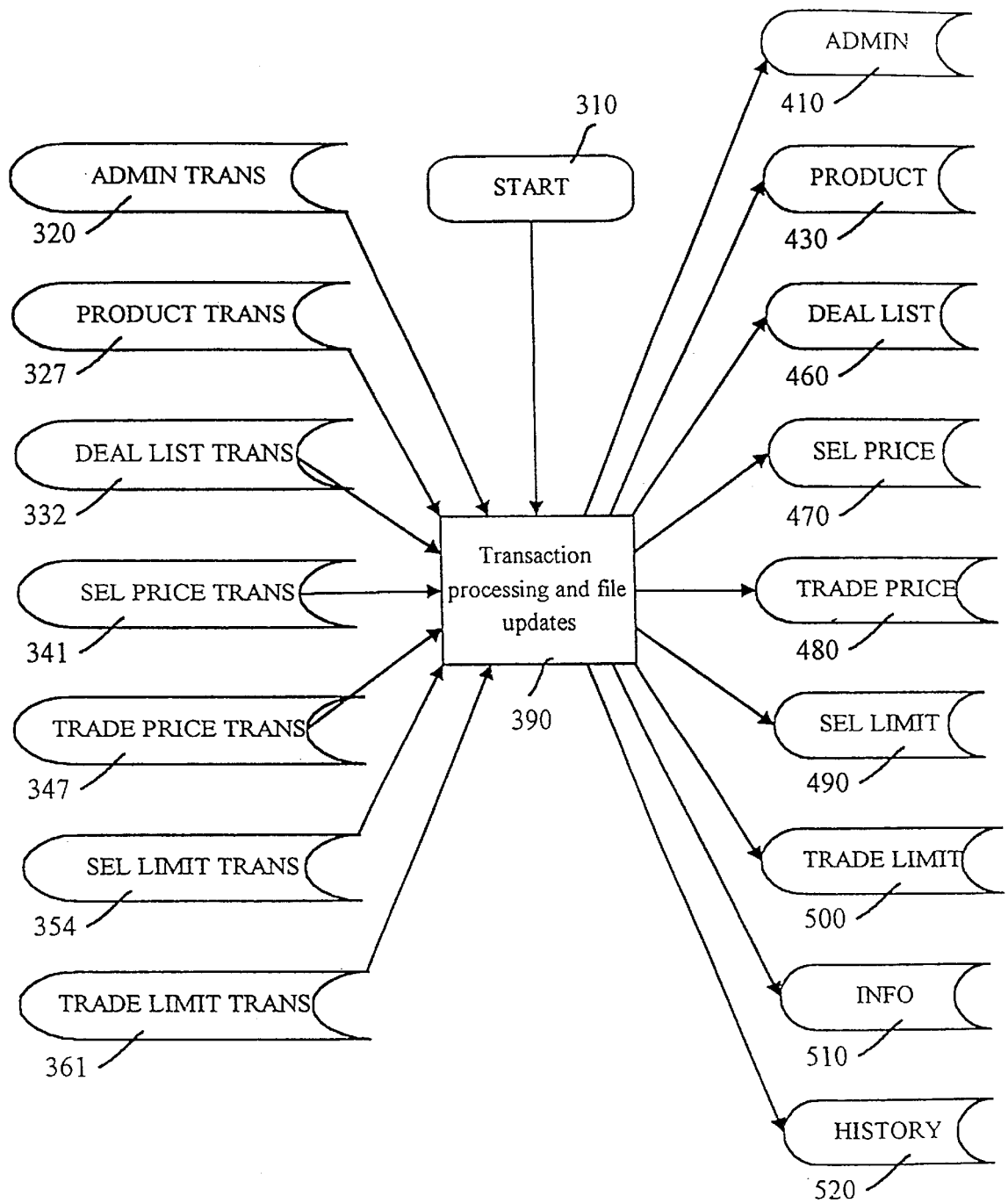
FIGS. 18 to 40 show flow diagrams of the first to ninth process components for a CONTRACT APP.

Process 1 handles file administration and updating tasks supporting all other processes (FIG. 18). The PRODUCT, PRODUCT TRANS, DEAL LIST and DEAL LIST TRANS files referred to in FIG. 18 are applicable, individually or collectively, to primary, secondary, derivative-primary, and derivative-secondary contract orders. The SEL PRICE, SEL PRICE TRANS, SEL LIMIT and SEL LIMIT TRANS files are applicable only to primary and derivative-primary contract orders. The TRADE PRICE, TRADE PRICE TRANS, TRADE LIMIT and TRADE LIMIT TRANS files are applicable only to secondary and derivative-secondary contract orders.

The file administration and updating tasks handled by Process 1 comprise: dealing with general data-file information received from CONTRACT APP stakeholders; dealing with general data-file and order processing information received from relevant other INVENTCO stakeholders, particularity VIRPRO and AXSCO; dealing with trading support information received directly from CONTRACT APP stakeholders; dealing with potential counterparty primary, and derivative primary, product order "consideration bid" parameters and order-match constraints; dealing with existing-contract offering party secondary, and derivative secondary, order match conditions; and dealing with miscellaneous information from entities external to INVENTCO.

Existing and prospective stakeholders are required to supply their applicable CONTRACT APP with specified identification and other information, and to continually maintain the integrity of this information. For each stakeholder, this information includes: applicable name(s), addresses, contact numbers, and references; their desired system access medium; their consideration/entitlement transfer entity account details; and, if applicable, their required schedule of fees and charges payable by other INVENTCO stakeholders. This information is maintained in the data file ADMIN, updated information being received by way of the transaction file ADMIN TRANS.

VIRPRO is required to supply the applicable CONTRACT APP with various forms of general data-file information including: identification data relating to the application promoter for (each) CONTRACT APP; details of the permitted types of system access mediums; and consideration/entitlement denominations available in each application. Again, this information is maintained in the data file ADMIN, updated information being received by way of the transaction file ADMIN TRANS.

VIRPRO is similarly required to supply the applicable CONTRACT APP with various forms of general data-file information including: information on all data received by and sent from the various parts of INVENTCO to one another and to entities external to INVENTCO; and statistical information of various types, including data traffic volumes, data file location information and so on. This information is continuously collected by AXSCO and maintained in the data file HISTORY.

Trading support information received directly from CONTRACT APP stakeholders comprises stakeholder relationship information of a general nature, and specific information from individual stakeholders.

Stakeholder relationship information of a general nature comprises "transaction communication parameters" and automatic/manual deal and no deal flags". Transaction communication parameters are parameters set by all (registered) CONTRACT APP stakeholders defining the bounds within which they wish, for security reasons, all of their communications within INVENTCO to fall. Automatic/manual deal and no deal flags are "flags" set, as required, by all (registered) CONTRACT APP stakeholders indicating their requirements with respect to dealing with other CONTRACT APP stakeholders. This information is maintained in the data file DEAL LIST, updated information being received by way of the transaction file DEAL LIST TRANS.

Specific information from individual stakeholders differs according to the category of stakeholder involved.

Application promoters provide, amongst other things: information for the data file, PRODUCT (updated transactions being received from the file, PRODUCT TRANS), and further information for the data file ADMIN (updated transactions being received from the file, ADMIN TRANS). Information for the data file, PRODUCT includes details of the specific products application promoters offer for trading/ exchange/transfer. Information for the data file, ADMIN includes: the order pricing and matching process upon which the application is based; the consideration/entitlement "value date" regime upon which their application is based; the categories of other stakeholders allowed to participate in the application and the conditions under which they can do this; the specific rules of engagement of counterparty-guarantors by potential counterparties; the availability and, in turn, the terms and conditions for CONTRACT APP stakeholder utilization of "consideration credit", "collateralisation", and "netting" features of the application (embodied in the various post-order-processing management routines); and details of the consideration/entitlement transfer entities involved in the application and relevant security information concerning account access.

Product sponsors provide full details of the product(s) they are sponsoring; product ordering parties and potential counterparties (collectively) indicate, with respect to each other, the parties they either prefer to deal with or wish to deal with exclusively. Potential counterparties (exclusively) provide a variety of specific information, including: details of the Application promoter, Product sponsor, and Counterparty-guarantor rules under which they have chosen to operate; data recording the lines of credit (if any) offered to ordering parties and the general and specific terms and conditions of these credit lines (applicable to ordering parties individually and/or to defined classes of ordering parties); parameters with which a potential counterparty wishes to determine its consideration "bids" on orders. Counterparty-guarantors provide details of the potential counterparties (if any) they have agreed to guarantee and the nature of such guarantees. Regulators provide details of: all entities having a stake in the application and their relationships to one another (for example, which counterparty-guarantors cover which counterparties, which potential counterparties offer which products, and so on); specific regulations developed for the regime; and parameters defining the taxation treatment of all types of orders and related transactions. Consideration/entitlement transfer entities provide "set-up" and on-going account access and balance-updating services. All of the above-described information is maintained in the data file, ADMIN, updated information being received by way of the transaction file ADMIN TRANS.

In dealing with potential counterparty primary product order "consideration bid" parameters and order-match constraints, potential product order counterparties are required, amongst other things, to: define various parameters with which they wish to establish a consideration bid on a defined product order; and define parameters with which the potential counterparty wishes to determine adjustments to the "base-price" bids on product orders according to the specific ordering party involved (this information is maintained in the data file SEL PRICE; updated information is received by way of the transaction files SEL PRICE TRANS); define possible individual contract and product constraints the potential counterparty requires to be satisfied if they are to become a counterparty to a defined product ordering party order; and define possible expected-value product-portfolio constraints the potential counterparty requires to be satisfied if they are to become a counterparty to a defined product ordering party order (these latter two categories of information are maintained in the data files SEL LIMIT and BUY LIMIT; updated information being received by way of the transaction file SEL LIMIT TRANS).

In dealing with existing-contract offering party secondary order match conditions, offering parties are required, amongst other things, to specify: the Order IDs of the contracts in which the entity concerned wishes to "sell" its position as a contract stakeholder, and, for each such contract, the pricing and other parameters it requires to be satisfied before a contract position "sale" is effected. This information is maintained in the data file TRADE PRICE; updated information is received by way of the transaction file TRADE PRICE TRANS.

In dealing with potential counterparty derivative-primary product order "consideration bid" parameters and order-match constraints, potential product order counterparties are required to provide essentially the same information described above in relation to primary product orders. However, in addition, information directly applicable to the relevant type of derivative-primary transaction concerned (say, an option to establish a primary product order at a later date) is also required.

In dealing with existing-contract-offering party derivative-secondary order match conditions, offering parties are required to provide essentially the same information described above in relation to secondary product orders. However, in addition, information directly applicable to the relevant type of derivative-secondary transaction concerned (say, an option to sell a position in a primary product order at a later date) is also required.

In dealing with miscellaneous information from entities external to INVENTCO, this information can be of any type and may, potentially, be used by any part of INVENTCO; the information is maintained in the data-file ADMIN with updated information being received by way of the transaction file ADMIN TRANS.

Process 2

Process 2 handles the receipt and processing of "primary" risk management contract transactions, such transactions being of multiple types. Various sub-processes of Process 2 handle the receipt and processing of all possible types of these transactions, including product order processing, price quote requests, and withdrawals of existing product orders.

Figure 19:
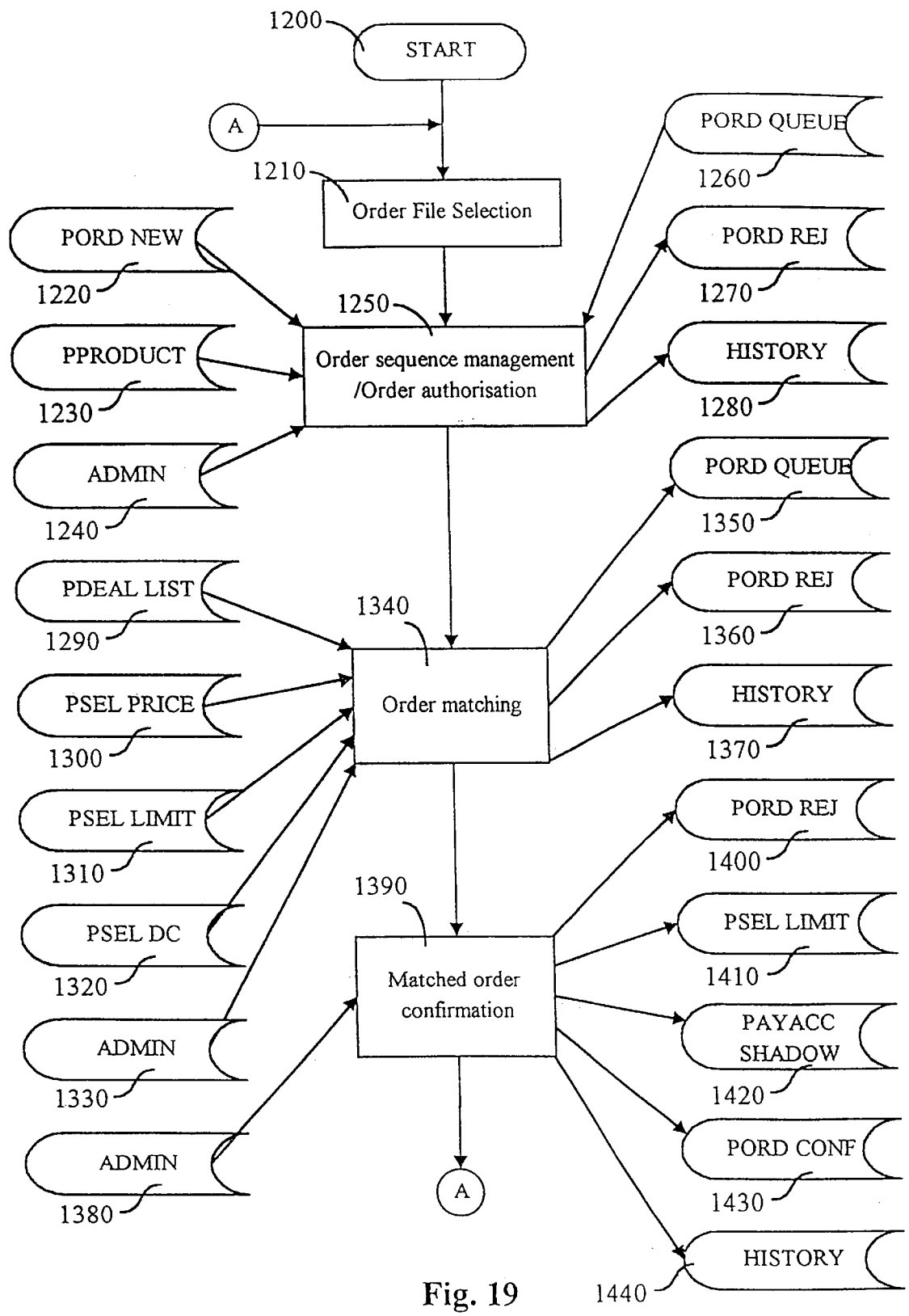

Primary "product orders" constitute the core "primary" risk management contract transaction type (FIG. 19 provides a summary flow chart, and the document text provides a detailed flow chart and description of the processing of this transaction type).

Primary product orders incorporate the following key items of information: ordering party identification information; CONTRACT APP application and product identification information; "other stakeholder involvement" information; the ordering party's desired form of product specification (directly input as entitlement coordinates or as mathematical function(s)); when the order specification is by way of a single-dimensional mathematical function, the parameters of such a function (which can include: the term "X", the term "Alpha (X)", the term "Beta (X)", the term "Gamma (X-1)"; the contract consideration and entitlement "denomination type", "currency (if applicable)" and "national currency (if applicable)"; the ordering party's interest or otherwise in being granted credit by potential counterparties for the yet-to-be-determined contract consideration amount; the ordering party's interest or otherwise in availing themselves of the possible netting and collateralisation features of the APP concerned; the consideration "price" range within which the ordering party is prepared to "pay" for their defined product; miscellaneous other dimensions of the ordering party's needs, and the consideration/entitlement transfer entity accounts from which/to which they wish to have relevant "payments" made/received). Upon its receipt, all of this information is written to—and subsequently processed from—the file PORD NEW.

Three sub-processes are involved in processing primary product orders—order authorisation, order matching, and matched order confirmation. In the case of the anticipated most typical form of order, termed a "normal-automatic" primary product order these sub-processes function as follows:

The primary product order authorisation sub-process verifies that all orders contain data appropriate to the product being sought and that each ordering party is accurately identified and credentialled (this sub-process draws principally on the data-file, PPRODUCT).

The primary product order matching sub-process locates the best possible counterparty(ies) for the ordering party's transaction according to the application promoter-specified "matching rules" embodied in the APP; it does this utilizing three component sub-processes, termed: short-listing of potential-counterparties, individual potential-counterparty "pricing" calculations, and counterparty selection.

The "short-listing of potential counterparties" sub-process component establishes a list of potential counterparties (if any) willing to offer the product sought by the ordering party, upon their receipt from the ordering party of a consideration they deem to be appropriate (this sub-process draws principally on the data-file, PDEAL LIST).

The individual potential-counterparties pricing calculations sub-process component utilises the above-described pricing parameters pre-specified by each short-listed potential counterparty to calculate the "bid" each of them is prepared to make on the ordering-party's product order (or part thereof), and to add these to the potential counterparties short-list file (this sub-process draws principally on the data-file, PSEL PRICE).

The "counterparty selection" sub-process component extracts from the above-described "potential-counterparties short-list" file the best possible counterparty(ies) for the ordering party's transaction, according to the application promoter-specified "matching rules" embodied in the APP, taking into account whatever matching constraints all applicable APP stakeholders may have prespecified. This selection being made, and the price bid being within the allowable limits specified by the ordering party, and there being no requirements for manual-approval intervention by any relevant stakeholder, a matched order is deemed to be in existence (this sub-process draws principally on the data-file, PSEL LIMIT).

The matched order confirmation sub-process effectively secures, automatically, the positive agreement of all affected stakeholders to the contract, including confirmation of the product ordering party's ability to immediately pay (or be granted counterparty credit, or ordering party guarantor credit, for) the required contract consideration (and possible other applicable fees). Automatic approvals of contracts are made by the CONTRACT APP electronically transferring resources recorded in the ordering party's applicable consideration/entitlement transfer entity account to the account of the applicable counterparty (See Appendix H for a description of the consideration/entitlement "payment" process). In turn, automatic updates of the counterparty's matching constraints maintained in the file PSEL LIMIT are made.

Upon completion of the above-described processing steps: unmatched order transactions are written to the file, PORD QUEUE, for subsequent match attempts; matched and confirmed order transactions are confirmed to the relevant CONTRACT APP stakeholders (this process drawing principally on the data-file, ADMIN) and are written to the file PORD CONF for subsequent "back-office" processing; and relevant CONTRACT APP stakeholders are notified of rejected orders (again, this process drawing principally on the data-file, ADMIN), records of this being written to the file PORD REJ for subsequent "back-office" processing. A copy of all processing outputs is written to the file, HISTORY.

Process 3

Process 3 handles the receipt and processing of "secondary" risk management contract transactions. Like "primary" risk management contracts, "secondary" risk management contracts are of multiple types; various sub-processes of Process 3 handle the receipt and processing of all possible types of these transactions, including product order processing, product price indications, and withdrawals of existing product orders.

Figure 20:
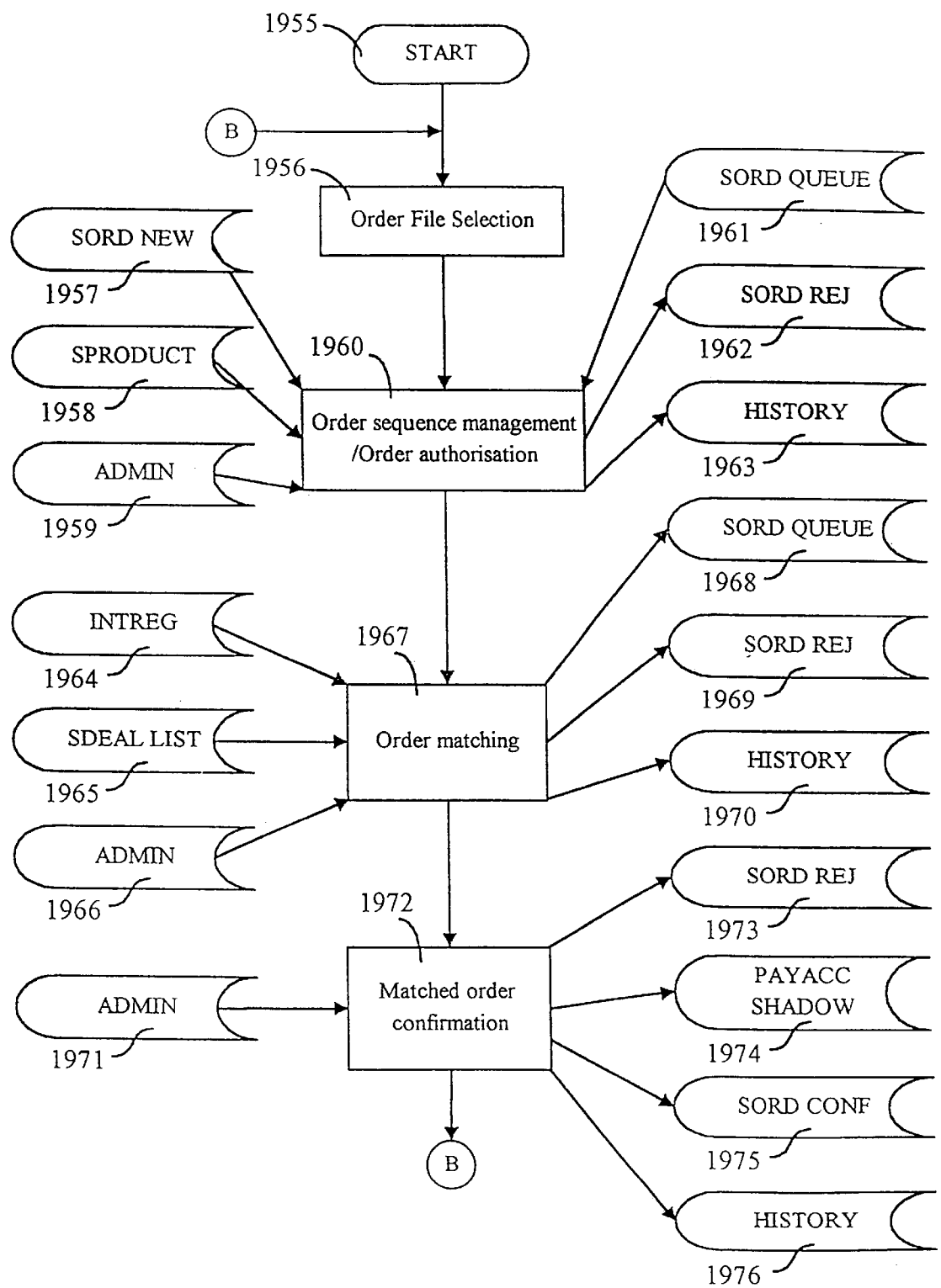

"Secondary product orders" constitute the core "secondary" risk management contract transaction type (FIG. 20 provides a summary flow chart of the processing of this transaction type).

"Secondary" product orders incorporate the following key items of information: potential acquiring party identification information; the pre-established Order ID reference to the sought-after primary contract; the potential acquiring party's interest or otherwise in being granted credit by offering parties for the yet-to-be-determined contract acquisition amount; the acquiring party's interest or otherwise in availing themselves of the possible netting and other features of the APP concerned; the acquisition "price" range within which the potential acquiring party is prepared to "pay" for the contract they have specified; other dimensions of the potential acquiring party's needs; and the consideration/entitlement transfer entity accounts from which/to which they wish to have relevant "payments" made/received. The above-described information is, upon receipt, written to—and subsequently processed from—the file SORD NEW.

Three sub-processes are involved in processing secondary product orders—order authorisation, order matching, and matched order confirmation. In the case of the anticipated most typical form of order, termed a "normal-automatic" secondary product order these sub-processes function as follows:

The secondary product order authorisation sub-process verifies that all orders contain data appropriate to the contract sought and that each potential acquiring party is accurately identified and credentialled (this sub-process draws principally on the data-file, SPRODUCT).

The secondary product order matching sub-process locates sought-after contract records and, based on the contents of these records, determines whether a "sale" of the position of the specified stakeholder in the contract to the potential acquiring party is possible—in particular, whether the acquisition "price" range within which the potential acquiring party has specified it is prepared to "pay" for the position of the specified current stakeholder is equal to, or in excess of, the "allowable sale price" figure prespecified by the applicable contract stakeholder. If a contract "sale" is found to be possible, and there being no requirements for manual-approval intervention by any relevant stakeholder, a "match" is deemed to have occurred.

The secondary product matched order confirmation sub-process effectively secures, automatically, the positive agreement of all affected stakeholders to the contract position "sale", including confirmation of the contract acquiring party's ability to immediately pay (or be granted current stakeholder credit, or acquiring party guarantor credit, for) the required "sale price" consideration (and possible other applicable fees). Automatic approvals of such "sales" are made by the CONTRACT APP electronically transferring resources recorded in the acquiring party's applicable consideration/entitlement transfer entity account to the account of the applicable current contract stakeholder.

Upon completion of the above-described processing steps: unmatched order transactions are written to the file, SORD QUEUE, for subsequent match attempts; matched and confirmed order transactions are confirmed to the relevant CONTRACT APP stakeholders (this process drawing principally on the data-file, ADMIN), required records being written to the file SORD CONF for further "back-office" processing as required; and rejected order transactions are similarly notified to the relevant CONTRACT APP stakeholders (again, this process drawing principally on the data-file, ADMIN), required records being written to the file SORD REJ for further "back-office" processing. A copy of all processing outputs is written to the file, HISTORY.

Process 4

Process 4 handles the receipt and processing of "derivative-primary" risk management contract transactions. Like "primary" risk management contracts, "derivative-primary" risk management contracts are of multiple types; various sub-processes of Process 4 handle the receipt and processing of all possible types of these transactions, including product order processing, product price indications, and existing product order withdrawals.

Figure 21:
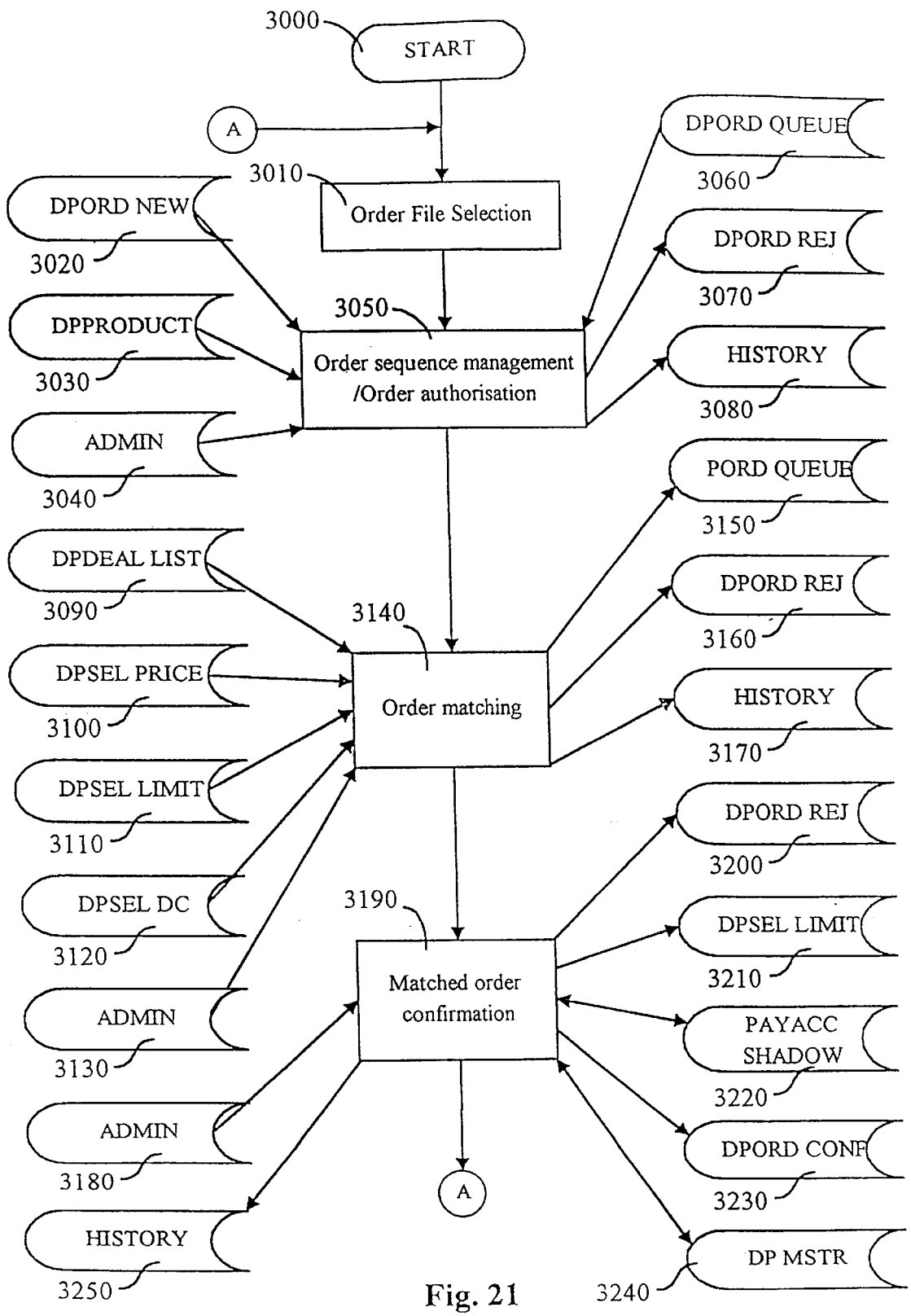

"Product option orders" is one illustrative "derivative-primary" risk management contract transaction type (FIG. 21 provides a summary flow chart of the processing of this transaction type).

"Derivative-primary" product option orders incorporate the following key items of information: ordering party identification information; CONTRACT APP application and product identification information; "other stakeholder involvement" information; the ordering party's desired form of product specification (directly input as entitlement coordinates or as mathematical function(s)); when the order specification is by way of a single-dimensional mathematical function, the parameters of such a function (which can include: the term "X", the term "Alpha (X)", the term "Beta (X)", the term "Gamma (X-1)"; the contract consideration and entitlement "denomination type", "currency (if applicable)" and "national currency (if applicable)"; the ordering party's interest or otherwise in being granted credit by potential counterparties for the yet-to-be-determined contract option consideration amount; the ordering party's interest or otherwise in availing themselves of the possible netting and collateralisation features of the APP concerned; the consideration "price" range within which the ordering party is prepared to "pay" for their defined product option; miscellaneous other dimensions of the ordering party's needs, and the consideration/entitlement transfer entity accounts from which/to which they wish to have relevant "payments" made/received). Upon its receipt, all of this information is written to—and subsequently processed from—the file DPORD NEW.

Three sub-processes are involved in processing derivative-primary product orders order authorisation, order matching, and matched order confirmation. In the case of the most likely form of the above-mentioned illustrative option order, termed a "normal-automatic" derivative-primary product option order these sub-processes function as follows:

The primary product option order authorisation sub-process verifies that all orders contain data appropriate to the product option being sought and that each ordering party is accurately identified and credentialled (this sub-process draws principally on the data-file, DPPRODUCT).

The primary product option order matching sub-process locates the best possible counterparty(ies) for the ordering party's transaction according to the application promoter-specified "matching rules" embodied in the APP; it does this utilizing three component sub-processes, termed: short-listing of potential option-counterparties, individual potential option-counterparty "pricing" calculations, and option-counterparty selection.

The "short-listing of potential option-counterparties" sub-process component establishes a list of potential option-counterparties (if any) willing to offer the product option sought by the ordering party, upon their receipt from the ordering party of an option consideration they deem to be appropriate (this sub-process draws principally on the data-file, DPDEAL LIST).

The "individual potential option-counterparties pricing calculations" sub-process component utilises the above-described pricing parameters prespecified by each short-listed potential option-counterparty to calculate the "bid" each of them is prepared to make on the ordering-party's product option order (or part thereof), and to add these to the potential option-counterparties short-list file (this sub-process draws principally on the data-file, DPSEL PRICE).

The "option-counterparty selection" sub-process component extracts from the above-described "potential option-counterparties short-list" file the best possible counterparty (ies) for the ordering party's transaction, according to the application promoter-specified "matching rules" embodied in the APP, taking into account whatever matching constraints all applicable APP stakeholders may have prespecified. This selection being made, and the price bid being within the allowable limits specified by the ordering party, and there being no requirements for manual-approval intervention by any relevant stakeholder, a matched option order is deemed to be in existence (this sub-process draws principally on the data-file, DPSEL LIMIT).

The matched option order confirmation sub-process effectively secures, automatically, the positive agreement of all affected stakeholders to the options contract, including confirmation of the product-option-ordering party's ability to immediately pay (or be granted counterparty credit, or ordering party guarantor credit, for) the required option product consideration (and possible other applicable fees).

Automatic approvals of contracts are made by the CONTRACT APP electronically transferring resources recorded in the ordering party's applicable consideration/entitlement transfer entity account to the account of the applicable counterparty. In turn, automatic updates of the option-counterparty's matching constraints maintained in the file DPSEL LIMIT are made.

Upon completion of the above-described processing steps: unmatched option-order transactions are written to the file, DPORD QUEUE, for subsequent match attempts; matched and confirmed option-order transactions are confirmed to the relevant CONTRACT APP stakeholders (this process drawing principally on the data-file, ADMIN) and are written to the reference file DP MSTR, and the file DPORD CONF for subsequent "back-office" processing; and relevant CONTRACT APP stakeholders are notified of rejected orders (again, this process drawing principally on the data-file, ADMIN), records of this being written to the file DPORD REJ for subsequent "back-office" processing. A copy of all processing outputs is written to the file, HISTORY.

If/when an option-holder wishes to exercise its option over a pre-established contract, it does so by appropriately notifying the CONTRACT APP which, in turn, retrieves the contract record from DPMSTR, effects the necessary additional consideration payments, and writes a new record to PORD CONF for subsequent back office processing. As described above, the appropriate HISTORY and other files are updated in this process.

Process 5

Process 5 handles the receipt and processing of "derivative-secondary" risk Management contract transactions. Like "secondary" risk management contracts, "derivative-secondary" risk management contracts are of multiple types; various sub-processes of Process 5 handle the receipt and processing of all possible types of these transactions, including product order processing, product price indications, and withdrawals of existing product orders.

Figure 22:
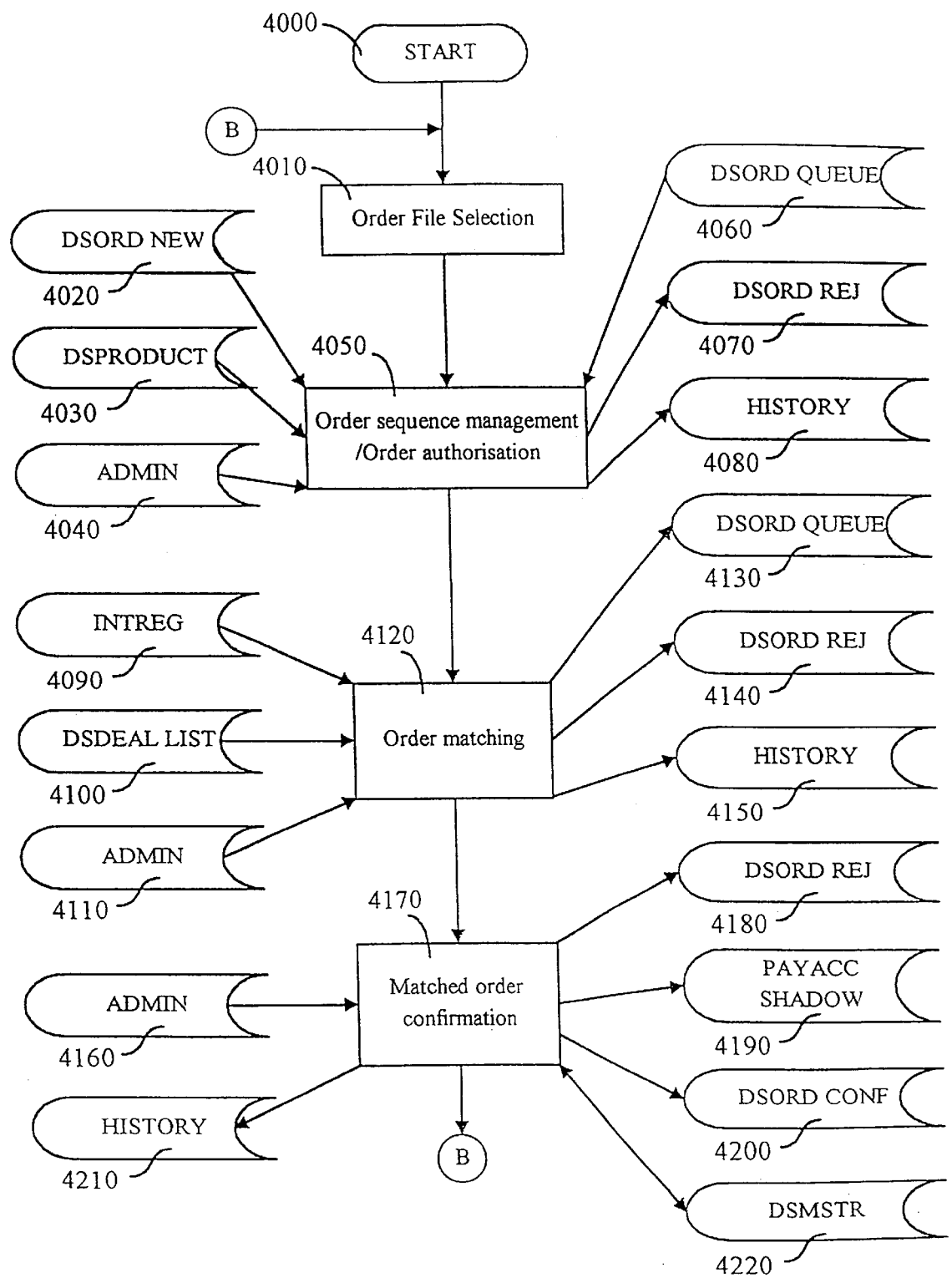
Figure 23:
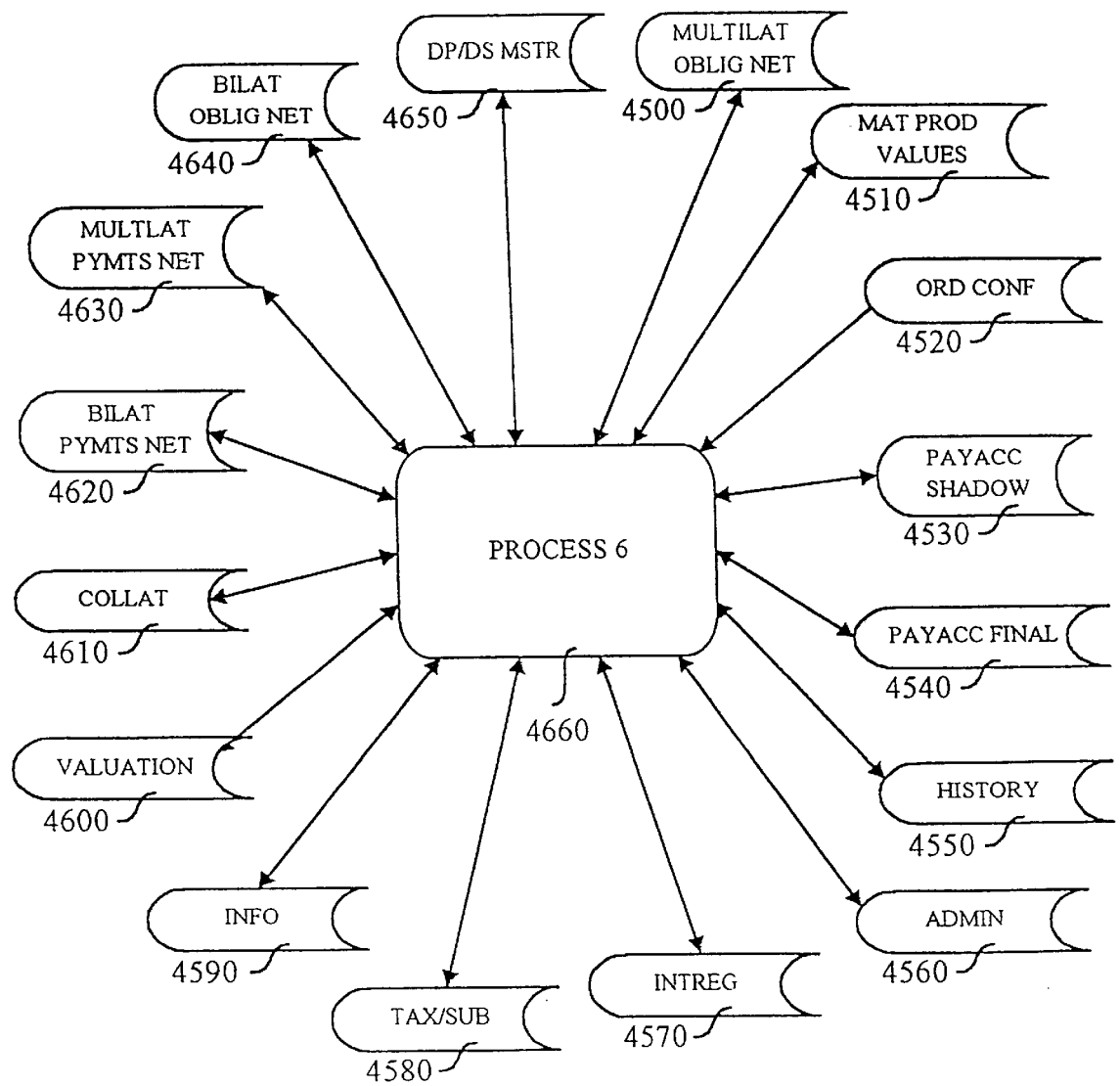
Figure 24:
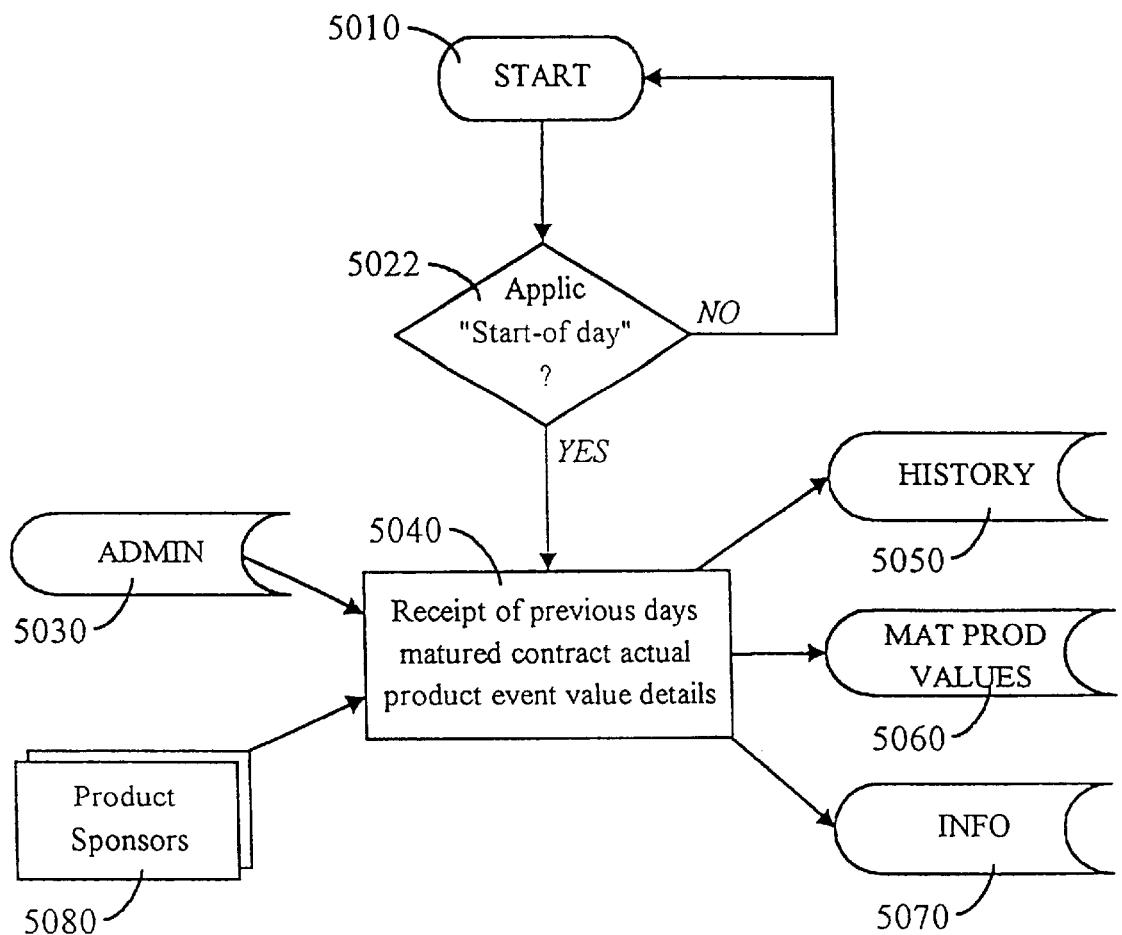
Figure 25:
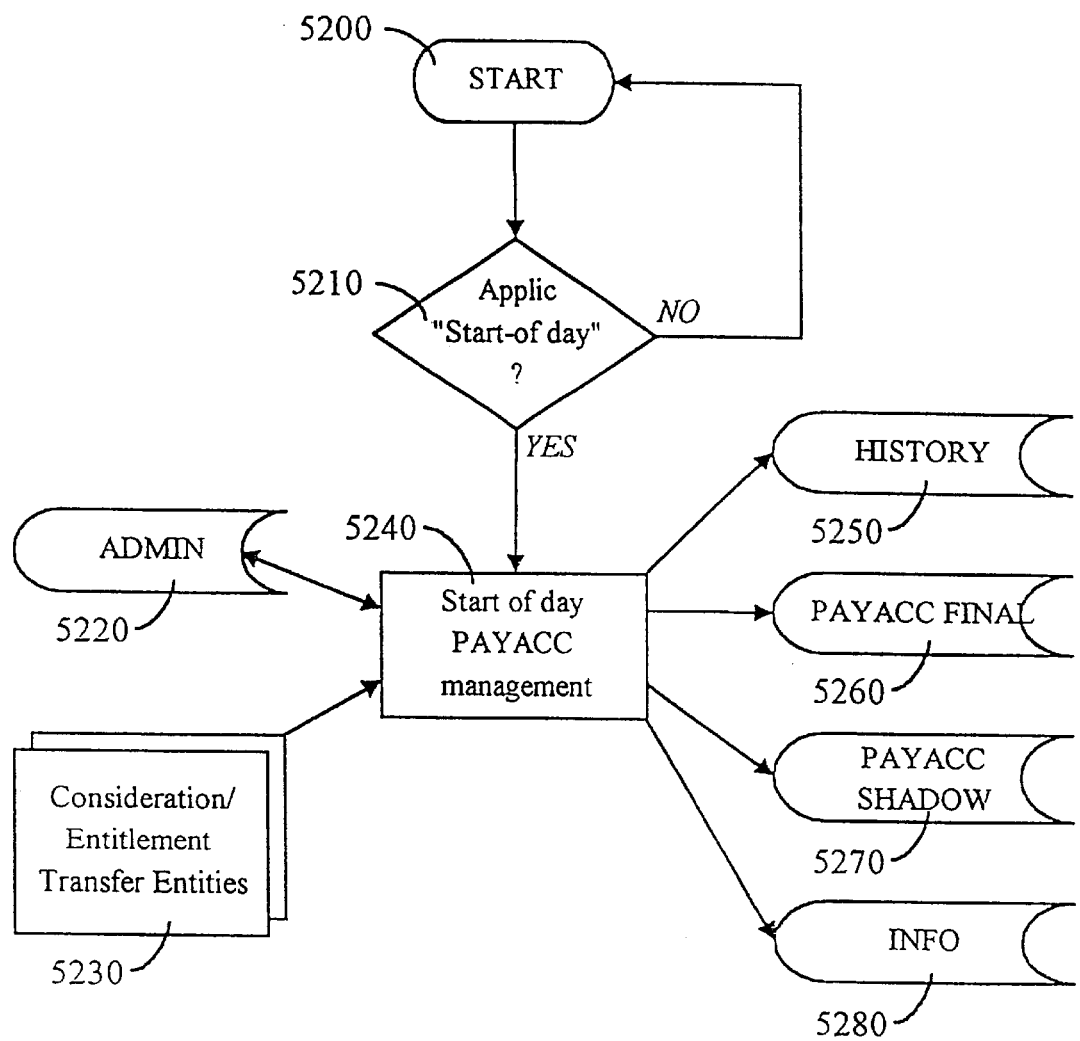
Figure 26:
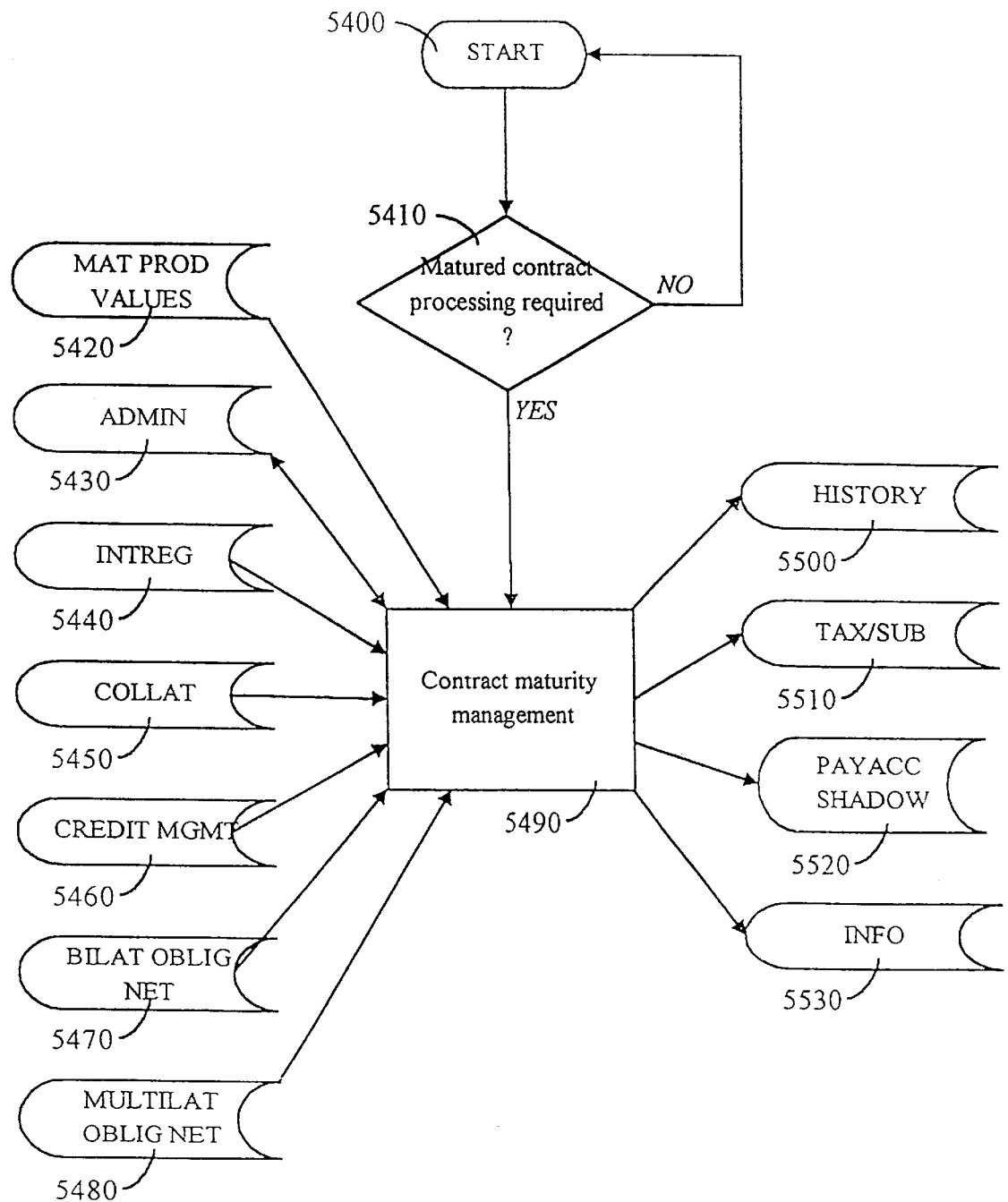
Figure 27:
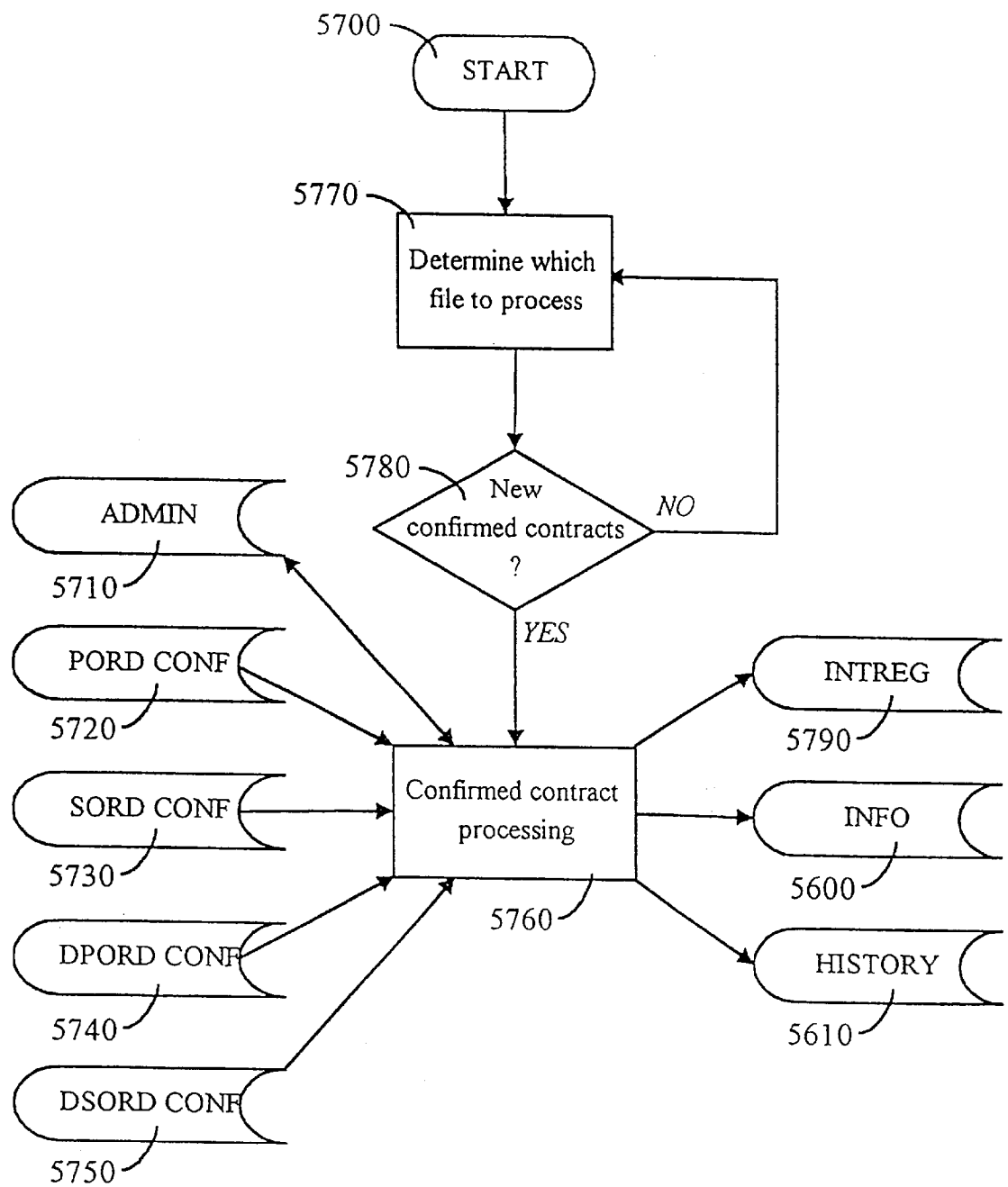
Figure 28:
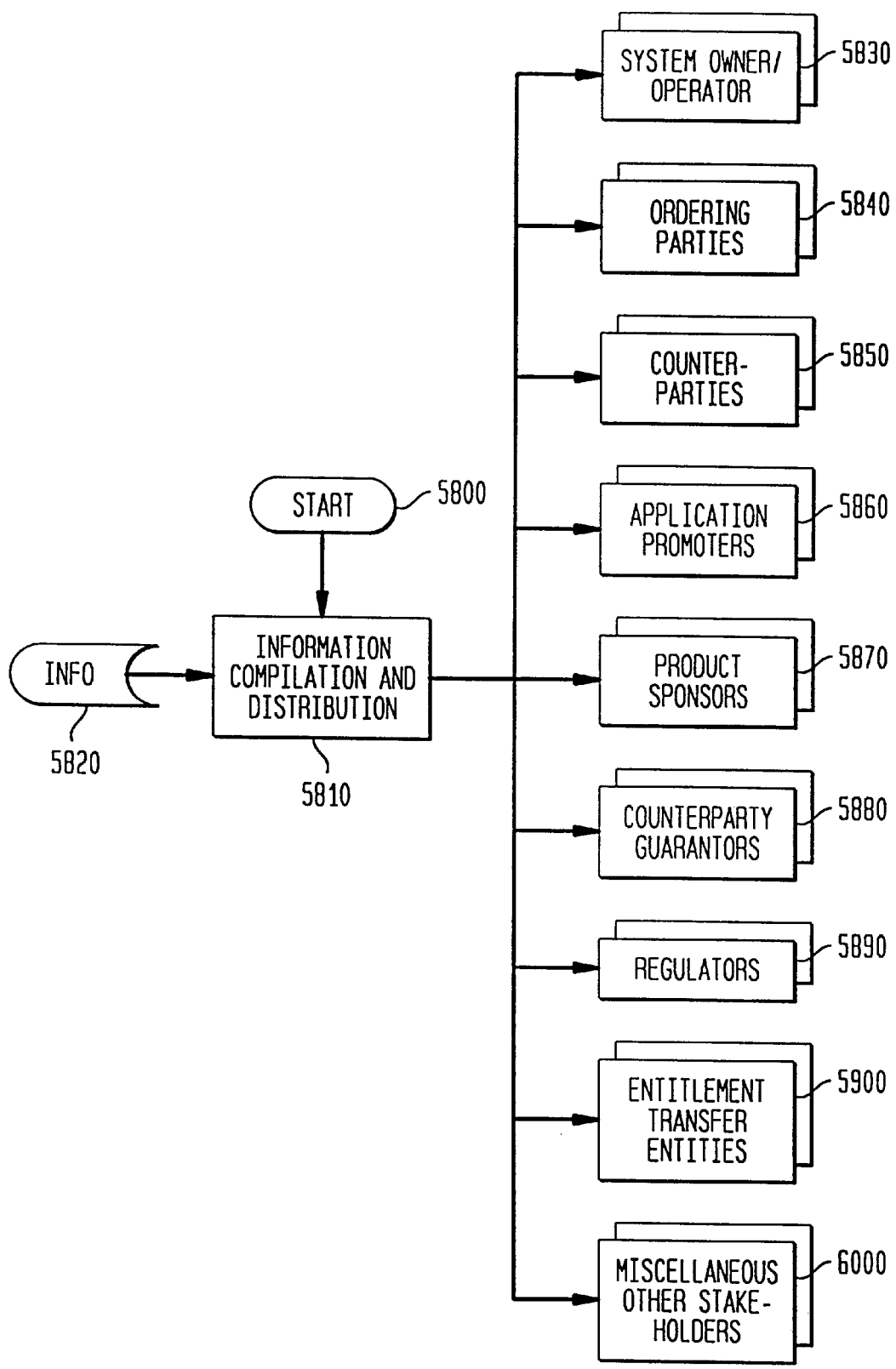

"Product option orders" is an illustrative "derivative-secondary" risk management contract transaction type (FIG. 22 provides a summary flow chart of the processing of this transaction type).

"Derivative-secondary" product option orders incorporate the following key items of information: potential acquiring party identification information; the pre-established Order ID reference to the sought-after primary contract (in relation to which an option is to be purchased or sold); the potential acquiring party's interest or otherwise in being granted credit by offering parties for the yet-to-be-determined option contract acquisition amount; the acquiring party's interest or otherwise in availing itself of the possible netting and other features of the APP concerned; the acquisition "price" range within which the potential acquiring party is prepared to "pay" for the contract option they have specified; other dimensions of the potential acquiring party's needs; and the consideration/entitlement transfer entity accounts from which/to which they wish to have relevant "payments" made/received. The above-described information is, upon receipt, written to—and subsequently processed from—the file DSORD NEW.

The subprocesses involved in the processing of derivative-secondary product option orders are essentially a combination of the processes described above in the case of secondary product orders (Process 3) and derivative-primary product option orders (Process 4). At the completion of the matching process, matched orders are written to the reference file DSMSTR and the file DSORD CONF for subsequent back office processing.

If/when an option holder wishes to exercise its option over a pre-established contract, it does so by appropriately notifying the CONTRACT APP which, in turn, retrieves the contract record from DSMSTR, effects the necessary additional consideration payments, and writes a new record to SORD CONF for subsequent back office processing. As described above, the appropriate HISTORY and other files are updated in this process.

Process 6

Process 6 handles the "back office" management of "matched/confirmed" primary, secondary, derivative-primary, and derivative-secondary risk management contract transactions and transactions handled by Processes 7–9. The process incorporates multiple sub-processes, collectively accessing multiple data files (FIG. 23): primary risk management contract back office processing; secondary risk management contract back office processing; derivative-primary risk management contract back office processing; derivative-secondary risk management contract back office processing; "Process 7" transactions back office processing; "Process 8" transactions back office processing; and "Process 9" transactions back office processing.

In relation to the back-office management of confirmed/matched primary risk management contracts—a number of sub-processes are involved, including: Receipt of the previous operating day's "matured-contract actual product event value" sub-process; "Start-of-day PAYACC management" sub-process; Contract maturity management sub-process; Confirmed contract processing sub-process; Information compilation and distribution sub-process; Information extraction from primary orders sub-process; Contract valuation sub-process; Contract collateralisation payments sub-process; System Access and usage fee determination and payments sub-process; Bilateral obligations netting sub-process; Multilateral obligations netting sub-process; Bilateral payments netting sub-process; Multilateral payments netting sub-process; and "end-of-day PAYACC management" sub-process.

Receipt of the previous operating day's "matured-contract actual product event value" details. This sub-process is flowcharted in FIG. 24; it involves the applicable CONTRACT APP receiving "matured-contract actual product event value" details from the relevant product sponsors (external to INVENTCO). The primary data-file, MAT PROD VALUES, is updated with this information. The support data-files, ADMIN, HISTORY, and INFO are similarly updated with applicable information.

"Start-of-day" PAYACC management. This sub-process is flowcharted in FIG. 25; it involves the applicable CONTRACT APP receiving consideration/entitlement "actual account" opening-balances from participating consideration/entitlement transfer entities (external to INVENTCO) (see Process 7 for details). The primary data-files, PAYACC SHADOW and PAYACC FINAL are updated with this information. The support data-files, HISTORY, INFO and ADMIN, are similarly updated with applicable information.

Contract maturity management. This subprocess is flowcharted in FIG. 26; it involves the applicable CONTRACT APP determining and giving effect to primary and related entitlement-transfers to/from applicable CONTRACT APP stakeholders, applicable other INVENTCO stakeholders, where such transfers are principally reflected in entries to the data-file, PAYACC SHADOW. CONTRACT APP determines and gives effect to these transfers, principally by drawing upon product/contract information maintained in the data files, INTREG, MAT PROD VALUES, COLLAT, CREDIT MGMT, BILAT OBLIG NET, and MULTILAT OBLIG NET. These data-files are appropriately updated in the process as are the support data-files, ADMIN, HISTORY, TAX/SUB, PAYACC SHADOW and INFO.

Confirmed contract processing. This sub-process, flowcharted in FIG. 27, operates continually throughout each operating day. Details of new matched/confirmed contracts are read from the file PORD CONF and are then time-stamped and written to the file INTREG as two records—one record pertaining to the contract ordering party and the other to the contract counterparty. The support data files, INFO, ADMIN, and HISTORY are appropriately updated in the process.

Information compilation and distribution. This sub-process, flowcharted in FIG. 28, operates continually (beyond a defined operating day), drawing on the data-file INFO. As already described, INFO is updated continually as CONTRACT APP and other INVENTCO events occur, including pertinent AXSCO message information written in the first instance to HISTORY. All relevant INVENTCO stakeholders have access to preauthorised parts of INFO.

Figure 29:
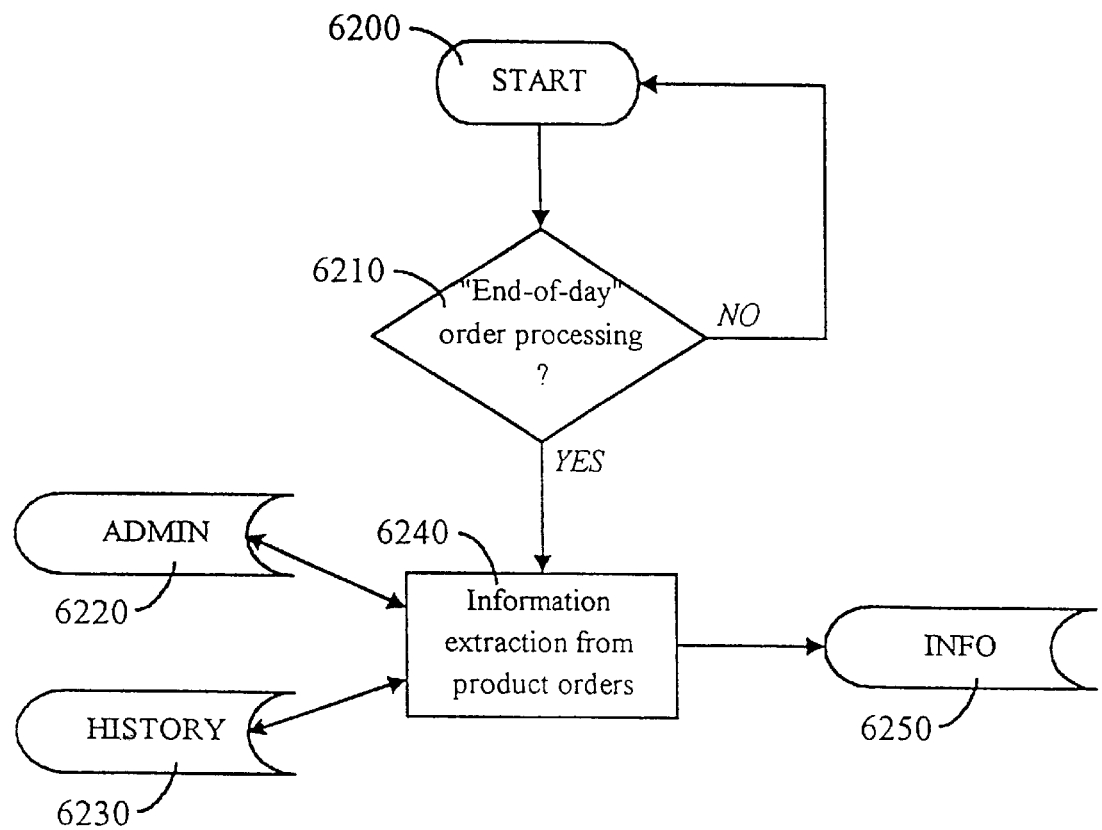
Figure 30:
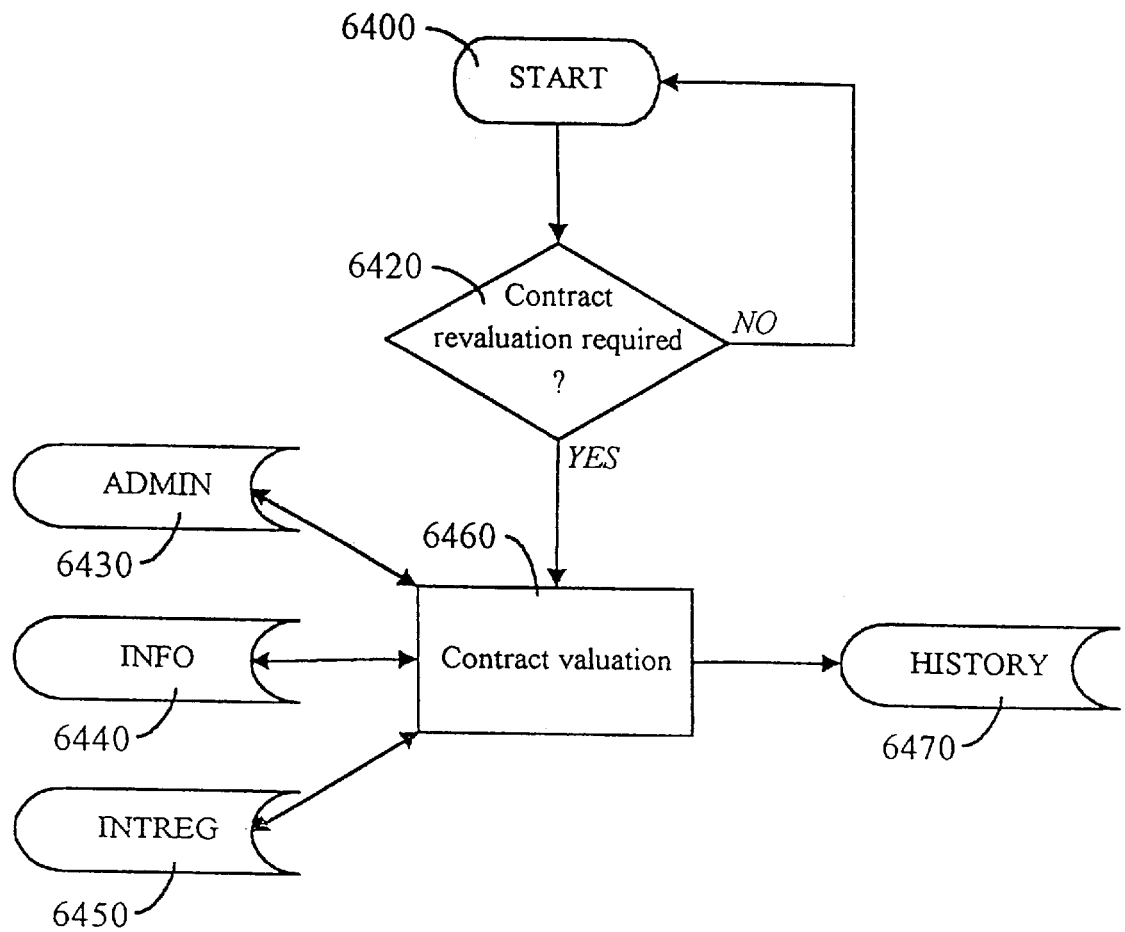
Figure 31:
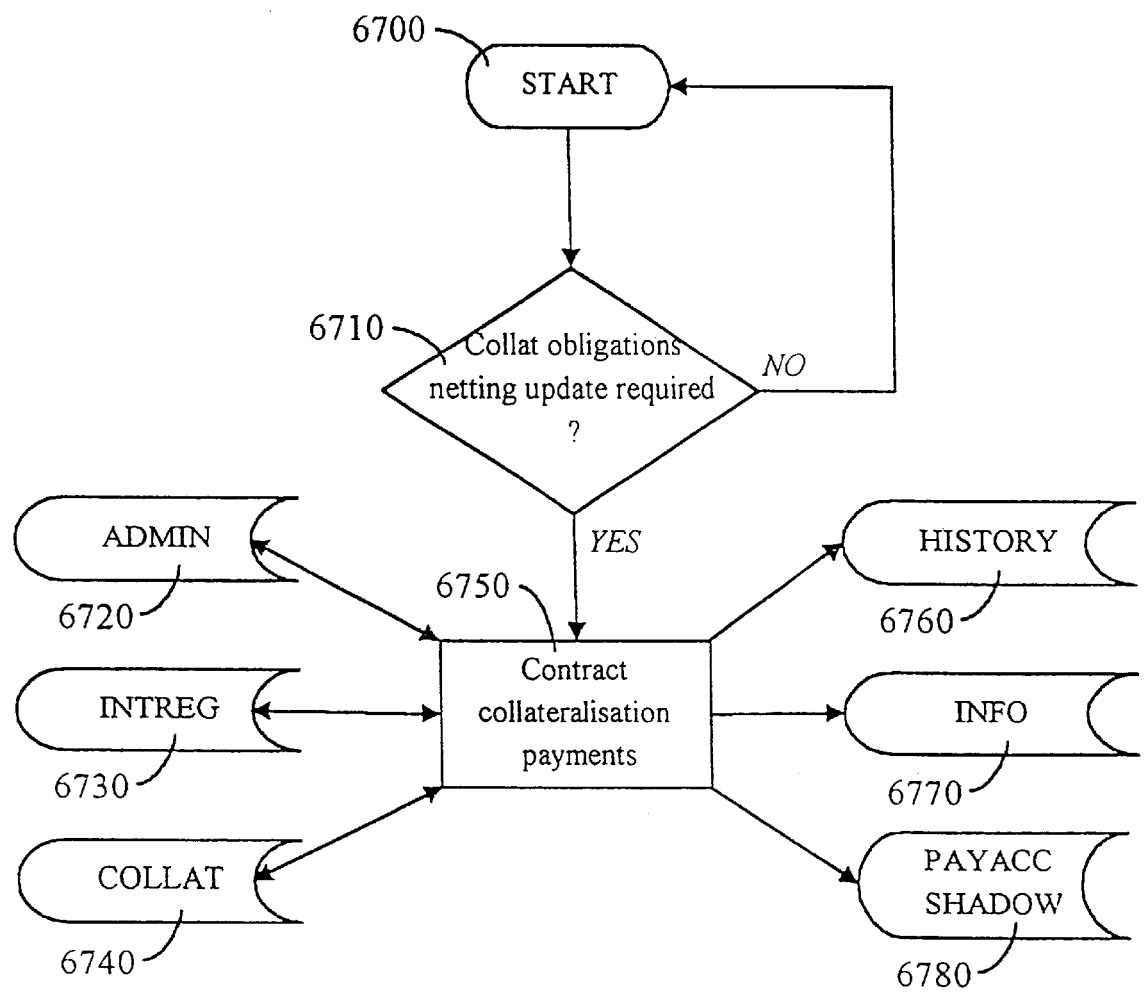
Figure 32:
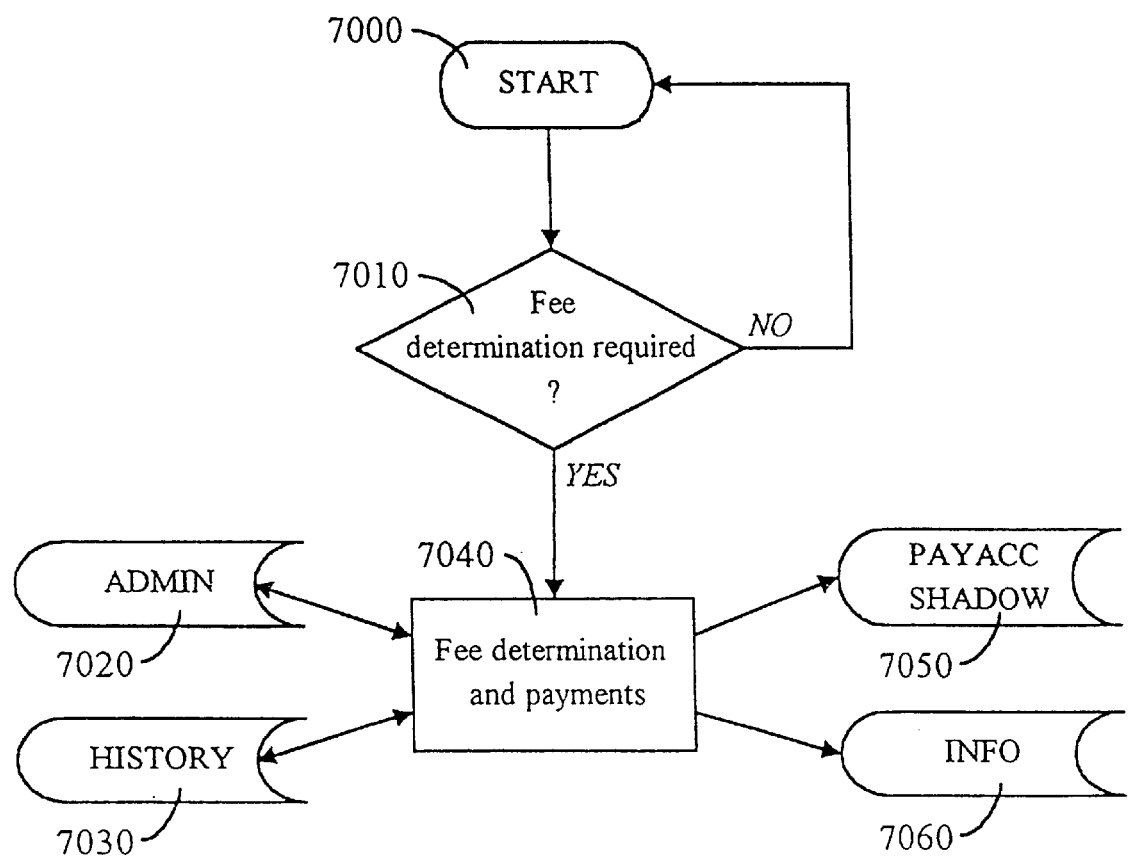
Figure 33:
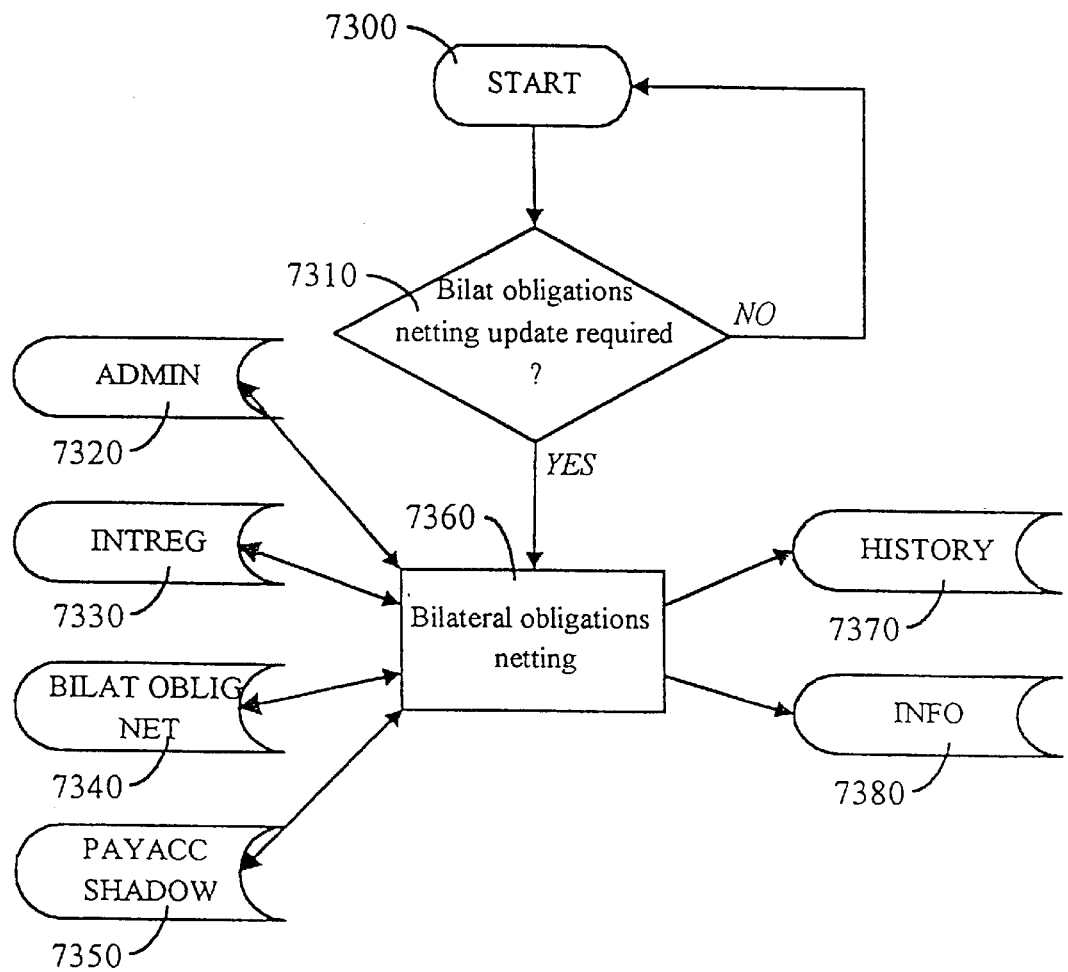

Information extraction from primary orders. This sub-process, flowcharted in FIG. 29, is effected after the completion of the defined operating day. Essentially, it involves the single task of processing the data-file, HISTORY, to yield pertinent information for the data-file INFO. One of the most important items of information drawn from HISTORY is (confidential) information on all of the prior day's potential counterparty consideration bid parameters, in particular the data items termed "assessed probabilities of occurrence". This information yields "market" information for the subsequent contract valuation sub-process.

Contract valuation. This sub-process, flowcharted in FIG. 30, draws principally upon the above-described "markets" information previously written to INFO. Pertinent data from this file is "applied against" all outstanding contracts maintained in INTREG, thereby yielding updated "future product value (FPV)", "expected value" and "distribution" value information for all contracts and, from this, revaluations of all future entitlement "expected values" and "distribution" values. All these revaluation figures are maintained in INTREG with applicable information also being written to INFO and HISTORY.

Contract collateralisation payments. This sub-process, flowcharted in FIG. 31, draws principally on the data-file INTREG. Following the contract valuation process, this collateralisation process involves relevant INTREG records being read and, depending (amongst other things) on the precalculated "present value" of the expected future entitlement associated with each relevant contract, a calculated portion of the present value of the expected future consideration amount is debited or credited to the PAYACC SHADOW file of the applicable collateralisation trustee entity, and the product ordering party and/or counterparty as is applicable.

Generally, if the most recent precalculated "present value" of the expected future entitlement associated with each relevant contract indicates a negative contract value, and if this negative value exceeds the prior contract valuation figure, the applicable entity's trust account is credited with the funds difference, with the entity's own consideration/entitlement transfer entity account being debited correspondingly. If this negative value does not exceed the prior contract valuation figure, the applicable entity's trust account is debited with the funds difference, with the entity's own consideration/entitlement transfer entity account being credited correspondingly. On the other hand, if the most recent precalculated "present value" of the expected future entitlement associated with each relevant contract indicates a positive contract value, the only collateralisation payment adjustment called for is one in which all funds (if any) in the applicable entity's trust account are transferred to the entity's own consideration/entitlement transfer entity account. In each of the above-described cases, a record of all entries effected is written to the data-file, COLLAT, and a subset of this information is written to the data-files HISTORY and INFO.

System Access and usage fee determination and payments. This subprocess, flowcharted in FIG. 32, deals with the determination and payment of system access and usage fees (as distinct from contract maturity date fee payments). The function draws principally on the data-files ADMIN, and HISTORY. Fee payment parameters are maintained in data-file ADMIN. These parameters are applied against the day's new records already written to HISTORY. Debits and credits for fees so determined are written to PAYACC SHADOW with summary information written to INFO and HISTORY.

Bilateral obligations netting. This subprocess, flowcharted in FIG. 33, effectively maintains an up-to-date matrix of the present values of expected future entitlement (and other) obligations between pairs of participating ordering parties and counterparties (as well as other participating CONTRACT APP and INVENTCO stakeholders), continually adjusted on the basis of required current consideration, entitlement and other payments/receipts as they occur. As required, the function updates the above-described matrix in two stages. First, with the most recent contract revaluation figures contained within INTREG. And second, with the end-of-day payment/receipt amounts contained within PAYACC SHADOW. Consideration/entitlement transfer entity transfers from/to applicable entities are determined (according to the application-promoter specified parameters for so doing) on the basis of whether or not any/all of the adjusted bilateral present value figures are in excess of their allowable limits. These entries are written to PAYACC SHADOW, with the data-files BILAT OBLIG NET, INTREG, HISTORY, and INFO being subsequently updated.

Figure 34:
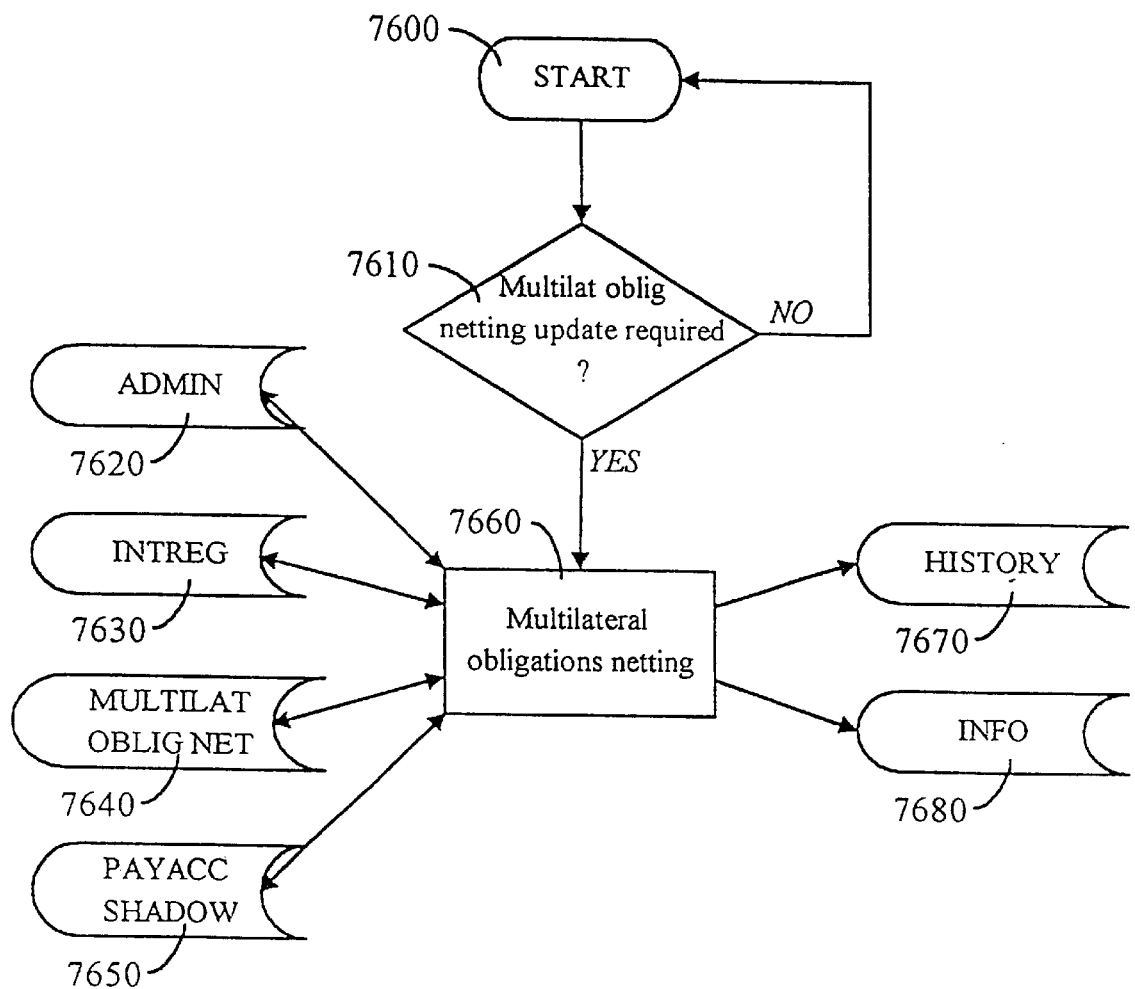

Multilateral obligations netting. This subprocess, flowcharted in FIG. 34, is essentially the same as the bilateral netting function except that a specified "clearing/trustee" entity is effectively interposed between all bilateral counterparties and, as such, netted obligations are only between the specified "clearing house/trustee" entity and each participating entity.

Figure 35:
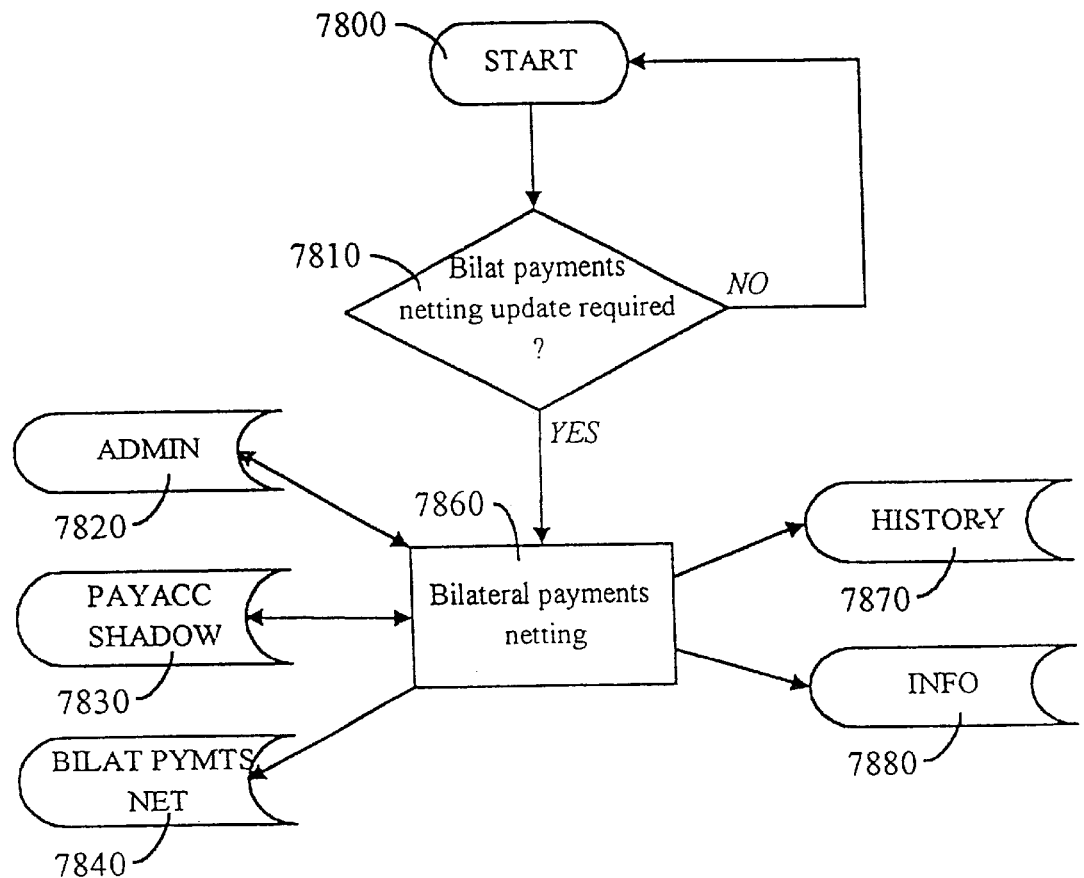

Bilateral payments netting. This subprocess, flowcharted in FIG. 35, is independent of the above-described bilateral and multilateral obligations netting subprocesses. The subprocess operates by producing a matrix of bilaterally netted payments/receipts based on records contained in the data-file, PAYACC SHADOW. Single netted payment/receipt figures are then rewritten to PAYACC SHADOW, with the data-files BILAT PYMTS NET, ADMIN, HISTORY and INFO being subsequently updated.

Figure 36:
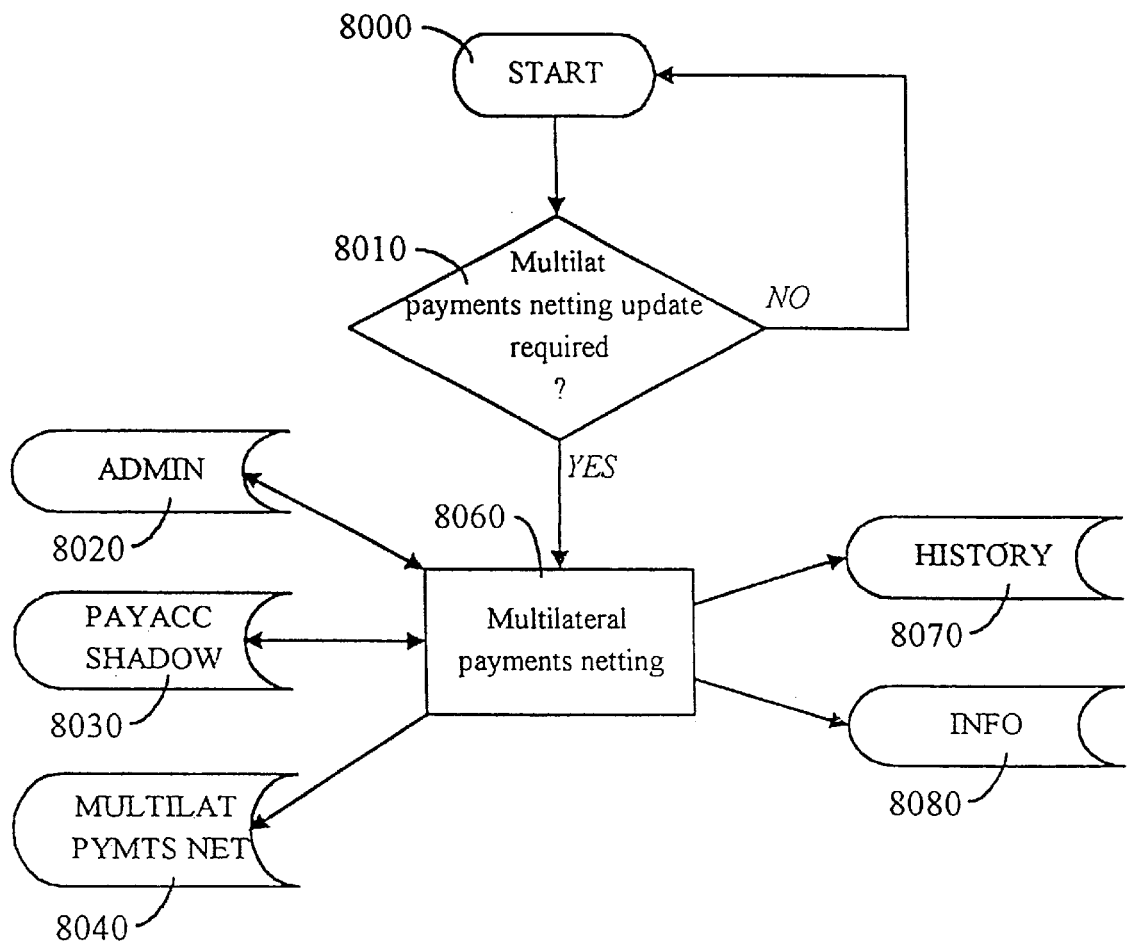
Figure 37:
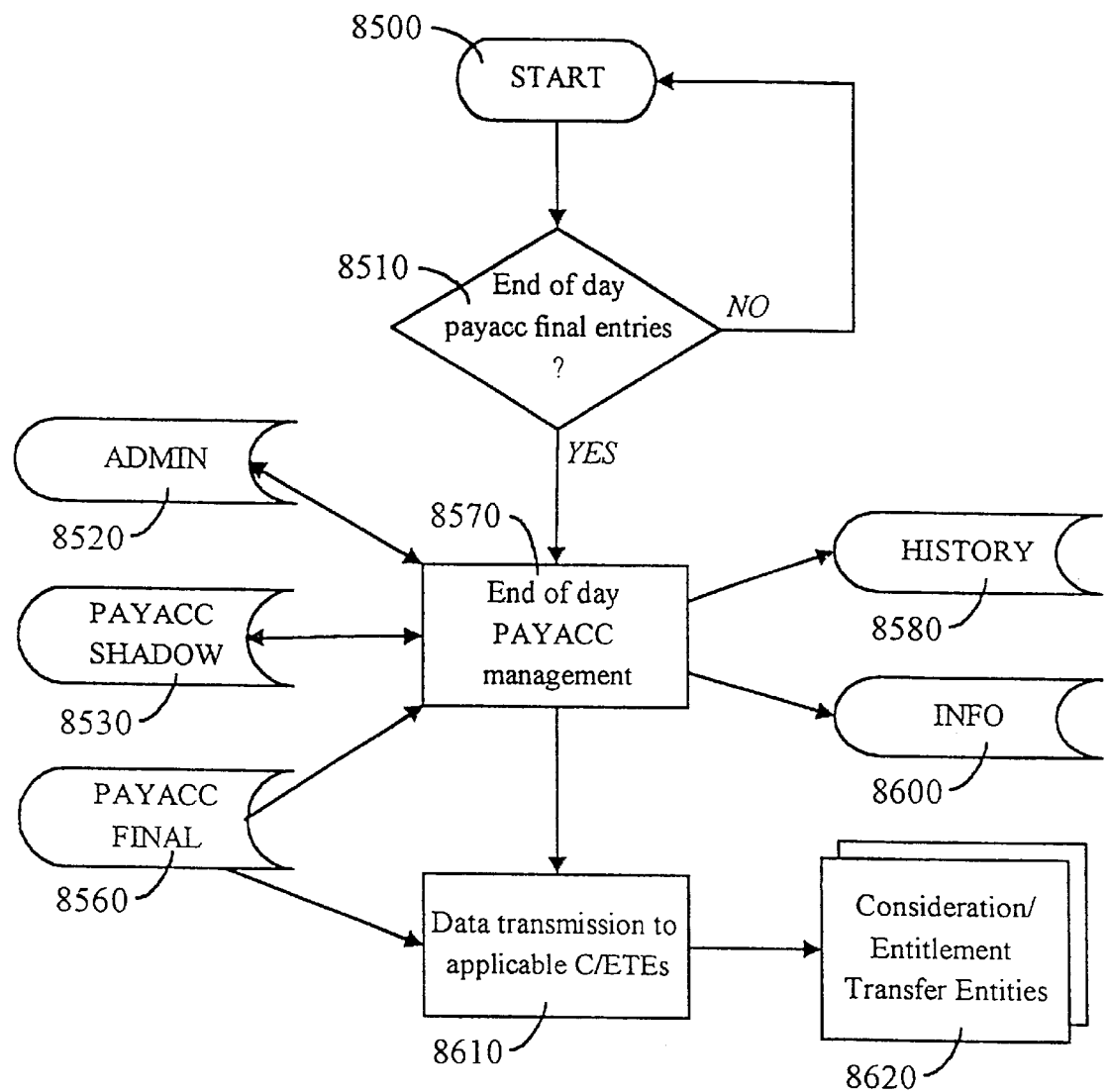
Figure 38:
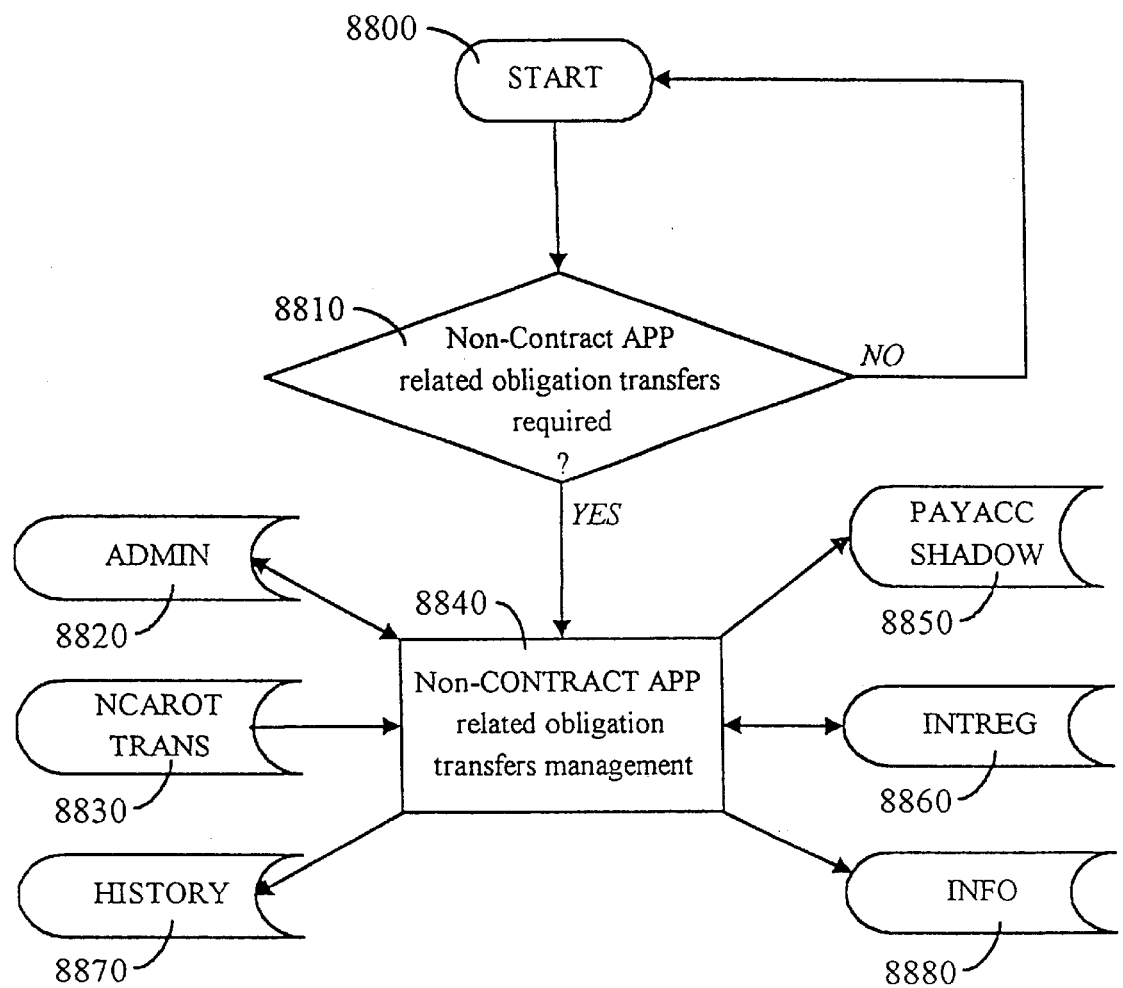
Figure 39:
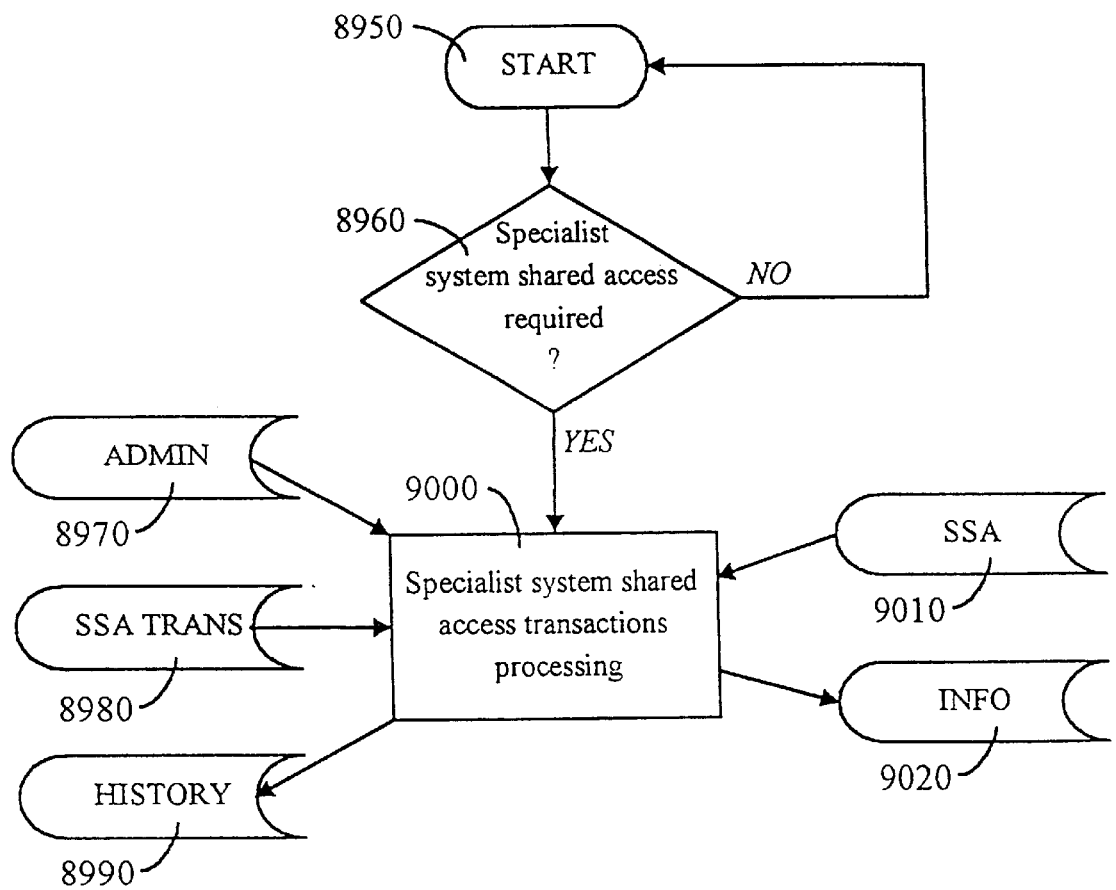
Figure 40:
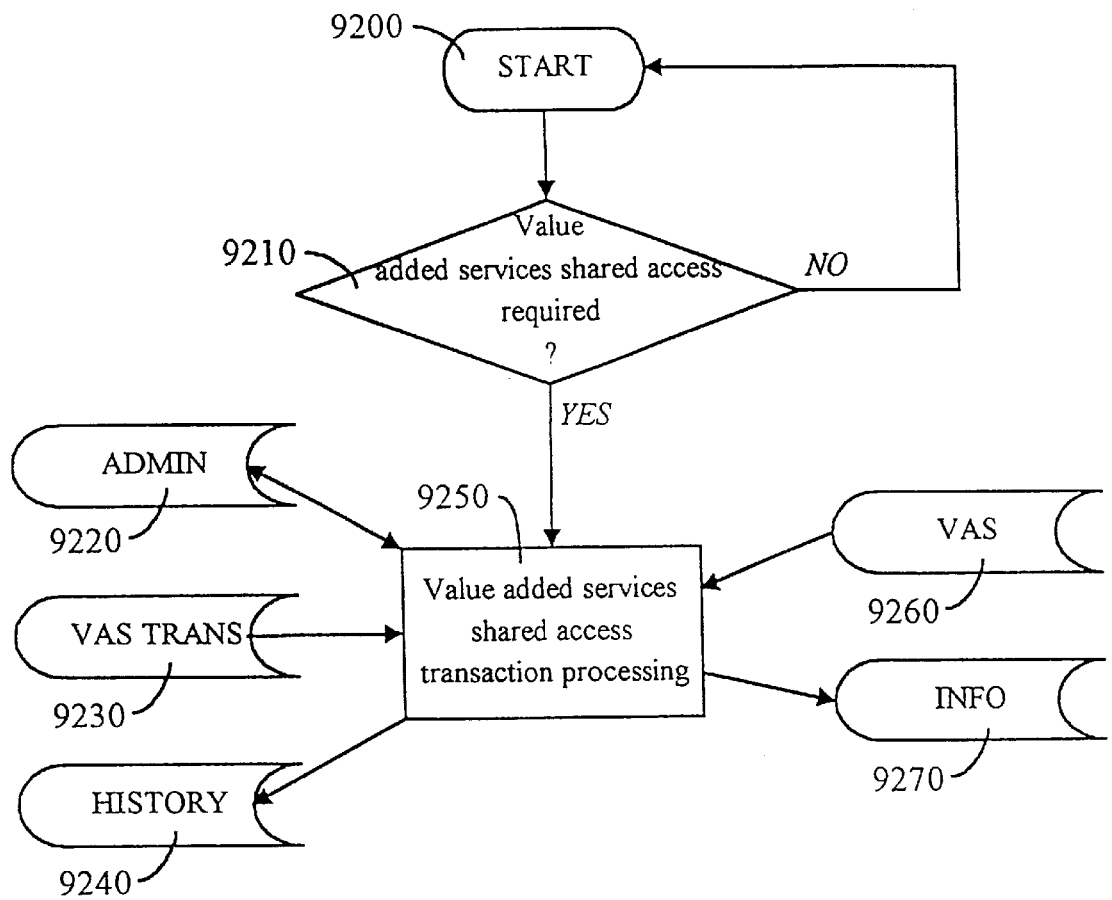

Multilateral payments netting. Like bilateral payments netting, this subprocess, flowcharted in FIG. 36, is independent of the above-described bilateral and multilateral obligations netting subprocesses. The subprocess operates by producing a matrix of bilaterally netted payments/receipts to/from the applicable "clearing house/trustee" entity based on records contained in the data-file, PAYACC SHADOW.

Single netted payment/receipt figures (to/from the "clearing house/trustee" entity) are then rewritten to PAYACC SHADOW, with the data-files MULTILAT PYMTS NET, ADMIN, HISTORY and INFO being subsequently updated.

"End-of-day" PAYACC management. This subprocess, flowcharted in FIG. 37, involves a three-stage process. First, the preparation of inter-consideration/entitlement transfer entity "balancing" transactions. Second, the transfer of the final contents of the PAYACC SHADOW data-file to the data-file, PAYACC FINAL. And third, the electronic transmission of the contents of PAYACC FINAL to the applicable consideration/entitlement transfer entities (external to INVENTCO). In turn, the subsidiary data-files, ADMIN, HISTORY, and INFO are updated.

Process 7

Process 7 handles non-CONTRACT APP-related obligation transfers between applicable INVENTCO stakeholders, that is, the transfer of ownership title over "assets" registered by INVENTCO—typically matched/confirmed contracts (recorded as CONTRACT APP INTREG records) and consideration/entitlement transfer entity resources (recorded as PAYACC records). Both of the above-mentioned items have value to their holder. This process enables holders of these items to assign or lend any portion of their holdings to others at their will through initiating the appropriate transactions as NCAROT TRANS. The process accesses a relatively small number of data files (See FIG. 38). NCAROT TRANS received result in appropriate updates to the primary data-files, PAYACC SHADOW and INTREG. In turn, the subsidiary data files, HISTORY, ADMIN and INFO are updated.

Process 8

Process 8 (flowcharted in FIG. 39) handles CONTRACT APP (and other INVENTCO) stakeholder shared-access to specialist systems to assist them decide how best to interface with one or more aspects of INVENTCO. In the case of CONTRACT APP stakeholders, the most likely users of this process, one collection of such specialist systems are termed "decision support systems". The purpose of these systems is to guide a user-stakeholder as to how it should react to/deal with the continually changing circumstances within the CONTRACT APP with which they are dealing. Different clusters of systems are applicable for different CONTRACT APP stakeholders. These systems involve a hierarchy of potentially any number of value-added components.

An example of one such system, useful to primary product ordering parties, is a system which helps an ordering party determine which of its prespecified, but as yet un-matched, orders it should withdraw and which of its potential new product orders it should submit. This system is in the form of a "utility optimization" mechanism which seeks to identify the best possible composition of outstanding orders (and thus, which existing, unmatched orders should be withdrawn and which new orders should be submitted) based on two things. First, an objective function which seeks to minimize the difference between a weighted sum of actual and desired values of a series of attributes (involving single or multiple products, covering the ordering party's "real business exposure" to each product, the ordering party's portfolio of contracts which have been "matched" but are not yet confirmed, orders which have been submitted but not yet matched, and potential yet-to-be-submitted orders (collectively termed the "buyer's objective portfolio"), these attributes including, amongst other things: the "expected value" of the objective portfolio; the "standard deviation" of the objective portfolio; the "incremental cash outflow" attribute of the objective portfolio; the "maximum absolute loss" attribute of the objective portfolio; the "expected loss" attribute of the objective portfolio; the "implied minimum return on investment" of the objective portfolio; and the "implied expected return on investment" of the objective portfolio. And second, a series of constraints specifying, amongst other things: the required "minimum values" of each objective function attribute; and required minimum product-shares in the ordering party's overall product portfolio. The mathematical form of this "optimization" could take any of a number of alternative forms.

An optimization mechanism similar to the one described above can also aid potential counterparties in defining their pricing parameters for application against incoming product orders.

Effectively, systems of the above-described type are collectively maintained as a software "library" within the applicable CONTRACT APP (although they may also be loaned by VIRPRO-authorised entities independent of INVENTCO and/or acquired by VIRPRO-authorised parties whether they are INVENTCO stakeholders or not). CONTRACT APP (and other INVENTCO) stakeholder requests to make use of software within this library are received by way of records in the file, SSA TRANS. These requests result in the appropriate records in the file SSA being accessed and made available for use via AXSCO and the applicable entity's authorised electronic link to INVENTCO. Appropriate records of the utilization of SSA records are written to the data-files HISTORY, ADMIN and INFO.

Process 9

Process 9 (flowcharted in FIG. 40) handles CONTRACT APP (and other INVENTCO) stakeholder shared-access to a range of INVENTCO-facilitated value added services. These services can include: accounting, reconciliation, and information services; value added information reseller services; financial services of multiple types; and data processing and telecommunications services. Effectively, software relating to these services is maintained as a software "library" within the applicable CONTRACT APP (although they may also be loaned by VIRPRO-authorised entities independent of INVENTCO and/or acquired by VIRPRO-authorised parties whether they are INVENTCO stakeholders or not). CONTRACT APP (and other INVENTCO) stakeholder requests to make use of software within this library are received by way of records in the file, VAS TRANS. These requests result in the appropriate records in the file VAS being accessed and made available for use via AXSCO and the applicable entity's authorised electronic link with INVENTCO. Appropriate records of the utilization of VAS records are written to the data-files HISTORY, ADMIN and INFO.

Process 2 Variables and Data Files

Listed below is the file name and description therefor.

Order Data Fields

OID Unique identification assigned by CONTRACT APP to every new order submitted.

BID Ordering party identification.

BREF Ordering party's own reference for this order.

PID Order field specifying the required product.

PMAT Product maturity date.

PC/ED Product consideration/entitlement denomination.

PCUR Product currency denomination.

PNCUR Product national currency denomination.

PPARAM Product specification parameters (eg. minimum value (PMIN), maximum value (PMAX), and the step size (PSTEP)).

MAXCONSID Maximum consideration the ordering party will pay for this contract.

PAYFUNC Pay-off function type, contingent on one or more index variables.

PAYPARAM Parameters associated with the PAYFUNC.

ACC CONSID The ordering party account the consideration is to be paid from. Implied is the account consideration/entitlement, currency, national currency.

ACC ENTITL The ordering party account the contract entitlement is to be paid into. Implied is the account consideration/entitlement, currency, national currency.

RET LIM Retention time limit for the order, which sets an expiration time for the order whilst remaining un-matched.

OPRICE Price calculated and selected for this order (this value will be the matching price).

SPRICE Counterparty identification with which the order was matched.

PAY TRAN Payment transaction number.

DCID Defined circumstances identification.

OANON Anonymous flag, set by the ordering party when seeking to avoid manual authorisation requests by other stakeholders.

OMANUAL Manual authorisation request flag. If set, the ordering party requires manual authorisation before the matched order is fully confirmed.

DTID Deal type identification which codes a combination of miscellaneous flags such as collateralisation, bilateral and multilateral netting requirements.

Counterparty Short List Arrays

PRICEFUNC(SID) Pricing function: function type and associated parameters.

ELFUNC(SID) Expected loss determination function: function type and associated parameters.

EVFUNC(SID) Expected value determination function: function type and associated parameters.

CR(SID) Commission rate to be used for the current defined circumstances.

DR(SID) Discount rate to be used for the current defined circumstances.

PRICE(SID) Price calculated by each counterparty.

EL(SID) Expected loss calculated for the current order by each counterparty.

AL(SID) Absolute loss calculated for the current order by each counterparty.

EV(SID) Expected values determined for the current order by each counterparty.

MCC(SID) Maximum composition any contract (as an expected loss) can have of the entire portfolio.

MC(SID) Maximum composition the product (as an expected loss) can have of the entire portfolio.

ELL1(SID) Order expected loss limit.

ELL2(SID) Expected loss limits set by the counterparty for the product.

ELL3(SID) Expected loss limits set by the counterparty for equivalent maturity date products.

ELL4(SID) Expected loss limits set by the counterparty for same month maturity products.

ELL5(SID) Expected loss limits set by the counterparty for orders in all products.

CEL2(SID) Current accumulated expected losses for the product.

CEL3(SID) Current accumulated expected losses for equivalent maturity date products.

CEL4(SID) Current accumulated expected losses for same month maturity products.

CEL5(SID) Current accumulated expected losses for orders in all products.

ALL1(SID) Absolute loss limit function for each contract.

ALL2(SID) Absolute loss limit function set for the product.

CAL2(SID) Current absolute limit function accumulated for the product.

EVL1(SID) Expected value limit on each order.

C-C/EDXCHANG(SID) Counterparty consideration/entitlement denomination exchange rates which convert the ordering party's consideration denomination of ACC CONSID (and MAXCONSID) into the product's consideration denomination.

C-CXCHANG(SID) Counterparty currency exchange rates which covert the ordering party's currency of ACC CONSID (and MAXCONSID) into the product's denominated currency.

C-NCXCHANG(SID) Counterparty national currency exchange rates which convert the ordering party's national currency of ACC CONSID (and MAXCONSID) into the product's denominated national currency.

E-C/EDXCHANG(SID) Counterparty consideration/entitlement denomination exchange rates which convert the ordering party's consideration denomination of ACC ENTITL into the product's consideration denomination.

E-CXCHANG(SID) Counterparty currency exchange rates which covert the ordering party's currency of ACC ENTITL into the product's denominated currency.

E-NCXCHANG(SID) Counterparty national currency exchange rates which convert the ordering party's national currency of ACC ENTITL into the product's denominated national currency.

Miscellaneous Variables

BPRICE Best price selected from the PRICE(SID) array.

SID The currently selected or viewed counterparty identification.

INDEX Index counter variable required for calculating order prices.

P1 Value calculated by a pricing function at an index point.

P2 Value calculated by a pay-off function at an index point.

Master Files

File Description/Contents

PORD NEW Holds details of all new orders submitted by ordering parties:

BID Ordering party identification.

BREF Ordering party's own reference for this order.

PID Order field specifying the required product.

MAXCONSID Maximum consideration the ordering party will pay for this contract.

PAYFUNC Pay-off function type, contingent on one or more index variables.

PAYPARAM Parameters associated with the PAYFUNC.

ACC CONSID The ordering party account the consideration is to be paid from.

ACC C/ED The ordering party account consideration/entitlement.

ACC CUR The ordering party account currency.

ACC NCUR The ordering party account national currency.

ACC ENTITL The ordering party account the contract entitlement is to be paid into.

RET LIM Retention time limit for the order, which sets an expiration time for the order whilst remaining un-matched.

OANON Anonymous flag, set by the ordering party when seeking to avoid manual authorisation requests by other stakeholders.

OMANUAL Manual authorisation request flag. If set, the ordering party requires manual authorisation before the matched order is fully confirmed.

DTID Deal type identification which codes a combination of miscellaneous flags such as collateralisation, bilateral and multilateral netting requirements.

PORD QUEUE This master file holds details of orders which have already been authorised, and have attempted to match once before. Fields as in ORD NEW plus some additional fields:

OID Unique identification assigned by P-CONTRACT to every new order submitted.

PMAT Product maturity date.

C/ED Product consideration/entitlement denomination.

PCUR Product currency denomination.

PNCUR Product national currency denomination.

PPARAM Product specification parameters (eg. minimum value (PMIN), maximum value (PMAX), and the step size (PSTEP)).

DCID Defined circumstances identification.

PORD REJ All rejected orders reside in this file. Fields as in ORD QUEUE plus some additional fields:

ERRCODE Error code indicating why the order was rejected.

PORD CONF When an order is matched and fully confirmed, full details are stored in this master file. Fields as in ORD QUEUE plus some additional fields:

OPRICE Price calculated and selected for this order. This value will be the matching price.

SPRICE Counterparty identification with which the order was matched.

PAY TRAN Payment transaction number.

PPRODUCT This master file holds information (definition details) about each product known to the system:

PID Product identification.

PMAT Product maturity date.

PC/ED Product consideration/entitlement denomination.

PCUR Product currency denomination.

PNCUR Product national currency denomination.

PPARAM Product specification parameters (eg. minimum value (PMIN), maximum value (PMAX), and the step size (PSTEP)).

PDEAL LIST This file holds a list of the ordering party/product/counterparty tuples of allowable deals to occur. Thus by specifying an ordering party (BID) and product (PID), a list of counterparties who are prepared to enter into a deal with the ordering party/product combination, can be obtained:

BID Ordering party identification

PID Product identification

SID Counterparty identification

ANON All stakeholder identifications requiring anonymous confirmation.

MANUAL All stakeholder identifications requiring manual authorisation

PSEL DC This file allows counterparties to define identifications for sets of potential order parameters.

Any order data field can be used to define an order.

Each defined circumstance identification is then used to set unique pricing parameters:

DCID Defined circumstances identifications.

BID Ordering party identification

PAYFUNC Pay-off function type, contingent on one or more index variables.

PAYPARAM Parameters associated with the PAYFUNC.

ACC CONSID The ordering part account the consideration is to be paid from.

ACC ENTITL The ordering party account the contract entitlement is to be paid into.

DTID Deal type identification.

PC/ED Product consideration/entitlement denomination.

PCUR Product currency denomination.

PNCUR Product national currency denomination.

PSEL PRICE Contains all counterparty pricing parameters, including commission rates, discount rates and exchange rates:

SID Counterparty identification

PID Product identification

DCID Defined circumstances identification

PRICEFUNC Pricing function: function type and associated parameters.

CR Commission rate to be used for the current ordering party in the current product.

DR Discount rate to be used for the current ordering party in the current product.

C-C/EDXCHANG Counterparty consideration/entitlement denomination exchange rates which convert the ordering party's consideration denomination of ACC CONSID (and MAXCONSID) into the product's consideration denomination.

C-CXCHANG Counterparty currency exchange rates which covert the ordering party's currency of ACC CONSID (and MAXCONSID) into the product's denominated currency.

C-NCXCHANG Counterparty national currency exchange rates which convert the ordering party's national currency of ACC CONSID (and MAXCONSID) into the product's denominated national currency.

E-C/EDXCHANG Counterparty consideration/entitlement denomination exchange rates which convert the ordering party's consideration denomination of ACC ENTITL into the product's consideration denomination.

E-CXCHANG Counterparty currency exchange rates which covert the ordering party's currency of ACC ENTITL into the product's denominated currency.

E-NCXCHANG Counterparty national currency exchange rates which convert the ordering party's national currency of ACC ENTITL into the product's denominated national currency.

PSEL LIMIT Holds all counterparty portfolio limits and current accumulated exposures in the various mathematical forms allowed by the system:

SID Counterparty identification

PID Product identification

DATE Product maturity date.

MCC Maximum composition any contract (as an expected loss) can have of the entire portfolio.

MC Maximum composition the product (as an expected loss) can have of the entire portfolio.

ELL1 Order expected loss limit.

ELL2 Expected loss limits set by the counterparty for the product.

ELL3 Expected loss limits set by the counterparty for equivalent maturity date products.

ELL4 Expected loss limits set by the counterparty for same month maturity products.

ELL5 Expected loss limits set by the counterparty for orders in all products.

CEL2 Current accumulated expected losses for the product.

CEL3 Current accumulated expected losses for equivalent maturity date products.

CEL4 Current accumulated expected losses for same month maturity products.

CEL5 Current accumulated expected losses for orders in all products.

ALL1 Absolute loss limit function for each contract.

ALL2 Absolute loss limit function set for the product.

CAL2 Current absolute limit function accumulated for the product.

EVL1 Expected value limit on each order.

PAYACC Payment accounts for all registered stakeholders (inc. balances and previous SHADOW transactions), are stored in this master file:

ID Stakeholder identification.

NO Account number.

ACC C/ED The ordering party account consideration/entitlement.

ACC CUR The ordering party account currency.

ACC NCUR The ordering party account national currency.

BALANCE Available funds.

GID Stakeholder identification guaranteeing the account.

Risk Management Contracts

Risk management contracts is a term used to refer to one type of contractual obligation which can be, but does not need to be, traded/exchanged/transferred, and subsequently processed and settled, using an INVENTCO system. Risk management contracts consist of "primary" isk management contracts; "secondary" risk management contracts; "derivative-primary" risk management contracts; and "derivative-secondary" risk management contracts.

"Primary" risk management contracts can be "simple" and "complex" in nature ("simple" contracts being derivatives of "complex" contracts).

A "simple" primary risk management contract is a tradeable or untradeable contract conveying an obligation on an entity, upon that entity being granted a consideration by another entity (or accepting a pledge to be granted a consideration by the other entity), to make an entitlement to that other entity depending on the value of a defined phenomenon, determined at a defined time in the future.

A "complex" primary risk management contract is a tradeable or untradeable contract conveying an obligation on either or both of two entities, upon one entity [usually] being granted a consideration by the other entity (or accepting a pledge to be granted a consideration by the other entity), to make an entitlement to pay/receive an entitlement from one another, depending on the value of a defined phenomenon, determined at a defined time in the future. A "complex" contract may, in turn, be "basic" or "advanced" in nature: a "complex-basic" contract being one that does not involve ordering party and/or matched order counterparty "collateralisation payments" to a third-party trustee or clearing entity during the life of a contract; and a "complex-advanced" contract being one that does involve ordering party and/or matched order counterparty "collateralisation payments" to a third-party trustee or clearing entity during the life of a contract.

"Secondary" risk management contracts are pre-existing "primary" risk management contracts offered for trade (individually or as a portfolio) by a "risk-counterparty" stakeholder to the underlying contract.

"Derivative-primary" risk management contracts are options contracts, or futures contracts, or forward contracts, or forward rate agreements, or swaps, or like financial instruments based on specified, but yet-to-be-established, primary risk management contracts.

"Derivative-secondary" risk management contracts are options contracts, or futures contracts, or forward contracts, or forward rate agreements, or swaps, or like financial instruments based on pre-existing primary risk management contracts (which may have been traded since they were first established), including instruments based on: specified, but yet-to-be established, secondary risk management contracts; and the intended tertiary trading/exchange/transfer of specified, established, secondary risk management contracts.

What is claimed is:

1. A method of exchanging an obligation between parties, wherein an exchange obligation is administered by a supervisory institution, and wherein at least one credit record and one debit record is maintained with an exchange institution, the method comprising:

(a) maintaining a shadow credit record and a shadow debit record for a party to be held independently by the supervisory institution from the exchange institution;

(b) for every transaction resulting in an exchange obligation, the supervisory institution electronically adjusting said shadow credit record and/or shadow debit record, allowing only those transactions that do not result in a value of said shadow debit record being less than a value of said shadow credit record; and (c) at the end of a period of time, the supervisory institution providing an instruction to the exchange institution to credit and/or debit in accordance with said adjustments of said allowed transactions, wherein said instruction being an irrevocable, time invariant obligation placed on the exchange institution.

2. The method of claim 1, wherein said exchange obligation arises out of a transaction linked to a share price.

3. The method of claim 1, wherein said exchange obligation arises out of a transaction linked to a weather event.

4. The method of claim 1, wherein said exchange obligation arises out of a transaction linked to a market event.

5. The method of claim 1, wherein said exchange obligation involves the transfer of shares in financial or physical assets.

6. The method of claim 1, wherein said exchange obligation involves a wager.

7. The method of claim 1, wherein said exchange obligation involves the transfer of a commodity.

8. The method of claim 1, wherein said exchange obligation arises out of a transaction involving money for goods, services, promises, credits or warrants.

9. The method of claim 1, wherein said period of time is a part of a day.

10. The method of claim 1, wherein each said adjustment takes place in chronological order.

11. The method of claim 1, wherein said step of providing an instruction represents one or more credits and/or one or more debits netted throughout a period for each party in respect to transactions of that period of time.

12. The method of claim 1, wherein the exchange institution is a credit card company.

13. The method of claim 1, wherein the exchange institution is a debit card company.

14. The method of claim 1, wherein the exchange institution is a bank.

15. The method of claim 1, wherein the exchange institution is a central bank.

16. The method of claim 1, wherein the exchange institution is a guarantor offering credit to one or more parties involved in said exchange obligation.

17. The method of claim 1, wherein the exchange institution is a party offering credit to one or more other parties involved in said exchange obligation.

18. The method of claim 1, wherein said exchange obligation arises out of a currency exchange transaction.

19. The method of claim 1, wherein two or more exchange institutions operate in different time zones.

20. The method of claim 1, wherein two or more exchange institutions have different account processing cycles.

21. The method of claim 1, wherein the transaction arises out of a collateralization payment obligation.

22. The method of claim 1, further comprising the step of obtaining from the exchange institution a balance for said shadow credit record and/or said shadow debit record.

23. The method of claim 1, wherein the exchange institution is a non-bank clearing house or depository.

24. The method of claim 1, wherein at least one credit record and one debit record is maintained with another exchange institution, the method further comprising administering an exchange obligation involving said another exchange institution in accordance with steps (a)–(c).

25. The method of claim 24, wherein said another exchange institution operates in a different time zone than the exchange institution.

26. The method of claim 24, wherein said another exchange institution has a different account processing cycle than the exchange institution.

27. A method of exchanging an obligation between parties, wherein an exchange obligation is administered by a supervisory institution, and wherein an account is maintained with an exchange institution, the method comprising:
   (a) maintaining a shadow record for a first party to be held independently by the supervisory institution from the exchange institution;
   (b) for every transaction resulting in an exchange obligation, the supervisory institution electronically adjusting said shadow record, allowing only those transactions that do not result in a value of said shadow record being less than zero; and
   (c) exchanging at least one transaction between the supervisory institution and the exchange institution at the end of a period of time in accordance with said adjustments made in step (b), wherein said transaction being an irrevocable, time invariant obligation placed on the exchange institution.

28. The method of claim 27, wherein the account pertains to shares in financial or physical assets.

29. The method of claim 27, wherein the account pertains to participation rights in wagers.

30. The method of claim 27, wherein the account pertains to goods.

31. The method of claim 27, wherein the account pertains to services.

32. The method of claim 27, wherein the account pertains to central bank exchange settlement account deposits.

33. The method of claim 27, wherein the account pertains to financial instrument deposits.

34. The method of claim 27, wherein the account pertains to credit extended to/from a party or to/from a guarantor of a party.

35. The method of claim 27, wherein the account includes an overdraft or line-of-credit with an exchange institution.

36. The method of claim 27, wherein said first party holds one or more accounts with more than one exchange institution.

37. The method of claim 27, wherein the supervisory institution and exchange institution are legally and/or geographically domiciled in different countries.

38. The method of claim 27, wherein one party is a buyer and the other party is a seller.

39. The method of claim 27, further comprising debiting and/or crediting said shadow record based on said transaction.

40. The method of claim 27, wherein said exchange obligation arises out of a collateralization payment obligation.

41. The method of claim 27, wherein said transaction involves a weather event.

42. The method of claim 27, wherein said transaction involves a market event.

43. The method of claim 27, wherein said transaction involves a wager.

44. The method of claim 27, wherein said transaction involves an exchange of money for goods, services, promises, credits or warrants.

45. The method of claim 27, wherein the exchange institution is a credit card company.

46. The method of claim 27, wherein the exchange institution is a debit card company.

47. The method of claim 27, wherein the exchange institution is a party offering credit to one or more other parties involved in said exchange obligation.

48. The method of claim 27, further comprising the step of obtaining from the exchange institution a balance for said shadow record.

49. The method of claim 27, wherein a second party maintains an account with an exchange institution that is different from the exchange institution that maintains the account for said first party.

50. The method of claim 49, wherein two or more exchange institutions operate in different time zones.

51. The method of claim 49, wherein two or more exchange institutions have different account processing cycles.

52. The method of claim 27, wherein exchanging said at least one transaction between the supervisory and the exchange institution at the end of a period of time represents netted adjustments made in step (b).

53. The method of claim 27, wherein said period of time is a part of a day.

54. The method of claim 27, wherein said exchange obligation arises out of a currency exchange transaction.

55. The method of claim 27, wherein the exchange institution is a bank.

56. The method of claim 27, wherein the exchange institution is a central bank.

57. The method of claim 27, wherein two or more exchange institutions have different account processing cycles.

58. The method of claim 27, wherein an account is maintained with another exchange institution, the method further comprising administering an exchange obligation involving said another exchange institution in accordance with steps (a)–(c).

59. The method of claim 58, wherein said another exchange institution operates in a different time zone than the exchange institution.

60. The method of claim 58, wherein said another exchange institution has a different account processing cycle than the exchange institution.

61. A method of exchanging a payment obligation of a currency exchange transaction between banks, wherein an exchange obligation is administered by a supervisory institution, and wherein at least one bank maintains a credit record and a debit record with a central bank, the method comprising:
   (a) maintaining a shadow credit record and a shadow debit record for a bank to be held independently by the supervisory institution from the central bank;
   (b) for every currency exchange transaction resulting in a payment obligation, the supervisory institution electronically adjusting said shadow credit record and/or shadow debit record, allowing only those currency exchange transactions that result in a net positive shadow record balance; and (c) periodically providing an instruction to the central bank to credit and/or debit in accordance with said adjustment of said allowed currency exchange transaction, wherein said instruction being an irrevocable, time invariant obligation placed on the central bank.

62. The method of claim 61, wherein each said adjustment takes place in chronological order.

63. The method of claim 61, further comprising the step of obtaining from the central bank a balance for said shadow credit record and/or said shadow debit record.

64. The method of claim 61, wherein the step of periodically providing said instruction occurs at an end of a processing cycle.

65. A method of exchanging a payment obligation between a buyer and a seller, wherein the exchange of the payment obligation is administered by a supervisory institution, and wherein the buyer and seller maintain an account with a bank, the method comprising:

(a) maintaining a shadow record for the buyer or the seller to be held independently by the supervisory institution from the bank;

(b) for every transaction resulting in a payment obligation, the supervisory institution electronically adjusting said shadow record, allowing only those payment transactions that do not result in a value of said shadow record being less than zero; and (c) exchanging at least one account transaction between the supervisory institution and the bank at the end of a period of time in accordance with said adjustments made in step (b), wherein said account transaction being an irrevocable, time invariant obligation placed on the bank.

66. The method of claim 65, further comprising the step of obtaining from the bank a balance for said shadow record.

67. The method of claim 65, wherein said period of time is a part of a day.

68. A method of exchanging an obligation between parties, wherein an exchange obligation is administered by a supervisory institution, the method performed by the supervisory institution, comprising:

maintaining a first account for a first party, independent from a second account maintained by a first exchange institution;

maintaining a third account for a second party, independent from a fourth account maintained by a second exchange institution;

electronically adjusting said first account and said third account in order to effect the exchange obligation between said first party and said second party after ensuring that said first party and said second party have adequate value in said first account and said third account, respectively; and providing an instruction to said first exchange institution and said second exchange institution to adjust said second account and said fourth account in accordance with the adjustment of said first account and said third account, wherein said instruction being an irrevocable, time invariant obligation placed on said first exchange institution and said second exchange institution.

69. The method of claim 68, wherein said first and/or second exchange institution is a central bank.

70. The method of claim 69, wherein said first exchange institution and said second exchange institution are the same.

71. The method of claim 68, wherein said second account and said fourth account are the same account.

72. The method of claim 68, wherein the exchange obligation involves currency.

73. The method of claim 68, wherein said first and/or second exchange institution is a non-bank clearing house or depository.

74. The method of claim 68, wherein adequate value requires that said first account and said third account have a positive balance.

75. The method of claim 68, wherein said instruction to said first exchange institution and said second exchange institution represents adjustments to said first and said third account netted throughout a period of time.

\* \* \* \* \*

UNITED STATES PATENT AND TRADEMARK OFFICE
CERTIFICATE OF CORRECTION

PATENT NO. : 6,912,510 B1
DATED : June 28, 2005
INVENTOR(S) : Ian Kenneth Shepherd It is certified that error appears in the above-identified patent and that said Letters Patent is hereby corrected as shown below:

Title page,
Item [63], Related U.S. Application Data, please replace "5,970,497" with
-- 5,970,479 --.
Item [30], Foreign Application Priority Data, please replace "Jul. 12, 1994" with
-- Dec. 7, 1994 --.

Signed and Sealed this

Twenty-fifth Day of October, 2005

JON W. DUDAS
*Director of the United States Patent and Trademark Office*